(12) United States Patent
Regan

(10) Patent No.: US 6,611,264 B1
(45) Date of Patent: *Aug. 26, 2003

(54) DEFERRED SCANLINE CONVERSION ARCHITECTURE

(75) Inventor: Matthew James Patrick Regan, Victoria (AU)

(73) Assignee: Interval Research Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/172,812

(22) Filed: Jun. 13, 2002

Related U.S. Application Data

(63) Continuation of application No. 09/336,522, filed on Jun. 18, 1999, now Pat. No. 6,407,736.

(51) Int. Cl.[7] ................................................ G06T 15/00
(52) U.S. Cl. ...................................................... 345/422
(58) Field of Search ................................ 345/419, 420, 345/422, 423, 424, 426, 428, 619

(56) References Cited

U.S. PATENT DOCUMENTS

| 3,763,365 A | 10/1973 | Seitz ............................ 235/156 |
| 3,816,726 A | 6/1974 | Sutherland et al. .......... 235/152 |
| 3,889,107 A | 6/1975 | Sutherland et al. .......... 235/152 |
| 3,893,075 A | 7/1975 | Organ et al. .............. 340/172.5 |
| 4,271,431 A | 6/1981 | Steber ......................... 358/140 |
| RE31,200 E | 4/1983 | Sukonick et al. ............ 340/724 |
| 4,471,449 A | 9/1984 | Leavitt et al. ............... 364/577 |
| 4,477,834 A | 10/1984 | Beaumont et al. ........... 358/113 |
| 4,625,289 A | 11/1986 | Rockwood ................... 364/522 |
| 4,646,251 A | 2/1987 | Hayes et al. ................. 364/518 |
| 4,873,515 A | 10/1989 | Dickson et al. .............. 340/728 |
| 4,885,703 A | 12/1989 | Deering ....................... 364/522 |
| 4,918,626 A | 4/1990 | Watkins et al. .............. 364/522 |
| 4,945,500 A | 7/1990 | Deering ....................... 364/522 |
| 4,967,392 A | 10/1990 | Werner et al. ............... 364/900 |
| 5,061,919 A | 10/1991 | Watkins ....................... 340/721 |
| 5,136,664 A | 8/1992 | Bersack et al. ................ 382/49 |
| 5,163,127 A | 11/1992 | Ikumi et al. ................. 395/126 |
| 5,251,160 A | 10/1993 | Rockwood et al. .......... 364/578 |
| 5,303,340 A | 4/1994 | Gonzalez-Lopez et al. . 395/141 |
| 5,343,558 A | 8/1994 | Akeley ......................... 395/126 |
| 5,347,618 A | 9/1994 | Akeley ......................... 395/121 |
| 5,361,386 A | 11/1994 | Watkins et al. .............. 395/130 |
| 5,381,519 A | 1/1995 | Brown et al. ................ 395/132 |

(List continued on next page.)

OTHER PUBLICATIONS

Akeley, Kurt, "Reality Engine Graphics", SIGGRAPH 93, Anaheim, CA. Aug. 1–6, 1993, pp 109–116.

(List continued on next page.)

*Primary Examiner*—Phu K. Nguyen
(74) *Attorney, Agent, or Firm*—Van Pelt & Yi LLP

(57) ABSTRACT

The deferred scanline converter system in accordance with the present invention receives. triangle data from a front end processor, identifies the triangles that are in competition for a given pixel location, and determines the winning triangle from among the competing triangles to generate the pixel for that pixel location. The system includes a triangle buffer write logic and a scan-out logic. The triangle buffer write logic initially receives triangle data, re-orients the triangle data to top, middle, and bottom vertices, and writes the triangle data to the triangle buffer in accordance with a triangle buffer writing scheme. The writing scheme uses a coverage mask to limit the number of triangles in competition for a given pixel location (i.e., if a triangle cannot be written to the triangle buffer within the confines of the coverage mask, it will be discarded). The scan-out logic performs pixel generation so that the pixel can be generated and displayed to the monitor at the time that the pixel is generated. The scan-out logic includes a triangle cache, a column of coefficient evaluators, an array of z-interpolator processors, an image composition network, and a shading/texture mapping unit. The entire scan-out logic is pipelined for fast and efficient operation.

23 Claims, 63 Drawing Sheets

U.S. PATENT DOCUMENTS

| | | | | |
|---|---|---|---|---|
| 5,392,385 | A | 2/1995 | Evangelisti et al. | 395/131 |
| 5,392,393 | A | 2/1995 | Deering | 395/162 |
| 5,408,606 | A | 4/1995 | Eckart | 395/162 |
| 5,422,991 | A | 6/1995 | Fowler | 395/143 |
| 5,446,836 | A | 8/1995 | Lentz et al. | 395/141 |
| 5,457,775 | A | 10/1995 | Johnson, Jr. et al. | 395/141 |
| 5,471,568 | A | 11/1995 | Webb et al. | 395/133 |
| 5,471,573 | A | 11/1995 | Kaasila | 395/141 |
| 5,493,644 | A | 2/1996 | Thayer et al. | 395/163 |
| 5,561,745 | A | 10/1996 | Jackson et al. | 395/119 |
| 5,574,847 | A | 11/1996 | Eckart et al. | 395/505 |
| 5,579,455 | A | 11/1996 | Greene et al. | 395/122 |
| 5,579,456 | A | 11/1996 | Cosman | 395/128 |
| 5,583,974 | A | 12/1996 | Winner et al. | 395/122 |
| 5,598,517 | A | 1/1997 | Watkins | 395/151 |
| 5,606,650 | A | 2/1997 | Kelley et al. | 395/130 |
| 5,651,104 | A | 7/1997 | Cosman | 395/128 |
| 6,275,236 | B1 | 8/2001 | Delahunty | 345/473 |
| 6,407,736 | B1 * | 6/2002 | Regan | 345/422 |

OTHER PUBLICATIONS

Deering, Michael, et al, "The Triangle Processor and Normal Vector Shader: A VLSI System for High Performance Graphics", SIGGRAPH '88, Atlanta, Aug. 1–5, 1988, Computer Graphics, vol. 22, No. 4, Aug. 1988, pp. 21–30.

Milnar, Steven, et al, PixelFlow: High–Speed Rendering Using Image Composition:, SIGGRAPH '92 Chicago, Jul. 26–31, 1992, pp. 231–240.

Montrym, John S., et al, "InfiniteReality: A Real–Time Graphics System", SIGGRAPH 97 Los Angeles, CA., Aug. 308, 1997, Computer Graphics Proceedings, Annual Conference Series, pp. 293–302.

Regan, Matthew, et al, "Priority Rendering with a Virtual Reality Address Recalculation Pipeline", SIGGRAPH 94, Orlando, FL. Jul. 24–29, 1994, Computer Graphics Proceedings, Annual Conference Series, 1994, pp. 155–162.

WARPS, 64–bit 3D Graphics Accelerator, pp. 1–5 Dec. 17, 1997, http://www.oaktech.com/briefs/warp5.html.

Technical Specifications, pp. 1–2, Dec. 17, 1997, http://www.oaktech.com/briefs/317 tech.html.

WARP 5 Block Diagram, p. 1, Dec. 17, 1997, http://www.oaktech.com/briefs/warpblok.html.

"Region Based Architecture", p. 1, Dec. 17, 1997, http://www.oaktech.com/briefs/warpreg.html.

Typical Design Examplees, p. 1, Dec. 17, 1997, http://www.oaktech.com.briefs/designs.html.

Dunphy, Christ, "Oak WARP5, New Bully on the 3D block", pp. 1–2, http://www.oaktech.com/boot.html.

Jon Peddie Associates, "Oak's WARP 5 3D controller—worth the wait", the Peddie Report Tracking digital Media Technology, vol X, No. 24, Jun. 23, 1997, http://www.oaktech.com/peddie.html, Dec. 17, 1997.

Gold Medal Technology, WARP 5 Video Accelerator; Oak Technology, All About Games Review, http://www.oaktech.com/review1.html, Dec. 17, 1997.

McClain, Tommy, "Dimension3D review" copyright Jun. 25, 1997, http://www.oaktech.com/review3.html, Dec. 17, 1997.

* cited by examiner

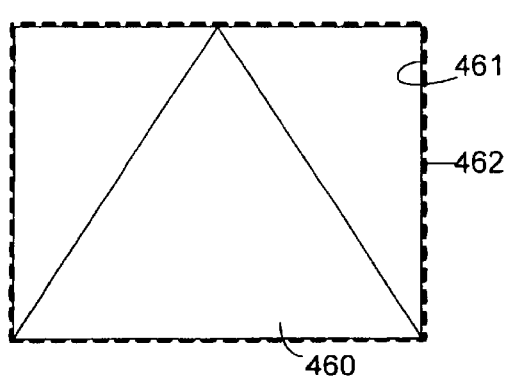
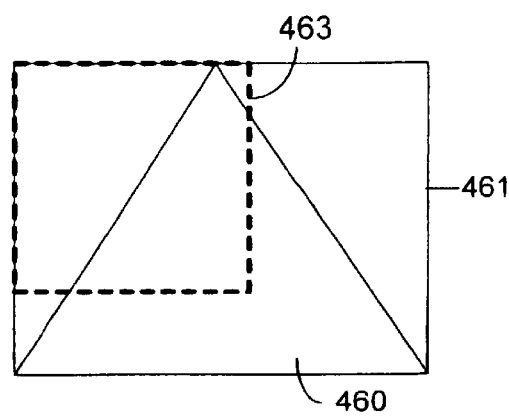
FIG. 12A              FIG. 12B
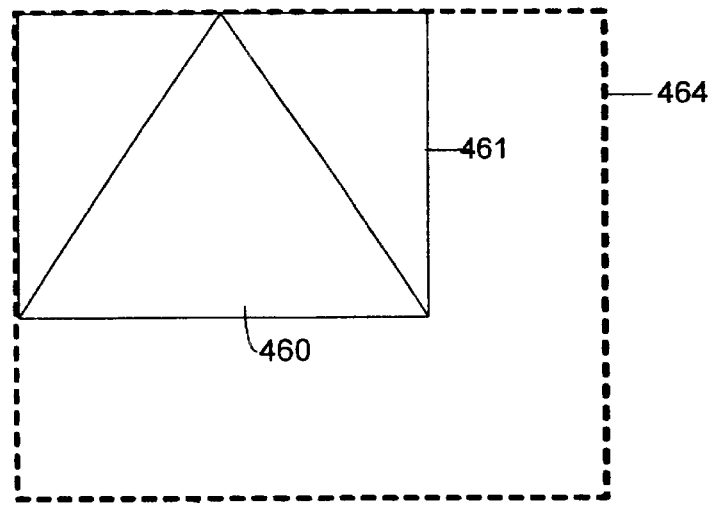
FIG. 12C

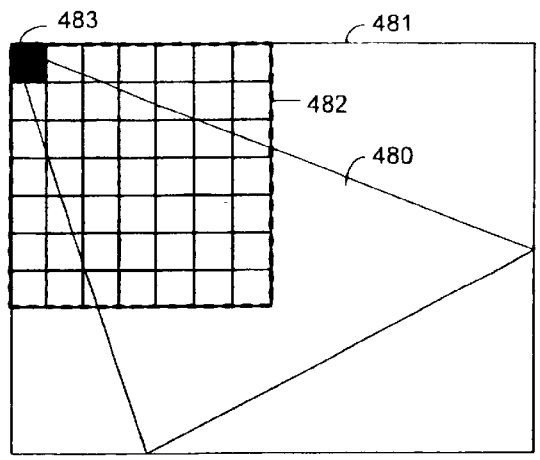
FIG. 14A
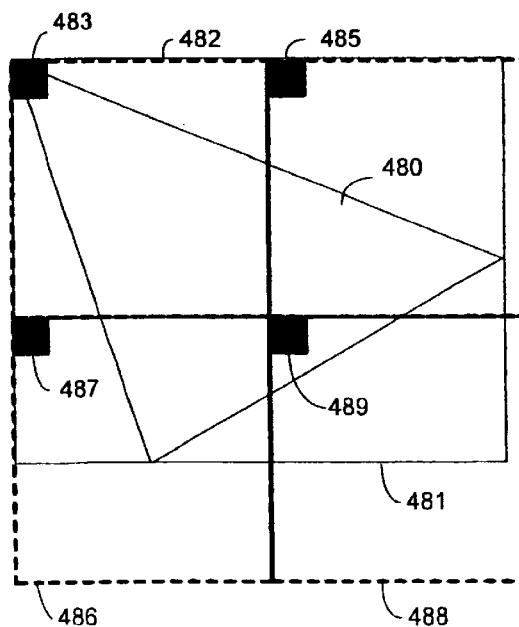 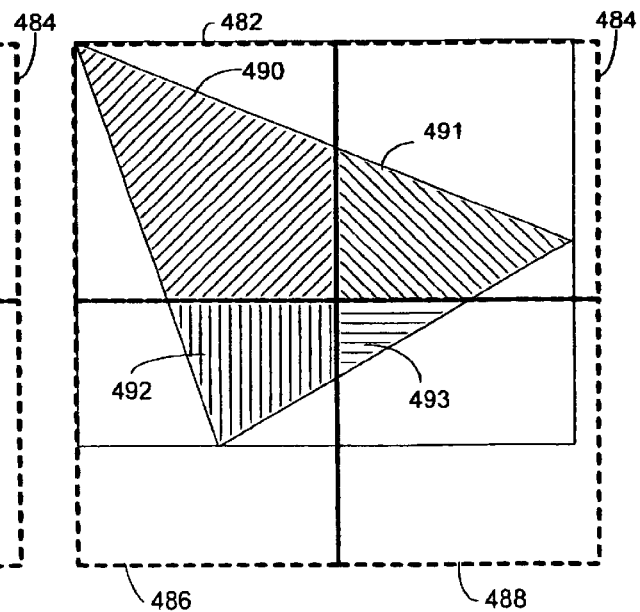
FIG. 14B FIG. 14C

Enlarged view of item 532

Enlarged view of item 532

|    | 0 | 1 | 2 | 3 | 4  | 5  | 6  | 7  | 8  | 9  | 10 | 11 | 12 | 13 | 14 | 15 | 16 | 17 | 18 | 19 | 20 | 21 | 22 | 23 |
|----|---|---|---|---|----|----|----|----|----|----|----|----|----|----|----|----|----|----|----|----|----|----|----|----|
| 0  | 2 | 2 | 2 | 2 | 2  | 2  | 2  | 2  | 2  | 2  | 2  | 2  | 2  | 2  | 2  | 2  | 2  | 2  | 2  | 2  | 2  | 2  | 2  | 2  |
| 1  | 3 | 3 | 2 | 2 | 2  | 2  | 2  | 10 | 4  | 4  | 4  | 4  | 4  | 4  | 4  | 4  | 4  | 5  | 8  | 2  | 2  | 1  | 1  | 1  |
| 2  | 3 | 3 | 3 | 3 | 2  | 2  | 10 | 11 | 4  | 4  | 4  | 4  | 4  | 5  | 5  | 5  | 5  | 8  | 9  | 1  | 1  | 1  | 1  | 1  |
| 3  | 3 | 3 | 3 | 3 | 3  | 10 | 11 | 11 | 4  | 4  | 5  | 5  | 5  | 5  | 5  | 5  | 8  | 9  | 9  | 1  | 1  | 1  | 1  | 1  |
| 4  | 3 | 3 | 3 | 3 | 10 | 10 | 11 | 11 | 6  | 7  | 7  | 7  | 7  | 7  | 7  | 7  | 8  | 8  | 9  | 9  | 1  | 1  | 1  | 1  |
| 5  | 3 | 3 | 3 | 3 | 12 | 12 | 13 | 13 | 13 | 13 | 13 | 13 | 13 | 13 | 13 | 13 | 8  | 8  | 9  | 1  | 1  | 1  | 1  | 1  |
| 6  | 3 | 3 | 3 | 3 | 12 | 12 | 12 | 12 | 12 | 12 | 13 | 13 | 13 | 13 | 13 | 13 | 8  | 9  | 1  | 1  | 1  | 1  | 1  | 1  |
| 7  | 3 | 3 | 3 | 3 | 12 | 12 | 12 | 12 | 12 | 12 | 12 | 12 | 12 | 12 | 13 | 13 | 8  | 1  | 1  | 1  | 1  | 1  | 1  | 1  |
| 8  | 3 | 3 | 3 | 3 | 3  | 3  | 3  | 3  | 3  | 3  | 3  | 3  | 3  | 1  | 1  | 1  | 1  | 1  | 1  | 1  | 1  | 1  | 1  | 1  |
| 9  | 3 | 3 | 3 | 3 | 3  | 3  | 3  | 3  | 3  | 3  | 3  | 3  | 3  | 3  | 1  | 1  | 1  | 1  | 1  | 1  | 1  | 1  | 1  | 1  |
| 10 | 3 | 3 | 3 | 3 | 3  | 3  | 3  | 3  | 3  | 3  | 3  | 3  | 3  | 3  | 1  | 1  | 1  | 1  | 1  | 1  | 1  | 1  | 1  | 1  |
| 11 | 3 | 3 | 3 | 3 | 3  | 3  | 3  | 3  | 3  | 3  | 3  | 3  | 3  | 3  | 3  | 1  | 1  | 1  | 1  | 1  | 1  | 1  | 1  | 1  |
| 12 | 3 | 3 | 3 | 3 | 3  | 3  | 3  | 3  | 3  | 3  | 3  | 3  | 3  | 3  | 3  | 1  | 1  | 1  | 1  | 1  | 1  | 1  | 1  | 1  |
| 13 | 3 | 3 | 3 | 3 | 3  | 3  | 3  | 3  | 3  | 3  | 3  | 3  | 3  | 3  | 3  | 3  | 3  | 1  | 1  | 1  | 1  | 1  | 1  | 1  |
| 14 | 3 | 3 | 3 | 3 | 3  | 3  | 3  | 3  | 3  | 3  | 3  | 3  | 3  | 3  | 3  | 3  | 3  | 3  | 3  | 1  | 1  | 1  | 1  | 1  |
| 15 | 3 | 3 | 3 | 3 | 3  | 3  | 3  | 3  | 3  | 3  | 3  | 3  | 3  | 3  | 3  | 3  | 3  | 3  | 3  | 3  | 3  | 3  | 3  | 1  |

FIG. 53

DEFERRED SCANLINE CONVERSION ARCHITECTURE

This is a continuation of application Ser. No. 09/336,522 filed Jun. 18, 1999 now U.S. Pat. No. 6,407,736.

BACKGROUND OF THE INVENTION

1. Field of the Invention

The present invention relates generally to computer graphics architecture and processing. More particularly, it relates to scan conversion of triangle-based polygon data into pixels.

2. Description of Related Art

Introduction

Three-dimensional (3-D) computer graphics systems display images, which represent real or imaginary objects in real or imaginary settings, on a two-dimensional (2-D) monitor or other output device. As a result, the user "believes" that he is seeing 3-D objects in a 3-D world. A typical computer graphics system stores such objects in one of the many existing object file formats, using 3-D coordinates to represent spheres, vectors, curves, polygons, and other simpler component objects, along with their associated object properties, such as color, texture, intensity, transparency and/or reflectivity. Environmental data such as the number, color, location, intensity, and other properties of illumination sources, as well as atmospheric properties, are included to add richness in detail to a scene containing one or more objects.

To render such a scene from a particular viewing angle onto a 2-D screen, the "front end" of a typical computer graphics system transforms the collection of objects in the scene into a set of primitives (typically polygons, such as triangles, that are independent of scale), taking into account any movement of objects over time, as well as the scene's environmental data and the user's desired viewing angle. Triangles frequently are used as the "building blocks" for 3-D objects with complex curved surfaces, because they are simple primitive objects that effectively can "cover" or represent each surface of virtually any complex object in a tiled manner. Relatively simple images might be represented with a few, relatively large triangles, whereas more complex images might require a greater number of smaller triangles. Regardless of their size, triangles typically are represented as three 3-D (x,y,z) vertices, along with color (RGB) and texture information. Of course, given sufficient memory and computational resources, pixels could be used in lieu of triangles to represent complex images even more precisely.

Front-end processing typically still is handled in software on the host system (e.g., a PC), and does not itself require hardware acceleration for most applications. The host system provides a stream of triangles to the "back end" of the computer graphics system. The order in which the host system provides these triangles does not necessarily bear any relationship to the screen location at which such triangles might be visible.

The back end of the system is responsible for "rasterizing" this set of triangles—i.e., transforming them into the particular pixels that will be displayed on the screen. It projects these 3-D triangles onto a 2-D screen, removes "hidden surfaces" to prevent portions of triangles that are obscured by other triangles from being displayed, and generates individual pixels (to be displayed on the screen) that "fill in" the visible portions of these triangles with their associated color or texture information. Back-end processing typically is relatively time-intensive, and thus often requires hardware acceleration to maintain sufficient performance.

The performance of 3-D graphics systems typically is measured by the number of triangles per second they can process. A key problem therefore is how to architect the back-end of a computer graphics system to process a stream of 3-D triangles as quickly as possible. Ideally, the back end of a system will rasterize, within the time required for one frame to be displayed on the screen (e.g., 1/60 of a second for a monitor with a 60 Hz refresh rate), all of the triangles generated by the system's front end. This is not, however, always possible.

For example, even a moderately complex screen object, such as a person, may be represented by a sufficiently large number of triangles to cause the back end of a typical computer graphics system to take multiple "frame times" to render that object completely. If the scene is static and the person is standing still, the back end may, for example, require 120 frames or 2 seconds to render that scene. If, however, the scene changes frequently, e.g., if that person moves across the screen, the back end would have to rasterize a greater number of triangles per second, because it would have to render, within those same 2 seconds, multiple variations of the same object—i.e., the same person in different poses and at different locations on the screen. Alternatively, to render an even more complex static image (e.g., a scene with three people together at one time) within those same few seconds would also require the back end to rasterize a greater number of triangles per second. Thus, by processing a greater number of triangles per second, a system is able to render more complex images and/or update images more frequently to reflect changes over time, even though it may not be able to render every image within a single "frame time."

Many of today's computer graphics applications handle very complex images and/or images that change very frequently. For example, digital imaging applications often require images of near-photographic quality which are represented by a large number of relatively small triangles. A computer graphics system must process many triangles relatively quickly in order to render such images within a reasonable period of time. Computer animation and virtual reality applications, on the other hand, may not require images of such complexity; but, they may require that frames be updated very frequently to reflect, for example, the many changes in a scene that result from a slight movement of a user's virtual reality headset. In either case, the system must process a larger number of triangles per second than if the images were less complex or changed less frequently.

To obtain adequate performance and process a sufficient number of triangles per second, most current computer graphics systems employ one of two general types of back-end architectures—(1) frame buffer architectures, which operate on a frame-by-frame basis, generating and writing into a buffer the pixels of each frame of an image to be displayed on the screen, and scanning out those pixels to the screen; and (2) display list architectures, which operate on a scanline-by-scanline basis, generating in scan order (and possibly writing into a buffer) the pixels of each scanline of an image to be displayed on the screen, and scanning out those pixels to the screen.

Frame Buffer Architectures

Systems based on frame buffer architectures, like all back end systems, receive 3-D triangles from the system's front end. These systems generate pixels to fill in each triangle (or at least the visible portion of each triangle), and store those pixels in a frame buffer that contains memory locations corresponding to each pixel on the screen. Typically, the order in which these systems generate pixels and store them in the frame buffer corresponds to the order in which triangles are received from the system's front end, and not necessarily the location of such triangles on the screen.

Typical frame buffer architectures employ a double-buffered approach, particularly for animation, in which two frame buffers are utilized. While the system is scanning out to the screen the pixels from the first frame buffer (containing the current image), it simultaneously is writing into the second frame buffer the pixels generated by rasterizing each triangle (for the next image). Once the system finishes processing the triangles for this second frame buffer (even if such processing requires multiple "frame times"), the system can switch buffers (on the next vertical retrace) and begin scanning out to the screen this next image from the second frame buffer, while generating a subsequent image in the first frame buffer.

If the system's Back end cannot generate and store pixels in a frame buffer quickly enough (i.e., cannot process a sufficient number of triangles per second), then the system scans out the same image to the screen for too many "frame times" before switching buffers and displaying the next image. As a result, images are not updated frequently enough to produce the desired animation effect.

If only a single buffer is used (e.g., for rendering a complex static 3-D object in a CAD program), the system displays the image as it is being generated. In this case, if the back end processes too few triangles per second, then the system will take too long to fully render the complete image.

Although all computer graphics systems can process only a limited number of triangles per second, systems based on frame buffer architectures are further limited by the nature of their design. Because they do not necessarily generate pixels in scan order, they cannot begin scanning out to the screen a complete image until after they generate all of the pixels representing that image and store those pixels in a frame buffer. Their overall performance therefore is limited by the time required to generate every pixel necessary to fill in each triangle (or at least the visible portion of each triangle), and write each of these pixels into the frame buffer or some other temporary memory. Further exacerbating this problem are the additional memory accesses made on a per-pixel basis, e.g., to a "z buffer" that stores pixel depth information.

Although a computer graphics system must generate a pixel for each location on the screen, it is not necessarily the case that it must write every such pixel (or even every visible pixel from each triangle) into a frame buffer in order to scan out such pixels to the screen. If, for example, a scene contains a large triangle that covers much of the screen, it is wasteful to take the time to store the same pixel value in many locations of the frame buffer memory, merely because that pixel must be displayed at many pixel locations on the screen (as is illustrated below with respect to the present invention).

Moreover, in a typical scene, many triangles may be partially or completely obscured by other triangles. As a result, the system may perform many redundant computations, as well as redundant writes to the frame buffer or other temporary memory, for pixels that ultimately will not be visible on the screen. Some systems, however, implement "hidden surface removal" algorithms to avoid writing these hidden pixels into the frame buffer, which may reduce this additional performance penalty to some extent.

For a description of a typical frame buffer architecture, see Kurt Akeley, "Reality Engine Graphics," Proceedings of SIGGRAPH '93 (Anaheim, Calif.; Aug. 1–6, 1993), published in COMPUTER GRAPHICS Proceedings, Annual Conference Series 1993, pp. 109–116. Although the Reality Engine system dedicates parallel hardware units to selected subsets of its frame buffer pixel locations, it still suffers from the above-mentioned disadvantages within each hardware unit.

The architecture of Oak Technology's 64-bit 3-D "WARP 5" graphics accelerator is a slight variation of a traditional frame buffer architecture. The WARP 5 first sorts the triangles into regions of the screen where they might generate visible pixels. Individual triangles can, of course, affect multiple regions. Upon completion of this "X-Y sort" of the entire set of triangles, the WARP 5 then rasterizes the triangles on a region-by-region basis, one region at a time, generating pixels for the current region and writing them into an on-chip "mini" frame buffer corresponding to that region of memory. It then writes the contents of each "mini" frame buffer into a single external (off-chip) frame buffer.

This process, though performed sequentially for each region, is similar in nature to the process employed by more traditional frame buffer architectures, and thus suffers from many of the same disadvantages. The WARP 5 still does not generate pixels in scan order. Although it implements a "hidden surface removal" algorithm that reduces the redundant pixel computations and writes for obscured triangles, it still generates and writes to a frame buffer (albeit a smaller, on-chip frame buffer) the many pixels necessary to fill in at least the visible portions of every desired triangle within each region before scanning out to the screen any of these pixels. Moreover, it suffers an additional performance penalty by serially (one region at a time) generating and writing pixels. This disadvantage, however, is a tradeoff for the relatively simple hardware necessary to handle only a single region at a time.

Display List Architectures

As an alternative to frame buffer architectures, display list architectures attempt to reduce the time required to generate and write every pixel (or at least every visible pixel from each triangle) into a frame buffer. Such architectures typically employ a pipeline of massively parallel processors, in which each processor is associated with an individual pixel or triangle (usually within a single scanline), to generate pixels very quickly, and in scan order. These pipelined processors enable the system to generate multiple scanlines in parallel, and thus to begin generating scanlines of a subsequent image before it has finished generating all of the scanlines of the current image, thereby reducing the average number of "frame times" required to generate a complete image.

Display list systems, although they pipeline the pixel generation process, typically cannot generate pixels sufficiently quickly to enable them to be scanned out to the screen "on the fly"—i.e., immediately as they are generated. A temporary frame buffer therefore still is necessary to buffer at least some number of generated scanlines before the process of scanning them out to the screen can begin.

For a description of a typical display list architecture, see Michael Deering, Stephanie Winner, Bic Schediwy, Chris Duffy and Neil Hunt, "The Triangle Processor and Normal Vector Shader: A VLSI System for High Performance Graphics," COMPUTER GRAPHICS, Vol. 22, No. 4, pp. 21–30 (August 1988). This system employs a pipeline of 1024 triangle processors, each associated with a single triangle at any one time, to generate scanlines of pixels in scan order.

The Deering et al. System pre-sorts the triangles into a Y-buffer that associates each scanline with a set of those triangles which intersect that scanline, and thus potentially might include pixels visible on that scanline. Each of these triangles is then assigned to one of the triangle processors in the pipeline, and "blank" pixels (representing actual pixel locations, processed in scanline order) are sent through the pipeline. Each triangle processor determines whether the current pixel location it receives is visible within its associated triangle—i.e., whether the pixel location falls within that triangle, and whether the interpolated depth of that triangle for that pixel location is "closer" than that generated by any previous triangle processor in the pipeline. If not, it merely passes that pixel onto the next triangle processor. If it is visible (thus far in the pipeline), it replaces the pixel with one having its interpolated depth. At the end of this pipeline, the "winning" pixel is sent through a smaller pipeline to generate RGB pixels that are stored in a temporary RGB frame buffer before being scanned out to the screen.

By employing a pipeline of massively parallel processors to generate pixels quickly and in scan order, display list systems are able to reduce the average number of "frame times" required to generate a complete image. Yet, such systems typically are "unbounded" in that they cannot guarantee that every scanline will be generated within a predefined period of time, i.e., because the performance of their pixel-generation process is dependent upon the concentration of triangles within particular regions of the screen.

For example, although the system described above has a fixed number of triangle processors, the number of triangles per scanline (in the image to be rendered) is not fixed. Even though a triangle processor can be associated with a new triangle once it has finished processing the last pixel location within its current triangle, there is no guarantee that a triangle processor will be available when a new triangle is ready to be loaded. If this "overflow" condition is detected, one or more addition "passes" through the triangle processor pipeline will be necessary to handle the "overflowed triangles" for a particular scanline. Only when the system completes these additional passes can it generate the correct scanline. Thus, congestion of triangles within a particular region of the screen may impact the overall performance of the system, and effectively increase the average number of "frame times" required to generate a complete image.

Moreover, these pipelined triangle processors cannot necessarily generate pixels sufficiently quickly to enable them to be scanned out to the screen "on the fly"—i.e., immediately as they are generated. In addition, the system's circuitry is made more complex by the fact that the pipeline of triangle processors may be processing pixel locations on multiple scanlines at any given point in time, not to mention the complexity and associated performance penalty of having to detect and handle "overflow" conditions when triangles are congested within a region of the screen.

Display list architectures also have a number of other disadvantages, such as the higher cost and greater complexity of massively parallel hardware. It generally is not feasible, for example, to include a single processor for every pixel on the screen. Moreover, even if the number of processors is limited, for example, to one per pixel on a single scanline, this may result in little overall performance benefit, due to the large number of triangles that have to be processed by each pixel processor, as well as any pre-sorting of triangles by the system.

Semiconductor Industry Trends

To approach the ideal of rasterizing all of the triangles generated by the front end of a computer graphics system within a single "frame time," the system's back end architecture must be optimized to avoid the bottlenecks while leveraging the benefits resulting from current trends in the semiconductor industry. For example, both logic and memory are increasing in density and decreasing in cost at an exponential rate. Based upon current predictions, by the year 2000, a single ASIC logic chip will contain over 100 million transistors, and mass production of 1 Gbit DRAMs will have begun, with each 1 Gbit DRAM (128 Mbytes) chip being capable of storing a 2 Mpixel image having 64 bytes of storage per pixel. Yet, ASIC pin counts are not increasing, instead remaining relatively constant at about 200–500 pins per ASIC. It is thus apparent that inter-chip bandwidth is likely to remain a significant bottleneck.

This bottleneck underscores the disadvantages noted above, particularly with respect to frame buffer architectures, which suffer performance penalties due in part to the many off-chip memory accesses that result from generating and writing many pixels to a frame buffer, and frequently accessing a "z buffer" and other temporary memory. Display list architectures also suffer from similar disadvantages, though they increase overall performance somewhat by pipelining the pixel-generation process. Yet, neither frame buffer nor display list systems can generate pixels sufficiently quickly to enable them to be scanned out to the screen "on the fly" as they are generated, which would eliminate the need for a frame buffer entirely.

SUMMARY OF THE INVENTION

The present invention provides a solution to the above-described problems by employing an architecture attuned to the current trends in the semiconductor industry. Various embodiments of this architecture are optimized to utilize one or a small number of ASICs, each containing a large number of transistors with relatively few interconnects. One embodiment of the present invention can be implemented in a single-chip ASIC which includes all the functionality necessary to perform the triangle buffer writing and rasterization/scan-out duties. Other embodiments may provide for two chips. One chip performs triangle buffering, while the other chip performs rasterization/scan-out functions.

One embodiment of this architecture is a real-time system that implements a two-step process. The first step in this process identifies which triangles are in competition to be rendered at a given pixel location, and stores them in a triangle buffer. The number of competing triangles is bounded in this first step to the "closest" N triangles associated with each pixel location to simplify the pipelined pixel generation implementation in the second step. The second step generates pixels based on the contents of the triangle buffer by resolving the competition, and renders each pixel (e.g., scans it out to the screen) "on the fly" as it is generated. Specifically, for each pixel location, this second step selects the relevant competing triangles, determines whether that pixel location is inside or outside these competing triangles, determines z depth values for each triangle, resolves the competition to identify the winning triangle, and generates the pixel color/texture associated with that winning triangle.

Triangle Buffer Write

By first storing triangle information for each triangle into a relatively few key locations in the triangle buffer, the system generally performs far fewer writes per triangle than there are potentially visible pixels within that triangle. It also defers scan conversion until after all triangles have been considered, at which point the system has sufficient information in the triangle buffer to generate each pixel in scan order, and scan that pixel out to the screen "on the fly" immediately as it is generated.

Writing the triangle information into a particular location of the triangle buffer guarantees "coverage competition" within a fixed-size region of the screen proximate to that location—i.e., it guarantees that the triangle will compete to be scan-converted at each of the pixel locations within that region. Triangle information may of course be written into multiple locations of the triangle buffer (each associated with a fixed-size region proximate to that location) to ensure sufficient "coverage competition" for at least all pixel locations at which that triangle may be visible. Thus, larger triangles may necessitate more writes to the triangle buffer than will smaller triangles.

In one embodiment, the triangle information includes 3-D coordinates and RGB color or texture information for each of three triangle vertices, as well as certain coefficients of "z-plane" and "slope" equations. This information can be used to determine, for any given pixel location on the screen, whether the triangle is "visible" at that location and, if so, at what depth in the scene.

Prior to writing this triangle information into a selected location of the triangle buffer, the system calculates a "z depth" value for the triangle at that location, using an artificial "maximum" value if the triangle is not visible at that location. The system compares the triangle's calculated z depth value to the z depth value stored at the corresponding location in a separate z buffer (e.g., to determine which of two triangles is "closer" at that pixel location). Initially, all locations in the z buffer are set to the artificial maximum value. Assuming, in one embodiment, that no objects are transparent and no anti-aliasing techniques are employed, then there will exist only one visible surface, and thus only one "winning" triangle, at any given pixel location on the screen. Whenever the system writes triangle information into a selected location of the triangle buffer, it also writes this z depth value into the corresponding location of the z buffer.

For each triangle being processed, the system determines how many fixed-size "coverage masks" are needed to sufficiently cover the triangle's bounding box. The system first attempts to store the triangle information for a triangle in the triangle buffer memory locations corresponding to the top left corner of each coverage mask. For each coverage mask, if the triangle information for an existing (previously processed) triangle already has been stored at that selected location in the triangle buffer, and is "closer" than (or at the same depth as) the current triangle, then the system attempts to store the triangle information for the current triangle at the next location within that coverage mask. Alternatively, if the current triangle wins, then its triangle information displaces the triangle information for the existing triangle, and the system attempts to relocate the triangle information for the displaced triangle to the next location within the particular original coverage mask associated with that displaced triangle.

In either case, the same process of comparing z depth values continues at each of these next selected locations until the triangle information for each "losing" triangle has been stored at a selected location within that triangle's particular associated coverage mask in the triangle buffer, or until such triangle "loses" at all such locations. In this latter case, its triangle information need not be stored anywhere within that coverage mask area of the triangle buffer because the triangle is not visible (based upon the prior z depth comparisons) at any pixel location on the screen corresponding to any of the fixed-size "coverage competition" regions associated with each location within that coverage mask area of the triangle buffer—i.e., because the triangle at each such pixel location either is outside the user's viewing angle or is obscured by a "closer" triangle.

This process of writing triangle information into selected locations of a triangle buffer requires far fewer writes, and far less time, than a frame buffer or display list system would require to generate pixels and store them in a frame buffer. This is due in part to the fact that this process is performed on a per-triangle, not a per-pixel, basis. By employing fixed-size "coverage competition" areas, the triangle information for each triangle need only be stored at one or a few selected locations in a triangle buffer, as opposed to the far greater number of frame buffer locations corresponding to the number of pixels necessary to fill in the visible portion of each triangle. Moreover, a great deal of time has been saved by deferring the process of scan-converting triangles into pixels.

Pixel Generation and Scan-out

Once the system has considered all triangles, and stored all relevant triangle information in the triangle buffer, it then generates a pixel for each pixel location on the screen, one at a time in scan order, and immediately scans each pixel out to the screen "on the fly" as it is generated. This is possible not only because the system's pixel generation process is heavily pipelined, but also because it is "bounded," in that a fixed maximum number of triangles will compete to be visible at each pixel location on the screen. This maximum number of triangles corresponds to the number of memory locations within the fixed-size "coverage competition" region associated with each pixel location on the screen. Those triangles whose triangle information was stored within any such region in the triangle buffer are guaranteed to be the "closest" triangles at the pixel location on the screen associated with that region. The prior z depth comparisons effectively discarded other "losing" triangles having greater depths at that pixel location.

The processes of generating pixels and scanning them out to the screen are performed in parallel via a pipeline that processes the contents of the triangle buffer and generates pixels in scan order. Because this process is "bounded," the system can guarantee that each pixel will be generated in the fixed period of time required to scan that pixel out to the screen—e.g., 1/60 of a second, divided by the number of pixels on the screen. Thus, the system incurs no additional overhead to scan-convert triangles into pixels. Its performance (triangles per second) is limited only by the time required to process each triangle and write triangle information into the triangle buffer.

Moreover, by "bounding" this process, the hardware required to implement this pipeline is greatly simplified. Compared with massively parallel display list architectures, for example, this pipeline uses far fewer and far simpler processors. Yet, it generates pixels faster and at regular intervals, enabling each pixel to be scanned out to the screen "on the fly" as it is generated. This system also can operate in a "double-buffered" manner. In that case, it utilizes the contents of a first triangle buffer and z buffer to generate pixels and scan them out to the screen for the current frame, while simultaneously storing triangle information for the next frame into a second triangle buffer and z buffer.

In either case, the system transfers the contents of the triangle buffer in scan order into a multi-stage pipeline that includes a "triangle cache," a column of "coefficient evaluators," an array of "z interpolation" processors, an "image composition network," and a "shading unit." In effect, this pipeline implements a "sliding coverage competition window", which slides across the triangle buffer determining the "winning" triangle for each pixel location on the screen, in scan order. At each moment in time, the z interpolation processors are calculating z depth values for all competing triangles within that "sliding coverage competition window," and then providing them in parallel to the image composition network, which determines the "winning" triangle.

At the beginning of the pipeline, the triangle cache receives and caches the most recent "N" rows from the triangle buffer, where N is equal, in one embodiment, to the number of rows in a fixed-size "coverage competition" region (e.g., 16 rows). The triangle cache wraps around to overwrite the first row after the last row of the cache is filled.

At the next stage of the pipeline, the triangle cache provides a column of triangle information in parallel to the coefficient evaluators, each of which determines certain depth-related components for each triangle stored in that column. After providing the coefficient evaluators the rightmost column of triangle information in the cache, the triangle cache wraps around to provide the leftmost column for the next N rows from the triangle buffer. Because the pipeline generates pixels in scan order, these depth-related components are limited to the row/scanline of the triangle buffer in which the triangle information for each triangle is stored. They enable the next stage of the pipeline to calculate, for any pixel location within that row/scanline, whether the triangle encompasses that pixel location and, if so, the triangle's interpolated z depth at that pixel location.

These depth-related components include "2-D span" information, which identifies the left and right edges of the triangle intersected by that row/scanline, z depth information for the current pixel being processed on that row/scanline (or for the left edge of the triangle intersected by that row/scanline if the current pixel is not within the triangle), and "dz slope" information which indicates the slope, or change in z depth, of the triangle from left to right.

At the next stage of the pipeline, the coefficient evaluators provide a column of triangle information in parallel to a "sliding window" or array of z interpolation processors (e.g., M processors, where M is equal to the number of columns in each fixed-size "coverage competition" region, e.g., 32). Each of these z interpolation processors calculates a z depth value, at the current pixel location being processed, for one of the triangles stored within this (e.g., 32×16) sliding window of locations in the triangle buffer. As each new column of triangle information is received from the coefficient evaluators, the sliding window of z interpolation processors calculate z depth values for the next pixel location, using a set of competing triangles within the "coverage competition" region one column to the right of the previous region.

In other words, the coefficient evaluators and z interpolation processors together enable the system to calculate, for the current pixel location being processed, z depth values for all competing triangles within a "coverage competition" region—e.g., the 32×16=512 triangles stored at the locations in the triangle buffer within this region. These z depth values are calculated simultaneously by the array of z interpolation processors for the current pixel location, and provided to an "image composition network" to determine the "winning" triangle.

At the next stage of the pipeline, the array of z interpolation processors provides all of the z depth values in parallel to the image composition network, which includes a "tree" of comparators to compare the z depth values within the current "coverage competition" region, and determine the "winning" triangle that is visible at the current pixel location being processed. A "shading unit" then determines the RGB color or texture for that pixel from the triangle information stored in the triangle buffer for that triangle—e.g., by interpolating from RGB information for each vertex of the triangle.

The calculations at each stage of this pixel generation pipeline are synchronized such that the final pixel data for each pixel is provided by the last stage of the pipeline when the "video clock" actually scans that pixel out to the screen. As noted above, this is possible because these calculations are "bounded" to a relatively small fixed number of triangles. This pipeline also benefits by making efficient use of very wide on-chip "embedded DRAM" busses for parallel data transfers between stages of the pipeline, which improves performance significantly and avoids time-consuming off-chip memory accesses.

Another embodiment of the present invention uses micro-polygons instead of polygons (i.e., triangles). Of course, the front end graphics system delivers micro-polygons, which can be conceptually viewed as polygons of higher resolution. The vertices of the micro-polygons are associated with samples or sub-pixels and the micro-polygon is any grouping of a plurality of samples or sub-pixels. A buffer at the output image composition network sums the sub-pixel values per pixel, calculates an average of the sub-pixels per pixel, and associates the average to that pixel. This feature results in smoother edges and improved anti-aliasing effects. One embodiment of the present invention uses micro-polygons in a real-time graphics system.

BRIEF DESCRIPTION OF THE FIGURES

The above objects and description of the present invention may be better understood with the aid of the following text and accompanying drawings.

FIGS. 12(A)–12(C) illustrate the coverage mask concept with respect to a triangle and its respective bounding box in accordance with one embodiment of the present invention.

FIGS. 14(A)–14(C) illustrate the concepts of assigning specific triangle buffer locations to triangles based on coverage mask placement and size in accordance with one embodiment of the present invention. These figures also illustrate the concept of visible v. non-visible regions of the bounding box.

FIG. 36(A) shows the triangle buffer contents after the first three triangles (i.e., the background) of FIG. 33(B) have been received by the graphics system and the triangle buffer write scheme has been performed for these triangles.

FIG. 36(B) shows the triangle buffer contents after all thirteen triangles (i.e., the entire image) of FIG. 34(C) have been received by the graphics system and the triangle buffer write scheme has been performed for these triangles.

FIGS. 37(A)–37(F) show the contents of the triangle cache and the array of z-interpolator processors when the pipelined graphics system of the present invention is generating pixels for pixel locations $(0, 0)$ to $(5, 0)$, respectively.

Figures 38A, 38B, 38C, 38D, 38E, 38F:
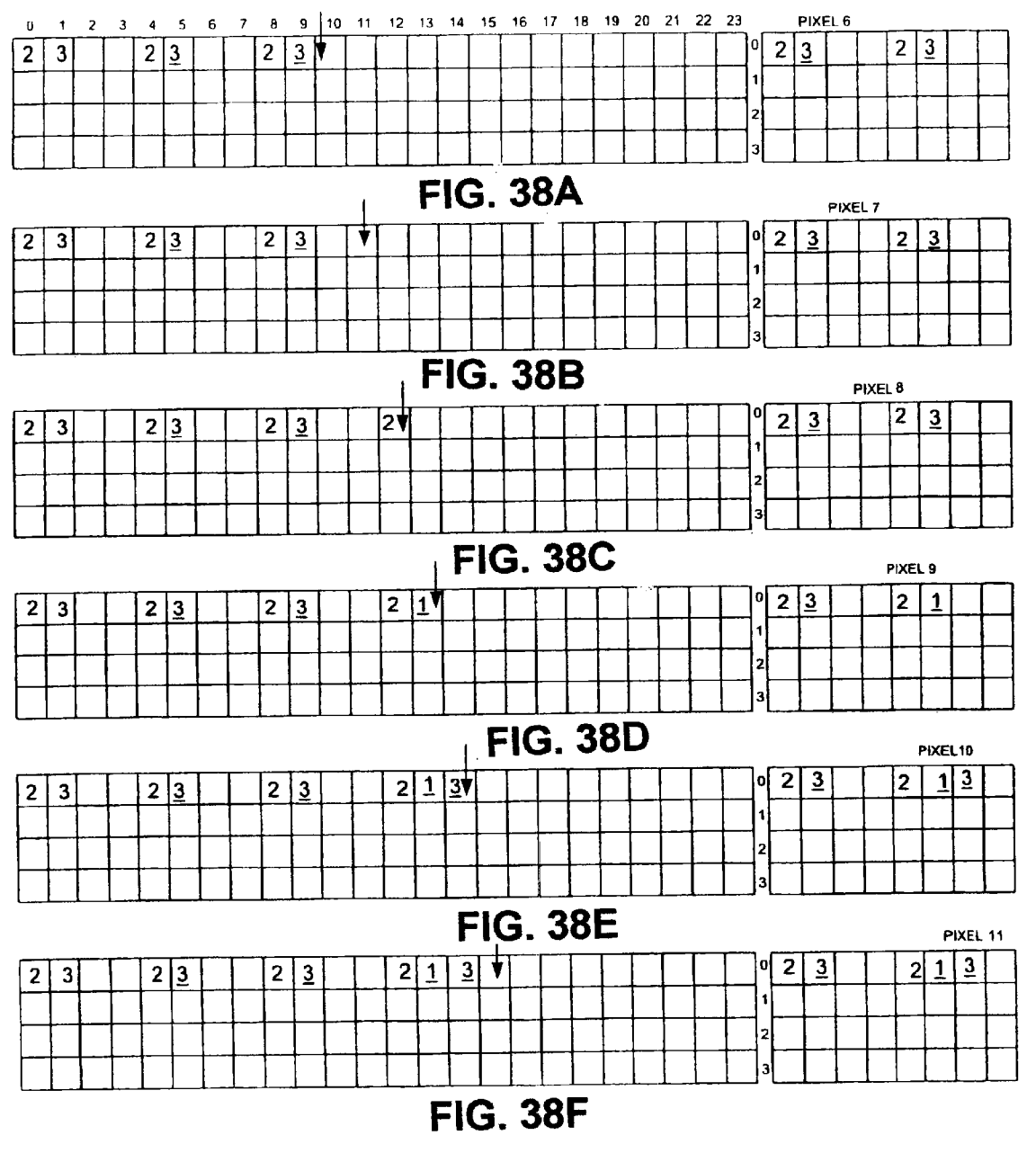

FIGS. 38(A)–38(F) show the contents of the triangle cache and the array of z-interpolator processors when the pipelined graphics system of the present invention is generating pixels for pixel locations $(6, 0)$ to $(11, 0)$, respectively.

Figures 39A, 39B, 39C, 39D, 39E, 39F:
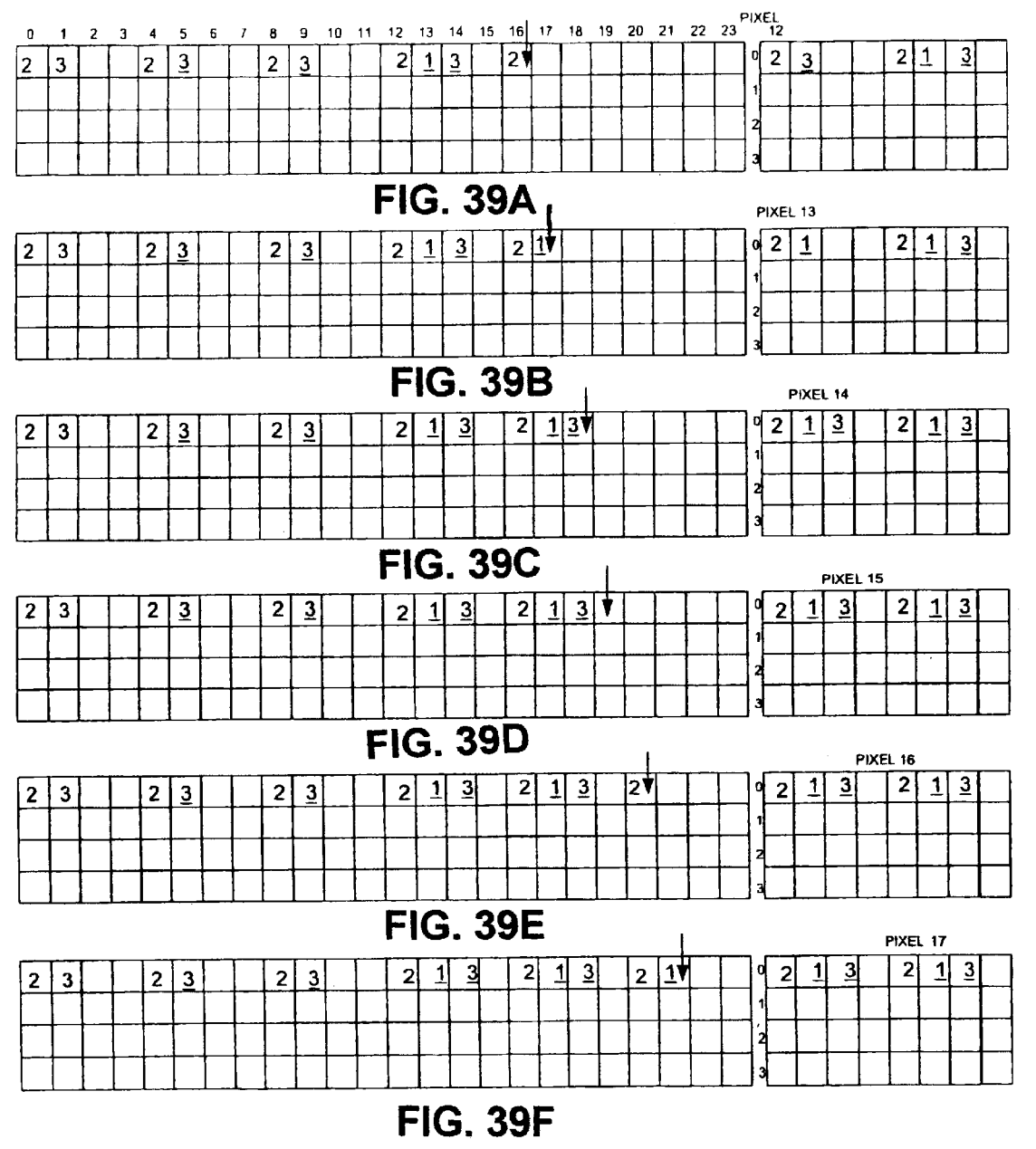

FIGS. 39(A)–39(F) show the contents of the triangle cache and the array of z-interpolator processors when the pipelined graphics system of the present invention is generating pixels for pixel locations $(12, 0)$ to $(17, 0)$, respectively.

FIGS. 41(A)–41(F) show the contents of the triangle cache and the array of z-interpolator processors when the pipelined graphics system of the present invention is generating pixels for pixel locations $(0, 1)$ to $(5, 1)$, respectively.

Figures 42A, 42B, 42C, 42D, 42E, 42F:
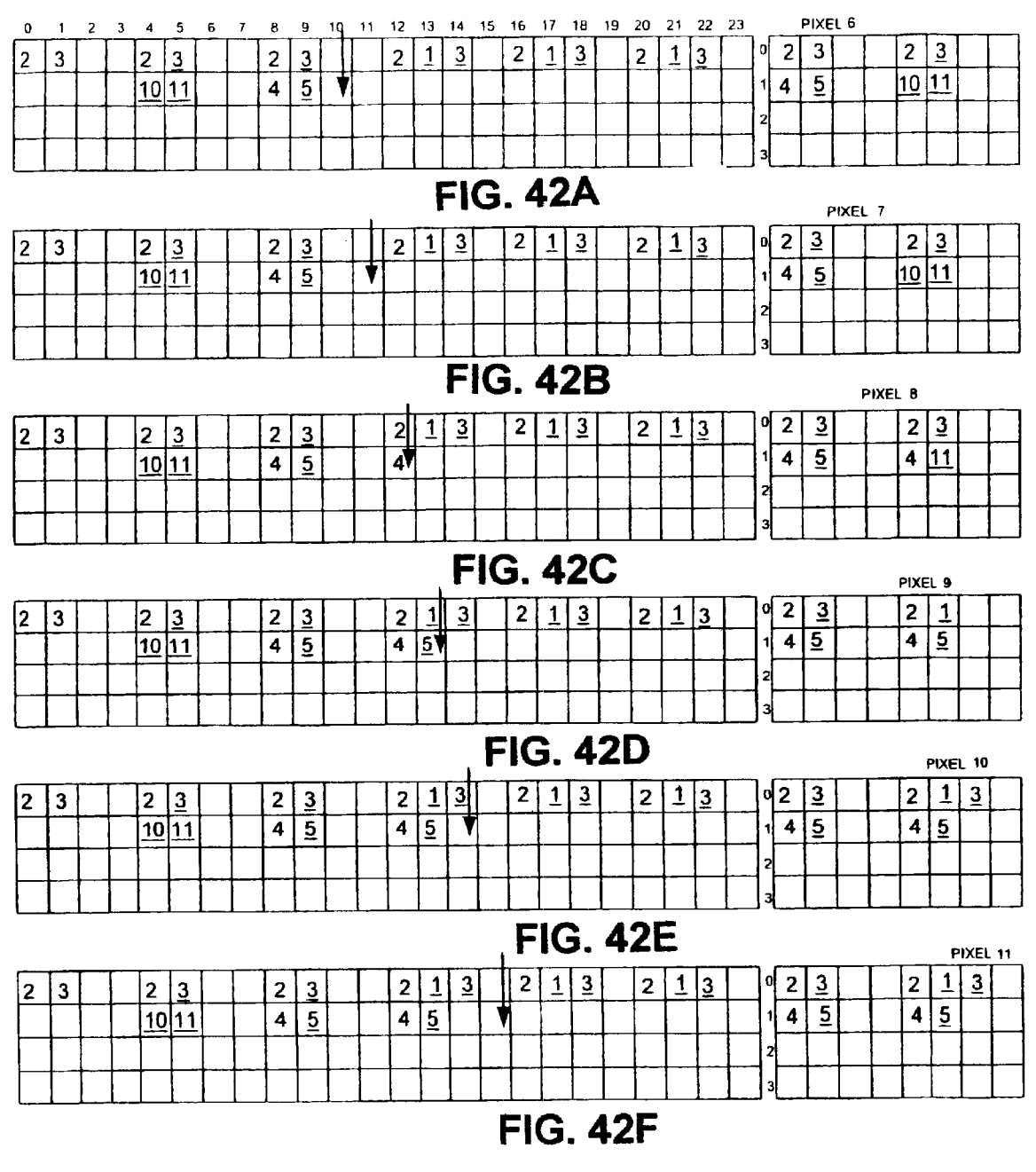

FIGS. 42(A)–42(F) show the contents of the triangle cache and the array of z-interpolator processors when the pipelined graphics system of the present invention is generating pixels for pixel locations $(6, 1)$ to $(11, 1)$, respectively.

Figures 43A, 43B, 43C, 43D, 43E, 43F:
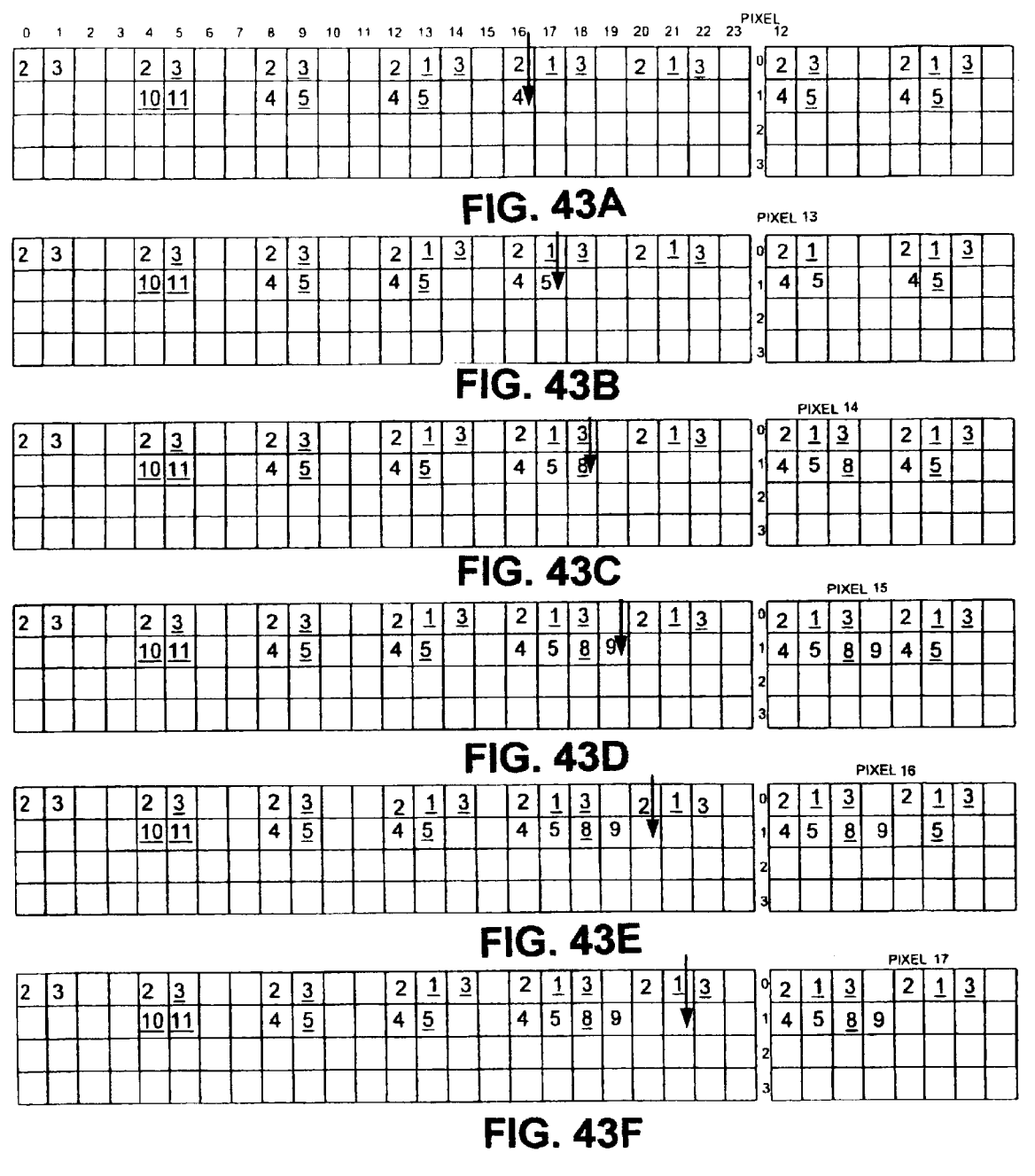

FIGS. 43(A)–43(F) show the contents of the triangle cache and the array of z-interpolator processors when the pipelined graphics system of the present invention is generating pixels for pixel locations $(12, 1)$ to $(17, 1)$, respectively.

FIGS. 44(A)–44(B) show the contents of the triangle cache and the array of z-interpolator processors when the pipelined graphics system of the present invention is generating pixels for pixel locations $(18, 1)$ to $(19, 1)$, respectively.

FIGS. 45(A)–45(C) show the contents of the triangle cache and the array of z-interpolator processors when the pipelined graphics system of the present invention is generating pixels for pixel locations (20, 3) to (22, 3), respectively.

Figures 46A, 46B, 46C, 46D, 46E, 46F:
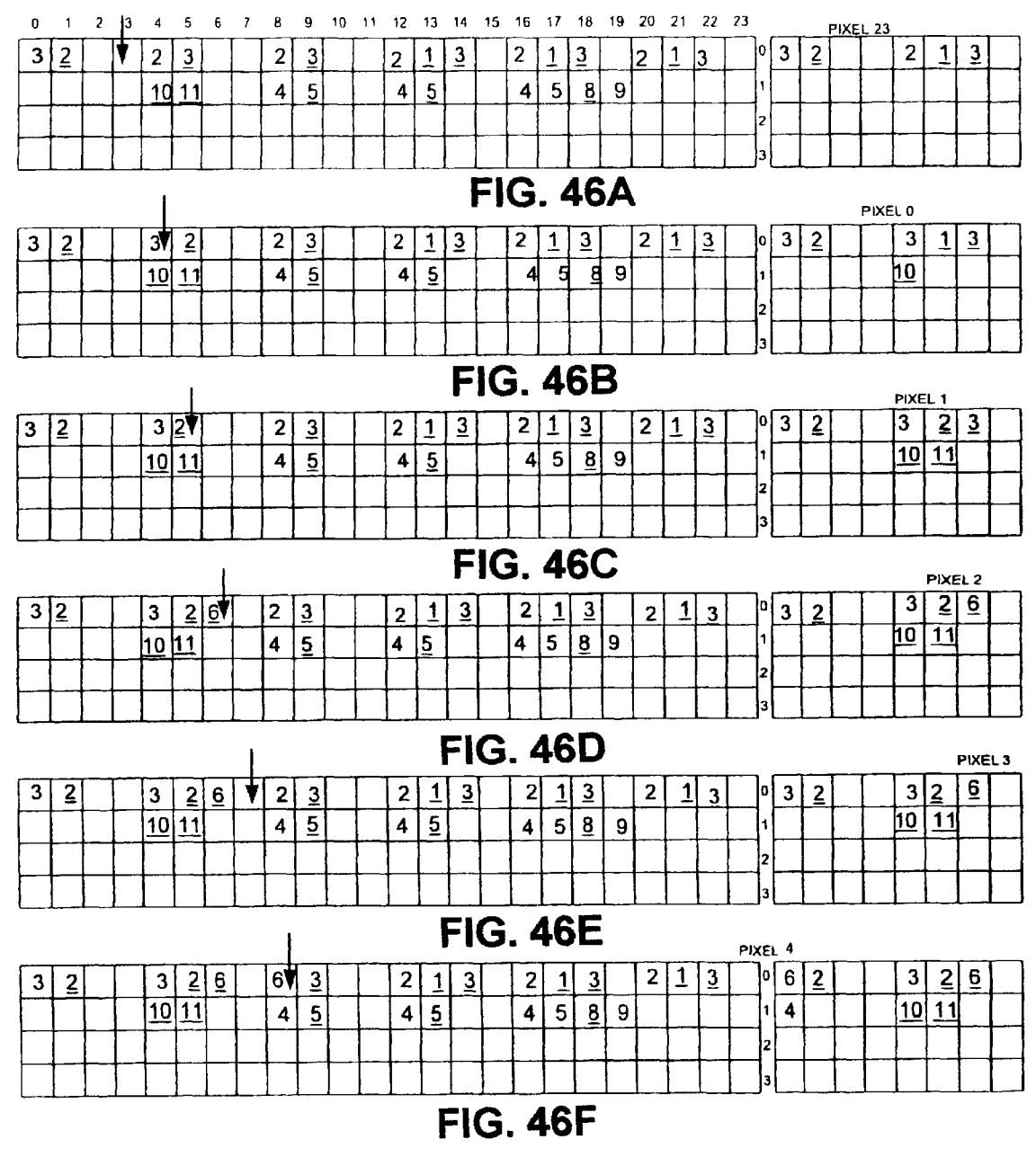

FIGS. 46(A)–46(F) show the contents of the triangle cache and the array of z-interpolator processors when the pipelined graphics system of the present invention is generating pixels for pixel locations (23, 3) to (4, 4), respectively.

Figures 47A, 47B, 47C, 47D, 47E, 47F:
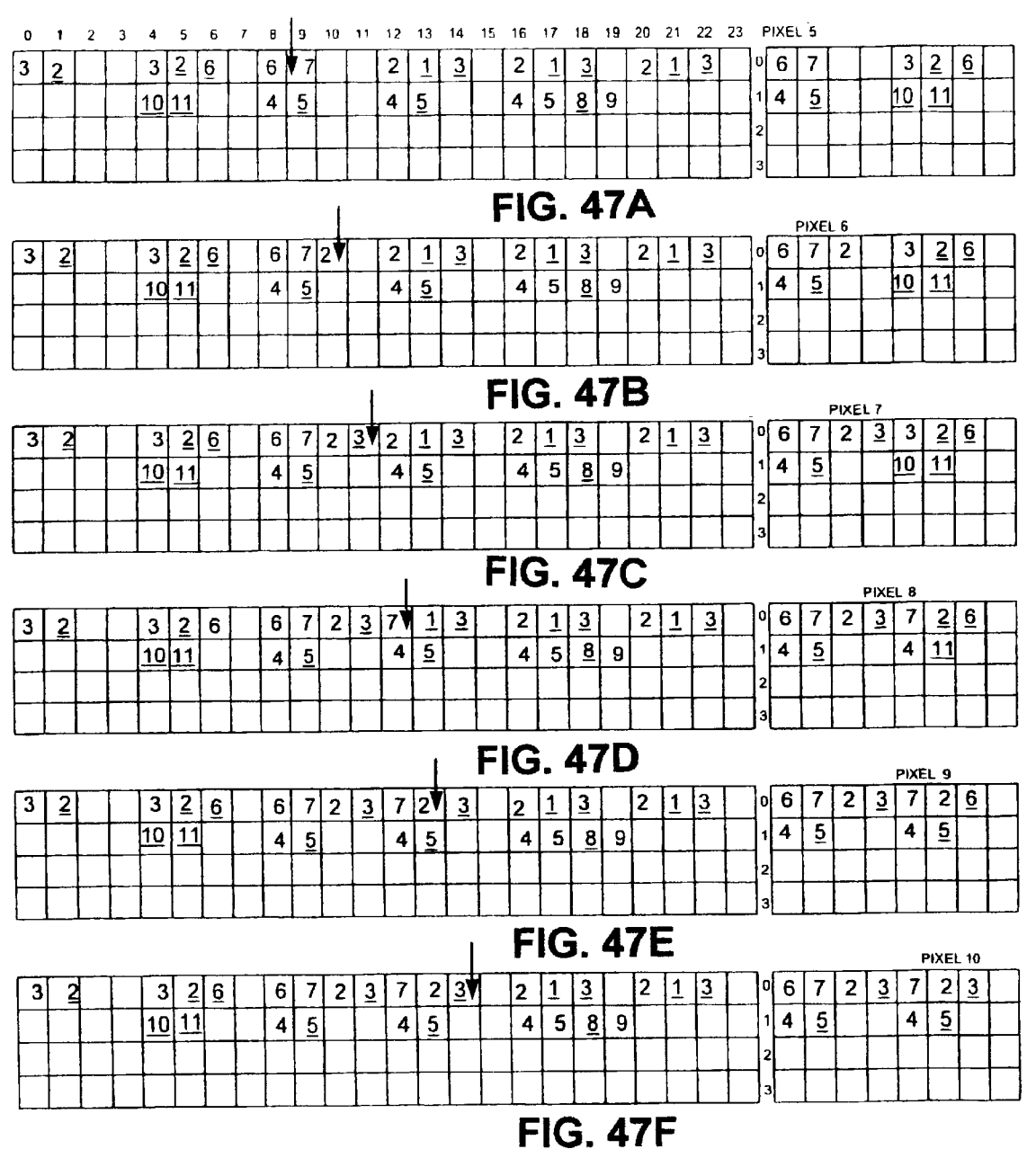

FIGS. 47(A)–47(F) show the contents of the triangle cache and the array of z-interpolator processors when the pipelined graphics system of the present invention is generating pixels for pixel locations (5, 4) to (10, 4), respectively.

FIGS. 48(A)–48(F) show the contents of the triangle cache and the array of z-interpolator processors when the pipelined graphics system of the present invention is generating pixels for pixel locations (11, 4) to (16, 4), respectively.

Figures 49A, 49B, 49C, 49D, 49E, 49F:
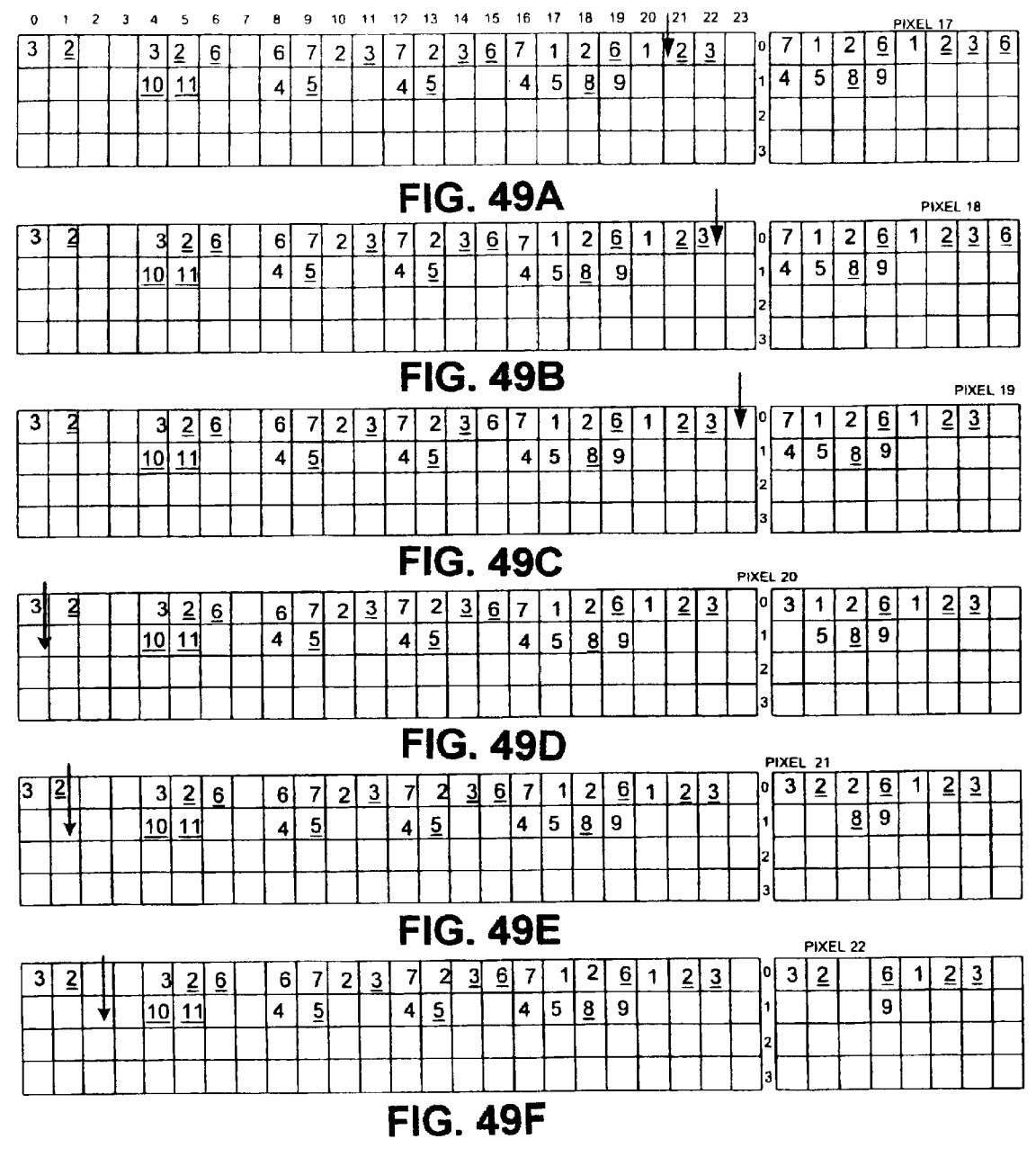

FIGS. 49(A)–49(F) show the contents of the triangle cache and the array of z-interpolator processors when the pipelined graphics system of the present invention is generating pixels for pixel locations (17, 4) to (22, 4), respectively.

Figures 51A, 51B, 51C, 51D, 51E, 51F:
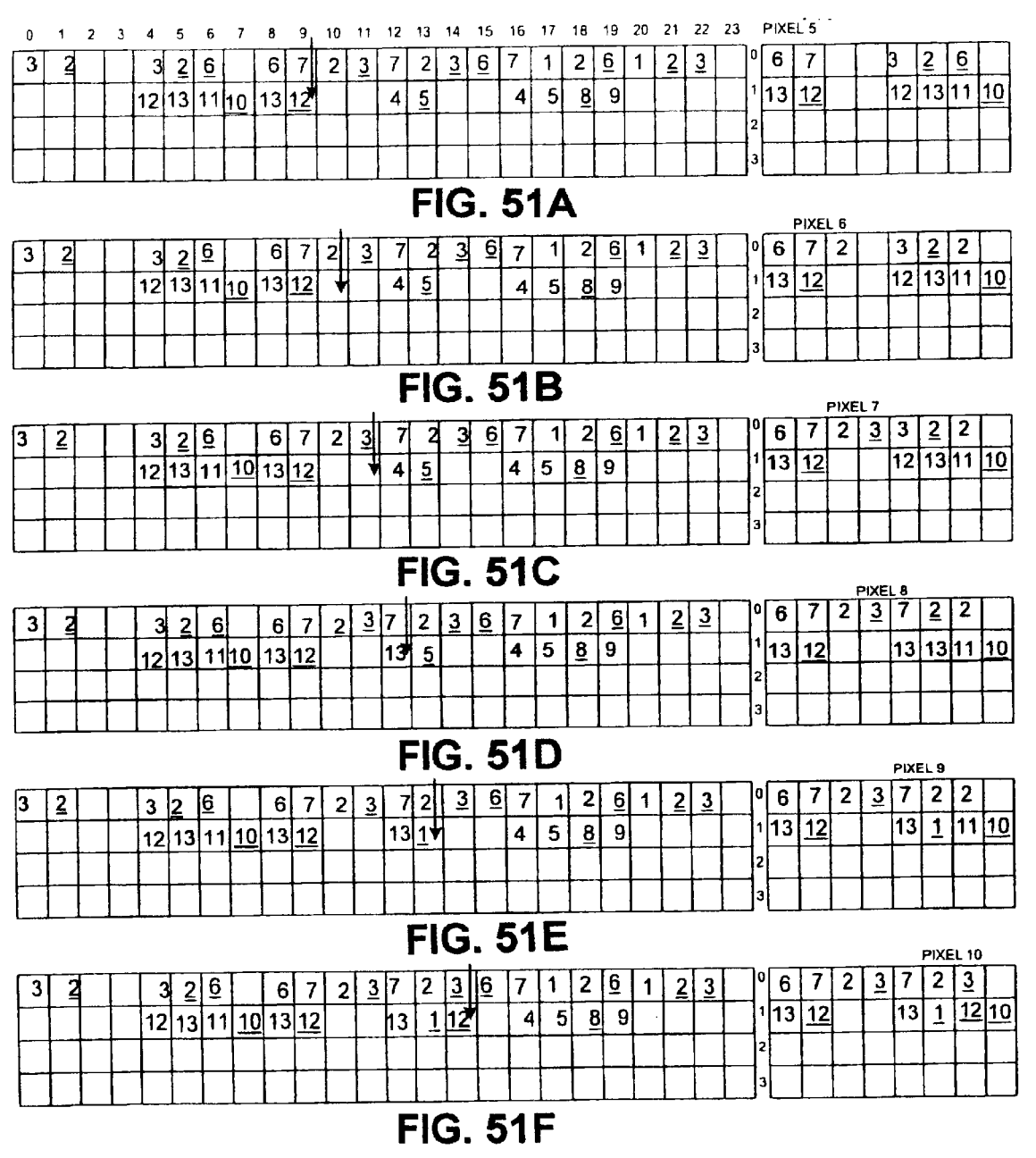

FIGS. 51(A)–51(F) show the contents of the triangle cache and the array of z-interpolator processors when the pipelined graphics system of the present invention is generating pixels for pixel locations (5, 5) to (10, 5), respectively.

Figures 52A, 52B, 52C, 52D, 52E, 52F:
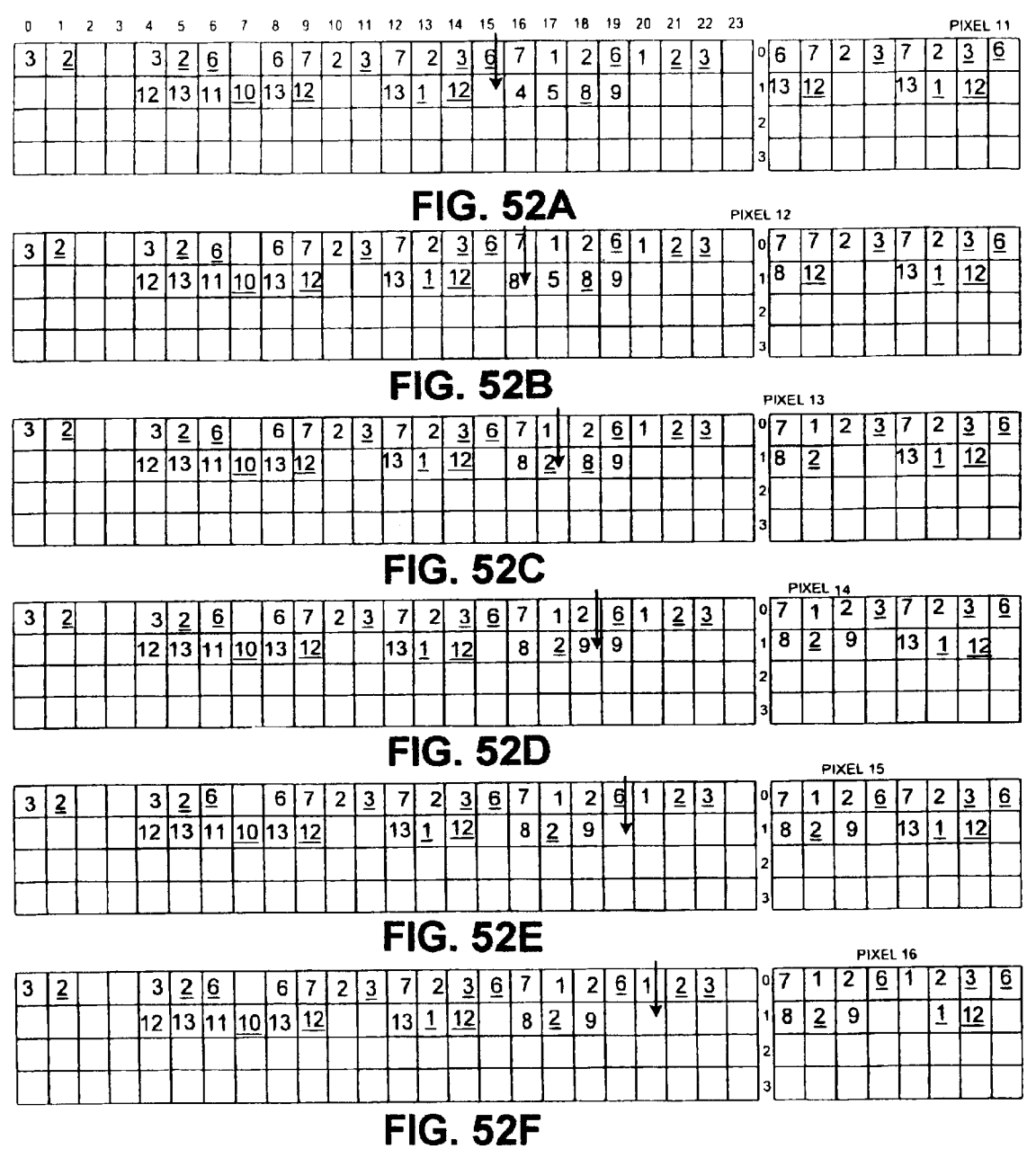

FIGS. 52(A)–52(F) show the contents of the triangle cache and the array of z-interpolator processors when the pipelined graphics system of the present invention is generating pixels for pixel locations (11, 5) to (16, 5), respectively.

FIG. 53 shows the winning pixels as determined by the graphics system in accordance with one embodiment of the present invention.

DETAILED DESCRIPTION OF PREFERRED EMBODIMENTS

Figure 1:
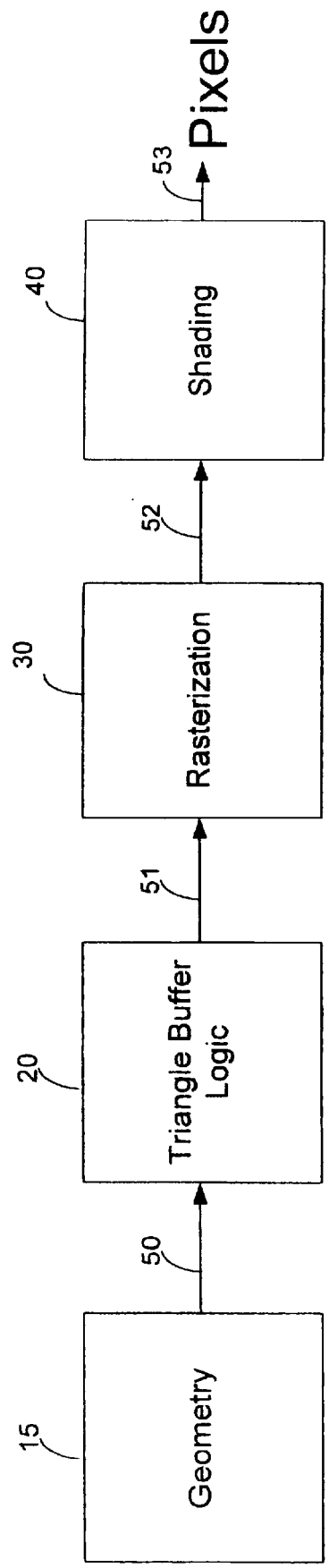
FIG. 1 shows a high level block diagram view of the deferred scanline converter system architecture (or graphics system) in accordance with one embodiment of the present invention.

The many embodiments of the present invention provide a system and method of rendering a description of objects, such as triangle data, to some output device, such as a printer or display monitor; that is, 3-D triangles are converted to pixels. These embodiments include a scanline converter architecture and method for processing multi-dimensional computer graphics data and displaying processed pixel data with a monitor or printer in real-time without the use of a full-framed pixel buffer. A two-stage process enables the rendering function by receiving the triangle data, determining those triangle data that are in competition for a given pixel location with a bounded writing scheme, and then, during scan-out to the output device, determining the winning triangle data for a given pixel location from among those triangles that are in competition. The system then applies shading/texture mapping to the winning triangles to generate pixels. These embodiments work well with current chips for optimum use of on-chip and off-chip bandwidth.

This patent specification will discuss the many embodiments of the present invention. First, some definitions of general terms and phrases will be provided. Second, an overview of the general architecture of the present invention will be discussed with specific details to be presented later. Third, the triangle buffer writing scheme in accordance with one embodiment of the present invention will be discussed, including a description of the coverage mask, bounding box, and the visible v. non-visible regions of the bounding box. Fourth, the scan-out logic including the triangle cache, the column of coefficient evaluators, the array of z-interpolator processors, and the image composition network will be discussed in detail. Alternative scan-out logic embodiments will also be presented. Fifth, the patent specification will then discuss a chip level implementation of one embodiment of the present invention. Sixth, the patent specification will illustrate the operation of one embodiment of the present invention with an example that guides the reader from the desired scene/object to the reception of the triangle data and the scan-out of the winning triangles for pixel generation to display the scene and the object. Seventh, the patent specification will conclude with some practical industrial applications that are themselves further embodiments of the present invention.

Definitions

Some definitions of terms and phrases used in this specification are in order. In the specification, the embodiments of the present invention are called "graphics system," "system," "deferred scanline converter," "deferred scan converter," or "back-end processor." These terms and phrases generally refer to the set of embodiments of the present invention. The scope of these terms is dependent on the context.

The specification uses the terms "line," "wire," "wire line," "wire/bus line," and "bus." These terms refer to various electrically conducting lines. Each line may be a single wire between two points or several wires between points. These terms are interchangeable in that a "wire" may comprise one or more conducting lines and a "bus" may also comprise one or more conducting lines.

The word "user" refers to the user of the graphics program who is observing the objects on the computer display screen. The "user" can select any "user viewing angle" or "viewing angle" from any three-dimensional location to view the object(s) on the display screen. Thus, if the object on the display screen is a typical open football stadium, one viewing angle may show the stadium from directly above where the stands in their entirety and the football field can be seen. Looking at the same stadium from ground level from the outside of the stadium, the stands and the football field are no longer visible but the sides of the stadium where the entrances are located can be seen. Other viewing angles will show other features of the stadium while not showing obscured or hidden features. Thus, depending on the viewing angle, certain features may or may not be hidden by obstructions. Of course, certain features may be partially visible and partially obstructed.

"Frame period," "vertical synchronization pulse period," and "screen refresh period" all generally refer to the time period during which data in the scan-out triangle buffer is used for scan-out purposes. This period is also the same period where the graphics system of the present invention writes triangle data into the triangle buffer that is not used for scan-out in a double buffered design. In one embodiment, the frame period may range from 30 Hz to 70 Hz with a typical value of 60 Hz. In the prior art, each frame period coincided with the scan-out of pixels in the frame buffer. In the embodiments of the present invention, the frame period coincides with the time between each screen refresh to enable the scan-out of triangle data in the triangle buffer.

Although the discussion below will generally be directed to triangles, it is equally applicable to micro-polygons. As known to those skilled in the art, micro-polygons are a collection or grouping of sub-pixels or samples. In one embodiment, a pixel includes sixteen sub-pixels or samples in a 4×4 matrix. Micro-polygons will be discussed in greater detail later in this patent specification.

General Architecture

Generally, one embodiment of the present invention is a graphics system that converts the three-dimensional polygons (e.g., triangles, micro-polygons) received from the front end of the system to pixels so that an image or series of images represented by these polygons can be rendered to some output device, such as a printer or monitor. This system is capable of generating 16 billion pixels per second, or 384 Gbytes per second, at the point in the architecture where the z values are computed and compared, which by itself represents a significant performance improvement over known prior art systems. It also has substantial expansion capabilities for fitting larger chips and newer processes such as embedded DRAM.

The particular designs substantially eliminate the many bottlenecks that had existed in prior art systems when low memory-logic interface bandwidth diminished and negatively offset the capabilities of high on-chip bandwidth. Accordingly, the embodiments of the present invention can generate an exemplary computer graphics scene of medium complexity with under 4,000 writes to memory whereas prior art systems may require approximately 300,000 pixel writes to the frame buffer for the same scene. For more complex scenes, the system needs more memory writes but still represent several orders of magnitude improvement in performance over the prior art. For simpler scenes, the system of the present invention represents an even greater order of magnitude improvement over the prior art. Such reduction in memory accesses by the system of the present invention reduces the need for off-chip bandwidth, increases throughput, and allows the system to process more triangles than ever before to increase rendering accuracy.

Other embodiments of the present invention include the many processes of converting these triangle data to pixels. Instead of the traditional frame buffer, the system uses a triangle buffer for storing triangles and defers scan conversion into pixels until scan-out. Thus, no pixels are generated and stored in memory; rather, pixels are generated "on the fly" from data in the triangle buffer during scan-out. In other words, one embodiment of the present invention can generate pixels in pipelined fashioned for immediate output to an output device (e.g., monitor) as the output device needs them during a frame period without any buffering between the pixel generation logic and the output device.

At a high level, the system utilizes a particular writing scheme to the triangle buffer which limits the number of triangles in competition to the size of a coverage mask. During pixel generation scan-out, one embodiment of the present invention uses a variation of the same coverage mask to identify competing triangles, determine visibility of triangles at particular pixel locations, determine z values, and resolve the z depth competition among the competing triangles so that a pixel from the winning triangle can be generated to the output device without any pixel writes to memory.

Referring to FIG. A, a high level view of the graphics system in accordance with one embodiment of the present invention is shown. A user decides to depict a scene and/or object(s) with computer-generated graphics. The user programs the appropriate data with a computer graphics software package, whether commercially purchased or custom-built, and provides the data to a geometry processor 15. The geometry processor 15 performs coordinate transformations and provides the data to a triangle buffer logic 20 via line 50. The data is in the form of triangles which may be of varying sizes and shapes, depending on the complexity of the scene or object(s) depicted. Ordering of the triangle data sent by the geometry processor 15 is not assumed; that is, the triangles may be sent by the geometry processor in random order or a specific order. The system of the present invention also does not assume any particular order of the triangles. Triangle data in the form of three-dimensional (3D) triangle data with z-plane equations are written by the triangle buffer logic 20 to a triangle buffer in accordance with a triangle buffer writing scheme. In one embodiment, the triangle buffer is implemented in a double buffered manner in which one of the buffers is used for writing data while the other is used for scan-out and the roles reverse after every vertical synchronization pulse (i.e., every 30–70 Hz, typically 60 Hz).

During scan-out, rasterization unit 30 receives the triangle data via line 51. The rasterization unit identifies triangles that are in competition for a given pixel location, determines visibility of the triangles at that pixel location, interpolates z values for the visible triangles, compares z values of the competing triangles, and resolves the competition by selecting a winning triangle for the given pixel location. The winning triangle represents the closest triangle to the user that is not obscured by any other triangle at that pixel location. The winning triangle is provided to shading/texture mapping unit 40 via line 52 where pixels are then generated to an output system. At one level, the rasterization unit 30 receives the data in the form of 3D triangles and z-plane equations at its input on line 51 and converts them to two-dimensional (2D) spans, z, and dz information and then finally to one-dimensional (1D) pixels after shading/texture mapping. To provide a fast and efficient system, the system depicted in FIG. 1 is pipelined.

Figure 2:
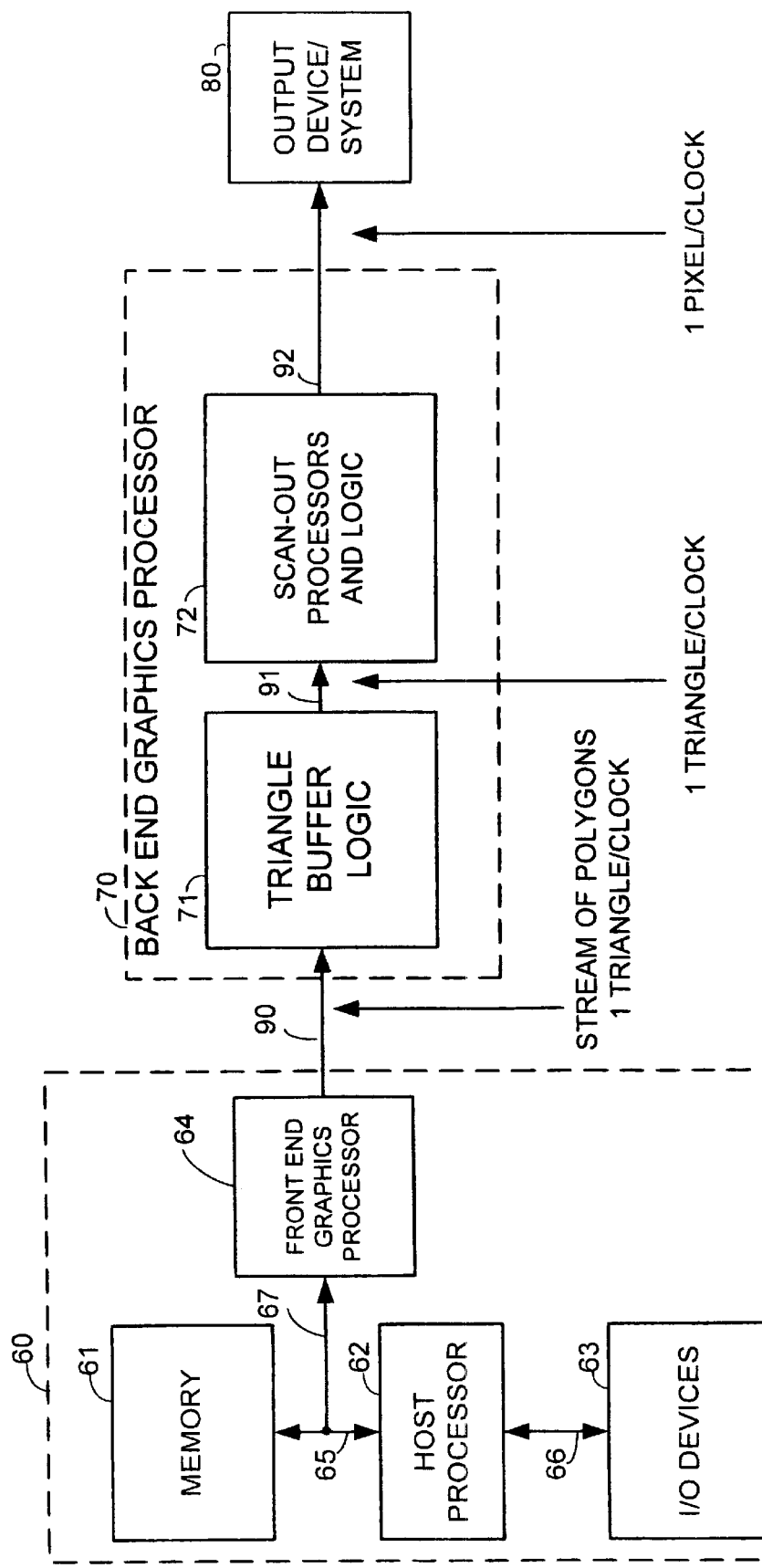
FIG. 2 shows a graphics system implementation with a computing system, a back end graphics processor containing the deferred scanline converter, and an output device in accordance with one embodiment of the present invention.

FIG. 2 shows another high level overview of one embodiment of the present invention in the context of a computing environment. The computer graphics environment includes a host computer 60 (which includes a front end graphics processor 64), back end graphics processor 70, and an output system or device 80, coupled together via several electrically conductive bus systems 90–92.

Host computer 60 includes a host microprocessor 62, a memory 61, input/output (I/O) devices 63, and a front end graphics processor 64 (which may be software or hardware). The host microprocessor 62 communicates with memory 61 and I/O devices 63 via bus 65 and bus 66, respectively. The host microprocessor 62 can be any relatively fast microprocessor such as the series of Intel Pentium processors, Digital's Alpha processors, Sun MicroSystem's SPARC processors or any number of processors known to those skilled in the art that is fast enough to process digital graphics data sufficiently.

Memory 61 includes main random access memory (DRAM or SRAM), read-only memory (ROM), and possibly one of several types of on-chip or off-chip cache subsystems. Memory 61 can also include a database of image data.

The processor-memory interface may include typical connections involving a local bus and a bus controller where memory accesses occur through the local bus like some of the processors manufactured by Intel. In another embodiment, the processor communicates with memory via dedicated lines. For example, the host computer system 60 can be a Sun Microsystems Enterprise 450 system which employs UltraSPARC II processors. Instead of the memory access via the local bus, the Sun 450 system allows the multiprocessors to access the memory via dedicated buses to the memory through a crossbar switch. Thus, multiple processes can be running with multiple microprocessors executing their respective instructions and accessing the memory without going through the local bus. The Sun 450 system along with the Sun UltraSPARC multiprocessor specifications are incorporated herein by reference. The Sun Ultra 60 system is another example of a microprocessor system although it allows only two processors. In still a further embodiment, the host computer system 60 may be a massively parallel processor system.

I/O devices 63 include keyboards, mouse, display monitors, printers, disk drives, tape drives, sensors, controllers, actuators, line drivers, modems, and any other devices that need to communicate with the host computer for any number of reason. Each of these elements in the host computer 60, including the host computer 60 itself, is commercially available and those skilled in the art knows which specific devices and brands to acquire for his/her specific application.

Computer graphics data is provided from the host computer 60 to the front end graphics processor 64 via bus 67. After processing the data, the front end graphics processor 64 provides the processed data to the back end graphics processor 70 via bus 90. In one embodiment, the processed data is a stream of polygons (i.e., triangles) output from the front end graphics processor at a rate of I triangle per clock on bus 90.

Computer graphics hardware (with or without related software) are designed for either front end or back end processing. The computer graphics industry realizes that a fine line exists between front end and back end processors that resists such simple categorization. For the sake of describing the present invention, however, front end processor 64 is provided herein as an element in the computing environment of FIG. 2 that provides triangle data and which may reside in the host computing system 60 or separately between the host computer 60 and the back end processor 70.

Front end graphics processor 64 receives instructions and data from the host computer 60 related to the graphics construct or image in world coordinates. The graphics data are described generally by image primitives which include triangles, textures, lines, etc. As known to those skilled in the art, the world coordinate system is a system in which a scene or object is represented in the computer after being model-transformed from three-dimensional modeling object coordinates. Typically, world coordinates are in floating point and, depending on the graphics program, the world coordinates can be in any unit meaningful to the application such as meters, miles, and angstroms. World coordinates are used near the beginning of the 3-D world to 2-D display screen coordinates transformation. The front end processor 64 then performs a number of transformations, clipping, and lighting instructions to describe the graphics image in screen coordinates.

Back end processor 70, or deferred scanline converter 70, then receives these processed triangle data from the front end processor 64 and, through various buffering techniques of updating the current graphics data information with new graphics data information, presents the data in the form of pixels to the output device 80. In essence, the back end processor 70 performs the following functions: (1) receives incoming triangle data; (2) determines the bounding box for each triangle; (3) uses a coverage mask to provide coverage to the triangles; (4) issues as many triangles as there are coverage masks that are necessary to "cover" the bounding box without overlaps among the coverage masks; (5) determines z-plane equations; (6) writes triangle data to a triangle buffer in accordance with a triangle buffer writing scheme; (7) identifies those triangles that are in competition for a given pixel location; (8) determines the visibility of the triangles for a given pixel location; (9) determines z depth at select locations corresponding to pixel locations by interpolation; (10) compares z depth values of all competing triangles for a given pixel location; and (11) determines the winning triangle among the competing triangles in which the winning triangle represents the triangle (and hence object or portion of an object) that is at the front of all other triangles (and all other objects or portions of objects), assuming no transparencies are involved. Based on the winning triangle, the system generates a pixel from the winning triangle at the given pixel location for delivery to the output system or device 80.

Still referring to FIG. 2, the back end graphics processor 70 includes a triangle buffer logic 71 and a scan-out logic 72 coupled to the triangle buffer logic 71 via bus 91 in accordance with one embodiment of the present invention. The triangle buffer logic 71 generally provides the logic and memory structure (triangle buffer and z buffer) for allocating a fixed amount of storage for each triangle issued by the triangle buffer write logic that can be successfully written to the triangle buffer within the confines of the coverage mask. As explained below, a single triangle received from the front end graphics processor may correspond to a number of issued triangles because of the numerous coverage masks required for full coverage of the received triangle. The triangle buffer in the triangle buffer logic 71 stores triangles that may ultimately win and lose in the scan-out logic 72 down the pipeline for the various pixel locations.

Although each memory location where a triangle may be stored corresponds to a pixel screen space location at the output device, the scan-out logic will not necessarily select the particular triangle stored at triangle buffer location (x, y) as the winning triangle for display at pixel location (x, y). Conversely, just because no triangle is stored at memory location (x, y) does not mean that no triangle will win for this pixel location (x, y). This is because the system of the present invention ensures that a triangle stored at memory location (x, y) will be guaranteed coverage competition for a wide range of pixel locations within the vicinity of pixel location (x, y). This range is a fixed range generally to the right, down, and to the lower left of the location where the triangle is stored. Refer to the coverage mask and sliding mask discussions below for a full explanation. Thus, even if a triangle is stored at memory location (x, y), this triangle may win for coverage at location (x+4, y) instead. By being stored at memory location (x, y), the system guarantees that that triangle can compete against other triangles for coverage at a wide range of pixel locations in addition to pixel location (x, y).

The competition among triangles for the pixel location is necessary because some triangles may be behind, and hence obscured by, other triangles. Z depth comparisons resolve the competition by determining which triangle is the closest to the user. The triangle buffer stores a bounded number of these competing triangles using a coverage mask which limits or bounds the number of triangles that may be competing for a given pixel location. Later in the pipeline, the scan-out logic resolves the competition by determining which of the competing triangles are in front of other triangles to generate one pixel per pixel location. In other instances, no triangles obscure other triangles or only a single triangle is present, in which case the result of the competition is clear.

The triangle buffer is implemented in a double buffered scheme so that one triangle buffer can be used for writing triangle data from the front end graphics processor to the triangle buffer while the other triangle buffer can be used for scan-out purposes to the output device 80. After every vertical synch pulse, the roles of the two triangle buffers reverse so that the triangle buffer used for scan-out during the previous synch pulse period is now used for storing buffered data and the other triangle buffer which was used for buffering data during the previous synch pulse period is used for scan-out.

The scan-out logic 72 is next. Triangle data processed by the triangle buffer logic 71 and stored in the triangle buffer are provided to scan-out logic 72 via bus 91. In essence, the scan-out logic 72 includes a triangle cache, a column of coefficient evaluators, an array of z-interpolator processors, and an image composition network which all function to receive 3D triangle data and z-plane equations (for both z depth and color), convert them to 2D spans, z, and dz, and then finally convert them to 1D pixels. In one embodiment, the triangle buffer logic 71 outputs 1 triangle per clock on bus 91. The scan-out logic 72 outputs 1 pixel per clock on bus 92. In other embodiments, a triangle cache is not used; rather, appropriate memory address logic is used to process selected data from the triangle buffer to the column of coefficient evaluators.

The scan-out logic 72 uses these subsystem components to enable a "sliding mask" concept, in which a mask of dimensions n×m, where n and m are positive integers and which coincide with twice the coverage mask dimensions in one embodiment, slides across the data stored in the triangle buffer. The sliding mask slides across the triangle buffer from column by column and row by row so that eventually, the sliding mask makes its way from the top left corner of the buffer to the bottom right corner of the buffer one scanline at a time. At each "stop," the scan-out logic processes the relevant data located within the confines of the sliding window to determine the winning triangle for pixel generation. After the end of a row, the sliding mask wraps around to the next row so that no part of the sliding mask is "hanging" outside the triangle buffer boundary; that is, all parts of the sliding mask are covering the triangle buffer. Of course, the exception is when the sliding mask is at the top edge of the triangle buffer. For example, assume the sliding mask's dimensions are 4 rows by 8 columns. If the bottom row of the sliding mask is on any part of the first three rows of the triangle buffer, some portion of the sliding mask will be "hanging" outside the triangle buffer.

The scan-out logic may include a shader/texture mapper. Alternatively, the shader/texture mapper may be provided separately from the scan-out logic. For shading, the color coordinates R, G, B will suffice. For texture mapping, U, V, and W instead of RGB are stored with the triangle data. The Gouraud shader can output interpolated values for U, V, and W which are fed to two dividers. One divider will divide U by W and the other divider will divide V by W. The outputs of these two dividers are coupled to a texture look-up table to fetch texels. The texels are then fed to a texture tri-lerp unit so that the tri-lerp operation can be performed for the texels. Textures that are not in the texture memory must be drawn into the triangle buffer one pixel at a time.

The output system or device 80, such as a graphics monitor or printer, receives pixel data from the back-end processor 70 via bus 92 so that the proper pixel associated with a portion of an object surface can be displayed. The particular winning triangle competing for the particular pixel location was determined in the back-end processor 70. The output device 80 merely displays the winning pixel associated with the object that is not obscured by another object for the particular pixel position. One embodiment of the monitor is a raster scan CRT display device where each horizontal line is scanned on the display sequentially, setting pixel properties (e.g., color, intensity, reflectivity) so that the combination of pixels forms a computer graphics scene.

In sum, the graphics system of the present invention, as shown and described above with respect to FIGS. 1 and 2, includes a triangle buffer and a scan-out logic. The graphics system receives triangle data from the front end processor and then writes the processed triangle data to the triangle buffer following a triangle buffer writing scheme in accordance with one embodiment of the present invention. The triangle buffer stores triangle data that may or may not ultimately win for a pixel location, but so long as storage space is available within the defined coverage mask and the triangle data satisfies the requirements of the triangle buffer writing scheme, the triangle data are stored in the triangle buffer for later processing by the'scan-out logic. In one embodiment, two triangle buffers are provided so that one buffer can be written with new incoming triangle data from the front end processor while the other buffer can be used for scan-out and during the next synch pulse period, the roles of the triangle buffers are reversed. For scan-out, the triangle data located within the sliding mask in the triangle buffer are processed. For each pixel location, the triangles that are competing for the given pixel location as determined by the sliding mask are evaluated and compared to each other so that a single triangle wins the competition for representation as the pixel for that given pixel location. These pixels are generated straight out of the triangle buffer and no other buffering mechanism, such as the traditional frame buffer, is utilized. Pixels are generated and provided to the output device without additional buffering.

The basic guiding principle behind this general architecture is that only one opaque triangle is visible at any one pixel location. Thus, if an image has one million pixels, only one million opaque triangles are visible. Preferably, the triangle buffer stores the visible triangle at the location where it is visible. Also, the triangle buffer need not be completely full to render the entire image. Thus, an empty triangle buffer location (x, y) can be associated with a visible triangle and pixel at pixel location (x, y). Furthermore, the system stores triangles in the triangle buffer based on the screen space location of the bounding box. A coverage mask bounds the area or region of the triangle buffer in the vicinity of the triangle data where the system guarantees coverage competition for that triangle. Indeed, as will be discussed later, the sliding mask determines the specific region where the system guarantees coverage competition for each stored triangle in the triangle buffer. By bounding the number of triangles in the coverage mask, the size of the array of z-interpolator processors in the scan-out logic can be bounded to simplify the design. Moreover, for larger triangles (triangles that are larger than the coverage mask), the system provides for multiple entries in the triangle buffer.

Triangle Buffer

The triangle buffer logic receives triangles from the front end processor and implements its triangle buffer write scheme for writing triangle data to a triangle buffer. The triangle buffer is unlike a frame buffer in many respects. Most notably, the triangle buffer stores triangle data whereas a frame buffer stores pixel data.

When the graphics system receives a triangle from the front end processor, it is actually receiving each of the three vertices of that triangle, along with other data that is relevant to the rendering of that triangle as a pixel (e.g., R, G, B). These vertices and other data associated with a given triangle are stored in a triangle buffer, if the system determines through its triangle buffer write scheme that this triangle should be written in a selected triangle buffer location. As will be explained further below, the triangle logic may decide that a particular issued triangle can not be stored anywhere in the triangle buffer because it failed its z comparisons at every triangle buffer location within its coverage mask.

Figure 6A:
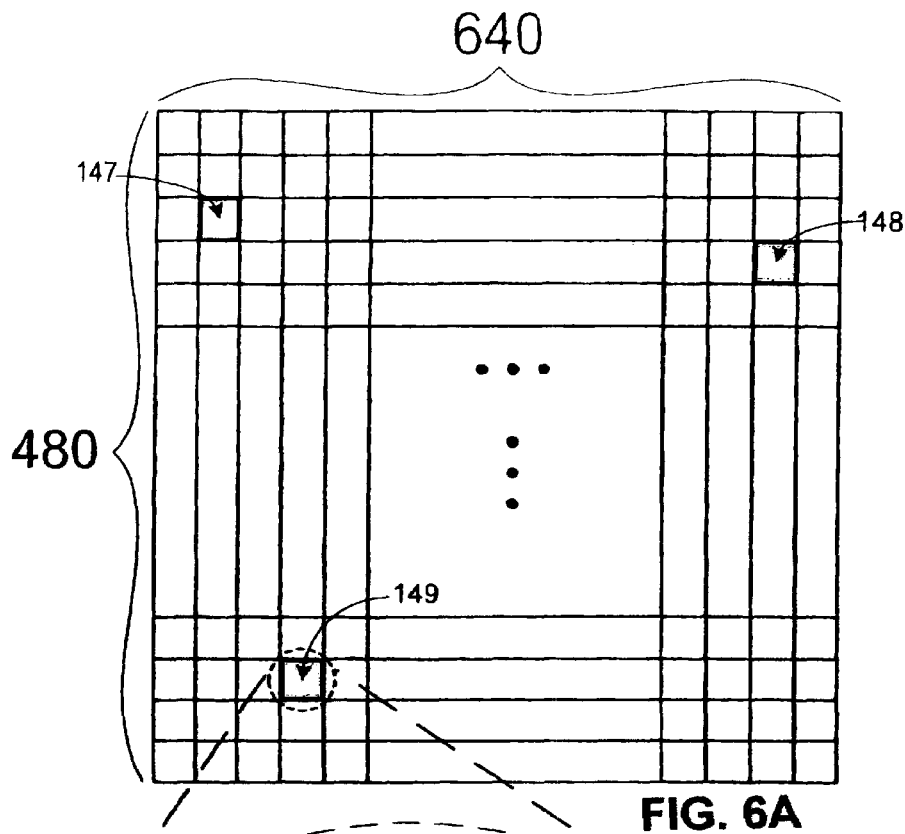
FIG. 6 shows the structure of the triangle buffer and one of its cells in accordance with one embodiment of the present invention.
Figure 6B:
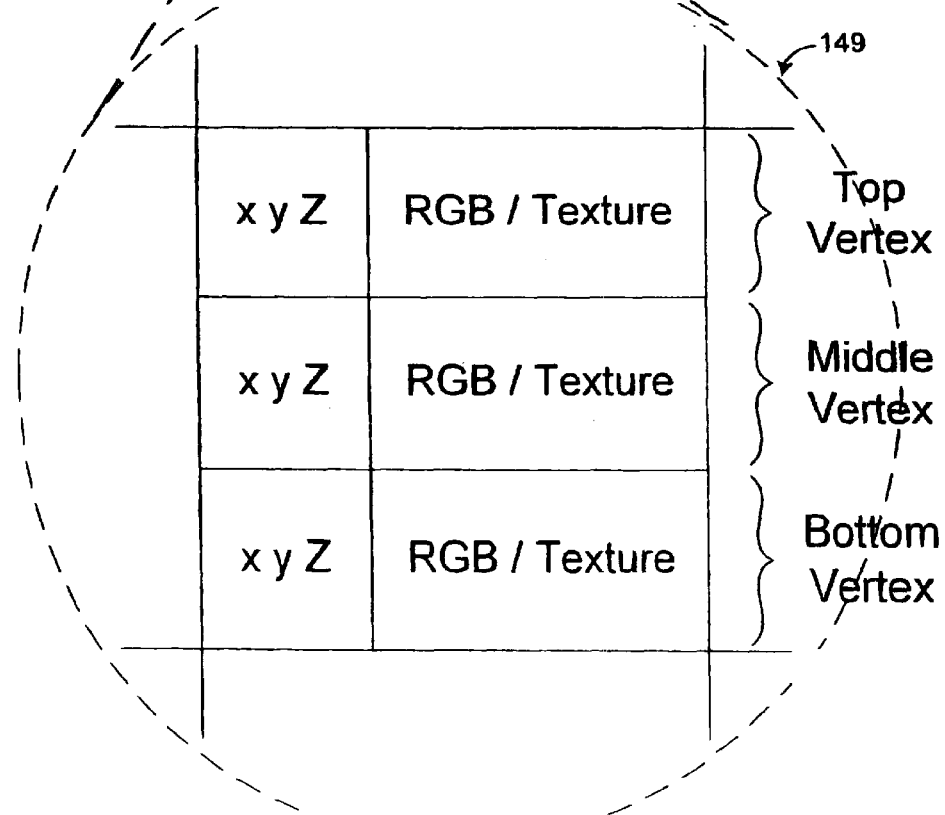

Referring to FIG. 6 briefly, one embodiment of the triangle buffer is a 640×480 memory array of cells; that is, 640 cells are provided in each row and 480 rows are provided altogether. An example of a 640×480 buffer is a buffer for a VGA system. In other embodiments, the triangle buffer has dimensions of 1280×1024. The specific dimensions may vary depending on the application and user's needs, however, the triangle buffer has dimensions that are consistent with the portion of the output device that displays or outputs pixels. Thus, if a computer graphics monitor can provide for a 1280×1024 screen to display pixels, then the triangle buffer also has dimensions of 1280×1024. Some exemplary cells include cells 147, 148, and 149. In one embodiment, each cell stores 32 bytes of triangle information. A double buffered 640×480 triangle buffer requires a little over 16 Mbytes of memory.

Each triangle is described by vertex coordinates (x, y, z) in 3-D space and some specification of surface properties such as color, texture, intensity, transparency, and reflectivity. Some triangle descriptions also include the normal vectors to the surface at each surface at each vertex. In one embodiment of the present invention, the triangle data stored in each cell of the triangle buffer includes, at a minimum, the xyz spatial coordinates (where z represents depth), and the R, G, and B color coordinates (or texture information) of the three vertices. Additional values as mentioned above may be specified for a given implementation to provide input to more elaborate shading/texture mapping processes.

Figure 3:
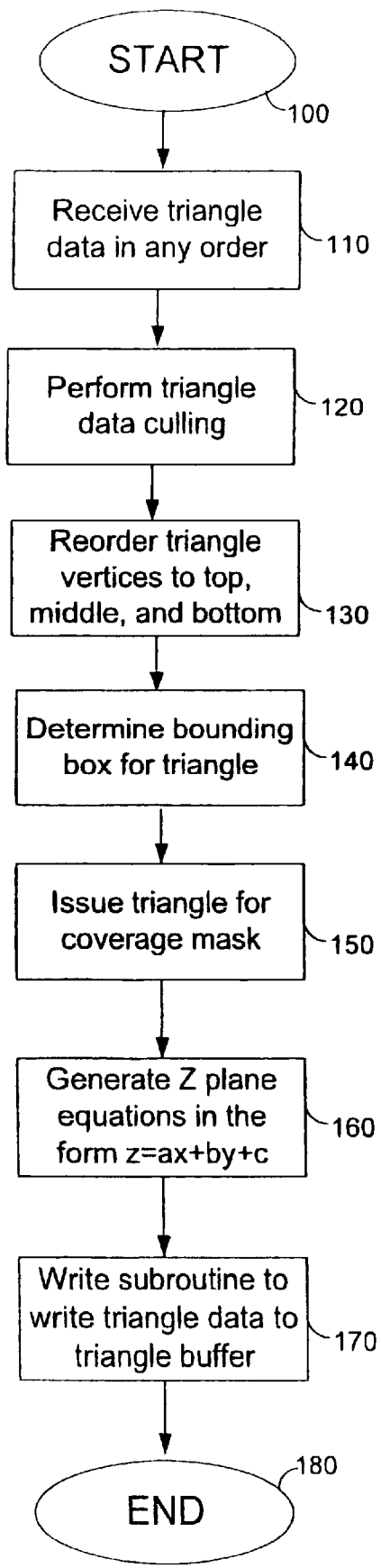
FIG. 3 shows a flow diagram of the main triangle buffer write process in accordance with one embodiment of the present invention.

For example, in FIG. 3, cell 149 contains the triangle data having three vertices, where each vertex of the triangle has xyz coordinates, RGB data, and texture data. Based on the vertices, the system can determine the various attributes of the triangle including its color, texture, plane equation, orientation, location on the screen, shape, and size. Consistent with the format of the triangle data, the graphics system stores the three vertices of a triangle in cell 149. The top vertex has x, y, z, rgb (or alternatively, texture) information associated with the top vertex of the triangle. The middle vertex has x, y, z, rgb (or alternatively, texture) information associated with the middle vertex of the same triangle. The bottom vertex has x, y, z, rgb (or alternatively, texture) information associated with the bottom vertex of the same triangle.

In one embodiment, the 640×480 triangle buffer delivers 32 bytes at 25 MHz, or 32 bytes every 40 ns. Thus, the scan out requirement is 800 Mbytes per second. A chip containing one next generation Rambus interface which utilizes split transaction memory access will be sufficient for scan in and scan out bandwidth.

The triangle buffer of the present invention replaces the traditional frame buffer in more ways than one. The triangle buffer is unlike the frame buffer in its contents and its placement on the pipeline. Typically, conventional frame buffers store information relating to the RGB value of the pixels to be displayed. Using the deferred scan conversion architecture of the present invention, the frame buffer concept has been modified substantially so that each triangle buffer location is capable of storing a complete triangle description, instead of its scanline-converted pixel value. Thus, although a frame buffer stores pixels, the triangle buffer stores triangles. Also, the triangle buffer is one of the first components on the pipeline placed at a point long before any pixels are generated. On the other hand, a frame buffer is normally placed near the end of the pipeline after pixels have been generated. Thus, data comprising triangle descriptions are stored in the cells.

Furthermore, the triangle buffer need not be full for the system to generate pixels for all 1280×1024 pixel location. In accordance with one embodiment of the present invention, a single triangle buffer entry allows that triangle in that entry to compete for coverage in a wide range of pixel locations. Also, just because a particular triangle is stored at a triangle buffer location (x, y) does not necessarily imply that that triangle will be the winning triangle at pixel location (x, y). Finally, just because a particular triangle buffer location is empty does not mean that no pixel will be generated at the corresponding pixel location. One embodiment of the architecture ensures that if a triangle is designated for a particular pixel location on the computer graphics monitor, that triangle will be stored in the triangle buffer at a location somewhere in the vicinity of the corresponding screen space location and available for pixel generation competition.

As explained later in this patent specification in the discussion about the scan-out logic, the triangles stored in the triangle buffer are read out and converted to pixels "on the fly" during every refresh frame period. The "on the fly" generation of pixels is a unique performance enhancing feature of one embodiment of the present invention because it enables scan-out without a frame buffer and eliminates the numerous pixel memory accesses that provided a bottleneck problem due to the low memory-logic interface bandwidth. In sum, the graphics system of the present invention does not utilize a frame buffer at all anywhere along its pipeline and instead, generates pixels based on triangle data in the triangle buffer "on the fly."

Triangle Buffer Writing Scheme—General Overview

In order to properly generate pixels according to the embodiments of the present invention, the triangles and their respective contents must be placed in the correct memory location in the triangle buffer. The placement of a triangle in a single triangle buffer location ensures that the triangle is guaranteed coverage competition in a range of pixel locations; that is, the triangle need not be placed at every single pixel location where it will be represented as a pixel. The triangle buffer writing scheme in accordance with one embodiment of the present invention ensures such proper placement of the triangles. In other words, the graphics system writes each triangle data to the proper location(s) in the triangle buffer and the contents of that triangle data are as required for proper operation by later processes down the pipeline.

FIG. 3 shows a flow chart of the main triangle buffer writing scheme in accordance with one,embodiment of the present invention. The flow chart begins at "start" step 100. The flow chart has some preliminary pre-writing operations of properly formatting the received triangle data as shown in steps 110, 120, 130, 140, 150, 160, and an actual writing operation at step 170. A more detailed discussion of the portion of the triangle buffer write scheme associated with step 170 will be provided later in the context of FIGS. 7, 8, 9, 12, 13, 14, 15, 17, 18, 19, and 20.

Generally, the graphics system receives triangles at step 110. It then performs some triangle data culling at step 120 to determine if the triangle is smaller than a pixel. If it is larger than a pixel, the system then re-orders the vertices of the triangle at step 130 to its proper top, middle, and bottom locations for storage in the triangle buffer cell. At step 140, it determines the a bounding box for each triangle so that the coverage mask(s) can be appropriately applied to the triangle later for writing triangle data to the triangle buffer. At step 150, the system issues a triangle for each coverage mask. Specifically, the system issues a triangle for each target triangle buffer location associated with a coverage mask. At step 160, the system determines the z-plane and color plane equations so that the system can later use the slope information to obtain an accurate z-depth and color information at a specific point on the triangle. The system also uses the plane equations to generate span information so that the system can determine whether a particular pixel location for which the various scan-out operations are being performed is inside or outside the relevant triangle.

Based on the results of all of these preliminary steps, the actual writing operation to the triangle buffer can be performed at step 170. For each write operation of a triangle to a triangle buffer location, a coverage mask is used. If a triangle is larger than the coverage mask, multiple coverage masks will be used. Applying the coverage mask(s) to the bounding box of each triangle, the system attempts to write to a designated triangle buffer location within the confines of the coverage mask via series of examining the designated location to determine if it's empty or full, performing z comparisons of new triangle data with existing triangle data, displacing the existing triangle if it loses the comparison, finding a new location for the displaced triangle, finding a new location for the new triangle if it loses the comparison with the existing triangle, and of course, writing the triangle data to selected triangle buffer locations. These operations will be discussed at length below.

The various steps of the flow chart of FIG. 3 will now be discussed with additional details. Consistent with the system design, the system does not assume any type of ordering of the incoming triangles. Thus, at step 110, the system receives triangles in any order. However, the system does not wait for all the triangles to be received within a given frame period before processing them; rather, the system processes the triangles as they are received to improve throughput. In other words, the system can receive one triangle while processing a previously received triangle.

Figure 10:
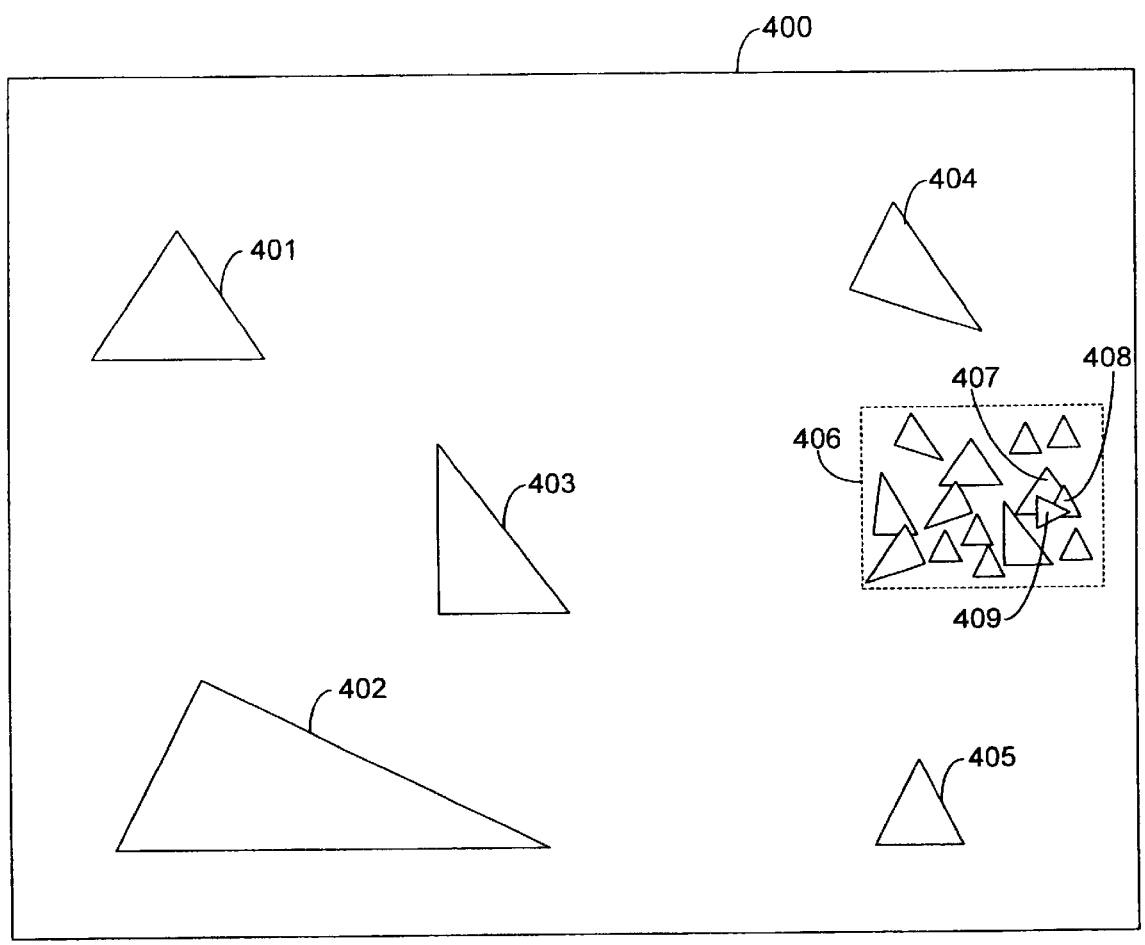
FIG. 10 shows one example of received triangles mapped onto an output device such as, for example, a computer monitor, to illustrate the reception order and varying sizes of the triangles received by the system.

To illustrate the triangle ordering, briefly refer to FIG. 10 where screen 400 represents any screen or monitor that is capable of displaying computer graphics scenes. In some embodiments, the dimensions of the screen 400 are consistent with the dimensions of the triangle buffer; that is, if screen 400 has dimensions 1280×1024 pixels, the triangle buffer has dimensions 1280×1024. During any vertical synchronization period or frame period for this example, triangles 401 to 409 (and other triangles that are not numbered) are received by the system for processing. This frame period coincides with the time between screen refresh.

However, reference to FIG. 10 in the context of triangle reception does not necessarily mean that the triangles 401 to 409 are stored in the triangle buffer as shown in FIG. 10. The reader should be mindful that storage of triangles into the triangle buffer is accomplished according to a triangle buffer writing scheme specified herein in the discussion with respect to other figures. FIG. 10 by itself is not indicative of the triangle buffer writing scheme at all.

The triangles do not necessarily come into the triangle buffer in any particular order. The triangles may come in the order 401 to 409 or some other order. Just because triangle 403 is located above triangle 402 does not necessarily mean that triangle 403 comes into the triangle buffer before triangle 402. Similarly, just because triangle 401 is located to the left of triangle 404 does not necessarily mean that triangle 401 comes into the triangle buffer before triangle 404. Furthermore, just because triangle 407 is located farther away from the user than triangle 408 does not necessarily mean that triangle 407 comes into the triangle buffer before triangle 408. The triangle buffer writing scheme addresses the triangles as they are received without any sorting.

Returning to FIG. 3, after a triangle is received at step 110, the system performs triangle data culling at step 120. Here, the system compares the surface area of the triangle to that of a pixel. If the triangle data has a surface area that is less than a pixel's surface area, the triangle is discarded. Unnecessarily small triangles are not processed further.

At step 130, the system re-orders each triangle's orientation to top, middle, and bottom vertices. As explained above, a triangle in a computer graphics system is represented by its three vertices. However, the front end processor delivers the three vertices without any regard to the triangle's orientation. The graphics system of the present invention re-orders the three vertices for proper storage in the triangle buffer cell according to its top, middle, and bottom vertices. The re-ordering step will be discussed further with respect to FIGS. 4, 6, and 11 below.

At step 140, the graphics system determines the bounding box for each triangle received. The bounding box for one triangle can vary considerably in size and shape from that of another triangle. The bounding box for a given triangle is the smallest box that can be "drawn" around that triangle. If the triangle is relatively large, its bounding box can be larger than a single coverage mask. Accordingly, multiple coverage masks will be needed to "cover" this bounding box. If the triangle is relatively small, its bounding box can be equal to or smaller than a single coverage mask. In this case, only one coverage mask will be needed to "cover" the bounding box. The bounding box is used later with the coverage mask during the actual writing routine. The bounding box determination is discussed further below with respect to FIGS. 5 and 11.

At step 150, the system issues a triangle for each coverage mask needed to "cover" a bounding box. Thus, as discussed above with respect to step 140, the size of the bounding box determines whether multiple coverage masks will be needed. If multiple coverage masks are needed, the system issues multiple triangles—one for each coverage mask. However, the triangle buffer write scheme as discussed below will ultimately determine whether the system will successfully write any or all of these triangles to the triangle buffer.

At step 160, the graphics system determines the plane equations for z and color. The system accomplishes this task by using the coordinate information (x, y, z) to determine the z-plane equations and the color information (R, G, B) to determine the color plane equations. The z-plane equation, as known to those ordinarily skilled in the art, allows the system to determine the slope and the actual z depth of selected points on the triangle. The color plane equation, as known to those ordinarily skilled in the art, allows the system to determine the slope and the actual color of selected points on the triangle. In accordance with the present invention, the system determines the z-plane and color plane equations so that the system can also use the slope information to obtain an accurate z-depth and color information at various points on the triangle. The system also uses the plane equations to generate span information so that the system can determine whether a particular pixel location for which the various scan-out operations are being performed is inside or outside the relevant triangle.

At step 170, the system performs the actual writing operation to the triangle buffer. As will be discussed in great detail later with respect to FIGS. 7, 8, 9, 12, 13, 14, 15, 17, 18, 19, and 20, the writing operation essentially seeks a designated triangle buffer location for a newly received and formatted triangle within the confines of its coverage mask and then compares the new triangle with the triangle already stored therein (if a triangle is already stored therein). Depending on the result of the comparison, the system assigns the winning triangle to that designated location and seeks a new location for the losing triangle within the confines of the coverage mask. If a location cannot be found for the triangle within the confines of the coverage mask, the triangle is discarded. The flow chart ends at step 180.

As needed, the various operations generally described above with respect to FIG. 3 will be described in greater detail below. These operations include re-ordering triangle vertices (step 130), determining the bounding box (step 140), issuing a triangle for each coverage mask (step 150), generating plane equations (step 160), and finally the write operation (step 170).

Re-ordering of Triangle Vertices

In FIG. 3, step 130 requires the re-ordering of triangle vertices. Why does the system re-order the vertices to their top, middle, and bottom vertices? The re-ordering of the vertices allows the system to more effectively implement the scan-out logic portion of the invention. As will be discussed later, the scan-out logic determines and uses the slopes to each of the line segments forming the three sides of the triangle. With the slope information, the system can determine the span of a triangle at a given row. With the span information, the system can determine whether the current pixel location for which the system is generating a pixel is inside or outside the triangle. By re-ordering the vertices to the proper top, middle, and bottom vertices, implementation is facilitated. The system knows that the top vertex information is also associated with the slope of the line segment between the top and middle vertices, the middle vertex information is also associated with the slope of the line segment between the middle and bottom vertices, and the bottom vertex information is also associated with the slope of the line segment between the top and bottom vertices.

Figure 11A:
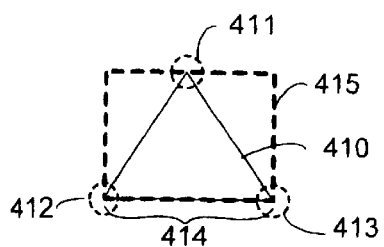
FIGS. 11(A)–11(E) illustrate the bounding box concept.
Figure 11B:
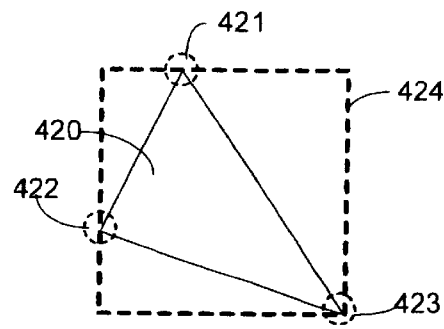

To illustrate the issues addressed by this re-ordering operation, refer to FIG. 11(B). Triangle 420 is represented by three vertices 421, 422, and 423. When the triangle is converted to pixels for the output device, the triangle should be oriented as shown with vertex 421 at the top, vertex 422 at the middle, and vertex 423 at the bottom. However, the front end processor may deliver triangle 420 by sending vertex 422 (middle) first, then vertex 423 (bottom), and then finally vertex 421 (top). At other times, the front end processor may deliver triangle 420 by sending vertex 423 (bottom) first, then vertex 421 (top), and then finally vertex 422 (middle). The graphics system in accordance with one embodiment of the present invention re-orders the vertices so that storage in the triangle buffer is consistent with the proper orientation of the triangle. In other words, the system will store vertex 421 (top) at the top, then vertex 422 (middle) immediately below vertex 421, and then finally vertex 423 (bottom) immediately below vertex 422 in the same cell of the triangle buffer. Referring briefly to FIG. 6, triangle buffer has many storage locations called cells. Three exemplary cells are cell 147, cell 148, and cell 149. In each cell, such as cell 149, the triangle vertices are stored. In accordance with one embodiment of the present invention, the graphics system stores the three vertices according to their top, middle and bottom orientation. Thus, vertex 1 will store the topmost vertex, vertex 2 will store the middle vertex, and vertex 3 will store the bottommost vertex regardless of the order of the vertices that the front end processor delivers.

At times, the triangle is oriented in such a way that two vertices are at the same level. For example, FIG. 11(A) shows triangle 410 with vertices 411, 412, and 413. Vertex 411 is clearly the top vertex but vertices 412 and 413 are equally at the bottom. In accordance with one embodiment of the present invention, the graphics system would decide that whichever vertex came in first (412 v. 413) would be assigned the middle vertex, and of course, vertex 411 would be assigned as the top vertex for storage in the cell in the triangle buffer. In accordance with another embodiment of the present invention, the graphics system would assign the leftmost vertex as the middle vertex (vertex 412) and the other as the bottom vertex (vertex 413). The same scheme applies to ties at the top level such as triangle 440 in FIG. 11(D) where two vertices 441 and 442 are equally the top vertices. In one embodiment, the graphics system would assign vertex 441 as the top vertex because it was sent before vertex 442, and in another embodiment, vertex 441 would be the top vertex because it is located to the left of vertex 442.

Figure 4:
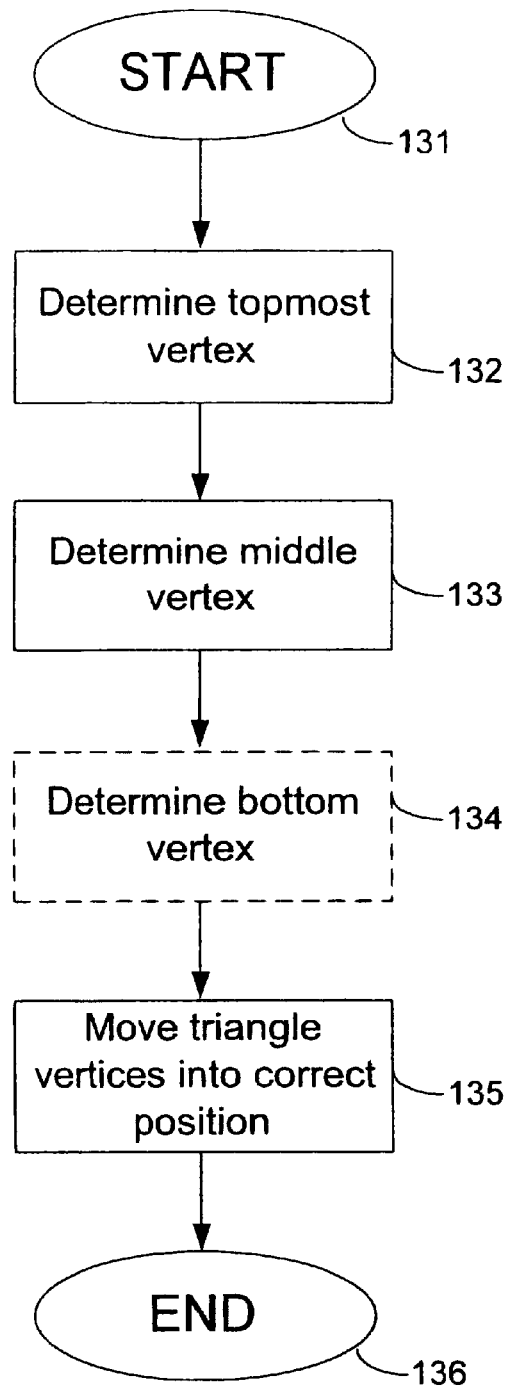
FIG. 4 shows a flow diagram of reordering each triangle data to top, middle, and bottom vertices in accordance with one embodiment of the present invention.

The flow chart of FIG. 4 provides a more detailed view of the re-ordering operation. The flow chart starts at step 131. At step 132, the system determines the topmost vertex of the triangle. At step 133, the system determines the middle vertex of the same triangle. At this point, the system knows that the last remaining vertex is the bottom vertex of the same triangle at step 134. The system then moves the vertices into their correct top, middle, and bottom positions at step 135. The flow chart ends at step 136. During the actual writing step, the triangle will be stored in the triangle buffer cell in this correct position.

Bounding Box

The system determines the bounding box information for each triangle. The bounding box allows the system to determine how many coverage masks will be needed to "cover" the bounding box associated with each triangle. The number of coverage masks needed determines the number of triangles issued. Referring briefly to FIG. 10, the triangles 401 to 409 are of varying sizes, shapes, and orientations and come in various order. Typically, the front end graphics processor sends smaller triangles such as those triangles within the dotted line 406 for those portions of the screen where finer granularity is necessary. Larger triangles such as triangles 401, 402, and 403 are for those portions of the scene such detail is not needed—usually a uniformly colored and textured surface that takes up a large area of the scene. Regardless of the sizes and shapes of the triangles, the graphics system of the present invention determines a bounding box for each triangle as indicated by step 140 of FIG. 3. The bounding box is the smallest box that can "fit" around the triangle. However, this "fit" determination is made in two-dimensional space; that is, the z depth information of the vertices is ignored. The box is "standing" upright and all angles of the box are 90 degrees. In other words, the bounding box is a rectangle.

Figure 11C:
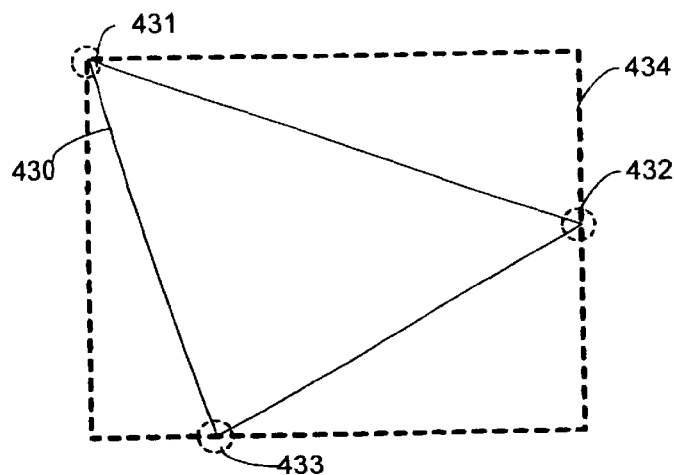
Figure 11D:
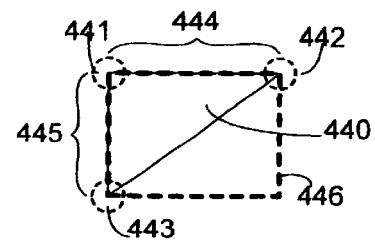
Figure 11E:
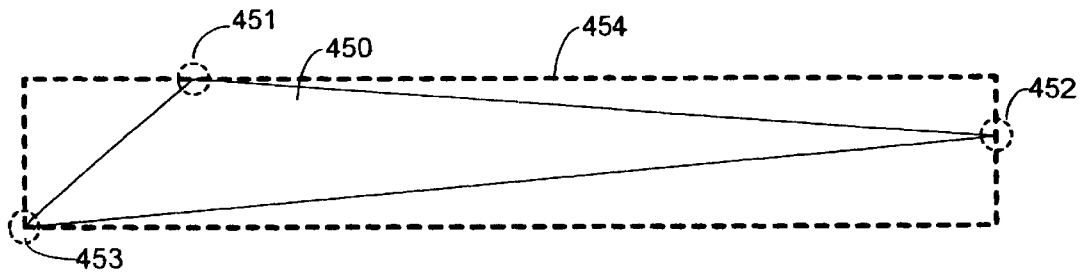

Refer to FIGS. 11(A) to 11(E) for a conceptual discussion of the bounding box. The triangles in FIGS. 11(A) and 11(D) are similar because the one or more sides of the triangle coincide with one or more sides of the bounding box. Other than the fact the triangle 410 in FIG. 11(A) is an upright standing equilateral triangle and the triangle 440 in FIG. 11(D) is a right triangle, these two triangles share a common property—one or two of its sides are oriented either at 0 or 90 degrees (perfectly horizontal or perfectly vertical). The triangles in FIGS. 11(B), 11(C), and 11(E) are similar to each other because none of their respective sides are either perfectly horizontal or perfectly vertical. Observe that in order to draw the smallest box around a triangle, at least one corner of the box must intersect a vertex of the triangle.

In FIG. 11(A), triangle 410 is an equilateral triangle (all sides are the same length) and is oriented in such a manner that vertices 412 and 413 share the same level below vertex 411. The smallest box that can "bound" the triangle 410 is bounding box 415. The top side of bounding box 415 intersects top vertex 411 and the bottom side 414 of bounding box 415 intersects vertices 412 and 413. The left side intersects vertex 412 and the right side intersects vertex 413. Here, the bottom side of triangle 410 (the side between vertices 412 and 413) coincides with the bottom side 414 of the bounding box 415. By having the sides of the bounding box intersect the vertices of the triangle, it is the smallest box that can be "drawn" around the triangle.

Analogously, triangle 440 in FIG. 11(D) has one side that is perfectly horizontal and another side that is perfectly vertical. Thus, these sides also coincide with the sides of the bounding box 446. Triangle 440 has vertices 441, 442, and 443. Side 444 of bounding box 446 coincides with the horizontal side of the triangle 440 located between vertices 441 and 442. Side 445 of bounding box 446 coincides with the vertical side of triangle 440 located between vertices 441 and 443.

In FIG. 11(B), triangle 420 is not an equilateral triangle and none of its sides are either horizontal or vertical. To draw the bounding box 424 around triangle 420, the top side of the bounding box 424 intersects top vertex 421, the left side of the bounding box 424 intersects the middle vertex 422, and the bottom and right sides of the bounding box 424 intersect the bottom vertex 423.

The triangle 430 in FIG. 11(C) is similar to the triangle 420 of FIG. 11(B) in that no particular side of the triangle coincides with any side of the bounding box. In FIG. 11(C), the top vertex 431 of triangle 430 intersects the top and left sides of bounding box 434, the middle vertex 432 intersects the right side of the bounding box 434, and the bottom vertex 433 intersects the bottom side of the bounding box 434.

Finally, triangle 450 in FIG. 11(E) is also very similar to triangle 420 of FIG. 11(B) and triangle 430 of FIG. 11(C). The top side of bounding box 454 intersects the top vertex 451 of triangle 450, the left and bottom sides of bounding box 454 intersect bottom vertex 453 of triangle 450, and the right side of bounding box 454 intersects vertex 452 of triangle 450.

Figure 16:
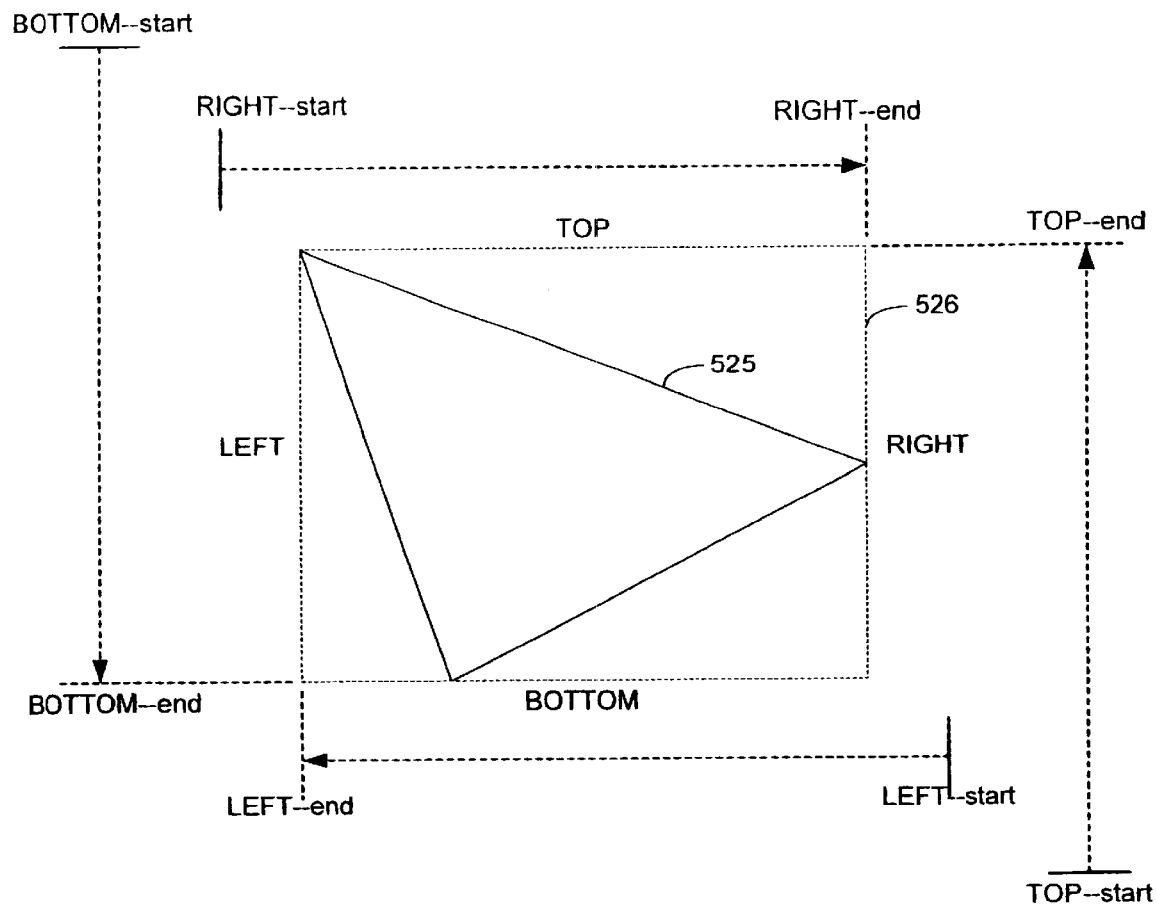
FIG. 16 illustrates the concept of determining bounding box boundaries.

Referring to FIG. 16, the graphics system of the present invention determines the bounding box with the vertex information for a given triangle, such as triangle 525, in accordance with one embodiment of the present invention. To determine the left side of the box, the system starts at a point far into the right side and moves a marker incrementally toward the left. When the marker has reached the leftmost located vertex of triangle 525, it stops. This marker position represents the left side of the bounding box. Similarly, for the right side, a marker starts at point far into the left side and moves incrementally to the right until it reaches the rightmost located vertex of the triangle 525. This marker position represents the right side of the bounding box. For the top side, the marker starts at a point far into the bottom of the triangle and incrementally moves up until it reaches the topmost vertex of triangle 525. It then stops. This marker position represents the top side of the bounding box. Finally, for the bottom side, the marker starts at a point located far into the top and incrementally moves down until it reaches the bottommost located vertex of triangle 525 where it stops. This marker position represents the bottom side of the bounding box. The bonding box 526 has thus been formed.

Figure 5:
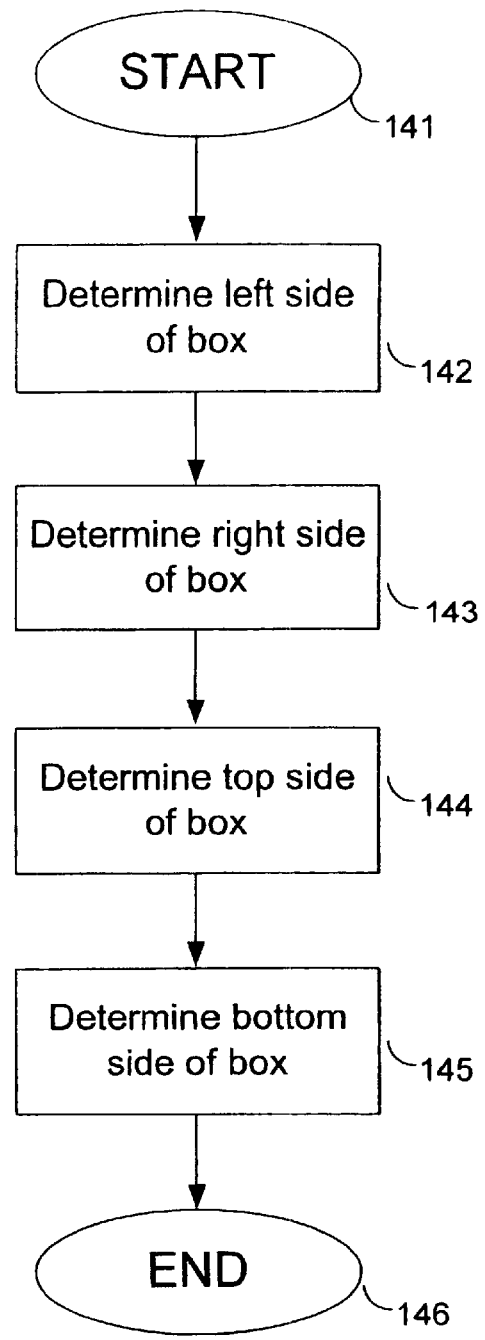
FIG. 5 shows a flow diagram of determining the bounding box for the triangle data.

Referring to FIG. 5, a flow chart shows how the system determines the bounding box for each triangle by implementing the above described technique in accordance with one embodiment of the present invention. The flow chart starts at step 141. At step 142, the system determines the left side of the bounding box. At step 143, the system determines the right side of the bounding box. At step 144, the system determines the top side of the bounding box. At step 145, the system determines the bottom side of the bounding box. The flow chart ends at step 146 and the system is ready for another triangle.

Z-Plane Equations

As known to those ordinarily skilled in the art, each triangle is represented by three sets of coordinates in three-dimensional space—$(x_0, y_0, z_0)$, $(x_1, y_1, z_1)$, and $(x_2, y_2, z_2)$. Based on the orientation of a given triangle in this 3D space, some points on the triangle surface may be at a different z depth than other points on the triangle surface. In other orientations, every point on the triangle surface is at the same z depth because the normal to the triangle surface is pointing in a horizontal position; that is, the triangle is flat against the screen. A general equation can be generated to describe the shape, size, and orientation of the triangle. Based on the equation, the z depth of selected points on the triangle surface can be easily calculated.

At step 160 of FIG. 3, the graphics system determines the plane equations for z and color. For z depth, the system accomplishes this task by using the coordinate information (x, y, z) to determine the z-plane equations. The z-plane equation, as known to those ordinarily skilled in the art, allows the system to determine the slope and the actual z depth of selected points on the triangle. For color, the system uses the color information (R, G, B) to determine the color plane equations. The color plane equation, as known to those ordinarily skilled in the art, allows the system to determine the slope and the actual color of selected points on the triangle.

The patent specification will now briefly discuss the derivation of the plane equations. As known to those ordinarily skilled in the art, z-plane equations are generally written in the form:

$$ax+by+c=z \qquad (1)$$

To solve for the plane equation for this particular system, the plane equation is initially written in the form:

$$d(x-x_0)+e(y-y_0)+f=z \qquad (2)$$

By recentering the origin to $(x_0, y_0)$, equation (2) can be written for the point $(x_0, y_0, z_0)$:

$$d(x_0-x_0)+e(y_0-y_0)+f=z_0 \qquad (3)$$

$$0+0+f=z_0$$

$$f=z_0$$

So, equation (2) can be rewritten as follows:

$$d(x-x_0)+e(y-y_0)+z_0=z \qquad (4)$$

or, $$d(x-x_0)+e(y-y_0)=z-z_0 \qquad (5)$$

Thus far, the equation is in general form after evaluation at the origin. Two other vertices for the triangle will also be available—$(x_1, y_1, z_1)$ and $(x_2, y_2, z_2)$. Two equations can be generated for these two sets of coordinates:

$$d(x_1-x_0)+e(y_1-y_0)=z_1-z_0 \qquad (6)$$

$$d(x_2-x_0)+e(y_2-y_0)=z_2-z_0 \qquad (7)$$

Using matrix form to solve these two equations (6) and (7):

$$\begin{bmatrix}(x_1-x_0) & (y_1-y_0)\\(x_2-x_0) & (y_2-y_0)\end{bmatrix}\begin{bmatrix}d\\e\end{bmatrix}=\begin{bmatrix}(z_1-z_0)\\(z_2-z_0)\end{bmatrix} \qquad (8)$$

Inverting equation (8) to solve for e first, the equation for e can be written as follows:

$$e=[(z_2-z_0)(x_1-x_0)-(z_1-z_0)(y_1-y_0)]/\text{determinant} \qquad (9)$$

where, determinant=$(x_1-x_0)(y_2-y_0)-(x_2-x_0)(y_1-y_0)$

Equation (9) can be used to solve for d in either equation (6) or equation (7). Returning to the general form of the plane equation, equation (1) is as follows:

$$ax+by+c=z \qquad (1)$$

In terms of the present invention, the a coefficient (or coefficient d above in equations (2)–(9)) is dz and the coefficient (or coefficient f above in equations (2)–(3)) is $z_0$. The b coefficient is simply $b_{coeff}$.

For the color plane equations, the same derivation steps can be used, as known to those ordinarily skilled in the art. In sum, the system determines the z-plane and color plane equations so that the system can use the slope information to obtain an accurate z-depth and color information at various points on the triangle. The system also uses the plane equations to generate span information so that the system can determine whether a particular pixel location for which the various scan-out operations are being performed is inside or outside the relevant triangle, as will be discussed further below. The plane equation can be implemented in hardware with a finite state machine which will be discussed in more detail below, or in software. The host processor can be programmed to generate the z plane equations as necessary.

Figure 54:
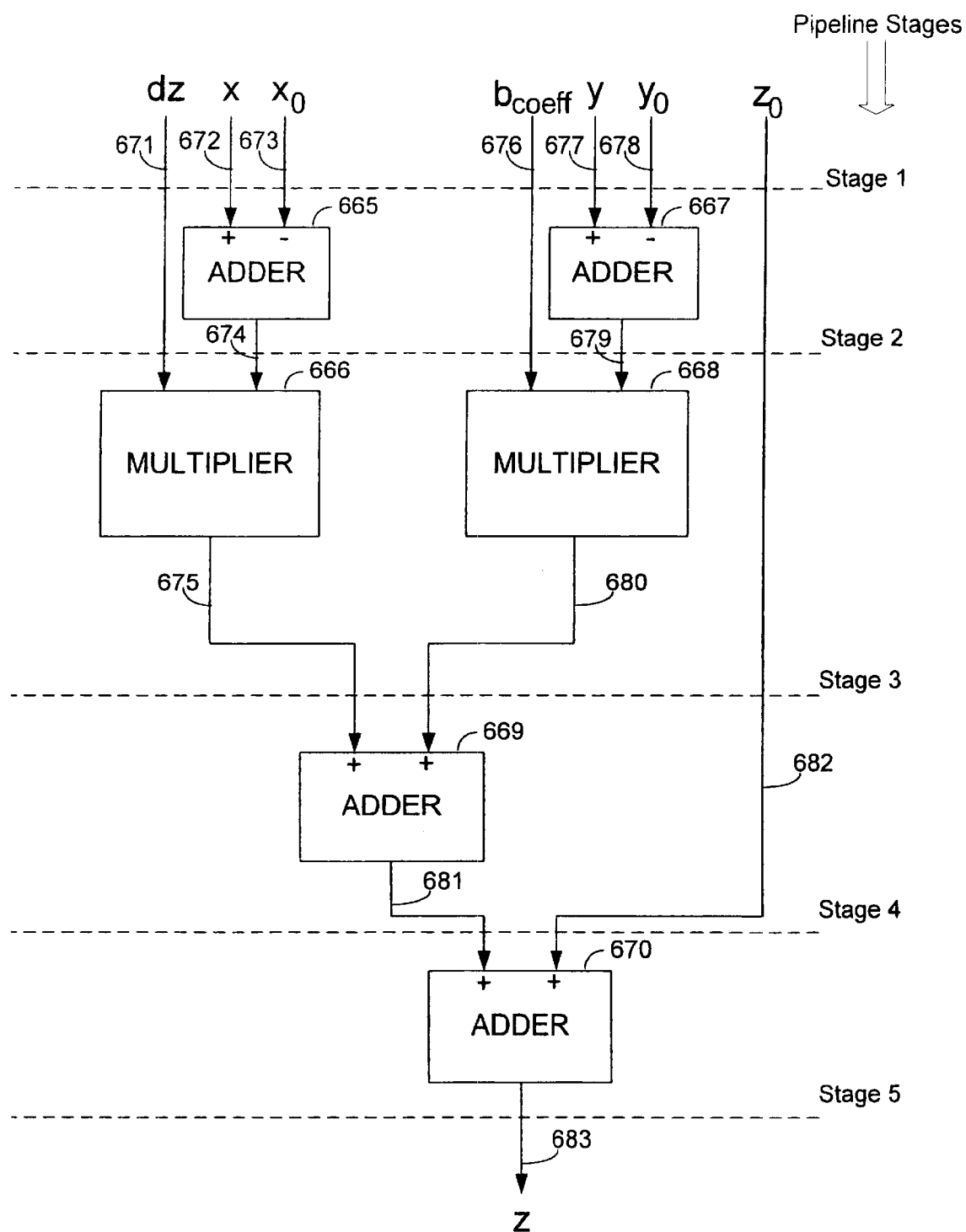
FIG. 54 shows the z-plane finite state machine that calculates the z values given the various coefficients x, $x_0$, y, $y_0$, $z_0$, dz, and $b_{coeff}$ in accordance with one embodiment of the present invention.

In hardware, the z-plane equations can be generated with a finite state machine. A plane equation finite state machine in accordance with one embodiment of the present invention is shown in FIG. 54. This finite state machine is also represented in block form in FIG. 20 as the z value unit 620. The finite state machine is implementing the following equation as derived above:

$$dz^*(x-x_0)+b_{coeff}{}^*(y-y_0)+z_0=z \qquad (10)$$

which was derived from the general form of the equation ax+by+c=z (equation (1)).

The finite state machine of FIG. 54 includes several adders 665, 667, 669, and 670, and some multipliers 666 and 668. The "dz" value is provided to multiplier 666 via line 671. The "x" and "$x_0$" values are provided to the adder 665 via lines 672 and 673, respectively. The output 674 of the adder 665 represents the "$(x-x_0)$" term. The "dz" and "$(x-x_0)$" terms are multiplied in multiplier 666 to provide the output "$dz^*(x-x_0)$" at line 675.

Similarly, the "$b_{coeff}$" value is provided to multiplier 668 via line 676. The "y" and "$y_0$" values are provided to adder 667 via lines 677 and 678, respectively. The output on line 679 represents the "$(y-y_0)$" term. The "$b_{coeff}$" and "$(y-y_0)$" terms are multiplied together in multiplier 668 to generate the "$b_{coeff}{}^*(y-y_0)$" term on line 680.

The "$dz^*(x-x_0)$" and "$b_{coeff}{}^*(y-y_0)$" terms are added together by adder 669 to generate an the output "$dz^*(x-x_0)+b_{coeff}{}^*(y-y_0)$" on line 681. This output on line 671 is added to the "$z_0$" value on line 682 to generate the "$dz^*(x-x_0)+b_{coeff}{}^*(y-y_0)+z_0$" term at output 683 which represents the "z" term.

In FIG. 54, the appropriate pipeline stages are shown with the dotted lines. Five stages are shown and wherever the dotted lines intersect the lines of the z-plane finite state machine, a register or buffer is placed thereon. So, line 671 has two registers, one for each stage. Similarly, line 682 has 4 registers, one for each of the four stages. Thus, a first set of dz, x, $x_0$, $b_{coeff}$, y, $y_0$, and $z_0$ values on lines 671, 672, 673, 676, 677, 678, and 682 would flow down the path together concurrently so that the final output on line 683 is the z value for this first set of dz, x, $x_0$, $b_{coeff}$, y, $y_0$, and $z_0$ values. In accordance with the pipelined scheme, as the z result for this first set of dz, x, $x_0$, $b_{coeff}$, y, $y_0$, and $z_0$ values is generated at stage 5 on line 683, a second set of dz, x, $x_0$, $b_{coeff}$, y, $y_0$, and $z_0$ values are being processed at stage 4, a third set of dz, x, $x_0$, $b_{coeff}$, y, $y_0$, and $z_0$ values are being processed at stage 3, a fourth set of dz, x, $x_0$, $b_{coeff}$, y, $y_0$, and $z_0$ values are being processed at stage 2, and a fifth set of dz, x, $x_0$, $b_{coeff}$, y, $y_0$, and $z_0$ values are waiting to enter the finite state machine at stage 1.

Triangle Buffer Writing Scheme—Detailed Discussion

As generally discussed above, the triangle buffer write operation essentially seeks a triangle buffer location for a newly received and formatted triangle within the confines of its coverage mask and then compares the new triangle with the triangle already stored therein (if a triangle is already stored therein). Depending on the result of the comparison, the system assigns the winning triangle to that designated location and seeks a new location for the losing triangle within the confines of the coverage mask. If a location cannot be found for the triangle within the confines of the coverage mask, the triangle is discarded. When a location has been found (or the triangle discarded), the system can process the next new triangle. A more detailed discussion of the portion of the triangle buffer write scheme associated with step 160 of FIG. 3 will now be discussed in the context of FIGS. 7, 8, 9, 12, 13, 14, 15, 17, 18, 19, and 20.

Triangle Data

Figure 15:
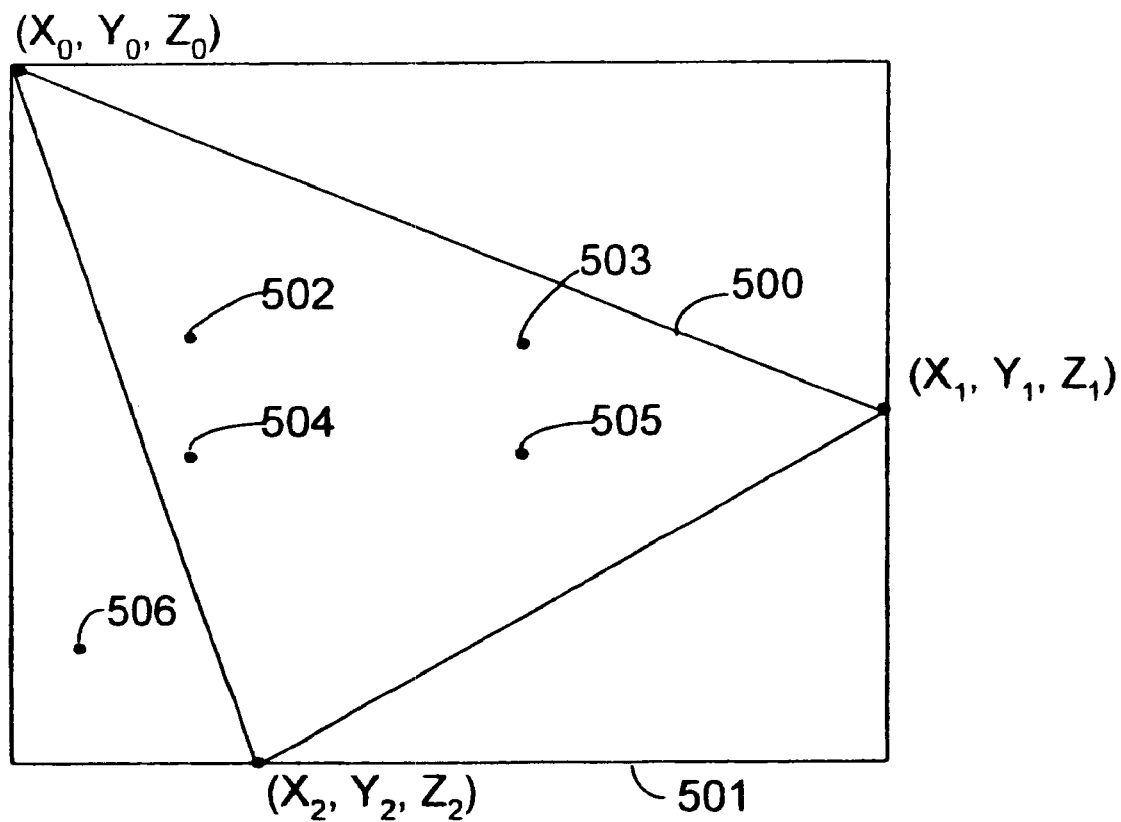
FIG. 15 shows a triangle with its vertices.

What data is stored in each cell? First, an examination of a triangle is in order. Referring to FIG. 15 briefly, a triangle 500 is associated with a bounding box 501, which is the smallest rectangle that can be "drawn" around the triangle. Triangle 500 has three sets of coordinates in perspective-corrected "three-dimensional" space—($x_0$, $y_0$, $z_0$), ($x_1$, $y_1$, $z_1$), and ($x_2$, $y_2$, $z_2$). Because a given triangle has a particular shape, size, orientation, and other properties that make it unique among all the other triangles, these attributes must be provided to the system.

Implicit from the z coordinate information, each triangle has depth information for various points on the surface of the triangle. Thus, points 502, 503, 504, and 505 on the surface of the triangle have particular z depths associated with them. If the triangle surface is perfectly vertical (i.e., the normal to the surface of the triangle is horizontally positioned), all points on the triangle surface are at the same z depth; otherwise, some points are farther away than other points. Also, a point on the outside of the triangle but inside the bounding box is associated with a non-visible region and hence a very high z value is associated with that point. For example, point 506 is associated with a non-visible region of the bounding box 501 whereas points 502 to 505 are associated with a visible region of the bounding box. Hence, the z values of points 502 to 505 are each lower than the z value of point 506. A discussion of visible v. non-visible regions will be provided later.

Figure 57:
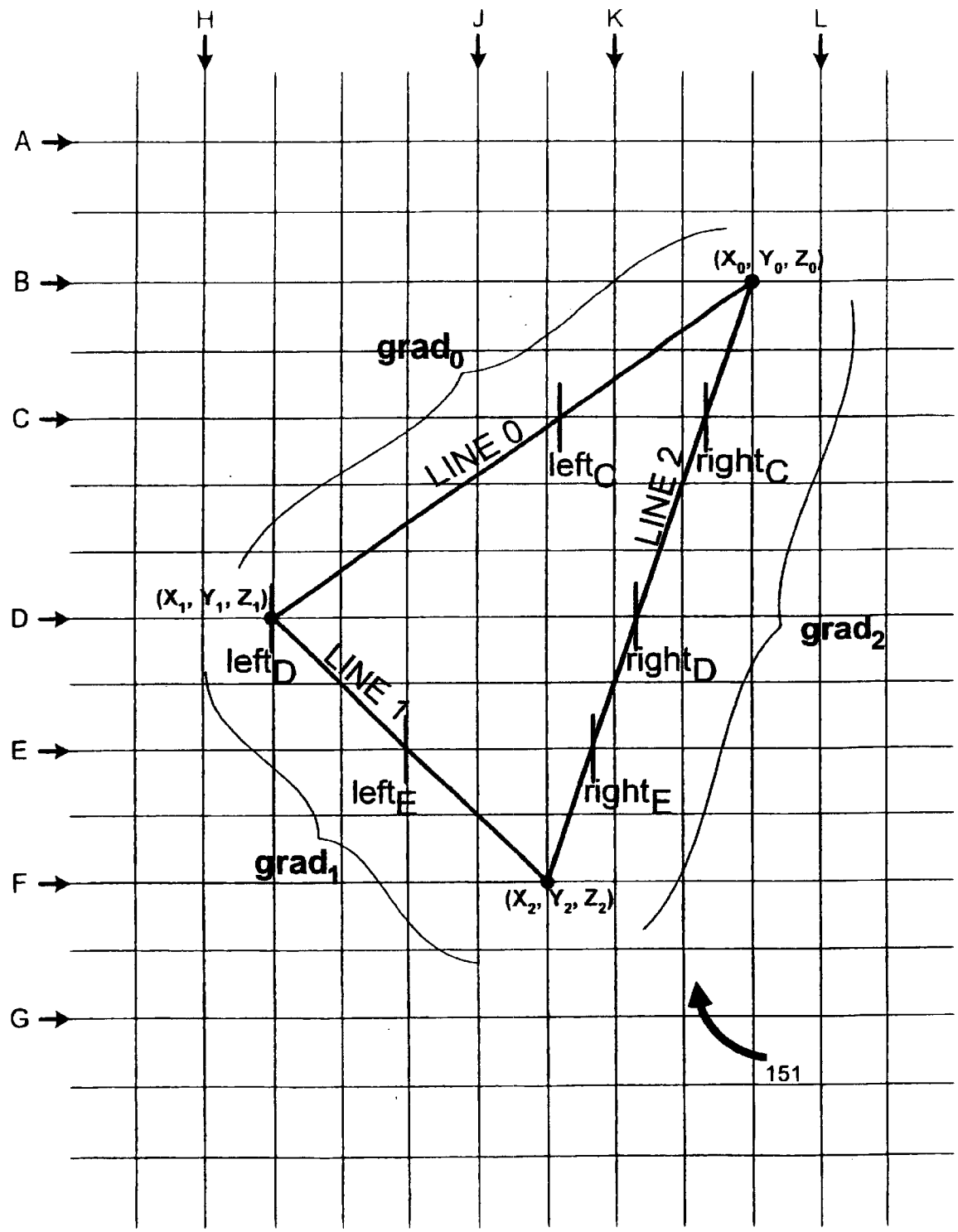
FIG. 57 shows in graphical form a triangle, its vertices, its slopes, and some left and right edges on a grid to illustrate the operation of the coefficient evaluator.

As discussed above with respect to FIG. 6, each cell stores the top, middle and bottom vertex information of a given triangle, the z-plane equation, and the slope equation. Referring to FIG. 57, a triangle 151 has three vertices: a top vertex at coordinate ($x_0$, $y_0$, $z_0$), a middle vertex at coordinate ($x_1$, $y_1$, $z_1$), and a bottom vertex at coordinate ($x_2$, $y_2$, $z_2$). Based on the plane equation discussion above, a z plane equation can be derived quite readily if the system has the following information: ($x_0$, $y_0$, $z_0$, ($x_1$, $y_1$, dz), and ($x_2$, $y_2$, $b_{coeff}$).

Each triangle also has color data associated with it represented by R, G, and B, as known to those ordinarily skilled in the art. Alternatively, each triangle can be represented by texture information instead of RGB color information.

Depending on its orientation, the triangle 151 also has some slope information. Line 0 is between coordinates ($x_0$, $y_0$, $z_0$) and ($x_1$, $y_1$, $z_1$). Line 1 is between coordinates ($x_1$, $y_1$, $z_1$) and ($x_2$, $y_2$, $z_2$). Line 2 is between coordinates ($x_0$, $y_0$, $z_0$) and ($x_2$, $y_2$, $z_2$). The slope information is dx/dy and although the actual slope values for lines 0 ($grad_0$), 1 ($grad_1$), and 2 ($grad_2$) can be calculated and stored, the system stores the equation instead. The benefit gained by storing the equation instead of actual values is that by computing it and storing the resulting equation once, the system does not waste computational resources by computing different slope information multiple times for the same triangle. To illustrate, assume that a particular triangle is large enough such that multiple coverage masks are required for full coverage of the bounding box. Since the bounding box of a given triangle must be covered in its entirety, one or more coverage masks may be required. If a triangle is large, multiple coverage masks will be used. For each coverage mask, the system will select target triangle buffer locations for storage of the triangle data. If a triangle is large enough, the use of multiple coverage masks requires that multiple triangle buffer locations will be targeted for the write operation. Thus, for the same triangle, triangle data must be stored at each of the targeted triangle buffer locations. If the system calculated the specific slope values of the triangle for each targeted location, several computational cycles will be needed prior to the actual write operation. If a general slope equation based on the vertices information was determined instead, the system would need to compute the slope equation only once even though multiple triangle buffer target locations have been designated for that single triangle.

As shown in FIG. 6, the re-ordering of the triangle vertices is performed to store the top, middle and bottom vertices information in order in each cell for a given triangle. Each cell stores the following information:

($x_0$, $y_0$, $z_0$)

($x_1$, $y_1$, dz)

($x_2$, $y_2$, $b_{coeff}$)

R, G, B (or alternatively, texture information)

slope equations (dx/dy)

As explained above, a z plane value can be derived quite readily if the system has ($x_0$, $y_0$, $z_0$), ($x_1$, $y_1$, dz), and ($x_2$, $y_2$, $b_{coeff}$) information (essentially the $z_0$, $b_{coeff}$, and the z-plane equations). In one embodiment, 256 bits are required for each triangle. Thus, when the system writes triangle data to a triangle buffer storage location, it is writing 256 bits of information.

Coverage Mask

Figure 7:
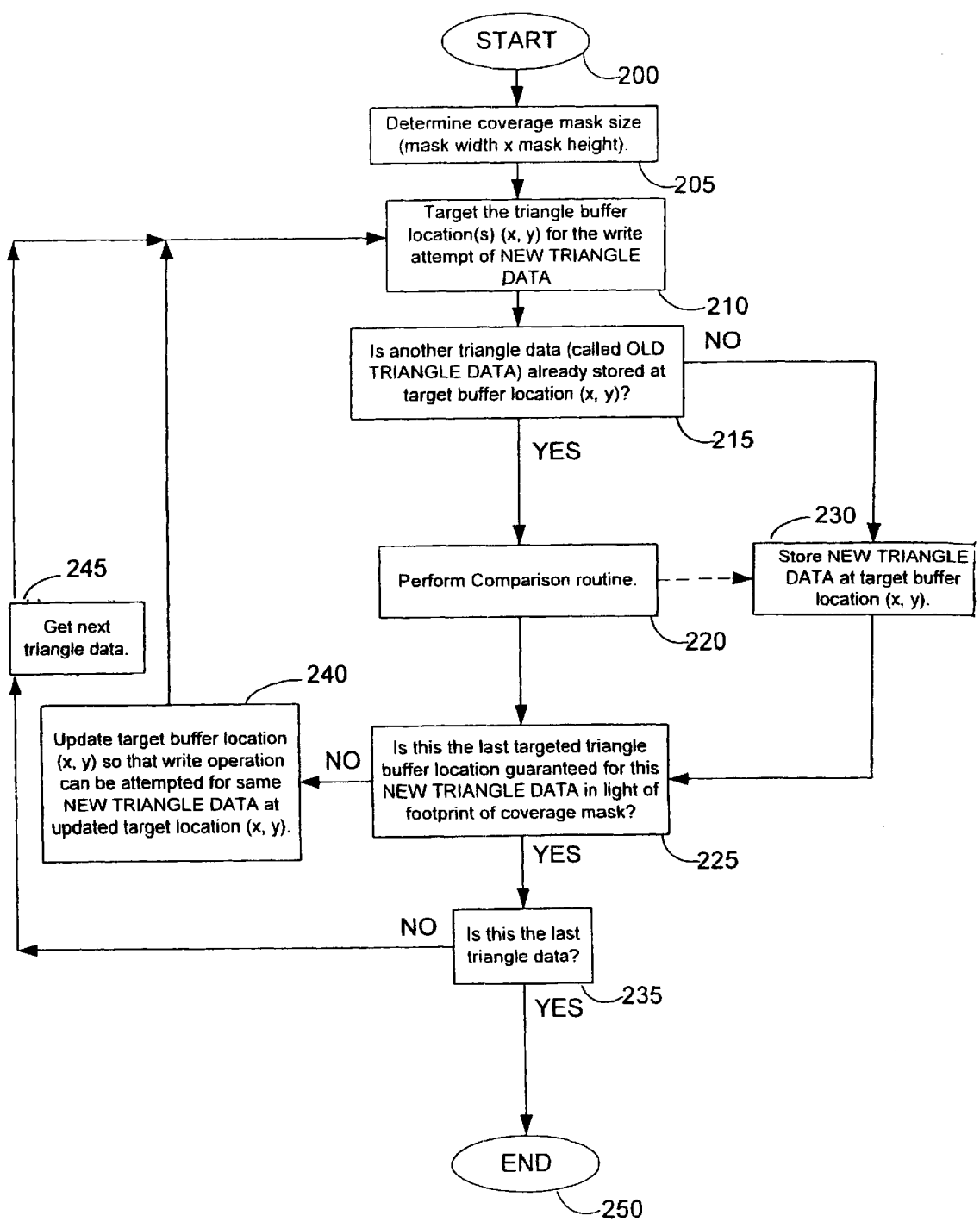
FIG. 7 shows a flow diagram of the write subroutine portion of the main triangle buffer write process in accordance with one embodiment of the present invention

A flow chart of the general triangle buffer write scheme is shown in FIG. 7. The flow chart begins at step 200. At step 205, the system determines the coverage mask size by selecting a particular mask width and mask height. In one embodiment, the mask size is 16×16; that is, the coverage mask is 16 triangle buffer locations wide and 16 triangle buffer locations tall. In other embodiments, the coverage mask size is 8×8. In one embodiment of the present invention, this selection of the coverage mask dimensions is constant for a given graphics session. Thus, regardless of the sizes and shapes of the triangles that are delivered by the front end processor, the coverage mask size remains constant.

The selection of the coverage mask size is not arbitrary. If the coverage mask had smaller dimensions, the system may operate faster with some loss in accuracy as the system tries to find a storage location within the confines of a smaller coverage mask and more triangles that should be in competition are potentially eliminated from competition at the outset due to the lack of triangle buffer location within the coverage mask. The smaller coverage mask also further simplifies (although not by much) some of the scan-out logic hardware. If the coverage mask had larger dimensions, the system may operate less fast with increased accuracy (albeit with diminishing returns) as the system tries to find a storage location within the confines of a larger coverage mask and less triangles are eliminated from competition at the outset. With the larger coverage mask, the system needs more scan-out hardware (although not much more). Because of the particular architectural design resulting in a simpler hardware implementation, the advantages gained from the many embodiments of the present invention are not diminished because of an arbitrary selection of the coverage mask. Furthermore, the hardware implications of arbitrary selections of the coverage mask dimensions are de minimis. Nevertheless, for optimal performance, the coverage mask dimensions should be selected with some care. Essentially, the trade-off in the different sizes of the coverage mask is the amount of processing units needed to process the triangles; that is, a graphics system that uses larger coverage masks requires more hardware processing units than a graphics system that uses smaller coverage masks.

To compare the size of the coverage mask to the size of the triangles, and hence the bounding box of each triangle, refer to FIGS. 12(A) to 12(C). In FIG. 12(A), the coverage mask 462 is selected for a given system implementation such that it is exactly the same size as the bounding box 461 of triangle 460. Here, only one coverage mask is needed to cover all of the bounding box of this particular triangle. In FIG. 12(B), the coverage mask 463 is selected for another implementation of the graphics system such that it is smaller than the bounding box 461 of triangle 460. Here, more than one coverage masks is needed to cover all of the bounding box of this triangle. Finally, in FIG. 12(C), coverage mask 464 is larger than the bounding box 461 of triangle 460. Here, like the coverage mask of FIG. 12(A), only one coverage mask is needed to cover all of the bounding box 461 of triangle 460. As stated above, one embodiment of the present invention uses the same size coverage mask throughout the entire graphics rendering session. Thus, the coverage mask is not made smaller in the middle of the session just to fit it to a bounding box.

Write Attempt at Target Triangle Buffer Location

At step 210 of FIG. 7, the system targets the triangle buffer location for the write attempt of the newly received triangle (called hereafter as NEW TRIANGLE DATA), or if the bounding box for the triangle is larger than the coverage mask, the system targets multiple locations for the write attempt. What is this location(s)? Remember, the NEW TRIANGLE DATA is associated with some area or region on the scene as determined from its vertices. Referring briefly to FIG. 10, triangle 401 is supposed to map to the region near the upper left corner of the screen. Triangle 403 is supposed to be mapped to the region near the center of the screen. Triangles 407, 408, and 409 are all located within the same small vicinity within dotted line 406 of the screen. The system attempts to make the mapping of triangle buffer location consistent with the scene or screen location. In this regard, the system uses the coverage mask and the bounding box.

Figure 13A:
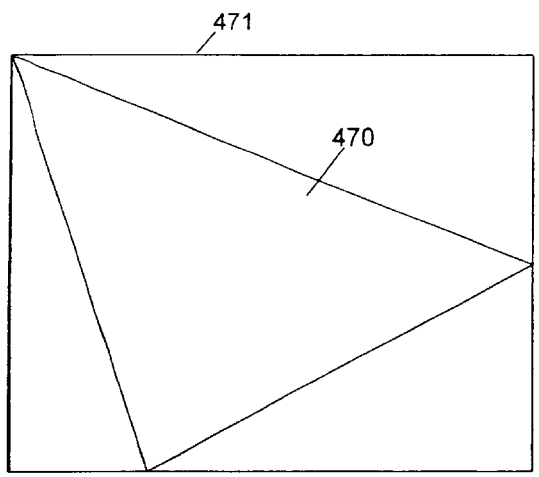
FIGS. 13(A)–13(C) illustrate the concept of corresponding triangle buffer locations to triangles, its bounding box, and the coverage mask.
Figure 13B:
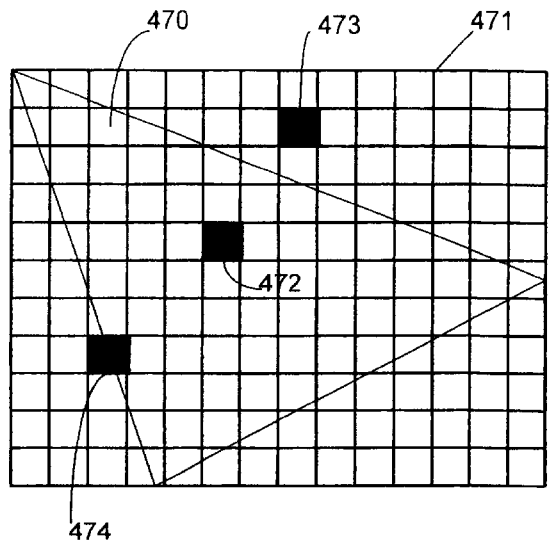
Figure 13C:
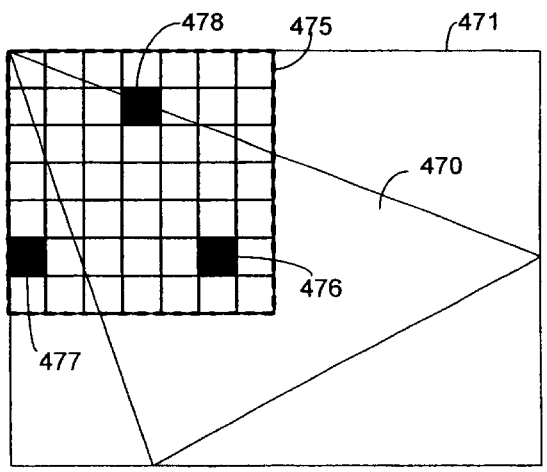

Refer to FIGS. 13(A) to 13(C) which shows the mapping of the bounding box to triangle buffer locations, and FIGS. 14(A) to 14(C) which shows the mapping of coverage mask to the bounding box. Referring to FIG. 13(A), let's say the NEW TRIANGLE DATA is 470 and its bounding box is 471. Mapping triangle 470 and its bounding box to the relevant portion of the triangle buffer, the triangle 470 and its bounding box overlap several triangle buffer locations or cells as shown in FIG. 13(B). Three representative triangle buffer locations are 472, 473, and 474. Cell 472 is located inside the triangle 470 while cell 473 is located outside the triangle 470 (but inside the bounding box 471). Also, cell 474 is located partially inside and partially outside the triangle 470.

If the coverage mask itself is placed on top of the bounding box against the upper left corner of the bounding box, the result is as illustrated in FIG. 13(C). The coverage mask has dimensions 7×7 so that 49 triangle buffer locations are associated with it. Here, the coverage mask is smaller than the bounding box 471. Some representative triangle buffer cells associated with this coverage mask 475 include cells 476, 477, and 478. Cell 476 is located inside the triangle 470, cell 477 is located outside the triangle 470 (but still inside the bounding box 471), and cell 478 is partially inside and partially outside the triangle 470.

As shown in FIG. 14(A), the system attempts to initially write the data associated with this NEW TRIANGLE DATA to the triangle buffer location at the upper left corner of the coverage mask. Thus, the system looks to triangle buffer location 483 for storage of this NEW TRIANGLE DATA 480. This triangle buffer location 483 corresponds to the upper left corner of the coverage mask 482.

Observe that this coverage mask 482 is too small to adequately cover the entire bounding box 481. So, in accordance with one embodiment of the present invention, multiple coverage masks will be used to fully cover the bounding box 481 as shown in FIG. 14(B). To fully cover the bounding box 481 with equally sized coverage masks, four coverage masks 482, 484, 486, and 488 are needed. In accordance with the triangle buffer write scheme, the system will initially attempt to write triangle data into the triangle buffer location corresponding to the upper left corner of each coverage mask, designated as locations 483, 485, 487, and 489.

These locations 483, 485, 487, and 489 merely represent the initial write destinations for the triangle data associated with triangle 480. In accordance with one embodiment of the present invention, several issues determine whether a successful write operation will take place for each of these locations: (1) the location is empty and so the system writes the relevant data for this triangle to this location; (2) the location is filled by another old triangle data but this old triangle data is located farther away (higher z) than the new triangle data; (3) the location is filled by another old triangle data but this old triangle data is located closer (lower z) than the new triangle data; and (4) the location is filled by another old triangle data but this old triangle data is located at the same depth (same z) as the new triangle data. The resolution of these issues determines whether the actual write operation will take place as discussed further below. In order to resolve these issues, a separate z buffer that is distinct from the triangle buffer is used to temporarily store z values of the various triangles that are stored in the triangle buffer.

Figure 17B:
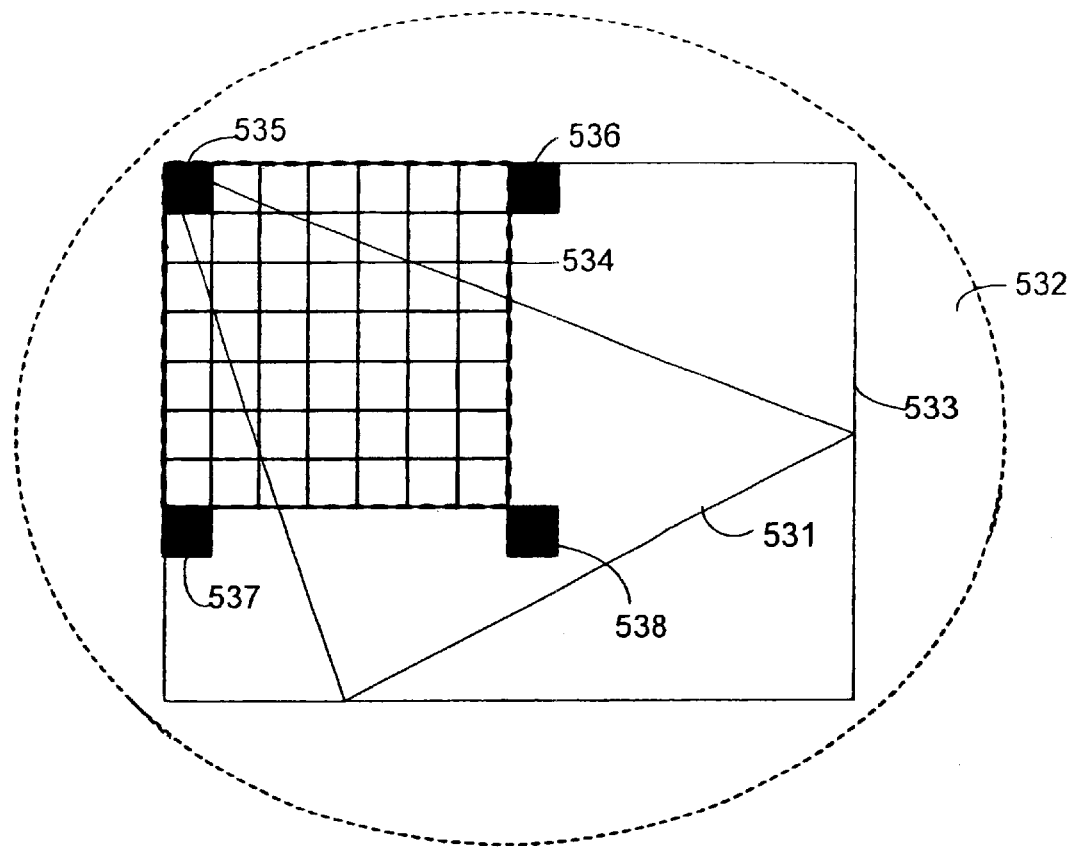
FIG. 17 illustrates the concept of writing triangle data to specific triangle buffer locations in accordance with one embodiment of the present invention.
Figure 17A:
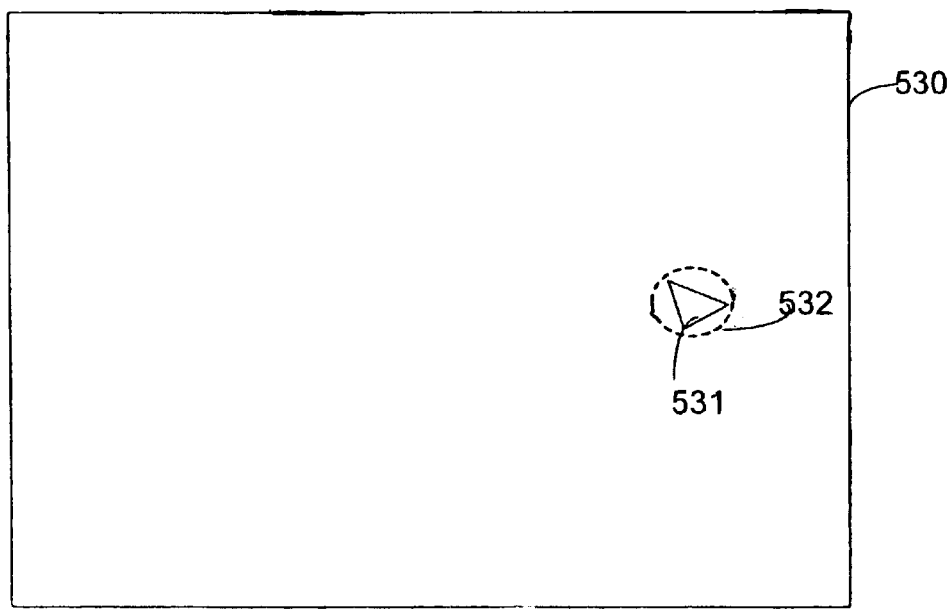

To reiterate, the system will initially attempt to write the NEW TRIANGLE DATA at the triangle buffer location(s) associated with the upper left corner of the coverage mask. If the coverage mask is smaller than the bounding box for the triangle, then multiple coverage masks will be used to cover the bounding box. The upper left corners of these coverage masks will also be the initial target locations for writing this NEW TRIANGLE DATA to these triangle buffer locations. Referring to FIG. 17, NEW TRIANGLE DATA 531 is located in the vicinity of region 532 based on its vertices information. In the enlarged view of region 532, triangle 531 and its bounding box 533 can be covered by four coverage masks 534. The system will initially target triangle buffer locations 535, 536, 537, and 538, which also correspond to the upper left corners of the coverage masks "placed over" the bounding box 533. Whether or not the write attempt is successful at these initially targeted locations is based on the resolution of the four issues previously mentioned above: (1) the initially targeted location is empty and so the system writes the relevant data for this initially targeted triangle to this location; (2) the initially targeted location is filled by another old triangle data but this old triangle data is located farther away (higher z) than the new triangle data; (3) the initially targeted location is filled by another old triangle data but this old triangle data is located closer (lower z) than the new triangle data; and (4) the initially targeted location is filled by another old triangle data but this old triangle data is located at the same depth (same z) as the new triangle data. Note that the initially targeted location may not be the ultimate location for the triangle data. If any write is successful at any location based on the resolution of these issues, the system will perform two writes: (1) the corresponding triangle data will be stored in the triangle buffer; and (2) the actual z value for visible regions or the artificial $z_{max}$ for non-visible regions at the corresponding location in the z buffer. These issues will be discussed further below.

Returning to step 210 of FIG. 7, the system targets the triangle buffer location for the write attempt of the NEW TRIANGLE DATA, or if the bounding box for the triangle is larger than the coverage mask, the system targets multiple locations for the write attempt. This step has been described above. From this point forward, the triangle buffer write scheme attempts to resolve the above four issues and tries to find new buffer locations for "failed" NEW TRIANGLE DATA and "displaced" old triangle data.

At step 215, the system reads the contents of the initially targeted location in the triangle buffer to determine if any other triangle data (called hereafter OLD TRIANGLE DATA) is already stored at this initially targeted location. If the initially targeted location is empty, the NEW TRIANGLE DATA is written to this location at step 230 immediately without any comparison step.

If another triangle or OLD TRIANGLE DATA is already stored there, the system compares the z values of the NEW TRIANGLE DATA and the OLD TRIANGLE DATA at step 220 to determine has the lower, and hence closer, z value. A z buffer is used for these z value comparisons. If a comparison is performed according to step 220, the winning triangle is assigned to this location and the losing triangle must find another location. If the NEW TRIANGLE DATA wins the comparison, the system stores the NEW TRIANGLE DATA at this triangle buffer location at step 230 and the system seeks a new storage location for the losing "displaced" OLD TRIANGLE DATA. If the OLD TRIANGLE DATA had won the comparison, the system keeps OLD TRIANGLE DATA at that location and seeks a new location for the "failed" NEW TRIANGLE DATA. When seeking a new location for the "failed" NEW TRIANGLE DATA or the "displaced" OLD TRIANGLE DATA, the system limits the search to the confines of a coverage mask and if no location can be found, the data is discarded altogether. Just as triangle data are stored in the triangle buffer for the NEW TRIANGLE DATA (and the OLD TRIANGLE DATA), the system also stores z values corresponding to the NEW TRIANGLE DATA in the z buffer. These steps will be explained in greater detail below with respect to FIGS. 8, 9, 18, 19, and 20.

After the above comparison, write, and new location seek steps have been performed, the system checks if all of the initially targeted locations have been processed for the write attempt at step 225. In other words, if the bounding box was larger than the coverage mask, the system uses multiple coverage masks to "cover" the bounding box. For each coverage mask, the system initially selects the upper left corner of each coverage mask as the targeted locations. If only one coverage mask is needed to "cover" the bounding box, then only one triangle buffer location is targeted.

With respect to step 225, in one embodiment, the system actually issues a new triangle for each target location. Thus, if two coverage masks are needed to cover a bounding box for a triangle, two triangles are issued—one triangle targeted for the upper left corner of the first coverage mask and another triangle targeted for the upper left corner of the second coverage mask. The system evaluates z values for each issued triangle. In essence, if the front end processor delivers a small triangle that requires only a single coverage mask for full coverage, the system will issue only one triangle for storage in a triangle buffer location, whereas if the front end processor delivers a large triangle that requires multiple coverage masks for full coverage, the system will issue multiple triangles for storage in multiple triangle buffer locations.

If the recently processed targeted location is not the last targeted location for this NEW TRIANGLE DATA (i.e., one or more additional coverage masks covering the same bounding box has a targeted buffer location for this NEW TRIANGLE DATA), then the system updates the buffer location (x, y) to this new targeted location so that a write operation can be attempted for this same NEW TRIANGLE DATA at step 240. The system then proceeds to step 210 where the new location is targeted for the write operation.

If the just processed targeted location is the last targeted location for this NEW TRIANGLE DATA during the check at step 225, the system checks if this NEW TRIANGLE DATA is the last triangle data for this session at step 235. If this NEW TRIANGLE DATA is not the last triangle for this session, the system gets the next triangle data at step 245 for processing. The system then proceeds to step 210 for the target location determination. If, however, this NEW TRIANGLE DATA is the last triangle for this session as checked at step 235, the program ends either immediately or after scan-out of the data in the triangle buffer at step 250. This is essentially the write operation in accordance with one embodiment of the present invention.

In sum, the system in accordance with one embodiment of the present invention initially targets the triangle buffer location(s) as dictated by the "coverage" of the bounding box by the coverage mask for the NEW TRIANGLE DATA. The system checks if the targeted location is empty or filled by another triangle data (OLD TRIANGLE DATA). If the location is empty, the system writes the NEW TRIANGLE DATA to the targeted location. If the location is filled by OLD TRIANGLE DATA, the system compares the z values of NEW TRIANGLE DATA and OLD TRIANGLE DATA. The winning triangle is assigned to that targeted location and the losing triangle must find another location. The system then performs the same task for another targeted triangle buffer location for the same NEW TRIANGLE DATA (if other locations are targeted based on the number of coverage masks are needed for coverage of the bounding box).

Comparison Routine

Figure 8:
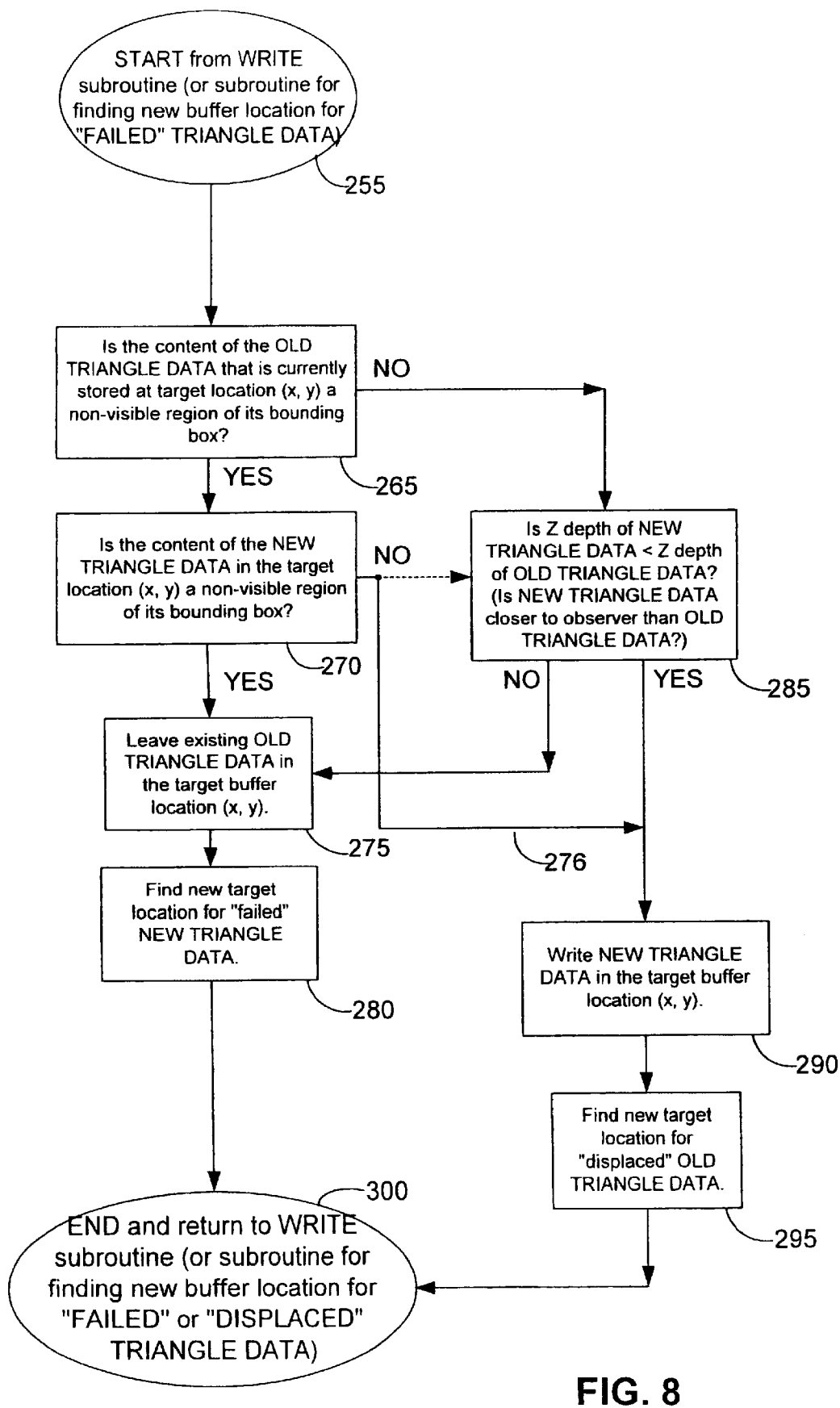
FIG. 8 shows a flow diagram of the comparison subroutine portion of the main triangle buffer write process in accordance with one embodiment of the present invention.
Figure 9:
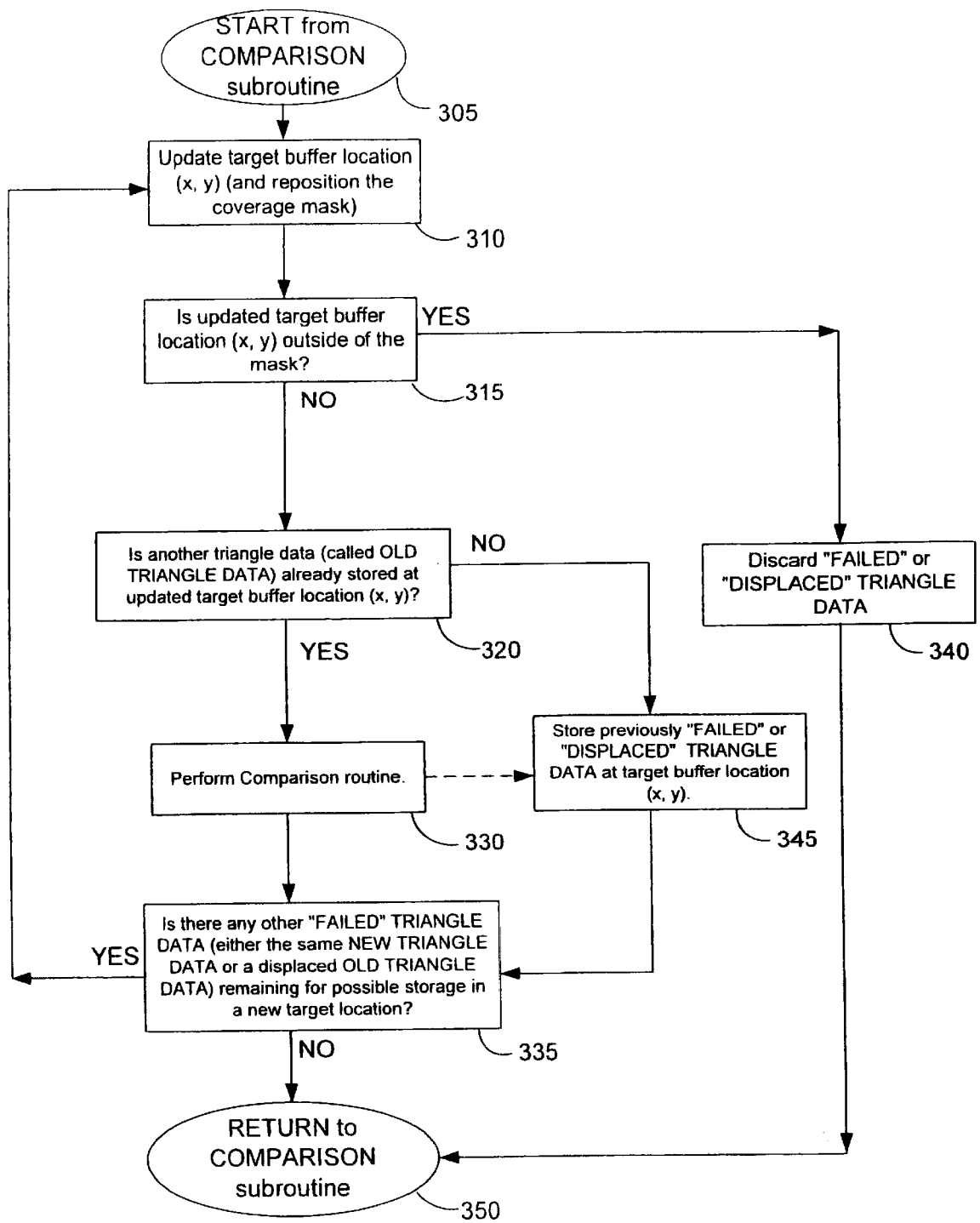
FIG. 9 shows a flow diagram of finding a new buffer location for the "failed" or "displaced" triangle data in accordance with one embodiment of the present invention.

In FIG. 7, the system performs the comparison and new location seek (for losing triangles) at step 220. A more detailed discussion will now be provided. Refer to FIG. 8 for the comparison routine. The flow chart of FIG. 8 starts at step 255 which corresponds to the beginning of step 220 of FIG. 7. At the outset, observe that the system has already determined that an OLD TRIANGLE DATA is already stored at the targeted location and as a result, the comparison operation has been invoked.

At step 265, the system can proceed in one of two paths based on the z value content of OLD TRIANGLE DATA. If the z value of OLD TRIANGLE DATA is not $z_{max}$, step 265 resolves to "NO" and hence a comparison is immediately performed at step 285. If the z value of OLD TRIANGLE DATA is $z_{max}$, step 265 resolves to "YES" and the system must examine the z value content of NEW TRIANGLE DATA at step 270.

To understand the operation of the remaining steps, including an explanation of actual z value v. $z_{max}$, a discussion of visible v. non-visible region will now be provided. When a NEW TRIANGLE DATA is received, the system examines the content of the coverage mask for this NEW TRIANGLE DATA. Specifically, is the content of the targeted buffer location (i.e., initially the upper left corner of the coverage mask) a visible or non-visible region of the bounding box? In other words, does the targeted location of the coverage mask include any portion of the triangle (i.e., the visible region) at all? If so, the system uses the actual z value of the triangle at the targeted location; that is, the z depth of the surface of the triangle which corresponds to that targeted location. Because a triangle can be at any orientation in three-dimensional space, a point on the triangle can be at any z depth. The system calculates the actual z depth of the triangle surface that corresponds to the targeted triangle buffer location based on the z plane equation for that triangle. If the targeted location of the coverage mask includes only the non-visible region of the bounding box, the system uses an artificial z value called $z_{max}$, to be discussed in more detail below.

The visible and non-visible region concepts will now be discussed. A further observation of the bounding box v. coverage mask interaction will illustrate how the z buffer will be used in determining which z value will be stored at the designated z buffer locations. In FIG. 14(C), the same coverage masks 482, 484, 486, and 488 are shown overlapped with the same triangle 480 and bounding box 481. In all four coverage masks, a visible portion of the triangle 480 is found within therein. In other words, coverage mask 482 includes a cross-hatched portion 490 of the triangle, coverage mask 484 includes a cross-hatched portion 491 of the triangle, coverage mask 486 includes a cross-hatched portion 492 of the triangle, and coverage mask 488 includes a cross-hatched portion 493 of the triangle. These cross-hatched portions represent the visible regions of the bounding box. However, these visible regions may or may not be found within the targeted triangle buffer locations, which are initially the upper left corner of each coverage mask, even though they are within the confines of the coverage mask.

The presence or absence of a visible portion of the triangle within the targeted location of the coverage mask affects what z values are stored in the z buffer. In FIG. 14(B), the targeted triangle buffer locations for triangle 480 are 483, 485, 487, and 489. Thus, targeted locations 483 and 489 include visible regions and targeted locations 485 and 487 include non-visible regions. Thus, for location 483, the actual z value associated with this triangle 480 at location 483 will be stored at a z buffer (a buffer separate from the triangle buffer) location that corresponds to its triangle buffer location. For location 489, the actual z value associated with this triangle 480 at location 489 will be stored at another z buffer location that corresponds to its triangle buffer location.

On the other hand, for location 485, the z value stored at the designated z buffer location is some artificially created z value called $z_{max}$. This value $z_{max}$ is set artificially high because the targeted location of this coverage mask is said to include a non-visible region of the triangle. Hence, the artificially high $z_{max}$ value should ensure that it would lose any z depth comparisons with other triangles if the other triangles are associated with some visible region (and hence, a lower z value) at that buffer location. Finally, for location 487, the artificial z value $z_{max}$ will be stored at another z buffer location that corresponds to its triangle buffer location.

Returning to step 265 of FIG. 8, the system can proceed in one of two paths based on the z value content of OLD TRIANGLE DATA. Assuming the value of the OLD TRIANGLE DATA is $z_{max}$, the system proceeds to step 270. The system determines at step 270 whether the content of the NEW TRIANGLE DATA that the system wants to write to at the targeted location is a non-visible region of the bounding box; that is, is the content of NEW TRIANGLE DATA at the targeted location (initially dictated by the upper left corner of the coverage mask) equal to $z_{max}$? If so, the system leaves the OLD TRIANGLE DATA at that targeted location as required by step 275. This eliminates memory write cycles that may ultimately be unnecessary because the z value for both data are at $z_{max}$ and its associated triangle may eventually lose some later comparison with a triangle that is associated with a visible region of the bounding box. The system determines that it is better to leave the existing data intact rather than perform a memory access cycle for this equivalent z data.

Alternatively, at step 270, if the z value for NEW TRIANGLE DATA is associated with a visible region, the system writes the NEW TRIANGLE DATA to the targeted triangle buffer location at step 290 (via flow chart path 276) and its z value to the z buffer at the corresponding location. Performing the comparison at step 285 is unnecessary because the NEW TRIANGLE DATA is at some z value and the OLD TRIANGLE DATA is at $z_{max}$ as previously determined at step 265.

Back at step 265, assuming that the z value of the OLD TRIANGLE DATA is not $z_{max}$, the system performs a comparison operation at step 285. Here, the system decides whether the z value of NEW TRIANGLE DATA is less than the z value of OLD TRIANGLE DATA. In other words, is the NEW TRIANGLE DATA closer to the user than, and hence less likely to be obscured by, the OLD TRIANGLE DATA? If the z value of the NEW TRIANGLE DATA is less than the z value of the OLD TRIANGLE DATA, then the system writes the NEW TRIANGLE DATA to the targeted triangle buffer location (initially the upper left corner of the coverage mask) at step 290 and its z value to the z buffer at the corresponding location. If the NEW TRIANGLE DATA is equal to or greater than the OLD TRIANGLE DATA, then the system leaves the OLD TRIANGLE DATA at that location as required by step 275. Again, if the z value for the NEW TRIANGLE DATA and the OLD TRIANGLE DATA are the same, the system does not waste memory access cycles (and a new seek location for the "displaced" OLD TRIANGLE DATA) to displace the OLD TRIANGLE DATA.

At this point, the system has either written NEW TRIANGLE DATA to the targeted location (and has written its z value to the corresponding location in the z buffer) because it had a lower z value than OLD TRIANGLE DATA, or kept the OLD TRIANGLE DATA in the targeted location (and left its z value intact in the z buffer) because its z value was equal to or less than the z value of the NEW TRIANGLE DATA. If the system had written the NEW TRIANGLE DATA to the targeted location, the OLD TRIANGLE DATA that was stored there is "displaced" and the system must find a new location for it as required by step 295. If the OLD TRIANGLE DATA had won the comparison, the NEW TRIANGLE DATA had "failed" in its write attempt at that targeted location and the system must find a new location for it as required by step 280. In the latter case, the target location must now be changed and will no longer be the upper left corner location of the coverage mask. The new location seek routine for the "displaced" OLD TRIANGLE DATA and the "failed" NEW TRIANGLE DATA will be discussed below with respect to FIGS. 9, 18, and 19. The comparison routine ends at step 300.

To illustrate these steps with an example, refer now to FIG. 14(B). The system receives the newly received triangle 480 (or NEW TRIANGLE DATA) and determines that its bounding box 481 is too large. So multiple, specifically four, coverage masks are needed for full coverage. These coverage masks 482, 484, 486, and 488 are "placed on top" of the bounding box 481. The system targets four triangle buffer locations 483, 485, 487, and 489 for storage of the triangle data associated with NEW TRIANGLE DATA 480. Initially, these initial target locations are the upper left corner of each coverage mask. Tackling one target location at a time, the system first examines the content of NEW TRIANGLE DATA at the first desired target location 483.

Thereafter, locations 485, 487, and 489 will be addressed. The system had previously determined that another triangle (or OLD TRIANGLE DATA) is already stored at triangle buffer location 483 so that a comparison may be necessary.

The system examines the z value content of OLD TRIANGLE DATA at location 483 by accessing the corresponding location in the z buffer. Is the z value of OLD TRIANGLE DATA equal to $z_{max}$ (or associated with a non-visible region) at location 483? Two cases will be examined—case 1 where the z value of the OLD TRIANGLE DATA=$z_{max}$, and case 2 where the z value of the OLD TRIANGLE DATA=actual z value.

Case 1: Z Value of OLD TRIANGLE DATA=$Z_{max}$

In an earlier cycle, the system had written OLD TRIANGLE DATA to triangle buffer location 483 and the z value to the z buffer. However, at that location 483, no visible region of the OLD TRIANGLE DATA was found therein so the system stored $z_{max}$ at the corresponding location in the z buffer. Accordingly, step 265 resolves to "YES."

Tackling one target location at a time, the system first examines the content of NEW TRIANGLE DATA at the first desired target location 483 in accordance with step 270 of FIG. 8. As shown in FIG. 14(B), target location 483 is associated with a visible region of NEW TRIANGLE DATA 480 and so, the actual z value at the surface of NEW TRIANGLE DATA 480 at location 483 will be used for the comparison.

Because the z value for OLD TRIANGLE DATA is $z_{max}$ and the z value of NEW TRIANGLE DATA is an actual z value at location 483, step 270 resolves to "NO" and the system is prepared to write the NEW TRIANGLE DATA to location 483 in the triangle buffer as required by step 290. The z value of NEW TRIANGLE DATA will also be stored in the z buffer at the location corresponding to triangle buffer location 483. An explicit comparison step of step 285 is not needed because the system already knows that the z value for OLD TRIANGLE DATA is $z_{max}$ and the z value for the NEW TRIANGLE DATA is the actual z value at that location 483, and hence, the z value for the NEW TRIANGLE DATA is less than the z value for the OLD TRIANGLE DATA.

The OLD TRIANGLE DATA that was previously stored at location 483 is not discarded yet; it is merely displaced until the system finds a new location for it. After the system reads and temporarily holds OLD TRIANGLE DATA, the system proceeds to find a new location for the displaced OLD TRIANGLE DATA at step 295. After the system performs a new location seek operation at step 295, the system then proceeds to step 300 where the comparison operation ends and the system returns to the main write routine of FIG. 7. In this example, three other triangle buffer locations have been identified for this NEW TRIANGLE DATA. These three locations (i.e., 485, 487, and 489) will be handled by the write routine of FIG. 7 and if a comparison is necessary, the system will perform the comparison routine according to FIG. 8, and finally the new location seek operation will be performed according to FIG. 9.

For location 485 for the same NEW TRIANGLE DATA, assume that the system performed the write routine according to FIG. 7 and because of the existence of OLD TRIANGLE DATA in triangle buffer location 485, a comparison would be necessary. However, at that location 485, the stored z value for the OLD TRIANGLE DATA is $z_{max}$ and thus, step 265 resolves to "YES."

The system first examines the content of the same NEW TRIANGLE DATA at the desired target location 485 in accordance with step 270 of FIG. 8. As shown in FIG. 14(B), target location 485 is associated with a non-visible region of NEW TRIANGLE DATA 480 and so, the $z_{max}$ value will be used for the comparison.

Because the z value for OLD TRIANGLE DATA is $z_{max}$ and the z value of NEW TRIANGLE DATA is also $z_{max}$ at location 485, step 270 resolves to "YES" and the system leaves the existing OLD TRIANGLE DATA at location 485. The NEW TRIANGLE DATA that was initially targeted for location 485 is not discarded yet; it has merely "failed" in its attempt to write to location 485. The system must now find a new location for the "failed" NEW TRIANGLE DATA with the new location seek routine of FIG. 9. After the system performs a new location seek operation at step 280, the system then proceeds to step 300 where the comparison operation ends and the system returns to the main write routine of FIG. 7. In this example, two more triangle buffer locations have been identified for this NEW TRIANGLE DATA. These two remaining locations (i.e., 487, and 489) will be handled by the write routine of FIG. 7 and if a comparison is necessary, the system will perform the comparison routine according to FIG. 8, and finally the new location seek operation will be performed according to FIG. 9.

Case 2: Z Value of OLD TRIANGLE DATA=Actual Z Value

At this point, assume that the system had processed locations 483 and 485 as discussed above. Thus, only two more locations, 487 and 489, exist for this same NEW TRIANGLE DATA. First, the system will address location 487. In an earlier cycle, the system had written OLD TRIANGLE DATA to triangle buffer location 487 and the z value to the z buffer. At that location 487, a visible region of the OLD TRIANGLE DATA was found therein so the system stored the actual z value of the surface of OLD TRIANGLE DATA corresponding to location 487 at the corresponding location in the z buffer. Accordingly, step 265 resolves to "NO."

The system then examines the content of NEW TRIANGLE DATA at the desired target location 487. As shown in FIG. 14(B), a non-visible region of NEW TRIANGLE DATA 480 is associated with target location 487 and so, the $z_{max}$ value will be used for the comparison. Because the z value for OLD TRIANGLE DATA is an actual z value and the z value of NEW TRIANGLE DATA is $z_{max}$ at location 487, step 285 resolves to "NO" (z of NEW TRIANGLE DATA not less than z of OLD TRIANGLE DATA). At step 275, the system leaves the existing OLD TRIANGLE DATA at location 487. The NEW TRIANGLE DATA that was initially targeted for location 487 is not discarded yet; it has merely "failed" in its attempt to write to location 485. The system must now find a new location for the "failed" NEW TRIANGLE DATA with the new location seek routine of FIG. 9. After the system performs a new location seek operation at step 280, the system then proceeds to step 300 where the comparison operation ends and the system returns to the main write routine of FIG. 7. In this example, one more triangle buffer location has been identified for this NEW TRIANGLE DATA. This remaining location (i.e., 489) will be handled by the write routine of FIG. 7 and if a comparison is necessary, the system will perform the comparison routine according to FIG. 8, and finally the new location seek operation will be performed according to FIG. 9.

For location 489 for the same NEW TRIANGLE DATA, assume that the system performed the write routine according to FIG. 7 and because of the existence of OLD TRIANGLE DATA in triangle buffer location 489, a comparison would be necessary. However, at that location 489, the stored z value for the OLD TRIANGLE DATA is an actual z value and thus, step 265 resolves to "NO." The system then examines the content of NEW TRIANGLE DATA at the desired target location 489. As shown in FIG. 14(B), a visible region of NEW TRIANGLE DATA 480 is associated with target location 489 and so, the actual z value will be used for the comparison. Because the z value for OLD TRIANGLE DATA is an actual z value and the z value of NEW TRIANGLE DATA is another actual z value at location 489, step 285 performs a comparison operation. If the z value of NEW TRIANGLE DATA is less than the z value of the OLD TRIANGLE DATA, step 285 resolves to "YES." If, however, the z value of NEW TRIANGLE DATA is not less than the z value of the OLD TRIANGLE DATA, step 285 resolves to "NO." Assuming that the z value of NEW TRIANGLE DATA is less than the z value of the OLD TRIANGLE DATA, step 285 resolves to "YES" and the system prepares to write NEW TRIANGLE DATA to location 489 while the system prepares to perform a new location seek routine for the "displaced" OLD TRIANGLE DATA according to step 295. The comparison routine then ends at step 300.

Assuming that the z value of NEW TRIANGLE DATA is not less than the z value of the OLD TRIANGLE DATA, step 285 resolves to "NO" and the system leaves the existing OLD TRIANGLE DATA at location 489. The NEW TRIANGLE DATA that was initially targeted for location 489 is not discarded yet; it has merely "failed" in its attempt to write to location 489. The system must now find a new location for the "failed" NEW TRIANGLE DATA with the new location seek routine of FIG. 9. After the system performs a new location seek operation at step 280, the system then proceeds to step 300 where the comparison operation ends and the system returns to the main write routine of FIG. 7.

New Location Seek for "Failed" or "Displaced" Triangles

As discussed above, the triangle buffer write scheme attempts to find a new triangle buffer location for the losing triangle after each comparison at steps 280 and 295 in FIG. 8. If the NEW TRIANGLE DATA lost the z value comparison with the OLD TRIANGLE DATA, the system must now seek a new triangle buffer location for the "failed" NEW TRIANGLE DATA while leaving the OLD TRIANGLE DATA intact at that target location. If, on the other hand, the OLD TRIANGLE DATA lost the z value comparison with the NEW TRIANGLE DATA, the system must now seek a new triangle buffer location for the "displaced" OLD TRIANGLE DATA after the system writes the NEW TRIANGLE DATA to the target location.

In seeking a new triangle buffer location for either the "displaced" OLD TRIANGLE DATA or the "failed" NEW TRIANGLE DATA, the system does not seek forever and at all possible locations; rather, if a new location cannot be found within the coverage mask, that triangle will be discarded for that coverage mask. The maximum number of locations sought for this previously losing triangle depends on the size of the coverage mask. If the coverage mask is 16×16, the system has 256 possible locations for the triangle where the upper left corner of the mask is the initially targeted location. If the coverage mask is 8×8, the system has 64 possible locations as targets.

A discussion of the new location seek concept will now be discussed with respect to FIGS. 17, 18 and 19. First, the "failed" NEW TRIANGLE DATA will be discussed. In FIG. 17, triangle 531 represents the NEW TRIANGLE DATA and its bounding box is represented by 533. The system will process NEW TRIANGLE DATA one coverage mask at a time so that location 535 (the upper left corner of coverage mask 534) will be processed first. When the processing for this coverage mask has been completed, the system will then process the same triangle 531 for the other coverage masks, where the upper left corner locations of these other coverage masks are represented by 536, 537, and 538 in FIG. 17.

For the coverage mask 534 for this triangle 531, assume that the previous comparison routine of FIG. 8 had been performed and the system determined that the NEW TRIANGLE DATA lost the comparison to the already existing OLD TRIANGLE DATA at the initially targeted upper left corner mask location 535 (FIG. 17). The OLD TRIANGLE DATA is not moved out and the system must now find a new location for the NEW TRIANGLE DATA.

Figure 18B:
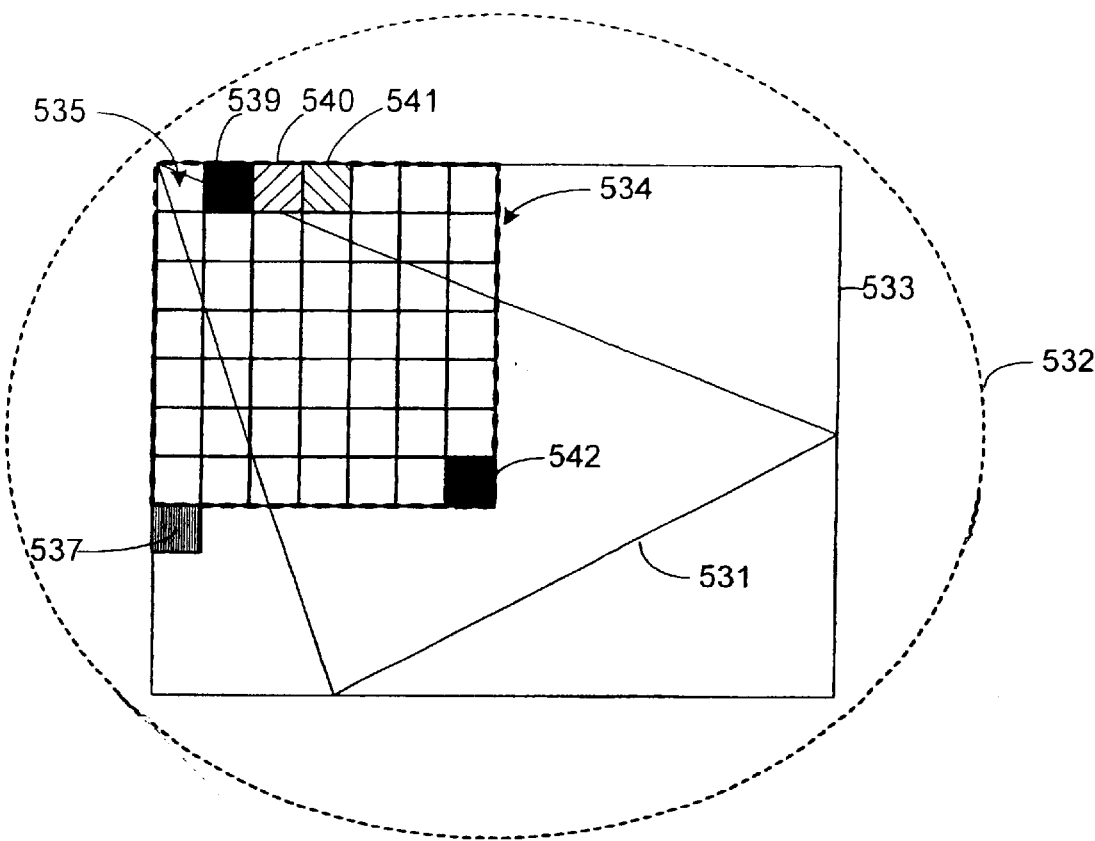
FIG. 18 illustrates the concept of writing "failed" new triangle data to specific triangle buffer locations in accordance with one embodiment of the present invention.
Figure 18A:
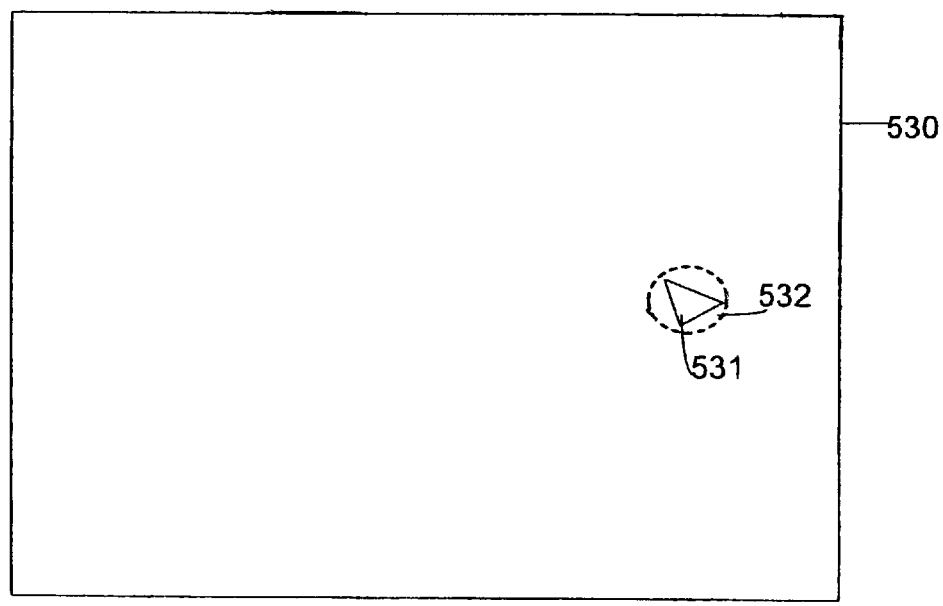

Referring now to FIG. 18, the next location that the system examines is triangle buffer location 539. The system determines whether another triangle is stored there. If not, the system writes the NEW TRIANGLE DATA to that location 539 and the z value at the location in the z buffer that corresponds to location 539. The z value stored at 539 will not necessarily be the same z value that is associated with location 535; rather, the z value will be the z value of the triangle surface at location 539. After all triangle 531 may be oriented in such a manner that various points on the triangle surface may have different z depths. In FIG. 18, location 539 covers a visible region of triangle 531.

If, however, another triangle is found in location 539, the system performs a comparison between the z value of the NEW TRIANGLE DATA and the z value of the triangle that is stored at location 539 much like the comparison routine of FIG. 8. Like above, the z value of NEW TRIANGLE DATA used for the comparison for location 539 will not necessarily be the same z value that is associated with location 535; rather, the z value of NEW TRIANGLE DATA that will be used for the comparison will be the z value of the triangle surface at location 539. If the NEW TRIANGLE DATA wins, the system performs a new location seek operation for the displaced triangle and writes the NEW TRIANGLE DATA to location 539. Assuming that the NEW TRIANGLE DATA loses the competition, the system examines location 540 (again using the z value of the triangle surface at location 540). If location 540 is full and the NEW TRIANGLE DATA loses the comparison again, the system examines location 541.

This process of examining all possible locations for the NEW TRIANGLE DATA continues until: (1) a location has been found for NEW TRIANGLE DATA; or (2) no location within the coverage mask can be found for NEW TRIANGLE DATA and thus, NEW TRIANGLE DATA must be discarded for this coverage mask. Thus, the first location examined is the upper left corner and the last location examined is location 542 in FIG. 18 . Each location of the coverage mask is examined row by row and column by column. However, the system may not ever have the opportunity to examine the last location 542 for NEW TRIANGLE DATA because an intermediate location such as location 541 may either be empty or even if it is not empty, the NEW TRIANGLE DATA may win the z depth comparison against the triangle that is already stored therein.

However, in some cases, the triangle buffer may be so densely packed that the system has to examine all locations in the coverage mask 534 including location 542. If location 542 has another triangle stored therein and NEW TRIANGLE DATA loses the z comparison with that triangle, the system will discard NEW TRIANGLE DATA because this location 542 represents the last location (the last row and the last column) within the coverage mask. In other words, the system will never examine location 537 for the NEW TRIANGLE DATA because location 537 is located outside the coverage mask. Of course, if NEW TRIANGLE DATA wins the z comparison with the OLD TRIANGLE DATA stored in location 542, the system writes NEW TRIANGLE DATA to location 542 and the z value (which is the z value of the triangle 531 at the surface of the triangle located at 542) in the z buffer at the z buffer location corresponding to the triangle buffer location.

By limiting the number of coverage mask locations for NEW TRIANGLE DATA, this embodiment of the present invention provides a bounded solution to triangle processing and thus achieves the following benefits: (1) the system does not waste computational resources in finding a memory location for a triangle that may ultimately not win a pixel location; (2) the system will never need to perform multiple passes to the same data and slowing the rendering process; and (3) less complicated hardware designs are possible to process stored triangle data "on the fly" because for a given pixel position, the number of triangles in competition is bounded.

The new location seek concept for the "displaced" OLD TRIANGLE DATA will now be discussed. The concept is similar to the new location seek concept of the "failed" NEW TRIANGLE DATA except that the coverage mask will be re-positioned. What is the re-positioned location? Remember, each triangle data that is stored in a triangle buffer memory location was associated with some coverage mask. Accordingly, the re-positioned coverage mask for the displaced triangle is the original coverage mask position which the system used to find a memory location for that triangle data, where that triangle data has currently been displaced.

Figure 19B:
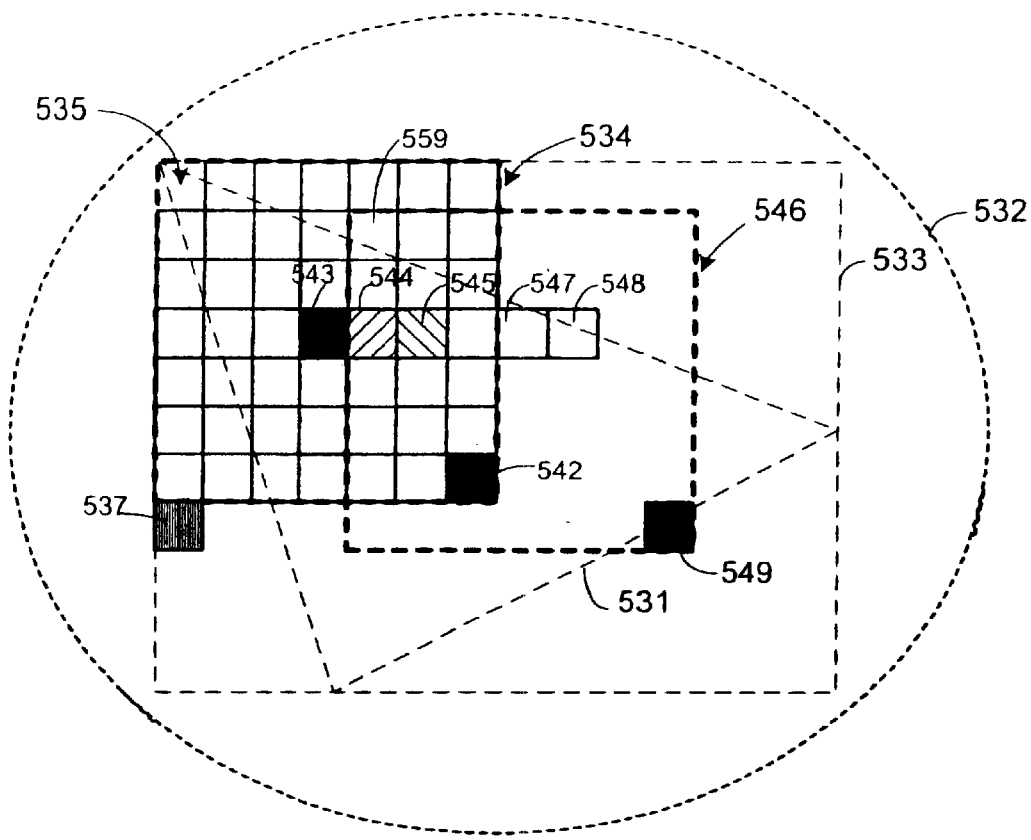
FIG. 19 illustrates the concept of writing "displaced" old triangle data to specific triangle buffer locations in accordance with one embodiment of the present invention.
Figure 19A:
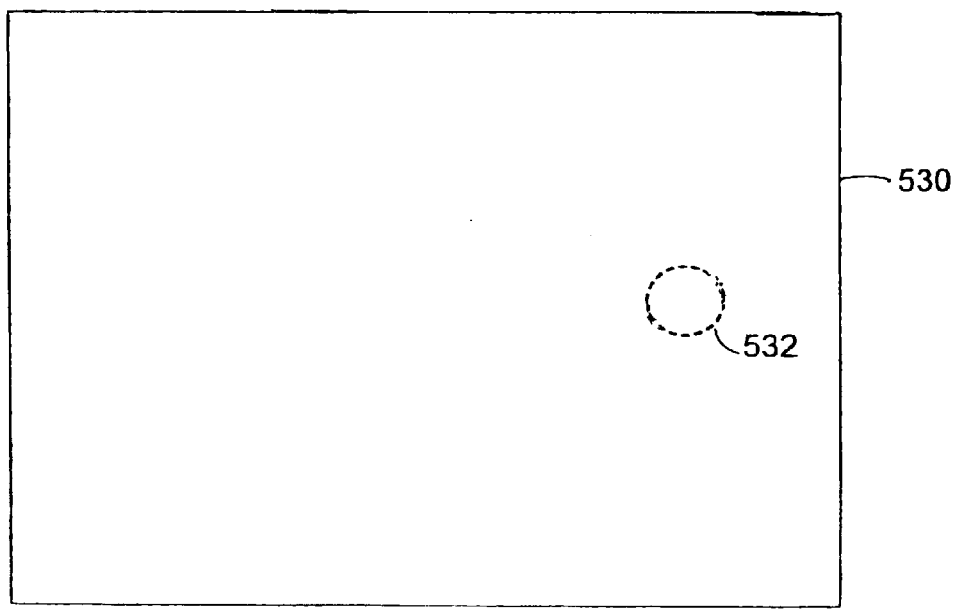

Referring now to FIG. 19, assume that the previous comparison routine of FIG. 8 had been performed and the system determined that the NEW TRIANGLE DATA lost the comparison to the already existing OLD TRIANGLE DATA at the initially targeted upper left corner mask location 535 (FIG. 17). The OLD TRIANGLE DATA is not moved out and the system must now find a new location for the NEW TRIANGLE DATA. The system has sequentially examined the various triangle buffer locations located after 535 in the coverage mask up to location 543 to no avail; that is, the NEW TRIANGLE DATA lost the comparison to the already stored triangle at each location. At location 543, a triangle is already stored therein and NEW TRIANGLE DATA loses again in the z comparison, so the system examines location 544.

At location 544, the system finds OLD TRIANGLE DATA stored therein. It performs a z comparison between the NEW TRIANGLE DATA and OLD TRIANGLE DATA. Remember, the NEW TRIANGLE DATA is associated with triangle 531 and bounding box 533 of FIG. 17, and OLD TRIANGLE DATA is associated with another triangle of possibly another shape, size, and orientation along with its own bounding box and its storage in location 544 occurred sometime during a prior computing cycle. This time, NEW TRIANGLE DATA wins the z comparison against OLD TRIANGLE DATA because the z value on the surface of the NEW TRIANGLE DATA at location 544 is closer to the user in depth (and unobscured, for the moment) than the z value stored in the z buffer for OLD TRIANGLE DATA at location 544. The system reads OLD TRIANGLE DATA for temporary usage and writes NEW TRIANGLE DATA at location 544 and its z value at the corresponding location in the z buffer. The OLD TRIANGLE DATA has been "displaced" by the NEW TRIANGLE DATA that had previously "failed" in its write attempts from locations beginning at the upper left corner location 535 to location 543, which includes all of the first three rows of coverage mask 534 and the first four columns of the fourth row.

The system must now perform a new location seek for the "displaced" OLD TRIANGLE. The system first re-positions the coverage mask so that it is anchored at a location corresponding to the original coverage mask's position which was used to store the "displaced" OLD TRIANGLE DATA in a prior computing cycle. Thus, if coverage mask 546 was used in a prior computing cycle to originally store the now displaced OLD TRIANGLE DATA in location 544, the system refers back to this coverage mask 546 anchored at location 559. This OLD TRIANGLE DATA is, of course, associated with another triangle of possibly another shape, size, and orientation along with its own bounding box. This is analogous to the system using coverage mask 534 anchored at location 535 to store the NEW TRIANGLE DATA that is now stored in location 544, as described above. In a subsequent computing cycle, this NEW TRIANGLE DATA in location 544 may be displaced by another newer triangle. After this displacement, the system refers back to the original coverage mask 534 anchored at location 535 to find a new location for this displaced triangle beginning with location 545.

Two possibilities exist for this "displaced" OLD TRIANGLE DATA that was previously stored at but displaced from location 544—(1) OLD TRIANGLE DATA now may be stored anywhere in the coverage mask 546 from location 545 to location 549; or (2) OLD TRIANGLE DATA will be discarded for failing to write to any location within the coverage mask 546. The system still examines triangle buffer locations, such as locations 545, 547, and 548, to determine if another triangle is stored therein, performs z comparisons between this "displaced" OLD TRIANGLE DATA and the triangle stored at the location being targeted using updated z values, and the OLD TRIANGLE DATA either wins or loses the z comparison. For location 545, the system uses the z value of the triangle surface of OLD TRIANGLE DATA at location 545, not the z value that was previously stored in the z buffer for OLD TRIANGLE DATA at location 544. Depending on the shape, size, and orientation of the triangle representing OLD TRIANGLE DATA, location 544 may cover a visible region and location 545 may cover a non-visible region. Furthermore, location 544 may cover a visible region where the surface is at one depth and location 545 may cover another visible region where the surface is at another depth.

If the "displaced" OLD TRIANGLE DATA wins the z comparison at location 547, for example, the triangle that was stored at location 547 will be displaced and the new location seek routine will be invoked for this newly displaced triangle. Again, the coverage mask will also re-position itself so that its upper left corner anchor will be location 547.

The flow chart of the new location seek routine is shown in FIG. J. The flow chart begins at step 305 in which a comparison routine had just been performed between the NEW TRIANGLE DATA and the OLD TRIANGLE DATA. At step 310, the system finds a new target location for the "failed" NEW TRIANGLE DATA or the "displaced" OLD TRIANGLE DATA. This new target location is usually the location immediately to the right of the current location within the coverage mask and if the current location is the last location in the row, the new location is the first location at the beginning of the next row.

At step 315, the system checks to make sure that the current location is not the last location in the coverage mask. If the current location is the last row and last column of the coverage mask, no new target location will be sought. Thus, if the next target location selected is outside the coverage mask, then the current location must be the last row and last column of the coverage mask and step 315 resolves to "YES." Here, step 340 requires that the system discard the triangle that the system is performing the new location seek routine (i.e., the "failed NEW TRIANGLE DATA or a "displaced" OLD TRIANGLE DATA). No room is available for this triangle and the system has made a decision to discard it altogether for this coverage mask. At step 350, the system ends the new location seek routine by returning to the comparison routine of FIG. 8 (which will return the system to the main write routine at step 300 of FIG. 8).

At step 315, if the new target location is inside the coverage mask, the system will not discard this triangle yet and step 315 resolves to "NO." At step 320, the system examines the new target location to determine if another triangle is stored therein. If another triangle is stored therein, step 320 resolves to "YES" so that a z comparison can be performed at step 330. If the current triangle that the system is performing the new location seek routine for wins the z comparison, the system will write its triangle data into the new target location at step 345. If the current triangle loses the z comparison against the triangle that is already stored in the new target location, the system proceeds to step 335.

At step 320, if another triangle is not stored therein in the new target location, that new target location is empty and step 320 resolves to "NO." The system will write the currently held triangle (either a "failed" NEW TRIANGLE DATA or a "displaced" OLD TRIANGLE DATA) into that new target location and the appropriate z value into the z buffer at its corresponding location at step 345. The system will then proceed to step 335.

At step 335, one of the following scenarios will have occurred: (1) the system wrote the current triangle successfully into the new target location because the new target location is empty; (2) the system wrote the current triangle successfully into the new target location because it won the z comparison against the triangle that was previously stored in that new target location, in which case that previously stored triangle has now been displaced; and (3) the system has not written the current triangle into that new target location because it has lost the z comparison against the triangle that was previously stored in that new target location.

In case (1), the system successfully wrote the current triangle into that target new location because that location was empty. Step 335 resolves to "NO" because no other triangles are outstanding that need addressing within this new location seek routine. The system then proceeds to step 350 and returns to the comparison routine and the main write routine.

In case (2), the system wrote the current triangle successfully into the new target location because it won the z comparison against the triangle that was previously stored in that new target location. Step 335 resolves to "YES" because a new displaced triangle exists. That triangle was just displaced from that new target location because of the lost comparison. The system thus proceeds to step 310 where a new location must be sought for this newly displaced triangle. The coverage mask will also be re-positioned with a new anchor at its former location from which it was displaced. The new location seek routine cycles again.

In case (3), the system has not written the current triangle into that new target location because it has lost the z comparison against the triangle that was previously stored in that new target location. Step 335 resolves to "YES" because the same current triangle still needs a new location within its coverage mask. The system thus proceeds to step 310 where a new location must be sought for this same triangle. The coverage mask will not be re-positioned with a new anchor because the same coverage mask applies. The new location seek routine cycles again.

In sum, if any write is successful at any location, the system will perform two writes: (1) the corresponding triangle data will be stored in the triangle buffer; and (2) the actual z value for visible regions or the artificial $z_{max}$ for non-visible regions at the corresponding location in the z buffer. If the current triangle loses a z comparison against triangle that was already stored therein in the target location, the system seeks a new location for the current "failed" triangle within the coverage mask. If a triangle that was currently stored at a target location has been displaced by the current triangle, the system must find a new location for the displaced triangle within the confines of its re-positioned coverage mask. If a triangle is successfully written into a target location because that location was empty, the system need not perform a new location seek routine for within this comparison cycle again because no outstanding triangles exist. At another comparison cycle, the new location seek routine may be invoked because a new location may be necessary for a current triangle that has lost a z comparison (i.e., the "failed" triangle) or a triangle that was stored in a target location lost a z comparison against a current triangle (i.e., the "displaced" triangle).

Hardware Diagram of Triangle Buffer Write Scheme

Figure 20:
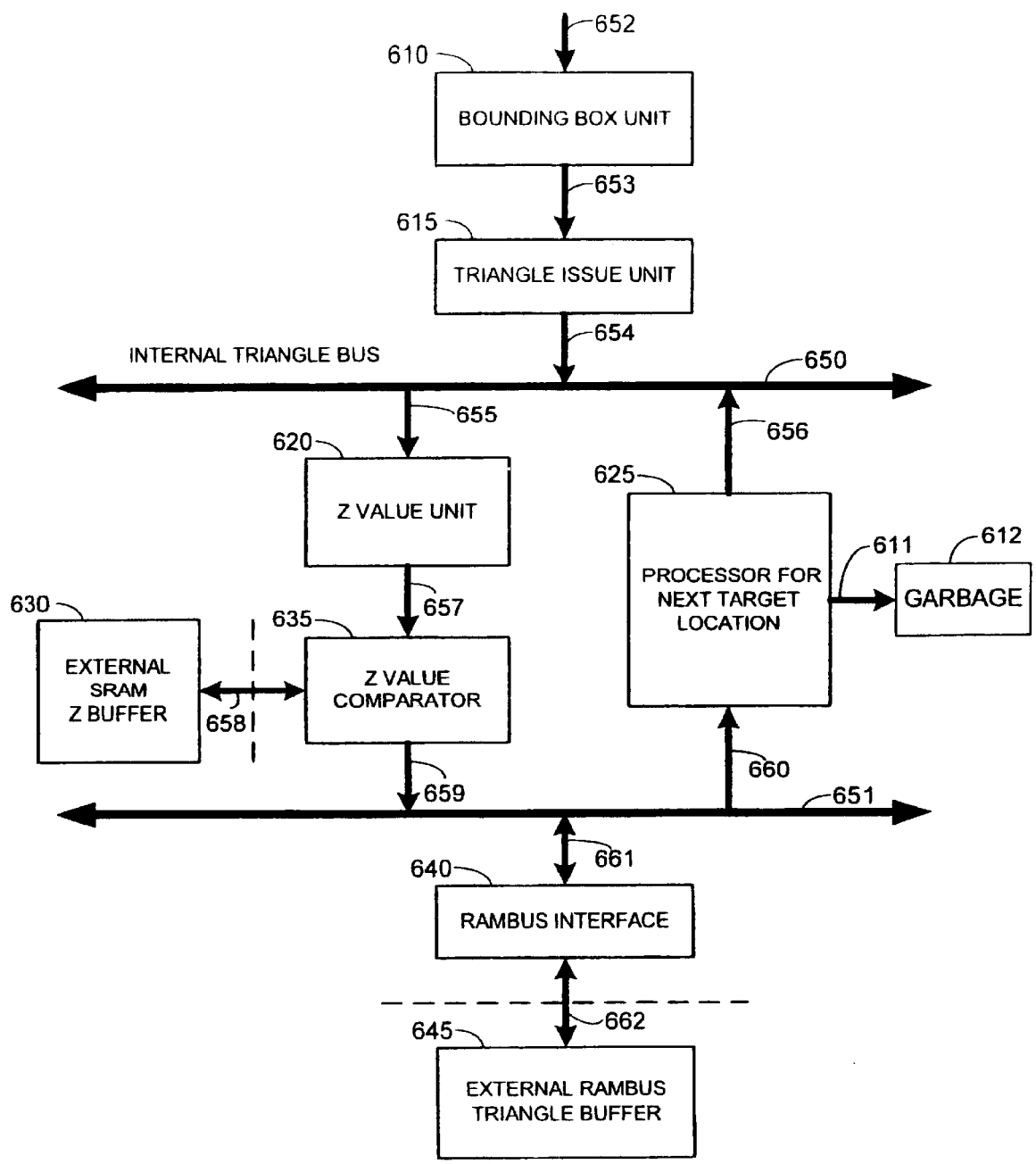
FIG. 20 shows the hardware implementation of the triangle buffer write scheme in accordance with one embodiment of the present invention.

Referring to FIG. 20, a block diagram of the triangle buffer write scheme is shown. The various components in FIG. 20 can be implemented in either software, or preferably in hardware with some finite state machine or another processor. At bus 652, the front end processor (not shown) delivers a triangle to the graphics system of the present invention. A bounding box unit 610 immediately determines the bounding box for the triangle. It may also perform the triangle data culling to determine if it has a surface area that is larger than the surface area of a pixel.

The bounding box unit 610 outputs the resulting boxed data to a triangle issue unit 615 via bus 653. The triangle issue unit 615 identifies the initial target triangle buffer locations for this triangle by issuing a triangle for each coverage mask that is used to "cover" this bounding box. Thus, the triangle issue unit performs the following function:

for (y=top; y<bottom; y+=16)

for (x=left; x<right; x+=16)

issue_triangle (tri);

Thus, if the bounding box is large enough, multiple coverage masks will be needed to "cover" the bounding box. It then delivers the processed triangle(s) associated with specific target triangle buffer locations to the rest of the system via bus 654 and internal triangle bus 650.

The z value unit 620 receives the triangle via bus 655. The z value unit 620 generates the z plane equations so that the system can determine the various z depths of any selected point in the bounding box.

The z value comparator 635 receives the current triangle via bus 657 and the z value of the triangle (if any) that is stored at the targeted location from a z buffer 630 via bus 658. Of course, if no triangle is stored at that target location, the current triangle would win the comparison and that thus this triangle would be passed to the triangle buffer 645 via buses 659, internal triangle bus 651, bus 661, Rambus interface 640, and bus 662. The z value at the target location for this current triangle would also be stored at the z buffer 630 via bus 658. Another issued triangle, which is either the same triangle at a different target location due to the use of multiple coverage masks or a different triangle altogether, would then be processed in the z value unit 620 and the z value comparator 635.

If another triangle is located at that target location, the z comparator compares the z values of the current triangle and the already stored triangle. If the current triangle wins the comparison due to a lower z value, this triangle would be passed to the triangle buffer 645 via buses 659, internal triangle bus 651, bus 661, Rambus interface 640, and bus 662. The z value at the target location for this current triangle would also be stored at the z buffer 630 via bus 658. The losing triangle, which is the triangle that was previously stored at that target location, is "displaced" from this target location and is passed to a processor 625 for the next target location via bus 659, internal triangle bus 651, and bus 660. The processor determines a new target location and re-positions the coverage mask for this "displaced" triangle. This triangle is then passed to the z value unit 620 via buses 656, internal triangle bus 650, and bus 655. If a new location for this triangle cannot be found within the re-positioned coverage mask, the system discards this triangle in the garbage can 612 via bus 611.

Returning to the original triangle that was issued by the triangle issue unit 615, if another triangle is located at the target location, the z comparator 635 compares the z values of the current triangle and the already stored triangle. If the current triangle loses the comparison due to a higher z value, this triangle would be passed to the processor 625 for the next target location via bus 659, internal triangle bus 651, and bus 660. A new target location is determined for this "failed" triangle within the coverage mask and this triangle is then passed to the z value unit 620 via buses 656, internal triangle bus 650, and bus 655. If a new location for this triangle cannot be found within the coverage mask, the system discards this triangle in the garbage can 612 via bus 611.

The various components in this hardware block diagram can be implemented by finite state machines. These components include the bounding box unit 610, triangle issue unit 615, z value unit 620, z value comparator 635, and the processor for next target location 625.

Scan-out Logic—General Overview

Up to now, the discussion focused on storing triangles into the triangle buffer as dictated by the triangle buffer write scheme. If scan-out for output to some output device (e.g., a monitor) is desired, one embodiment of the present invention includes some scan-out logic to generate pixels from these stored triangles without making multiple passes to the same data. Because the output device may refresh the monitor every frame period, the scan-out logic must process enough triangles and generate enough pixels so that an acceptable computer graphics image can be rendered. The scan-out logic, following on the heels of the improved triangle storage system as described above, processes enough triangles and generates enough pixels to be more than acceptable as it renders an image that is rich in detail.

As described above, the graphics system in accordance with one embodiment of the present invention processes incoming triangle data and writes triangle data to a triangle buffer in accordance with a triangle buffer writing scheme via z compares and the use of coverage masks to bound the system design. The scan-out logic performs the following functions using the triangles stored in the triangle buffer: (1) identifies those stored triangles that are in competition for a given pixel location; (2) compares depth values of all these competing triangles for a given pixel location; (3) determines the winning triangle among the competing triangles in which the winning triangle represents the triangle (and hence object or portion of an object) that is at the front of all other triangles (and all other objects or portions of objects), assuming no transparencies are involved; and (4) generates a pixel from the winning triangle for delivery to the output device.

Figure 21:
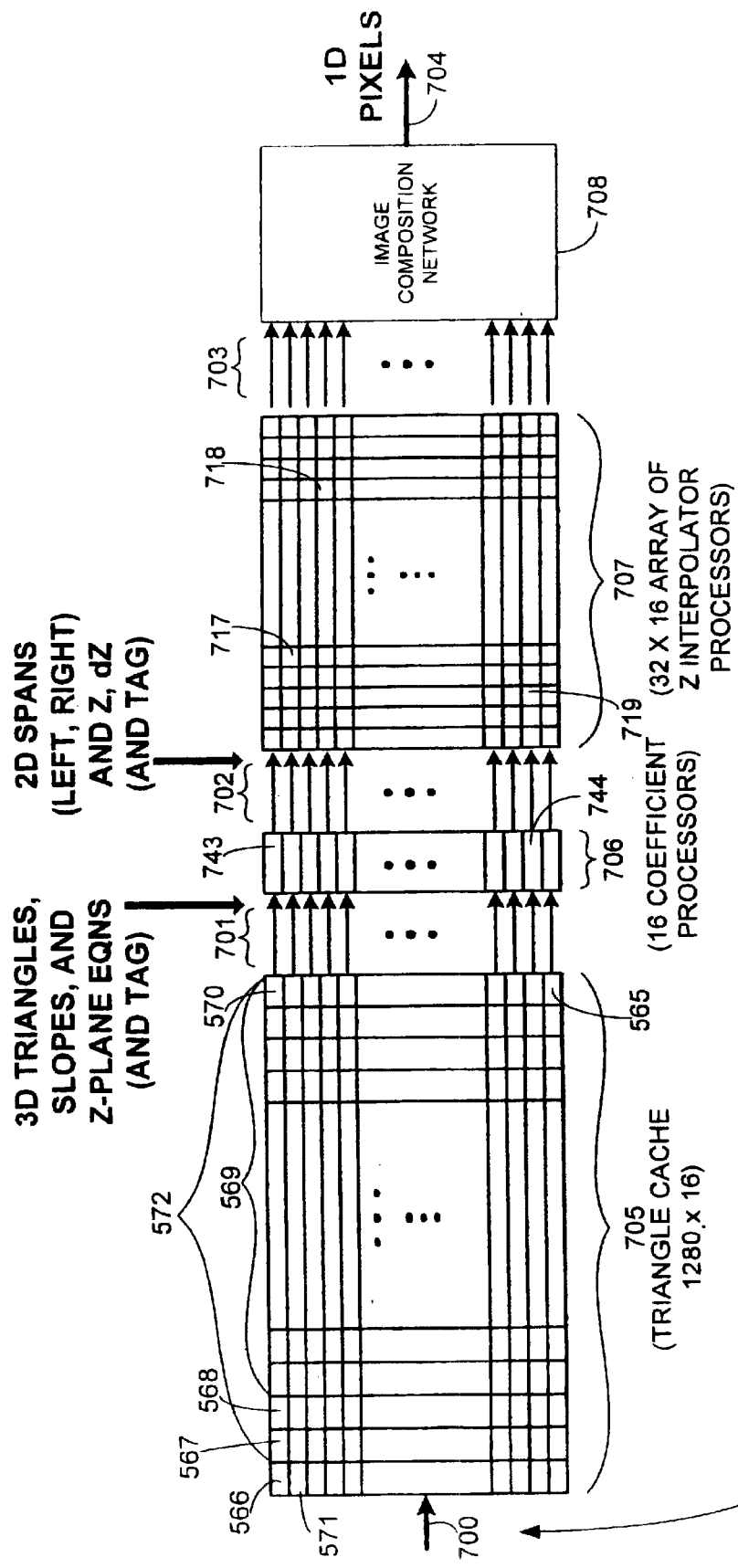
FIG. 21 shows the scan-out subsystem of the pipelined system from the triangle cache to the image composition network in accordance with one embodiment of the present invention.

As shown in FIG. 21, the scan-out logic subsystem includes a triangle cache 705, a column of coefficient evaluators 706, an array of z-interpolator processors 707, and an image composition network 708 which all function to ultimately convert triangles to pixels. To improve processing throughput, the scan-out logic is pipelined so that several multiple different data can be processed concurrently in different stages in the pipeline. One stage is located at the input to the triangle cache 705 at bus 700. An output of a second stage is represented by the output of the triangle cache 705 on bus 701. An output of a third stage is represented by the output of the column of coefficient evaluators 706 on bus 702. An output of a fourth stage is represented by the output of the array of z-interpolator processors 707 on bus 703. The image composition network contains at least 10 stages with each stage containing at least one comparator performing a z depth comparison between any two triangle data from the previous stage. The shader/texture mapper also has a number of stages. Thus, from the beginning of the pipeline where triangles from the triangle buffer are received to the end of the pipeline where the shader/texture mapper generates pixels from the winning triangles, the scan-out logic contains several deep stages of pipelined operations.

Other signal paths may also exist that may need pipelining. If any of these signal paths provide signals that are associated with particular sets of triangle data that are traveling down the pipeline, then these signal paths must be pipelined as well so that these signals travel down the pipeline with their associated triangle data. One example is a so-called blank signal. If no data is received at the input 700, a blank signal is generated at the same time so that the system knows that a pixel will not be generated for that particular cycle. The signal path for this blank signal is provided with the same pipeline stages as the core scan-out logic as described above from the input 700 to the shader/texture mapper.

As for the functional aspects of the scan-out logic in accordance with one embodiment of the present invention, the triangle cache 705 receives 3D triangle data and z-plane equations (for both z depth and color) from the triangle buffer via bus 700. The column of coefficient evaluators 706 receives a column of these 3D information from the triangle cache 705 via bus 701 and converts them to 2D spans, z, and dz. The column of coefficient evaluators 706 generates the span information to the array processors so that the array processors can determine whether the current pixel position for which it is processing the triangle data is inside or outside the various competing triangles. The column of coefficient evaluators also provides the z and dz information so that the array processors can calculate the z depth at every given pixel position so that the z competition among the various competing triangles can be resolved at the next set of stages.

The array of z-interpolator processors 707 receives the 2D spans (i.e., left and right edges of each triangle), z, and dz information from the column of coefficient evaluators 706 via bus 702 to interpolate z depth information for various triangles within the sliding mask, as described above. If a triangle data is not loaded into the array, the array does not process any z depth information for that triangle. The z depth interpolation is performed for each pixel locations during rasterization; that is, the array interpolates the z values of all triangles that are competing for a given pixel location. The span information is used to determine whether the current pixel position for which a pixel is being rasterized is inside or outside the various competing triangles. The z and dz information are used to calculate the z depth information at any given pixel position.

The image composition network 708 receives the interpolated z depth information from the array processors 707 via bus 703 to perform the z depth comparisons for ultimately determining the winning triangle for each pixel location. The shader/texture mapper (not shown in FIG. 21) finally converts the winning triangles to 1D pixels. In other embodiments, a triangle cache 705 is not used; rather, appropriate memory address logic is used to select data from the triangle buffer and feed them directly to the column of coefficient evaluators 706.

Data in the scan-out logic is loaded column by column. The system loads triangle data from the triangle buffer to the triangle cache 705 via bus 700. As each triangle data is loaded into corresponding locations in the triangle cache 705, an entire column of data from the triangle cache 705 is loaded into the column of coefficient evaluators 706 via bus 701 and the array of z-interpolator processors 707 via bus 702.

Figure 22:
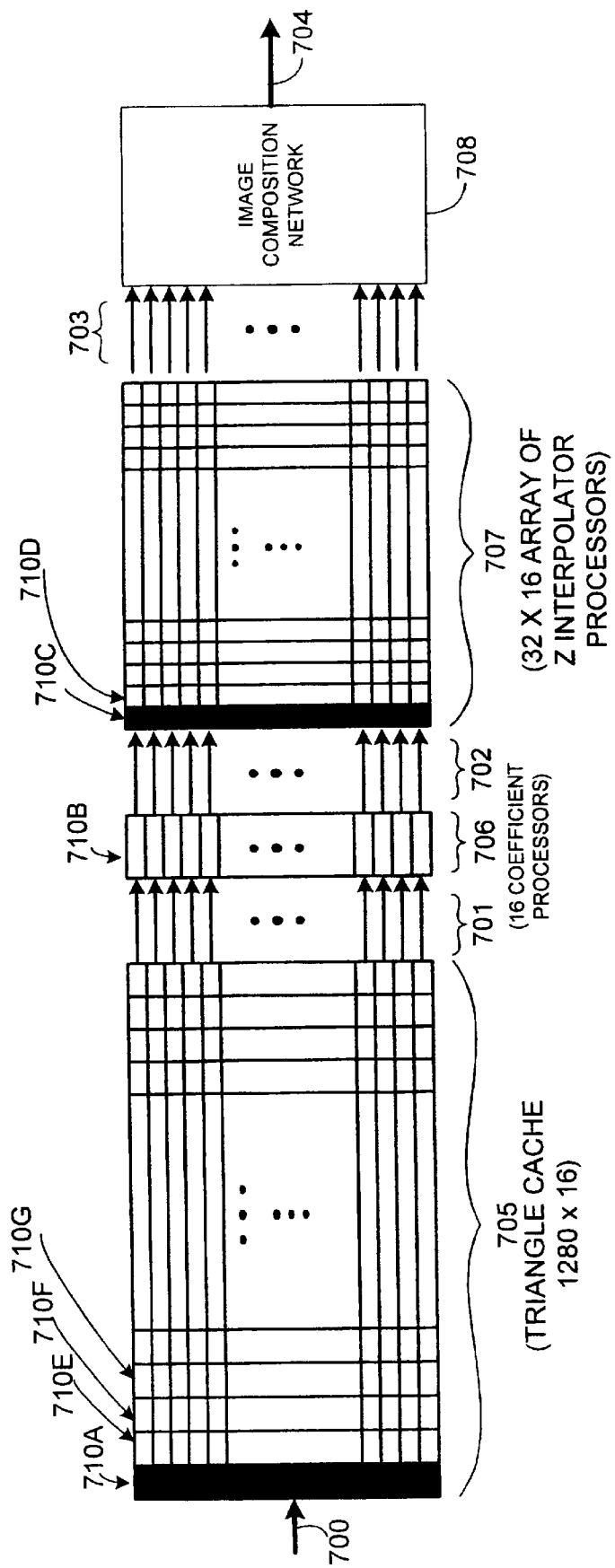
FIGS. 22–25 illustrate the operation of the scan-out subsystem shown in FIG. 21 in accordance with one embodiment of the present invention.

Referring to FIG. 22, when a data is written into the triangle cache, the column that corresponds to that data will be selected for processing. For example, a column of data in column 710A in the triangle cache 705 is provided to the column of coefficient evaluators 706. After processing, the column of coefficient evaluators 706 provides the column of data to the array of z-interpolator processors 707 where that column 710A will be written to column 710C.

Figure 23:
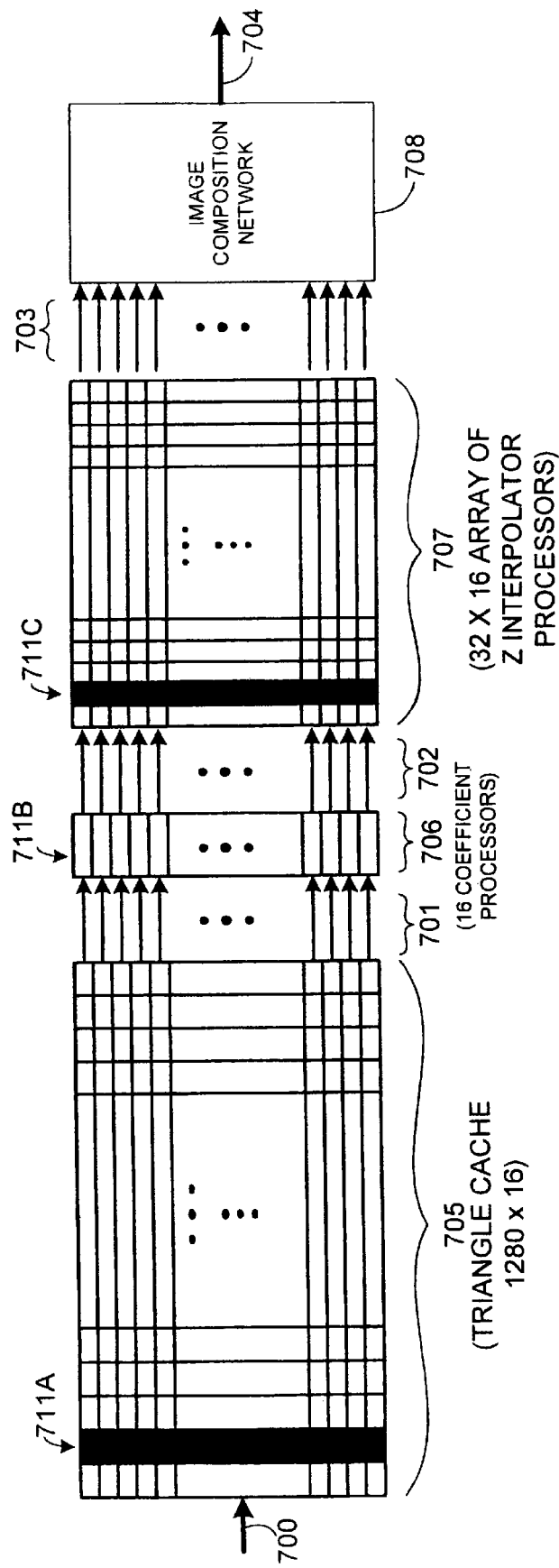
Figure 24:
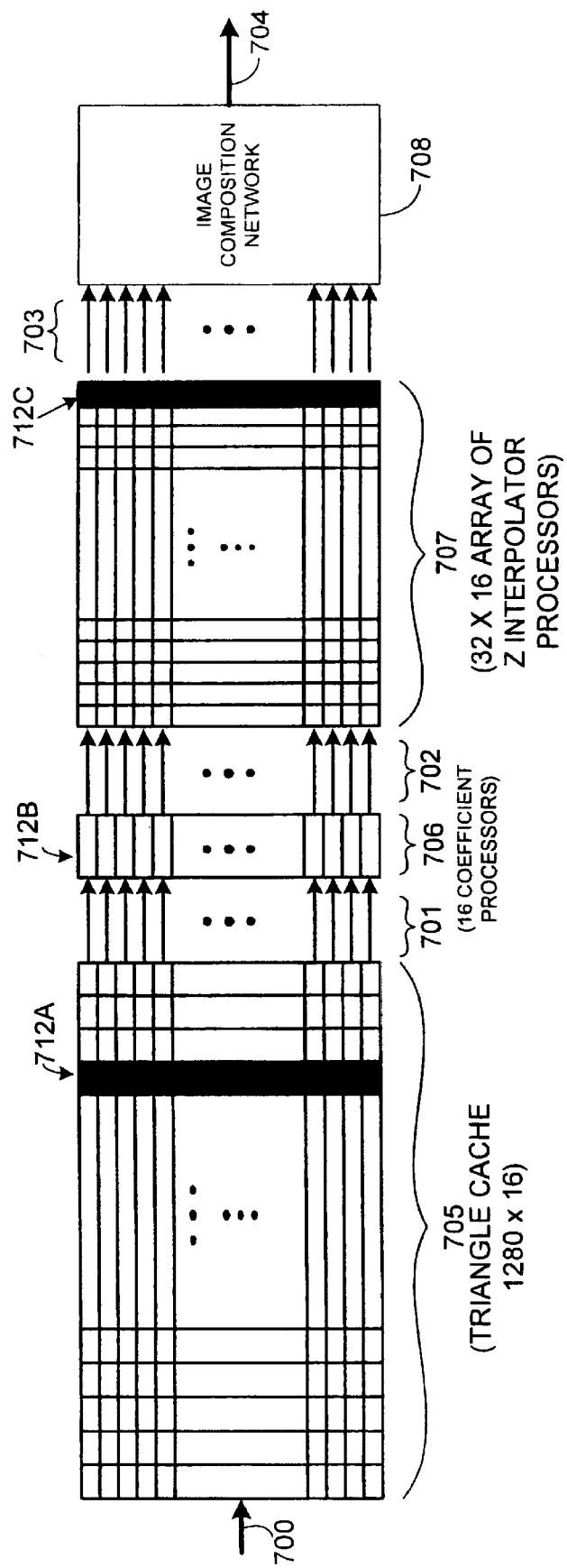

Similarly, in FIG. 23, the next column of data in column 711A in the triangle cache 705 is provided to the column of coefficient evaluators 706. After processing, the column of coefficient evaluators 706 provides the column of data to the array of z-interpolator processors 707 where that column 711A will be written to column 711C. This process continues such that, in FIG. 24, the column of data in column 712A in the triangle cache 705 is provided to the column of coefficient evaluators 706. After processing, the column of coefficient evaluators 706 provides the column of data to the array of z-interpolator processors 707 where that column 712A will be written to column 712C, the last column in the array 707.

Figure 25:
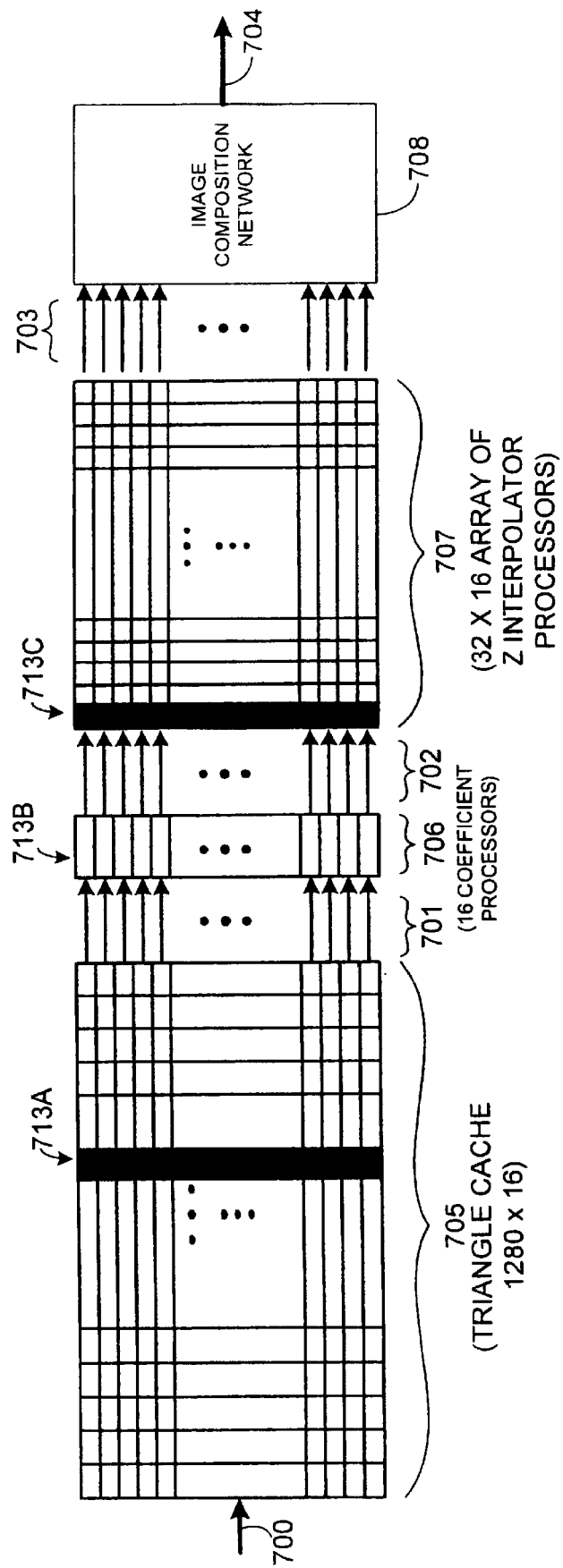

Because the array 707 is not as long as the triangle cache (i.e., 32 columns in the array v. 1280 columns in the triangle cache), the array processors are recycled in round-robin fashion from column to column as columns of data enter the array on bus 702. Because column 712C is the last column in the array 707, the next column of data from the triangle cache 705 must write to the first column in the array 707. Thus, in FIG. 25, the next column of data 713A in the triangle cache 705 is provided to the column of coefficient evaluators 706. After processing, the column of coefficient evaluators 706 provides the column of data to the array of z-interpolator processors 707 where that column 713A will be written to column 713C, the first column in the array 707. This round-robin left to right column and back to the left column again writing scheme of the array of z-interpolator processors continues throughout the scan-out process.

As explained above, pipelining is implemented. Thus, referring to FIG. 22, assume that the first column that is ever processed is column 710A. Data is written to column 710A in the triangle cache in one cycle. The column of coefficient evaluators and array stages are empty.

At the next cycle, a new data is written in column 710E of the triangle cache 705. The column of coefficient evaluators stage is processing the column of data from column 710A in the triangle cache 705. The array stage is still empty.

At the next cycle, a new data is written in column 710F of the triangle cache 705. The column of coefficient evaluators stage is processing the column of data from column 710E in the triangle cache 705. The array stage is now processing in column 710C the column of data from column 710A in the triangle cache 705.

At the next cycle, a new data is written in column 710G of the triangle cache 705. The column of coefficient evaluators stage is processing the column of data from column 710F in the triangle cache 705. The array stage is now processing in column 710D the column of data from column 710E in the triangle cache 705.

Thus, the array stage is at least two cycles behind the triangle cache stage and the column of coefficient evaluators stage is at least one cycle behind the triangle cache stage.

However, the pipelined design allows multiple columns of data to be processed concurrently.

Sliding Mask

The scan-out logic in FIG. 21 uses these subsystem components to enable a "sliding window" or "sliding mask" concept, in which a mask of dimensions n×m, where n and m are positive integers, "slides" across the data stored in the triangle buffer. The sliding mask slides across the triangle buffer from left to right and row by row so that eventually, the sliding mask makes its way from the top left corner of the buffer to the bottom right corner of the buffer one data at a time column by column and row by row. At each "stop," the scan-out logic processes the relevant data located within the confines of the sliding mask to determine the winning triangle for pixel generation.

A further explanation of the sliding mask will now be provided. This explanation is in two parts. The first part will generally provide background information on the sliding mask concept with a discussion of its limitation. Here, the sliding mask is the size of the coverage mask and generally slides across the triangle buffer. In the second part, the actual sliding mask in accordance with one embodiment of the present invention will be discussed which builds on the concepts discussed for the basic sliding mask but which also addresses that limitation. This latter sliding mask is twice as large as the coverage mask and data are loaded several cycles out of phase with the pixel generation.

Part One—General Sliding Mask With Limitation

Figure 58:
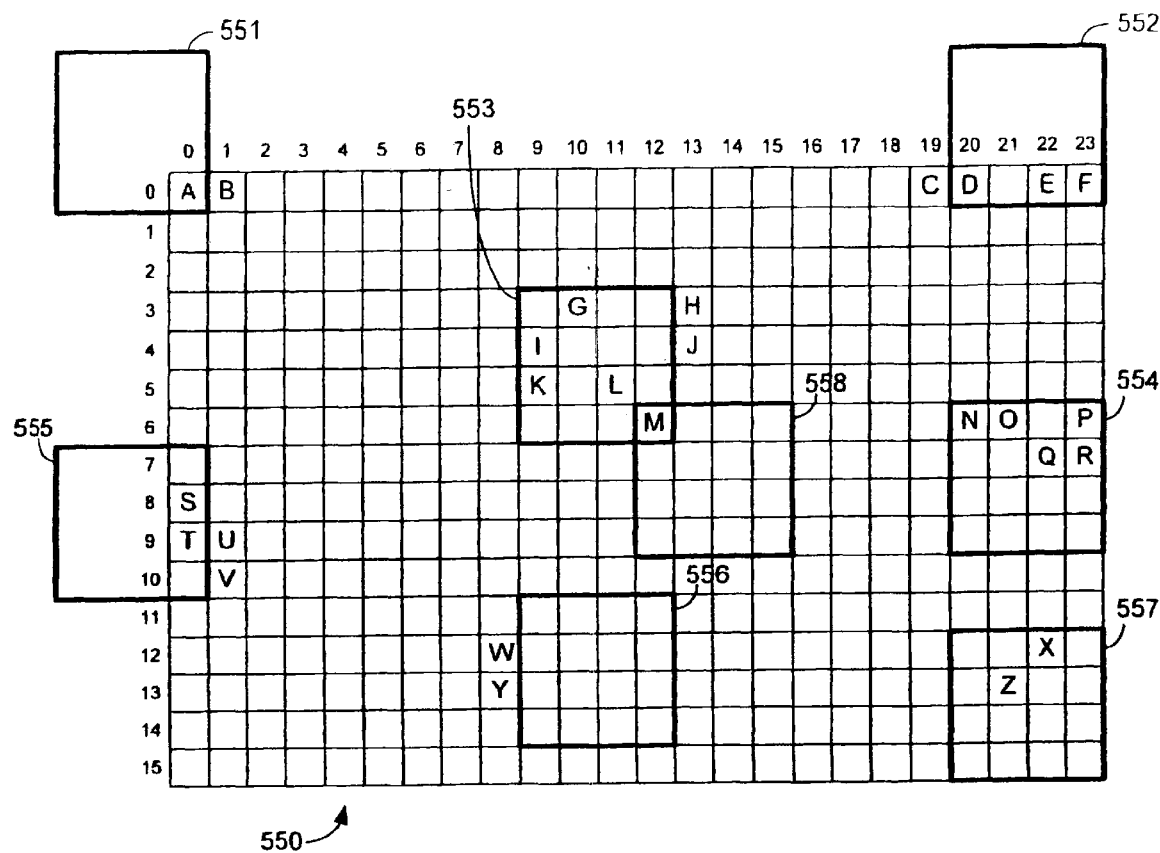
FIG. 58 shows the sliding mask superimposed on an exemplary triangle buffer to teach the basic concept of the sliding mask.

Referring to FIG. 58, a triangle buffer 550 is shown. This particular triangle buffer has dimensions 24 columns by 16 rows. A given location within the triangle buffer is referenced by the coordinates (column, row) so that, for example, location (0, 0) is the top left corner of the buffer, location (0, 23) is the top right corner of the buffer, location (15, 0) is the bottom left corner of the buffer, and location (15, 23) is the bottom right corner of the buffer. This particular triangle buffer 550 with dimensions 24 columns by 16 rows was deliberately exaggerated to be this small for teaching purposes only; an actual triangle buffer may be 1024 by 1024 (or larger).

In FIG. 58, the triangle buffer 550 has twenty-six triangle data A to Z stored therein. Although this is an inordinately small amount of triangles, the embodiments of the present invention can process these data to render an image. Of course, in other cases, more data can be stored therein.

The sliding mask, as briefly described above, has dimensions n×m and "slides" across the data stored in the triangle buffer to identify the competing triangles for a given pixel position and determine the winning triangle for pixel generation. In one embodiment, the sliding mask has twice as many columns and the same number of rows as the coverage mask that was used for the triangle buffer write operation. So, if the coverage mask is 16×16, the sliding mask is 32×16. If the coverage mask is 8×8, the sliding mask is 16×8. In another embodiment, the sliding mask has the same dimensions as the coverage mask. To facilitate a clear conceptual understanding of the sliding mask during scan-out, the following discussion in the context of FIG. 58 will use a sliding mask that is the same size as the coverage mask. Thus, for this example within the context of FIG. 58, the coverage mask has dimensions 4×4 and the sliding mask also has dimensions 4×4.

In one embodiment, only one sliding mask moves across the data in the triangle buffer 550. In other embodiments, multiple sliding masks can move across the triangle buffer to improve throughput. In FIG. 58, a single sliding mask is shown but in multiple different positions in the triangle buffer. These sliding mask positions include 551 to 558. Thus, the same sliding mask is shown in different spatial and temporal positions. Because the sliding mask moves left to right and then top to bottom, the sliding mask can be found at position 551 before position 557. Indeed, position 551 represents the first possible position for the sliding mask whereas position 557 represents the last possible position.

A reference point for a sliding mask to indicate its location within the triangle buffer 550 is its lower right corner. Indeed, the triangle data in the lower right corner of the sliding mask also represents a data that has never been processed before during scan-out in this frame period. The reference point of the sliding mask also corresponds to the pixel position for which the scan-out logic will generate a pixel from among the triangle(s) found within the sliding mask. Thus, when the sliding mask is located at reference point (x, y) in the triangle buffer, the scan-out logic will process the triangle data in the sliding mask and generate a pixel for pixel position (x, y).

Position 551 represents the first position for the sliding mask as it begins to process the triangle data in the triangle buffer for scan-out. At this position, only one triangle data A is within the confines of the sliding mask. Here, this triangle is located at triangle buffer location (0, 0) and when the sliding mask is in position 551, the scan-out logic in accordance with one embodiment of the present invention will process triangle A to generate a pixel for the corresponding pixel position (0, 0). Undoubtedly, this triangle A will also win the "competition" among all the triangles in the sliding mask for the pixel position corresponding to location (0, 0) because it is the only triangle in the sliding mask. After this triangle data A has been read into the first stage of the pipelined scan-out logic, the sliding mask moves over one column to the next location in the same row. Here, the next reference position is location (1, 0) where B is the new triangle data. In this position, the only triangles that are in the sliding mask are triangles A and B.

At position 552, the sliding mask has made its way over to the end of the first row where the scan-out logic will process triangles D, E, and F. Because the sliding mask is still in the first row, only one row of data can be found in the sliding mask. Triangle data C had been processed prior to the sliding mask reaching position 552 but data C is no longer in the sliding mask. Similarly, the sliding mask at position 554 is also at the end of the row and will process triangles N, O, P, Q, and R. After these data have been read into the first stage of the pipelined scan-out logic, the sliding mask moves to the beginning of the next row at position 555 where only two triangles S and T are found. This sliding mask then moves down the row in subsequent cycles.

At position 556, the sliding mask has made its way to the second to the last row of the triangle buffer 550. Here, no triangle data are found in the sliding mask and so, the scan-out logic will generate a pre-determined pixel (i.e., all black or all white or all gray) at pixel position (12, 14) that is not associated with any triangle. Just prior to this position 556, the sliding mask had triangles W and Y for processing but after the sliding mask slid over one column, these data W and Y are no longer in the sliding mask.

At position 557, the sliding mask contains triangles X and Z. The scan-out logic processes these triangles to generate a pixel for pixel position (23, 15). This completes the single pass scan-out processing of the triangle data in the triangle buffer. At the next cycle, for the next frame period, the sliding mask starts over at location (0, 0) to process the possibly new data in the triangle buffer. In one embodiment, two triangle buffers are used so that one can be used for the process of storing triangles from the front end processor and the other can be used for scan-out. At every frame period, the roles of the triangle buffers swap. Thus, in this example of FIG. 58, the scene may have changed so that the contents of the triangle buffer may be different from the version of FIG. 58.

The sliding mask provides that a triangle located at any triangle buffer location is guaranteed coverage competition for locations to the right and below within the confines of the sliding mask. Thus, triangle data M located at triangle buffer location (12, 6) is guaranteed coverage competition at all locations inside the sliding mask at position 558. For data M in FIG. 58, these locations are (12, 6), (13, 6), (14, 6), (15, 6), (12, 7), (13, 7), (14, 7), (15, 7), (12, 8), (13, 8), (14, 8), (15, 8), (12, 9), (13, 9), (14, 9), and (15, 9). So, whenever the sliding mask's reference point is at these triangle buffer locations, the scan-out logic guarantees coverage competition for data M. The first time that data M enters the scan-out logic pipeline is when the sliding mask is at position 553 and the last time that data M enters the scan-out logic pipeline is when the sliding mask is at position 558. The guarantee policy is for coverage competition and not necessarily for pixel generation. If that triangle wins a competition for a given pixel position, then a pixel will be generated for that winning triangle. However, a triangle that is guaranteed coverage competition may win or lose any of its competitions at all locations within the sliding mask range.

Figure 61:
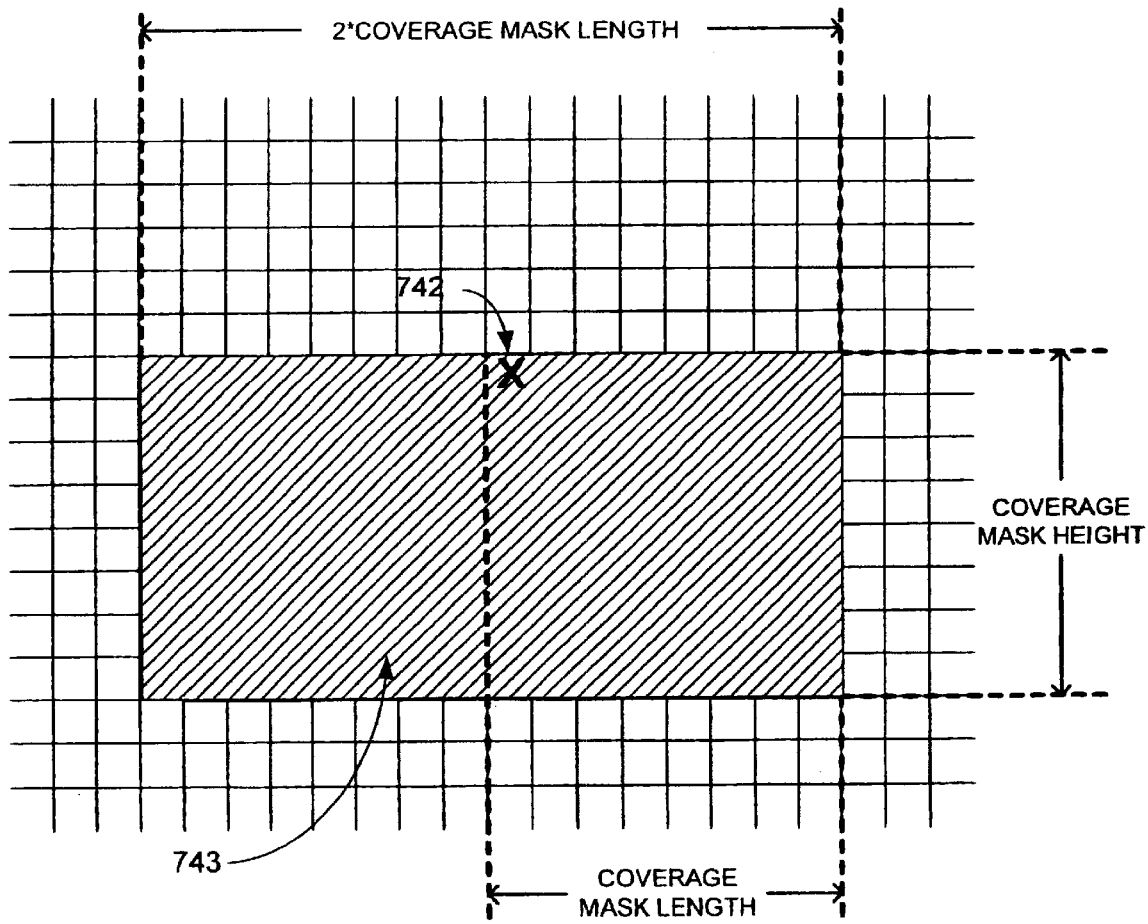
FIG. 61 illustrates the region where a given triangle is guaranteed coverage competition.

The coverage competition guarantee described above is true for the most part. The actual range of locations for which coverage competition is guaranteed is shown in FIG. 61 because of the system's use of a larger and out of phase sliding mask. For a triangle data located at location 742 (indicated by an "X"), the cross-hatched area 743 shown in FIG. 61 is the range of locations where coverage competition is guaranteed. The length of this area is twice the coverage mask length. For the right hand portion of the area beginning with the "X" location, the area has the same length as the coverage mask. For the area to the left of the "X" location, the area has a height of the coverage mask and a length of the coverage mask.

Of course, this cross-hatched area is a maximum area. When the triangle data (corresponding to the "X") is located closer to an edge of the screen or triangle buffer, less of the cross-hatched area will be guaranteed coverage competition because less of the area is available. Thus at one extreme, if the "X" location is located at the bottom right corner of the screen, only this particular location is guaranteed coverage competition because the sliding mask (and hence, the coverage competition area) does not have any other location(s) to the right, below and to the lower left of the "X" location.

Figure 60A:
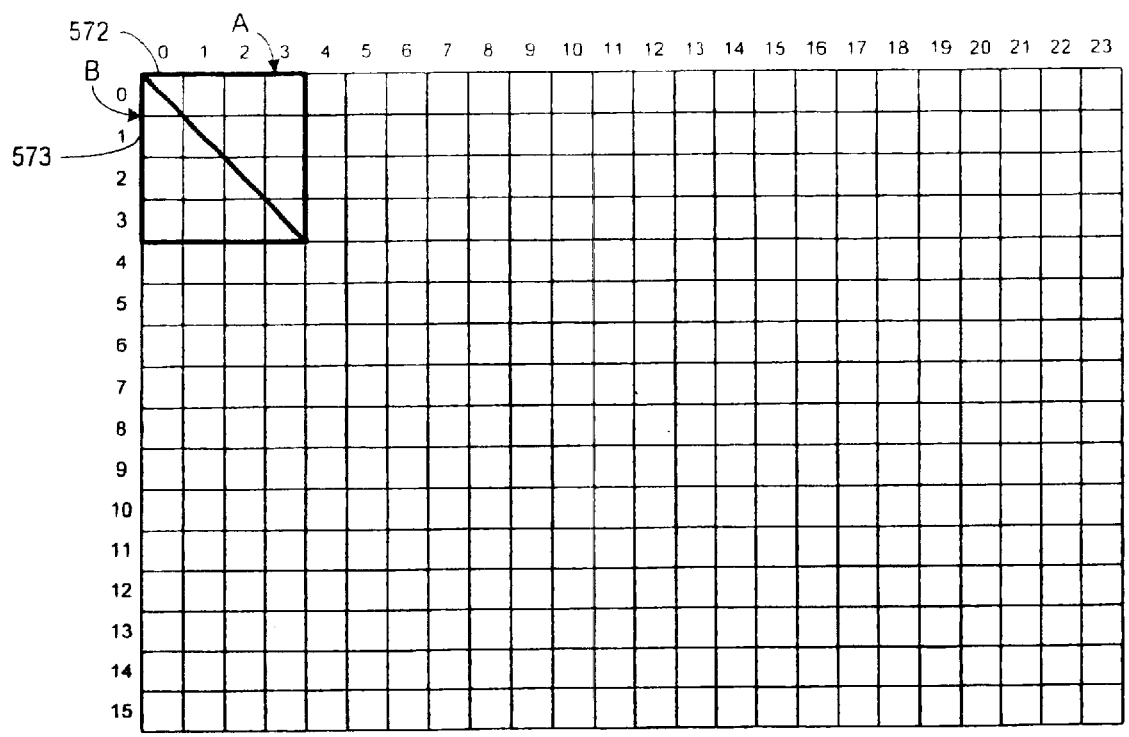
FIGS. 60(A) and 60(B) illustrate the sliding mask superimposed on an exemplary triangle buffer to illustrate why the embodiments of the present invention utilize the out of phase loading (or delayed pixel generation) scheme in accordance with one embodiment of the present invention.
Figure 60B:
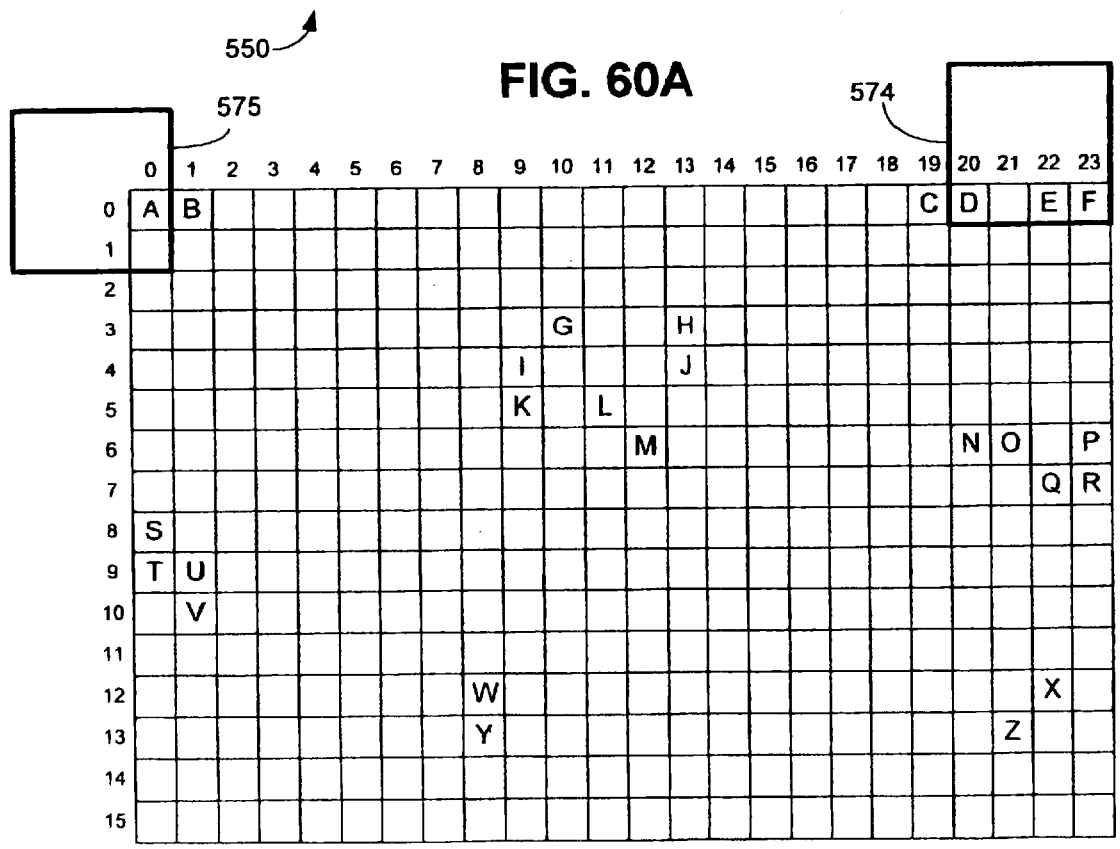

As mentioned above, the actual sliding mask used for the scan-out logic in accordance with one embodiment of the present invention is larger than the coverage mask and data are loaded out of phase with the pixel generation process. This larger and out of phase loading sliding mask is used in this embodiment to address one special case. Refer to FIGS. 60(A) and 60(B). In FIG. 60(A), triangles A and B have been received and are located at positions 572 and 573, respectively. Other triangles C to Z (not shown in FIG. 60(A) for the sake of clarity during this discussion of the special case) may also been received and processed. Assume that triangle A is at a lower z depth than triangle B. In the alternative, assume that triangle A and B are at the same z depth but triangle B was processed first. In both cases, the triangle buffer would be written as shown in FIG. 60(B). Notice that the data for triangle A is stored at location (0, 0) and the data for triangle B is stored at location (0, 1) in accordance with the triangle buffer writing scheme.

Returning briefly to FIG. 60(A), the scan-out logic should generate a pixel from triangle B for the pixel position corresponding to location (0, 1) because it is the triangle that is closest to the user (in this example, it is the only triangle at this location). Referring now to FIG. 60(B), the sliding mask is at the end of the row at position 574. At the next cycle, the scan-out logic moves the sliding mask to position 575. In this position, the scan-out logic is supposed to generate a pixel for the pixel position corresponding to location (0, 1). However, FIG. 60(B) shows that the contents of the sliding mask at position 575 include the data for triangle A only and not triangle B. This will result in triangle A winning the competition for that pixel position which is clearly erroneous; triangle B should represent the pixel for that pixel position but it is not even in the sliding mask. Only when the sliding mask moves one more column to the right does triangle B appear in the sliding mask for pixel generation at location (1, 1).

The design of the scan-out logic in accordance with one embodiment of the present invention is consistent with the triangle buffer writing scheme so that the correct set of triangle data are "in the running" for a given pixel position. If a triangle covers a particular pixel position, the scan-out logic will insure that that triangle will be competing for that pixel position unless that triangle is farther away than all the triangles that are found within the confines of the original coverage mask (remember, use of the coverage mask during the triangle buffer writing process bounds the number of triangles that may be competing for a given pixel position). The actual sliding mask that addresses the limitation discussed above will now be described.

Part Two—Actual Sliding Mask

In an actual implementation, the sliding mask has twice as many columns and the same number of rows as the coverage mask. So, if the coverage mask has dimensions 4×4, the sliding mask will have dimensions 8×4. The data for the current pixel position is also computed in the scan-out logic 4 cycles out of phase so that loading occurs 4 cycles before the computation for the current pixel position. Thus, even though the lower right corner of the sliding mask is located at a location (x, y), the scan-out logic is generating a pixel for location (x−4, y). In other words, for any given pixel position for which a data has been loaded, a pixel for that location is not generated until the sliding mask has moved four more columns to the right. For a 16×16 coverage mask, the sliding mask is 32×16 and the data are run out of phase by 16 cycles. For an 8×8 coverage mask, the sliding mask is 16×8 and the data are run out of phase by 8 cycles. So, for the example of FIG. 58, the sliding mask is 8×4 instead of 4×4.

Figure 59:
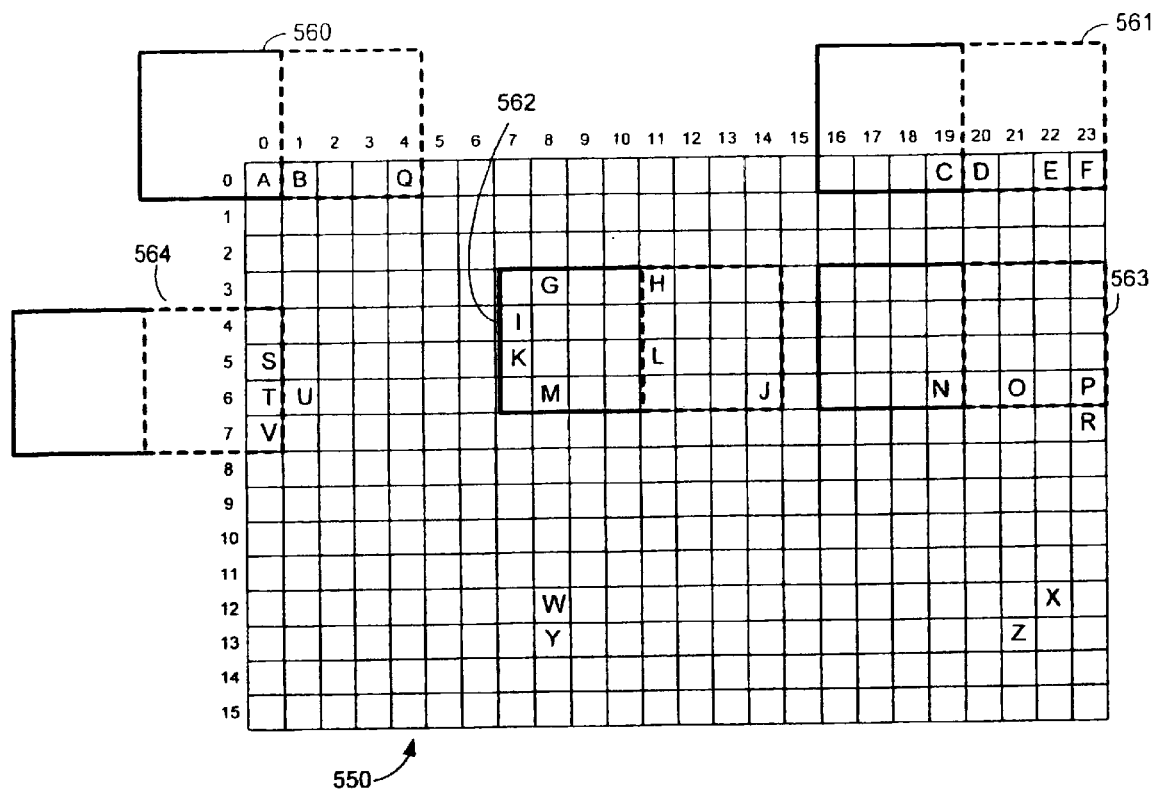
FIG. 59 shows the sliding mask superimposed on an exemplary triangle buffer to show the operation of the sliding mask in accordance with one embodiment of the present invention.

Referring now to FIG. 59, the sliding mask is shown in five different positions 560 to 564 in triangle buffer 550. In each position, such as position 562, the dotted box in the right hand side of the sliding mask represents the data that enter the sliding mask earlier and out of phase with the computation for the current pixel position. The computations for the data in the pixel positions corresponding to those out of phase locations (i.e., in the dotted line box) occur four phases later.

In FIG. 59, the sliding mask at position 560 has just received data Q at location (0, 4). The system is now prepared to process the data in the sliding mask for pixel position (0, 0). Thus, data for locations (0, 0), (0, 1), (0, 2), (0, 3), and (0, 4) are loaded in the sliding mask (i.e., array processors, to be discussed later) before the system processes the data in the same sliding mask for pixel generation at location (0, 0). Thus, at position 560, the sliding mask processes data A, B, and Q to generate a pixel for location (0, 0). More likely than not, data A will win the competition for that pixel position (0, 0).

At position 561, the sliding mask includes data C, D, E, and F, where F is the most recently loaded data into the sliding mask. However, the pixel generation computations are directed for location (0, 19), where data C is stored in the triangle buffer. Data E, F, and G had been loaded into the sliding mask fairly recently compared to data C. Similarly, for position 562, the system processes a pixel for location (10, 6) based on the competition among data G, H, I, J, K, L, and M. Data G, I, K, and M represent the oldest data in the sliding mask at this position 562 and data H, L, and J represent the most recent additions to the same sliding mask.

Although the sliding mask in FIGS. 58 and 59 appear to be solid boxes, the sliding mask actually wraps around to the next scanline when it proceeds past the end of a given scanline. Notice the sliding mask at position 563 where the lower right corner of the sliding mask is at location (23, 6). The sliding mask contains data N, O, and P where the system is performing the pixel rasterization for location (19, 6). When the sliding mask moves one column to the right, the system is preparing to process the data to generate a pixel for the next location (20, 6). However, the rightmost column of the sliding mask will not be "hanging" at the edge of the triangle buffer; rather, the rightmost column of the sliding mask has wrapped around to the beginning of the next row so that the lower right corner of the sliding mask is at location (0, 7). This wrapped-around rightmost column contains data S, T, and V. As the sliding mask originally at position 563 slides further over to the right, more of the data from the next group of rows (i.e., rows 4, 5, 6, and 7) will be included in the sliding mask. Thus, the sliding mask will never be "hanging" over the right edge of the triangle buffer or the left edge after the first row (like position 564). This out of phase sliding mask concept is implemented in the scan-out logic as described below. In another embodiment, the sliding mask fills with blanks between scanlines.

Triangle Cache

Returning to FIG. 21, the first component in the scan-out logic subsystem is the triangle cache 705. In one embodiment, the triangle cache 705 is as long as the triangle buffer (e.g., 1280 columns) and as tall as the coverage mask (e.g., 16 rows). For its purposes near the beginning of the scan-out logic pipeline, the triangle cache 705 needs to only hold the most recent N scanlines of triangle data from the triangle buffer, where N is the height of the coverage mask. In one embodiment, the triangle cache 705 always holds the most recent 16 scanlines of triangle data from the triangle buffer (for a 16×16 coverage mask). Indeed, the triangle cache 705 is identical to the triangle buffer except for the dimensions.

The system loads triangle data from the triangle buffer to the triangle cache 705 via bus 700. Data is loaded one data at a time, column by column within a row and when the end of the row is reached, the next row is then loaded column by column. Because the triangle cache is not as tall as the triangle buffer (i.e., 16 rows in the triangle cache v. 1024 rows in the triangle buffer), the triangle cache locations are recycled in round-robin fashion from the top row to the bottom row as data enters the triangle cache on bus 700.

For example, assume that the triangle cache currently holds data from triangle buffer rows 1 to 16. This implies that the last triangle cache location where a write operation was performed for a triangle data was location 565, the last column in the last row. For the next data that is located in the first column of row 17 in the triangle buffer, the system writes that next data to location 566 in the triangle cache. Thus, at this point, all locations in the first row of the triangle cache is associated with row 1 of the triangle buffer except for location 566 which is associated with data from row 17 of the triangle buffer. In other words, locations 572 in the triangle cache are unchanged from the previous cycle but the system writes a triangle data from row 17 of the triangle buffer into location 566 of the triangle cache. Similarly, the next data from row 17 of the triangle buffer will be stored at location 567. The third data from row 17 of the triangle buffer will be stored in location 568 of the triangle cache, while locations 569 still hold old data from row 1 of the triangle buffer. In later cycles, the system writes triangle data from row 18 of the triangle buffer into location 571 of the triangle cache. This round-robin top to bottom and back to the top again writing scheme of the triangle cache continues throughout the scan-out process.

In some embodiments, the triangle cache is filled by cache burst; that is, a triangle cache line can be filled with data from the triangle buffer via cache burst access. As known to those ordinarily skilled in the art, a cache line can be filled with less than the normal number of cycles. So long as the first cycle is normal (e.g., 2 clock cycles), the remaining cycles for other memory locations requires less clock cycles (e.g., 1 clock cycle). Thus, a burst cycle starts with a normal memory access which lasts for 2 clock cycles, for example, and then all remaining accesses need 1 clock cycle. Typically, burst cycles are restricted in that the amount of data to be transferred within one burst cycle must fall into a single N-byte area which starts at a N-byte boundary. If the requested data goes beyond this address area, the cache burst cycle must be split into two clock cycles. With cache burst access, an entire cache line can be filled ahead of the data being loaded into the column of coefficient evaluators.

In other embodiments, a triangle cache is not used. Data from the triangle buffer is loaded into the column of coefficient evaluators directly with the aid of an addressing logic that selects particular memory locations. Thus, for a 16×16 coverage mask and a 1280×1024 triangle buffer, an address logic that is coupled to the first coefficient evaluator at the top of the column is designed to select among rows 0, 16, 32, 48, . . . , 1264 from the triangle buffer. An address logic that is coupled to the second coefficient evaluator located second from the top of the column is designed to select among rows 1, 17, 33, 49, . . . , 1265. An address logic that is coupled to the third coefficient evaluator located third from the top of the column is designed to select among rows 2, 18, 34, 50, . . . , 1266. An address logic that is coupled to the sixteenth coefficient evaluator located at the bottom of the column is designed to select among rows 15, 31, 47, 63, . . . , 1279. Generally, for a 16×16 coverage mask, an address logic that is coupled to the $N^{th}$ coefficient evaluator located N from the top of the column is designed to select among rows N−1, N+15, N+31, N+47, . . . , 1264+(N−1). For an M×M coverage mask and a triangle buffer having R rows, an address logic that is coupled to the $N^{th}$ coefficient evaluator located N from the top of the column is designed to select among rows N−1, N+(M−1), N+(2*M−1), N+(3*M−1), . . . , R−M+(N−1).

Column of Coefficient Evaluators

As each triangle data is loaded into corresponding locations in the triangle cache, an entire column of data from the triangle cache is loaded into the column of coefficient evaluators 706 via bus 701. The column of coefficient evaluators, in accordance with one embodiment of the present invention, receives the 3D triangle data (coordinates), slope information (dx/dy for all three line segments bounding the triangle), current screen row, current column, the $b_{coeff}$ information, and the plane equations to generate 2D span information (i.e., the left and right edges of the triangle at a given row), z, and dz information. The column of coefficient evaluators generates the span information to the array processors so that the array processors can determine whether the current pixel position for which a pixel is being rasterized is inside or outside the various competing triangles. The column of coefficient evaluators also provides the z and dz information so that the array processors can calculate the z depth at every given pixel position so that the z competition among the various competing triangles can be resolved at the next set of stages. Given one z value at a pixel position and the dz information, the z value at other pixel positions can be interpolated. The column of coefficient evaluators also receives a tag, which is not used for any calculation but serves soley to identify the particular triangle as it makes its way down the pipeline to the array of z-interpolator processors, the image composition network, and the shader/texture mapper.

In some embodiments, the triangle cache is filled by cache burst; that is, a triangle cache line can be filled with data from the triangle buffer via cache burst access. As known to those ordinarily skilled in the art, a cache line can be filled with less than the normal number of cycles. Thus, with cache burst access, an entire cache line can be filled ahead of the data being loaded into the column of coefficient evaluators. In these embodiments, a particular triangle cache location may have been filled several cycles ago even though the system is just now loading data from that triangle cache location into the column of coefficient evaluators.

Coefficient Evaluator—Concept

For an explanation of the conceptual basis of a single coefficient evaluator in the column of coefficient evaluators, refer to FIG. 57. During the scan-out rasterization process, each pixel location is processed one at a time. In one embodiment, the system proceeds left to right and top to bottom; the system proceeds from one column to the next column within a row and at the end of the row, the system proceeds to the beginning column of the next row. The system always knows which column and row location for which the pixel generation process is being conducted. At any given location, the system determines whether a triangle provides any coverage. It accomplishes this task by using the left and right span information. If the current location is inside any triangle, the z value for these triangles at this location will be calculated and passed on to the image composition network to resolve the triangle z depth competition. If the current location is outside any triangle, that triangle will no longer be in the running for the z depth triangle competition because, after all, the triangle does not cover that location anyway.

FIG. 57 shows a grid for pixel locations. Rows A to G are some exemplary rows in the grid. Columns H, J, K, and L are some exemplary columns in the grid. Assume a coordinate o system where a point on the top is greater than a point on the bottom and a point on the right is greater than a point on the left. FIG. 57 also shows a triangle 151 of arbitrary shape, size, and orientation. It is located at the screen space as shown based on its coordinates. It also has slopes associated with each of its edges—$grad_0$ for the slope of the edge formed by coordinates $(x_0, y_0, z_0)$ and $(x_1, y_1, z_1)$, $grad_1$ for the slope of the edge formed by coordinates $(x_1, y_1, z_1)$ and $(x_2, y_2, z_2)$, and $grad_2$ for the slope of the edge formed by coordinates $(x_0, y_0, z_0)$ and $(x_2, y_2, z_2)$.

If the current location for which a pixel is being generated by the scan-out logic is located anywhere on row A, such as the location at the intersection of row A and column H (i.e., location (H, A)), no span information can be generated for this triangle because no part of this triangle is located on this row. The same applies to row G.

If the current location is located anywhere on rows B or F, the span information is such that the left and right edges will be the same point. At row B, the point $(x_0, y_0, z_0)$ represents both the left and right edges. At row F, the point $(x_2, y_2, z_2)$ represents both the left and right edges. This is a special case and the determination of whether the current location is inside or outside the triangle is based on whether the current location coincides with the coordinates of this point of the triangle.

If the current location is located anywhere on rows C, D, or E, the span information can be generated. For row C, the left edge is $left_C$ and the right edge is $right_C$. For row D, the left edge is $left_D$ and the right edge is $right_D$. For row E, the left edge is $left_E$ and the right edge is $right_E$. Thus, the span includes the left and right edges of the triangle at a given row.

How does the system determine the left and right edges? If the row associated with the current location is located at or above the row associated with the middle vertex at coordinates $(x_1, y_1, z_1)$, the gradient or slope $grad_0$ is used to determine one of the edges. If the row associated with the current location is located below the row associated with the middle vertex at coordinates $(x_1, y_1, z_1)$, the gradient or slope $grad_1$ is used to determine one of the edges. The other edge is determined by using the slope $grad_2$. Whichever of the two edges is lower is the left edge and the other edge is thus the right edge.

Given the span information, the system can also determine if the current location is inside or outside the triangle. If the current location is located anywhere on columns H or J, regardless of the row, the current location is outside the triangle and that triangle will not be competing for coverage at that location. If the current location is located anywhere along columns J or K, the current location may or may not be inside the triangle; the row information is needed to finally resolve this. Thus, if the current location is (J, C), the system determines that the current location is less than or equal to the left edge $left_C$ and thus, the current location is outside the triangle and that triangle will not win any z depth triangle competitions. If, on the other hand, the current location is (J, D), the system determines that the current location is greater than or equal to the left edge $left_D$ and less than or equal to the right edge $right_D$ and thus, the current location is inside the triangle and that triangle's z depth at that location (J, D) will be calculated and passed on to the image composition network for the z depth triangle competition. Whether this particular triangle wins or not for location (J, D) depends on whether other triangles also cover this location and at what z depth.

For the z depth information, the plane equation described earlier in this patent specification is used. This plane equation $dz*(x-x_0)+b_{coeff}*(y-y_0)+z_0=z$ is implemented in a manner such that if the current location is outside the triangle, the z at the left edge of the triangle is used and if the current location is inside the triangle, the actual z value at that location of the triangle is used. This initially calculated z value is used in subsequent cycles for interpolating the z value at various selected locations on the triangle as necessary.

In sum, the coefficient evaluator generates the span, z, and dz information. The span information includes the left and right edges of the triangle at the current row. Thus, depending on the shape and orientation of the triangle, the left and right edges of the same triangle may differ as the system progresses from one row to another during rasterization. The left and right edges will be used to determine if the current pixel location for which a pixel is being generated is inside or outside any of the competing triangles for that location. If the current pixel location is inside that triangle, that triangle will remain in the running for the z comparison competition later in the image composition network. If the current pixel location is outside that triangle, that triangle will effectively be out of the running because, after all, that triangle is not visible at that pixel location anyway so it should not win any z comparison competition.

Coefficient Evaluator—Hardware Implementation

Figure 55:
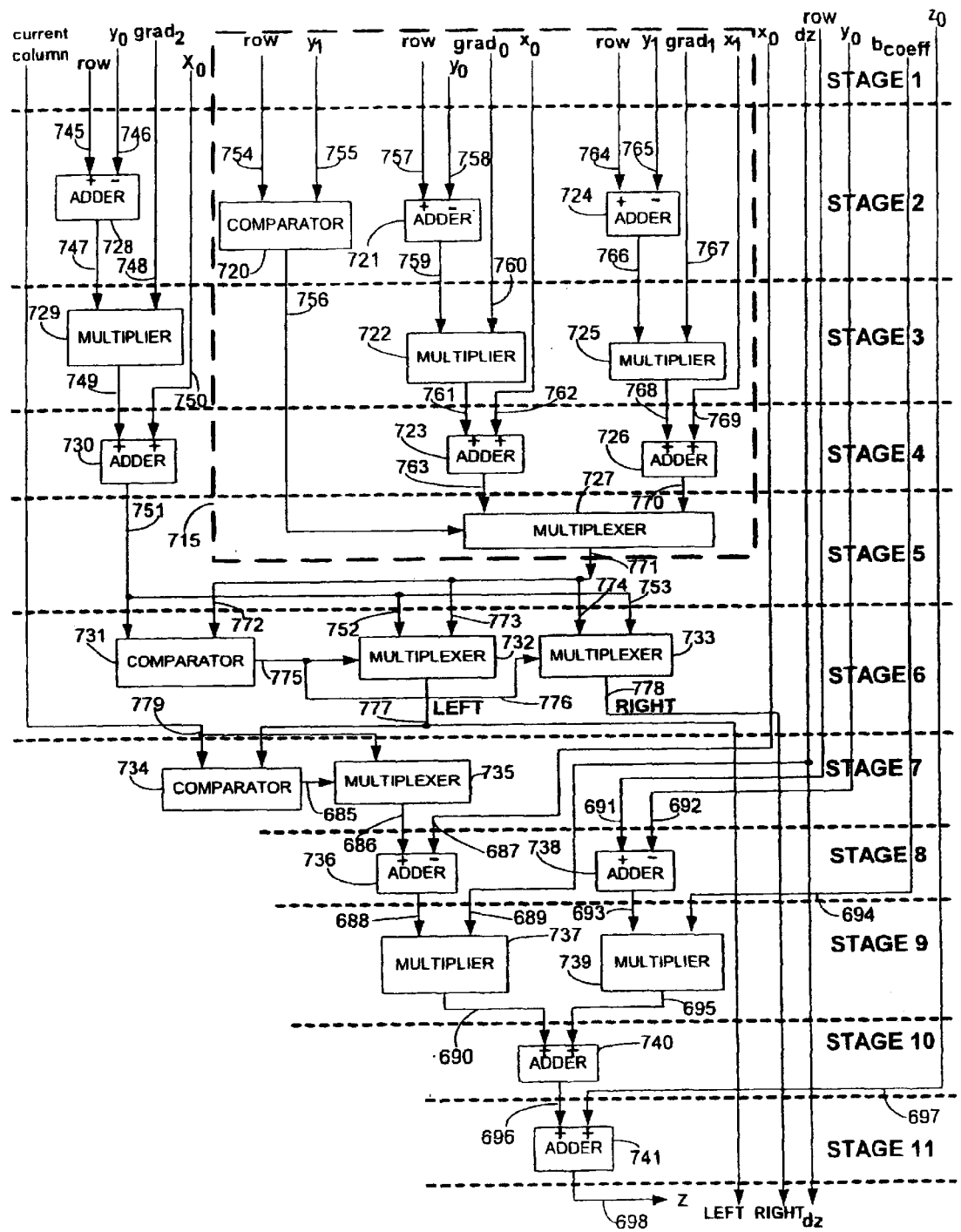
FIG. 55 shows a coefficient evaluator in accordance with one embodiment of the present invention.
Figure 56:
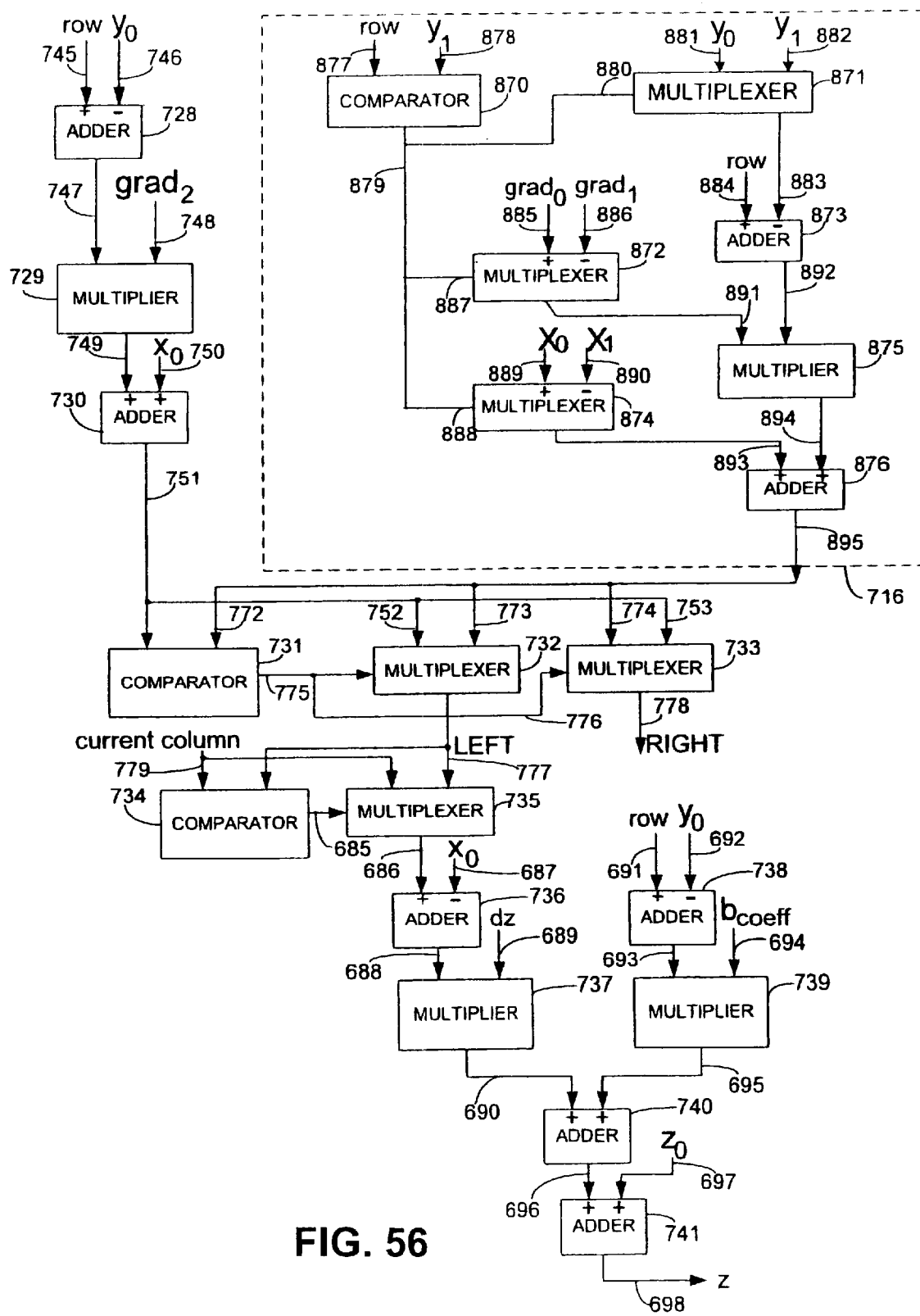
FIG. 56 shows a coefficient evaluator in accordance with another embodiment of the present invention.

The hardware implementation details for a single coefficient evaluator in the column of coefficient evaluators will now be discussed. One embodiment of the coefficient evaluator of the present invention is shown in FIG. 55. An alternative embodiment shown in FIG. 56 uses more multiplexers. The only difference between the two embodiments is the portion inside the dotted line 715 (FIG. 55) and 716 (FIG. 56).

In the first embodiment of FIG. 55, the coefficient evaluator uses the current row (corresponding to the current data being loaded in the triangle cache which is several cycles ahead of the pixel location), current column (corresponding to current pixel location), $x_0$, $x_1$, $y_0$, $y_1$, $z_0$, $grad_0$, $grad_1$, $grad_2$, dz, and $b_{coeff}$ to generate the left edge (LEFT), the right edge (RIGHT), z, and of course, dz. The left edge, labeled as LEFT, is output at line 777 by a multiplexer 732. The right edge, labeled as RIGHT, is output at line 778 by a multiplexer 733. The z value is output at line 698 by adder 741. The dz information is provided at line 689 and is passed on to the array of z-interpolator processors.

First, a first and second edges will be calculated and thereafter, a left and right edges will be determined based on the calculated first and second edges. Second, the z value is determined and assigned for this triangle at this current location. For the edge determination, the portion of the coefficient evaluator of FIG. 55 located above output line 751 determines an edge (either left or right) using the slope $grad_2$. Let's call this edge the first edge. In FIG. 57, the edge that corresponds to the slope $grad_2$ is the right edge because of the spatial orientation of the triangle. However, that triangle could have been oriented such that the left edge is defined by the slope $grade_2$. The second edge must also be determined. Two edge values will be calculated as Candidates for the second edge. The portion of the coefficient evaluator of FIG. 55 located above Output line 763 determines an edge (either left or right) using the slope $grad_0$ if the current row (corresponding to the current data being loaded in the triangle cache which is several cycles ahead of the pixel location). Alternatively, the portion of the coefficient evaluator of FIG. 55 located above output line 770 determines an edge (either left or right) using the slope $grad_1$ if the current row (corresponding to the current data being loaded in the triangle cache) intersects with this edge instead of the edge associated with $grad_1$. In FIG. 57, the edge that corresponds to the slope $grad_0$ or slope $grad_1$ is the left edge because of the spatial orientation of the triangle. One of these two edge candidates will be selected as the second edge. Returning to FIG. 55, the portion of the coefficient evaluator that determines which edge (i.e., $grad_0$ or $grad_1$) is applicable is located above the output line 756. Thus, the output at line 751 represents the first edge and the output at line 771 represents the second edge. The lower of the two edges is the left edge and the other edge is the right edge.

For the first edge, the x-coordinate edge value is output at line 751. The coordinate $y_0$ on line 745 is subtracted from the current row (y-coordinate) on line 746 by adder (subtractor) 728. The output of this adder 728 on line 747 is multiplied with the slope $grad_2$ on line 748 by multiplier 729. The multiplied output on line 749 is added to coordinate $x_0$ on line 750 by adder 730. Adder 730 outputs the edge value at line 751. Later, if this edge value is less than or equal to the other edge calculated by another portion of the coefficient evaluator, then this edge value is the left edge (or LEFT); otherwise, this edge value is the right edge (or RIGHT). This concludes the calculation of the first edge.

One candidate for the second edge is the output on line 763 while the other candidate is the output on line 770. One of these two candidates will be selected as the second edge (either left or right) to the first edge on line 751. First, the hardware design for determining the output on line 763 will be described. An adder 721 receives the current row (y-coordinate) on line 757 and the $y_0$ coordinate on line 758 and subtracts $y_0$ from the current row (y-coordinate). The output of the adder 721 is provided on line 759. A multiplier 722 receives the value on line 759 and the slope $grad_0$ on line 760 and multiplies them together to generate an output on line 761. An adder 723 receives this multiplier output on line 761 and the $x_0$ coordinate on line 762 and generates an added result on line 763. This result on line 763 is one of two candidates for the second edge value.

Next, the hardware design for determining the output on line 770 will be described. An adder 724 receives the current row (y-coordinate) on line 764 and the $y_1$ coordinate on line 765 and subtracts $y_1$ from the current row (y-coordinate). The output of the adder 724 is provided on line 766. A multiplier 725 receives the value on line 766 and the slope $grad_1$ on line 767 and multiplies them together to generate an output on line 768. An adder 726 receives this multiplier output on line 768 and the $x_1$ coordinate on line 769 and generates an added result on line 770. This result on line 770 is the other of the two candidates for the second edge value.

For selection of one of these two candidate edges for the second edge, a select signal on line 756 is generated by the comparator 720 to a multiplexer 727. This select signal indicates whether the current row (y-coordinate) intersects the edge associated with $grad_0$ or $grad_1$. If $grad_0$ is applicable, the control signal on line 756 selects the x-coordinate value on line 763. If $grad_1$ is applicable, the control signal online 756 selects the x-coordinate value on line 770. For this select signal, the current row (y-coordinate) on line 754 is provided to comparator 720. The other input to the comparator 720 is the coordinate $y_1$ on line 755. Comparator 720 determines if the current row (y-coordinate) is greater than or equal to the coordinate $y_1$, and if so, the select signal on line 756 will be such that the multiplexer 727 will output on line 771 the x-coordinate edge value from line 763. Otherwise, the current row (y-coordinate) is less than the coordinate $y_1$, and the select signal on line 756 will be such that the multiplexer 727 will output on line 771 the x-coordinate edge value from line 770. This concludes the calculation of the second edge.

The left and right edges will now be determined from the first and second edges. The output on line 751 provides the first edge. The output on line 771 provides the second edge. These outputs are provided to a comparator 731, along with a multiplexer 732 (via lines 752 and 773) and another multiplexer 733 (via lines 774 and 753). A comparator 731 compares the first edge and the second edge to determine which is lesser. If the first edge is less than the second edge, a select signal is provided to the multiplexers 732 and 733 via lines 775 and 776, respectively, so that the multiplexer 732 will output the first edge from line 752 to line 777 as the LEFT edge, and the multiplexer 733 will output the second edge from line 774 to line 778 as the RIGHT edge. If, however, the first edge is not less than the second edge, a select signal is provided to the multiplexers 732 and 733 via lines 775 and 776, respectively, so that the multiplexer 732 will output the second edge from line 773 to line 777 as the LEFT edge, and the multiplexer 733 will output the first edge from line 753 to line 778 as the RIGHT edge.

Having determined the left and right edges, the coefficient evaluator will determine and assign the z value for the triangle at this current location. If the current location is outside the triangle (i.e., less than the left edge), the coefficient evaluator generates a z value from the left edge. If the current location is inside the triangle, the coefficient evaluator generates an actual z value from the current location. In generating the z value, the coefficient evaluator implements the plane equation $dz*(x-x_0)+b_{coeff}*(y-y_0)+z_0=z$.

A comparator 734 receives the current column (x-coordinate) on line 779 and the LEFT edge on line 777. A multiplexer 735 receives a select signal on line 685 from the comparator 734 along with the same LEFT and current column (x-coordinate) information as the comparator 734. If the current column (x-coordinate) is less than or equal to the LEFT edge, the comparator 734 generates a select signal on line 685 which indicates that the LEFT edge should be used as the x-coordinate for the z depth calculation. Thus, multiplexer 735 generates as its output on line 686 the LEFT edge information from line 777. If the current column is greater than the LEFT edge, the comparator generates a select signal on line 685 which indicates that the current location should be used as the x-coordinate for the z depth calculation. Thus, multiplexer 735 generates as its output on line 686 the current column information from line 779.

Adder 736 receives this x-coordinate information (either LEFT edge or current location) on line 686 and subtracts the $x_0$ coordinate on line 687 to output a result on line 688. A multiplier 737 receives the result on line 688 and the dz value on line 689 and multiplies them together to generate a result on line 690. In parallel to these operations, an adder 738 receives the current row (x-coordinate) on line 691 and subtracts the $y_0$ coordinate on line 692 to output a result on line 693. A multiplier 739 receives the result on line 693 and the $b_{coeff}$ value on line 694 and multiplies them together to generate a result on line 695.

An adder 740 adds the results on lines 690 and 695 and generates an output on line 696. Another adder 741 adds that output on line 696 and the $z_0$ coordinate on line 697 and generates the z value on line 698. This z value represents the z depth value at either the LEFT edge (if the current location is outside the triangle) or the current location (if the current location is inside the triangle). This z value is also the initial z value provided by the coefficient evaluator to the array of z-interpolator processors as the latter calculates (or interpolates) the z value at every subsequent location for a given triangle.

In another embodiment of the present invention, the portion of the coefficient evaluator that is located within the dotted line 715 of FIG. 55 is altered as shown in the dotted line 716 of FIG. 56 represents one embodiment of the present invention. The implementation within the dotted line 716 of FIG. 56 uses more multiplexers than the embodiment of FIG. 55. In the following discussion, only the dotted line portion 716 will be described as all other components and signals are identical to that of FIG. 55.

In FIG. 56, a multiplexer 871 receives two inputs $y_0$ and $y_1$ on lines 881 and 882, respectively. Similarly, a multiplexer 872 receives two inputs $grad_0$ and $grad_1$ on lines 885 and 886, respectively. Also, a multiplexer 874 receives two inputs $x_0$ and $x_1$ on lines 889 and 890, respectively. These three multiplexers 871, 872, and 874 are controlled by a select signal which is generated by comparator 870. The comparator 870 receives the current row (y-coordinate) on line 877 and the $y_1$ coordinate on line 878. Based on the comparison, the comparator 870 generates a select signal on line 880 (and 879, 887, and 888) such that if the current row is greater than or equal to the $y_1$ coordinate, multiplexer 871 will output $y_0$ on line 883, multiplexer 872 will output $grad_0$ on line 891, and multiplexer 874 will output $x_0$ on line 893. On the other hand, if the current row is less than the $y_1$ coordinate, multiplexer 871 will output $y_1$ on line 883, multiplexer 872 will output $grad_1$ on line 891, and multiplexer 874 will output $x_1$ on line 893.

Adder 873 receives the current row on line 884 and subtracts either $y_0$ or $y_1$ on line 883. A multiplier 875 receives the output of the adder 873 on line 892 and the output of the multiplexer 872 on line 891 and multiplies them together to generate an output on line 894. An adder 876 then adds the value on line 894 with the output of the multiplexer 874 on line 893 to generate a result on line 895. This value on line 895 represents the second edge which will be compared to the first edge in comparator 731 to determine which of the first and second edges is the left edge and the right edge.

Pipelining is also employed in the coefficient evaluator in one embodiment of the present invention. The different pipeline stages are shown by the eleven dotted lines running horizontally across the coefficient evaluator in FIG. 55. In one embodiment, a register or buffer may be placed where the dotted lines intersect the circuit lines. With pipelining, different stages process data associated with different triangles and different pixel locations concurrently. At one end of the pipeline stages, one set of data (i.e., current screen row, current column, $x_0$, $x_1$, $y_0$, $y_1$, $z_0$, $grad_0$, $grad_1$, $grad_2$, dz, and $b_{coeff}$) associated with a particular triangle and pixel location enters the coefficient evaluator from the triangle cache (or triangle buffer) at stage 1. At the other end of the pipeline stages, the LEFT, RIGHT, z, and dz information associated with a given triangle and pixel location are output at stage 11. Thus, as a given set of data enters the coefficient evaluator at stage 1, the final LEFT, RIGHT, z, and dz results for that set of data are output to the array of z-interpolator processors 10 stages later, at stage 11. In between the first and last stages, the different stages process different data concurrently. For example, as one set of data associated with one triangle and a pixel location is processed at stage 4, another set of data associated with another triangle and an immediately previous pixel location is processed concurrently at stage 5.

The same pipelining concept is used for the embodiment shown in FIG. 56. The portion of the coefficient evaluator within the dotted line 716 differs from that of FIG. 55 but the pipelining implementation detail is analogous. The stages are roughly similar. One ordinarily skilled in the art would know where to draw the different lines for the different stages.

This coefficient evaluator is a single unit that receives a set of triangle data from a single cache location. If no triangle cache is employed, each coefficient evaluator receives a set of triangle data from a single triangle buffer location. Thus, in FIG. 21, each coefficient evaluator such as coefficient evaluator 743 or 744, handles one set of triangle data which includes $x_0$, $x_1$, $y_0$, $y_1$, $z_0$, $grad_0$, $grad_1$, $grad_2$, dz, and $b_{coeff}$ along with the current row (y-coordinate location) and current column (x-coordinate location). For a column of triangle cache locations as discussed above with respect to FIGS. 21 to 25, multiple coefficient evaluators will be used. Indeed, a column of coefficient evaluators will be used so that a column of data from the triangle cache (or triangle buffer) can be loaded into the coefficient evaluators concurrently. This concludes the discussion of the two embodiments of the coefficient evaluator hardware.

Array of Z-Interpolator Processors

The array of z-depth interpolator processors includes massively parallel arithmetic engines. These engines perform the triangle-to-pixel conversion operation to produce depth values simultaneously for each triangle associated with the current pixel as the display screen is scanned. All depth values for the current pixel are compared to select the "closest" triangle as the visible surface for each pixel in turn. Thus, as the triangles are processed out of the triangle buffer and triangle cache, the array of z depth interpolators determines the z value of all potentially visible triangles for a given screen space pixel position without resolving which triangle has the lowest z value. Then an image composition network determines which triangle contains the visible pixel through comparisons of z values. The RGB value and other properties of the pixel to be displayed may then be determined from knowledge of the visible triangle. Only a single surface (i.e., triangle) may be represented at a given pixel assuming that transparency and anti-aliasing are not provided. As known to those skilled in the art, aliasing occurs when analog images are digitized, resulting in a rough or jagged appearance. Anti-aliasing is a technique which smooths out the roughness by blending the image's edge colors with the background. This has the effect of making the image appear to have a much higher resolution.

In FIG. 21, the array of z-interpolator processors 707 is a single instruction multiple data (SIMD) array having dimensions 32×16. Because this array is a SIMD array, all processors in the array are identical to each other but may generate different results based on the input data. Each processor in the array, such as processor 717, 718, and 719 in FIG. 21, has a set of inputs and a set of outputs. Each set of inputs is coupled to each coefficient evaluator in the column of coefficient evaluators 706. Each set of outputs is coupled to a corresponding input of the image composition network 708. So, for a 32×16 array, 512 sets of outputs are provided.

Regardless of whether data is loaded into the array, each processor functions in accordance with its design. If data is provided, each processor processes the data in accordance with its design and generates a set of results to the image composition network 708 at each cycle (or cycles depending on the design). Even if no data is provided to the array after the initial data loading, the processor continues to process the data (which may have changed internally in the processor) to generate new results. In one embodiment of the present invention, feedback is employed in each processor so that after data is initially loaded into the processor, the set of data that the processor uses changes every cycle (or cycles).

The dimensions of the array may vary depending on the size of the coverage mask. A n×m coverage mask would require an array of z-interpolator processors having dimensions 2n×m. This means that if n×m is 16×16, the array would be 32×16 and will include 512 individual processors.

The array of z-interpolator processors 707 receives the 2D spans (i.e., left and right edges of each triangle), z, and dz information from the column of coefficient evaluators 706 via bus 702 to interpolate z depth information for various triangles within the sliding mask, as described above. If a triangle data is not loaded into the array, the array does not process any z depth information for that triangle. The z depth interpolation is performed for each pixel location during rasterization; that is, the array interpolates the z values of all triangles that are competing for a given pixel location. The span information is used to determine whether the current pixel position for which a pixel is being rasterized is inside or outside the various competing triangles. The z and dz information are used to calculate the z depth information at any given pixel position. In short, each z interpolator processor generates a z value for a given triangle for the current pixel position.

Figure 26:
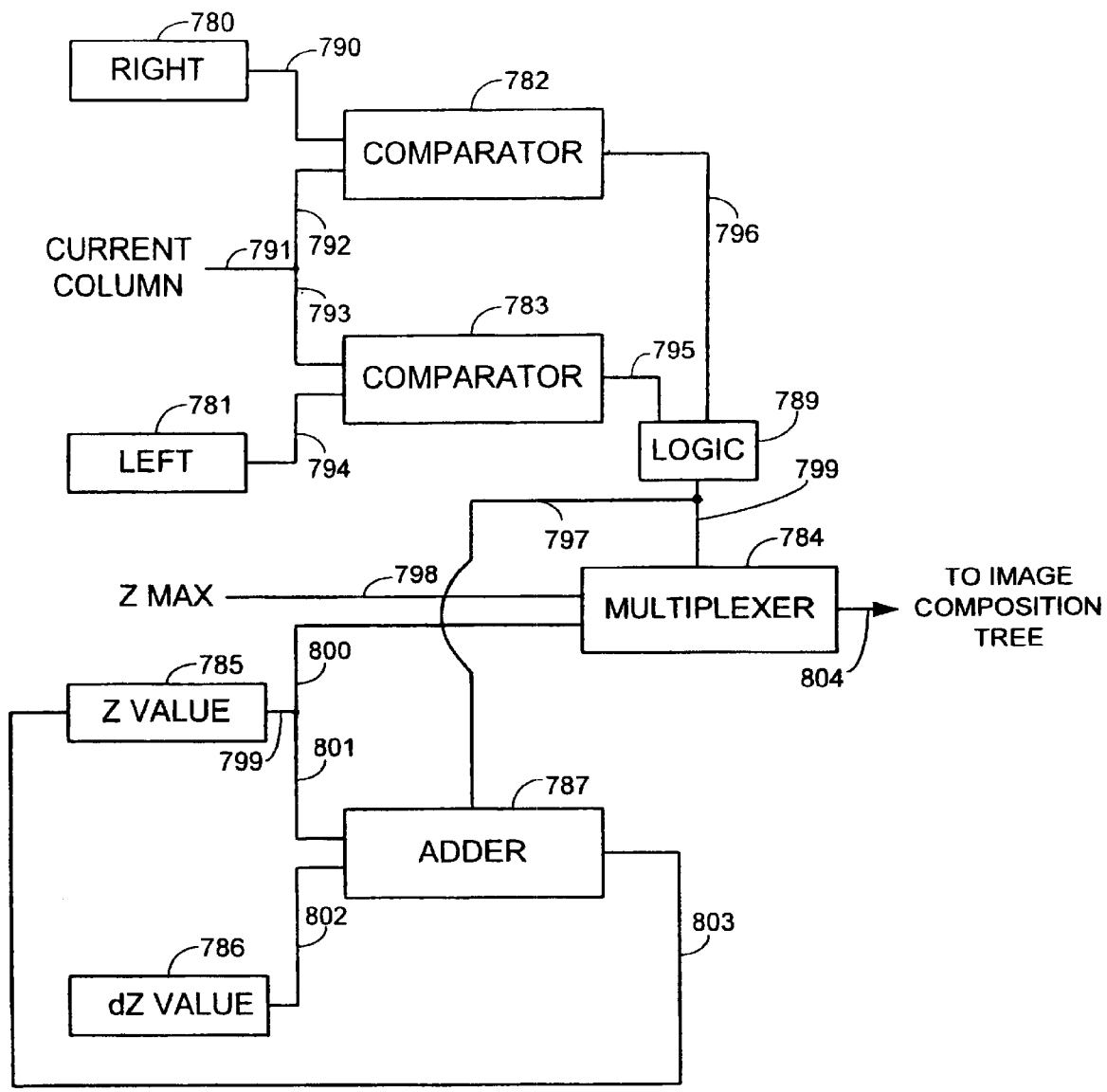
FIG. 26 shows a single z-interpolator processor in the array of z-depth interpolator processors in accordance with one embodiment of the present invention.

A single z-interpolator processor in accordance with one embodiment of the present invention is shown in FIG. 26. The z-interpolator processor uses four registers to hold and process the coefficient evaluator outputs (LEFT, RIGHT, z, and dz). The system also provides the current column (x-coordinate of the current location) to the z-interpolator processor. The right edge value from line 777 of a coefficient evaluator (FIGS. 55 and 56) can be written to a right register 780 in FIG. 26. The left edge value from line 778 of the same coefficient evaluator (FIGS. 55 and 56) can be written to a left register 781 in FIG. 26. The z value from line 698 of the coefficient evaluator (FIGS. 55 and 56) can be written to the z value register 785 in FIG. 26. Finally, the dz value from line 689 of the coefficient evaluator (FIGS. 55 and 56) can be written to the dz value register 786 in FIG. 26.

Comparator 782 receives the right edge value from register 780 via line 790 and the current column information via lines 791 and 792. Comparator 782 compares the right edge value with the current column information and if the current column is greater than right edge value, comparator 782 generates a logic "1" on line 796. Otherwise, if the current column is less than or equal to the right edge value, the comparator 782 generates a logic "0" on line 796. Thus, the comparator 782 generates a logic "1" signal whenever the current column is outside the span of the triangle at that row.

Comparator 783 receives the left edge value from register 781 via line 794 and the current column information via lines 791 and 793. Comparator 783 compares the left edge value with the current column information and if the current column is less than left edge value, comparator 783 generates a logic "1" on line 795. Otherwise, if the current column is greater than or equal to the left edge value, the comparator 783 generates a logic "0" on line 795. Thus, the comparator 783 generates a logic "1" signal whenever the current column is outside the span of the triangle at that row.

These comparator signals on lines 795 and 796 are provided to logic 789, which may be a logic unit (which is more complex than a simple OR gate) which generates a logic "1" on line 799 (and hence, 797) whenever any of its inputs is a logic "1" The output of the logic 789 is provided to multiplexer 784 and adder 787. This output on line 799 controls whether the multiplexer 784 will output a $z_{max}$ or the actual interpolated z value. The same output on line 797 enables and disables the adder 787.

Multiplexer 784 receives a $z_{max}$ value via line 798 and the current z interpolated value via line 800. If, as evaluated above by the comparators 782 and 783 and the logic 789, the current column is outside the span of the triangle at that row, the multiplexer 784 outputs the $z_{max}$ value on line 804. However, if the current column in inside the span of the triangle at that row, the multiplexer 784 outputs the interpolated z value on line 804. A $z_{max}$ value for a triangle on line 804 to the image composition virtually assures that that triangle will not win the competition for the current pixel position against other triangles. If the multiplexer 784 outputs an interpolated z value to the image composition network, the triangle associated with that interpolated z value may win the competition against other triangles if it has the lowest z value.

The z interpolation portion of the processor is as follows. The z value from line 698 of the coefficient evaluator (FIGS. 55 and 56) can be written to the z value register 785 in FIG. 26. Also, the dz value from line 689 of the coefficient evaluator (FIGS. 55 and 56) can be written to the dz value register 786 in FIG. 26. The z value in the register 785 is provided to the multiplexer 784 via lines 799 and 800 and ultimately to the image composition network if the current location is inside the span of the triangle associated with this z value.

An adder 787 receives the z value in register 785 via lines 799 and 801 and the dz value in register 786 via line 802, adds them together, and outputs the result on line 803. The result on line 803 is fed back to the z value register where the result writes over the existing value in the register 785. Thus, as the system proceeds from one pixel location to another, the z value register outputs the new interpolated z value from the incremental z value (dz) in register 786, the adder 787, and the feedback line 803. In this manner, for every new pixel location, a new z value can be interpolated from the previous z value from the previous pixel location and the incremental z value (dz).

The adder does not function all the time. If the current location for which a pixel is being generated is outside the span of the given triangle, the adder 787 is disabled so that the addition operation is not performed. So long as the current location is outside the span, the z value register 785 will hold the z value of the left edge of the triangle, as originally provided on line 698 of FIG. 55. This allows the processor to prepare for the interpolation operation with the adder 787, the dz value in register 786, and the feedback line 803 so that as soon as the current location is inside the span of the triangle at that row, the interpolation operation can be performed.

Each z-interpolator processor gets written over with new data in round robin fashion. When it's not being written over, it calculates new z values if the current location is inside the span. Sometimes, a z-interpolator processor that has data for a particular triangle can be written over with data from the same triangle but with a new z value.

In sum, each z-interpolator processor in the array processes the span, z, and dz information for a given triangle. If the current location for which a pixel is being generated is within the span (i.e., inside the triangle), the processor outputs the interpolated z value for that location to the image composition network. If, however, the current location is outside the span (i.e., outside the triangle), the processor outputs a $z_{max}$ value which ensures that the triangle associated with this $z_{max}$ value will lose the z comparison competition in the image composition network.

Image Composition Network

The image composition network 708 of FIG. 21 ultimately determines the winning triangle for each pixel location. The image composition network 708 receives the interpolated z depth information from the array processors 707 via bus 703 to perform the z depth comparisons.

Figure 27:
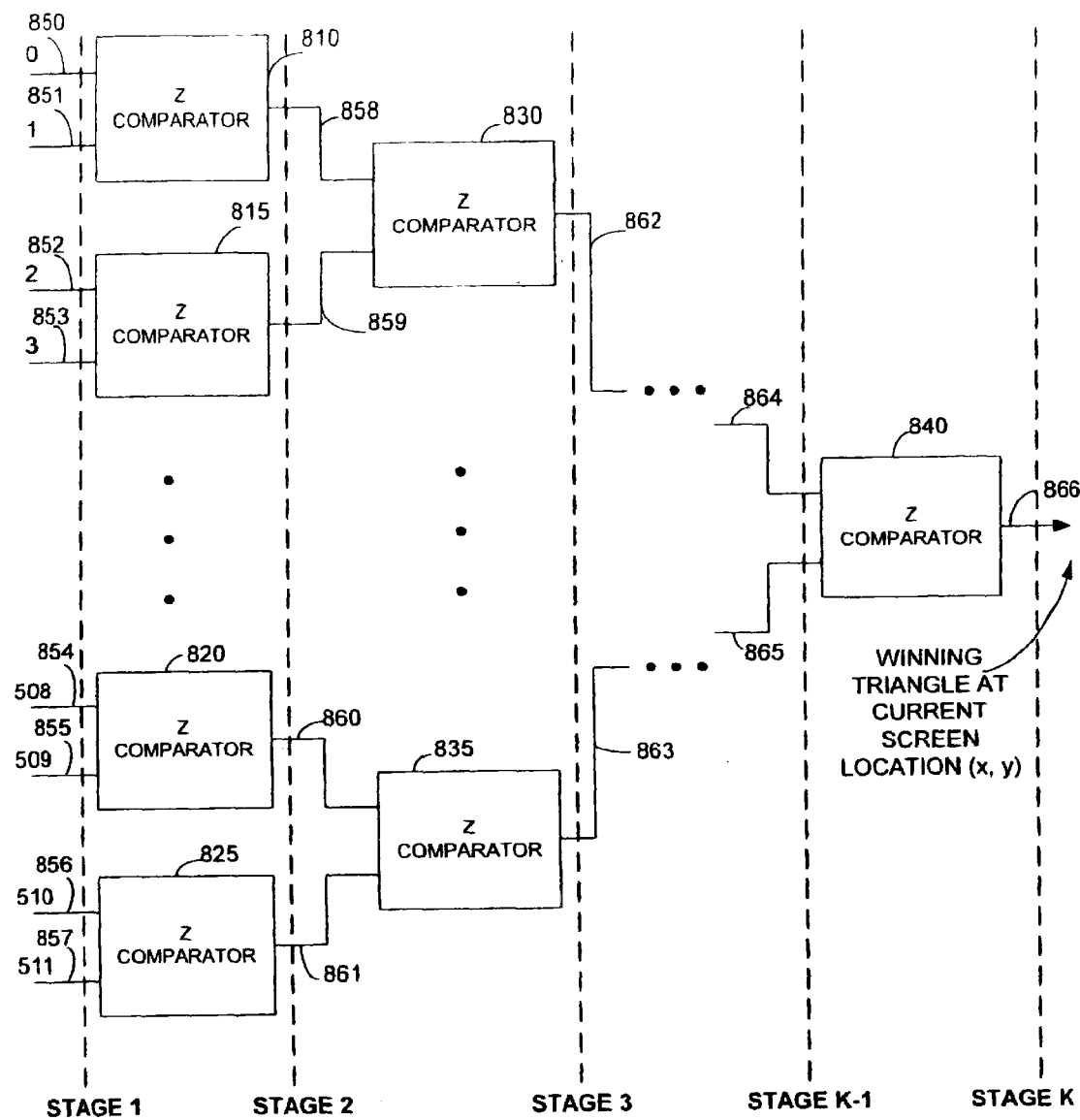
FIG. 27 shows an image composition network in accordance with one embodiment of the present invention.

Referring to FIG. 27, the image composition network is a series of comparators structured in the form of a tree. For a N×M array of z-interpolator processors, the image composition network has N*M inputs. At the first stage, each comparator couples a pair of inputs and compares them to each other to generate an output. At the next stage, each comparator couples a pair of outputs from the previous stage and generates another output. This continues from one stage to the next until only one comparator remains to couple and compare the last two inputs to ultimately generate the single output that represents the triangle with the lowest z value. This last comparator generates the lowest z value from among the original N*M z values output from the array of z-interpolator processors. The triangle associated with this lowest z value is the winning triangle for the given pixel position.

In FIG. 27, if N*M z values are output from the N×M array of z-interpolator processors, the image composition network has N*M inputs. Thus, inputs 850 to 857 represent some of the N*M inputs to the image composition network. Comparator 810 pairs inputs 852 and 853 together and generates the lower z value on line 859. Comparator 820 pairs inputs 854 and 855 together and generates the lower z value on line 860. Comparator 825 pairs inputs 856 and 857 together and generates the lower z value on line 861. These are some exemplary comparators for the first stage. If the network is larger, more comparators and inputs will be implemented.

For the next stage, comparator 830 pairs inputs 858 and 859 together and generates the lower z value on line 862. Comparator 835 pairs inputs 860 and 861 together and generates the lower z value on line 863. Of course, as stated above, larger networks will use more comparators to handle more z values. This completes the second stage.

For the final stage, comparator 840 pairs inputs 864 and 865 together and generates the lower z value on line 866. The z value on line 866 represents the lowest z value from among the z values originally input to the image composition network at the first stage at the given pixel location. The triangle associated with this z value is the winning triangle in the z comparison competition. After some shading/texture mapping operation on this triangle, a pixel will be generated for that pixel location.

For example, a 32×16 array of z-interpolator processors has 512 outputs and thus, the image composition network requires 512 inputs. At each cycle, the array outputs z values to the image composition network for z competition. Each pair of the 512 inputs are paired by a comparator and thus, 256 comparators are used for the first stage. Each of these 256 comparators generates an output and by pairing these outputs, 128 comparators are used for the second stage. Each of these 128 comparators generates an output and by pairing these outputs, 64 comparators are used for the third stage. Each of these 64 comparators generates an output and by pairing these outputs, 32 comparators are used for the fourth stage. Each of these 32 comparators generates an output and by pairing these outputs, 16 comparators are used for the fifth stage. Each of these 16 comparators generates an output and by pairing these outputs, 8 comparators are used for the sixth stage. Each of these 8 comparators generates an output and by pairing these outputs, 4 comparators are used for the seventh stage. Each of these 4 comparators generates an output and by pairing these outputs, 2 comparators are used for the eighth stage. Each of these 2 comparators generates an output and by pairing these outputs, only 1 comparator is needed for the ninth stage. This last comparator generates the lowest z value from among the original 512 z values output from the array of z-interpolator processors. The triangle associated with this lowest z value is the winning triangle for the given pixel position.

The image composition network is implemented in pipelined fashion. The different pipeline stages are shown by the dotted lines running vertically across the image composition network in FIG. 27. In one embodiment, a register or buffer may be placed where the dotted lines intersect the circuit lines. With pipelining, different stages process data associated with different triangles and different pixel locations concurrently. As one set of z values for a given pixel position is being processed at one stage, another set of z values for another pixel position is being processed at another stage.

Double Buffering

In one embodiment, the graphics system is implemented in a double buffered manner in which one of the triangle buffers (and one of the z buffers) is used for data writes while the other is used for scan-out, and the roles reverse after every frame period (i.e., every 30–70 Hz, typically 60 Hz). In this double buffered scheme, one of the two triangle buffers is used by the system for writing triangle data from the front end graphics processor to the triangle buffer in accordance with the triangle buffer writing scheme, while the other triangle buffer can be used for scan-out purposes to an output device. After every frame period, the roles of the two triangle buffers reverse so that at the next frame period, the triangle buffer used for scan-out during the previous frame period is now used for storing triangle data and the other triangle buffer which was used for storing triangle data during the previous frame period is now used for scan-out.

Figure 28:
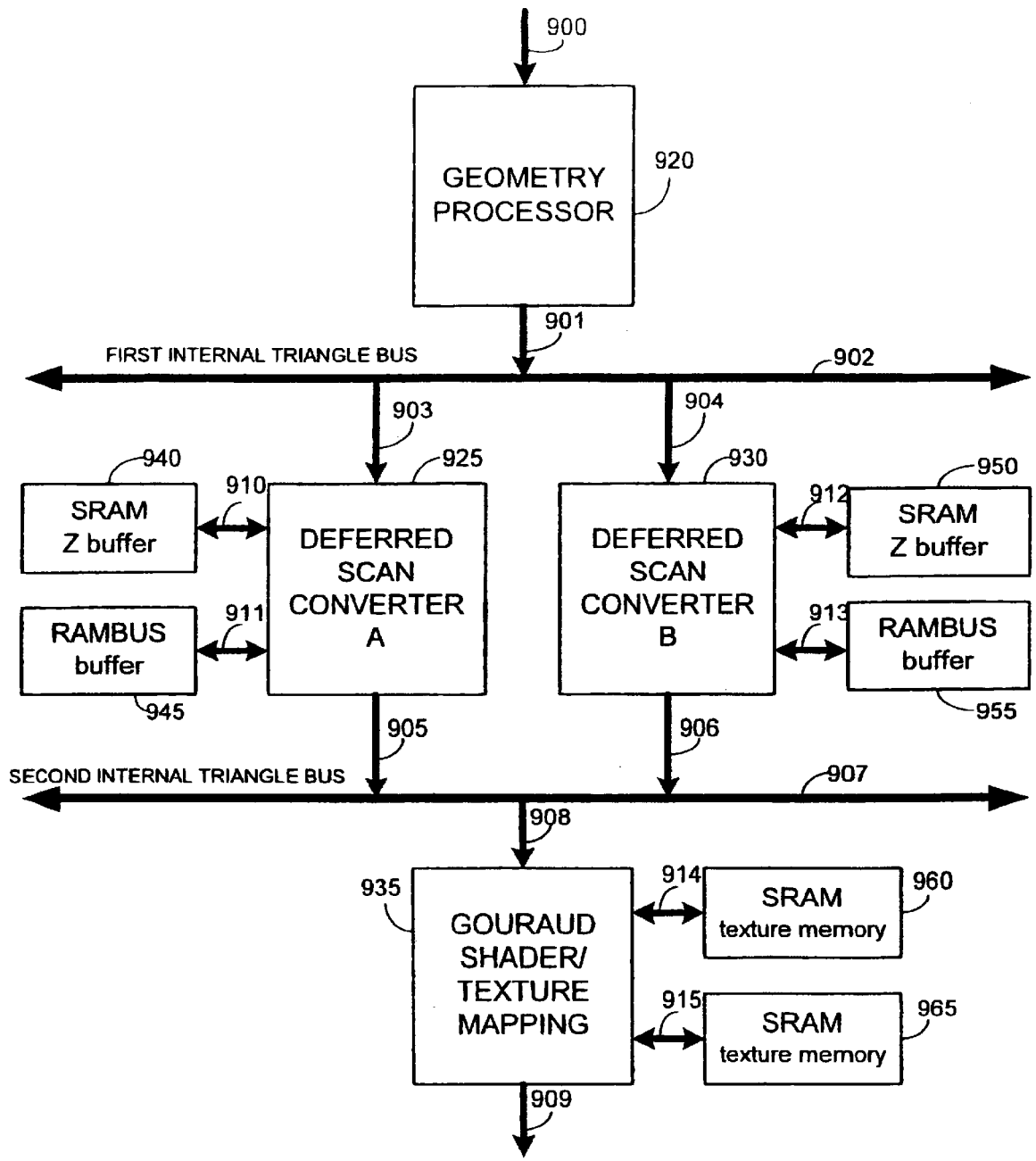
FIG. 28 shows the double-buffered system implementation in accordance with one embodiment of the present invention.

In FIG. 28, the double buffering technique is illustrated with two sets of deferred scan converters in accordance with one embodiment of the present invention are shown. The front end processor (not shown) delivers triangles via bus 900 to a geometry processor 920. The geometry processor 920, as known to those skilled in the art, performs coordinate transformations for the received triangle data. The geometry processor 920 then sends the transformed triangle data on bus 901 to either deferred scan converter 925 or deferred scan converter 930 via buses 903 or 904, respectively.

Deferred scan converter A 925 stores z values in the SRAM z buffer 940 via bus 910 and the triangle data in the triangle buffer 945 via bus 911. Deferred scan converter B 930 stores z values in the SRAM z buffer 950 via bus 912 and the triangle data in the triangle buffer 955 via bus 913. Both deferred scan converters 925 and 930 are identical in structure and function. During one frame period, the graphics system uses the scan converter 925, z buffer 940, and the triangle buffer 945 for storing z data and triangle data, while the graphics system uses the scan converter 930, z buffer 950, and the triangle buffer 955 for scan-out to an output device. At the next frame period, the roles reverse. The graphics system uses the scan converter 925, z buffer 940, and the triangle buffer 945 for scan-out to an output device, while the graphics system uses the scan converter 930, z buffer 950, and the triangle buffer 955 for storing z data and triangle data.

In one frame period, deferred scan converter 925 performs triangle buffer storage duties while the deferred scan converter 930 performs scan-out duties. While deferred scan converter 925 is writing triangle data and z data to the triangle buffer and the z buffer, respectively, the other deferred scan converter 930 is sending the winning triangles as determined during scan-out to the Gouraud shader/texture mapping unit 935 via buses 906, 907, and 908. Thus, bus 905 is not used during this frame period. The Gouraud shader/texture mapping unit 935 determines the RGB value and other properties of the pixel to be displayed from knowledge of the visible winning triangle. If texture information is used instead of RGB data, SRAM texture memories 960 and 965 are accessed for the final pixel generation operation via buses 914 and 915, respectively. The Gouraud shader/texture mapping unit 935 then generates a pixel to the output device on bus 909.

In the next frame period, deferred scan converter 930 performs triangle buffer storage duties while the deferred scan converter 925 performs scan-out duties. While deferred scan converter 930 is writing triangle data and z data to the triangle buffer and the z buffer, respectively, the other deferred scan converter 925 is sending the winning triangles as determined during scan-out to the Gouraud shader/texture mapping unit 935 via buses 905, 907, and 908. This time, bus 906 is not used during this frame period. The next frame period, the roles swap again. This process of swapping triangle storage duties and scan-out duties between the two deferred scan converters continues until the last triangle is processed or the computer graphics session has ended.

Chip Level Implementation

In one embodiment of the present invention, the portion of the graphics system from the geometry processor to the output of the image composition network is implemented in one chip. Thus, the bandwidth benefits that can be achieved with an on-chip implementation can be realized. The embodiments of the present invention, including the triangle buffer writing scheme and the on-the-fly pixel generation, take advantage of on-chip implementation benefits, unlike frame buffer technology which will not gain significant benefits by implementing it on-chip.

Figure 29:
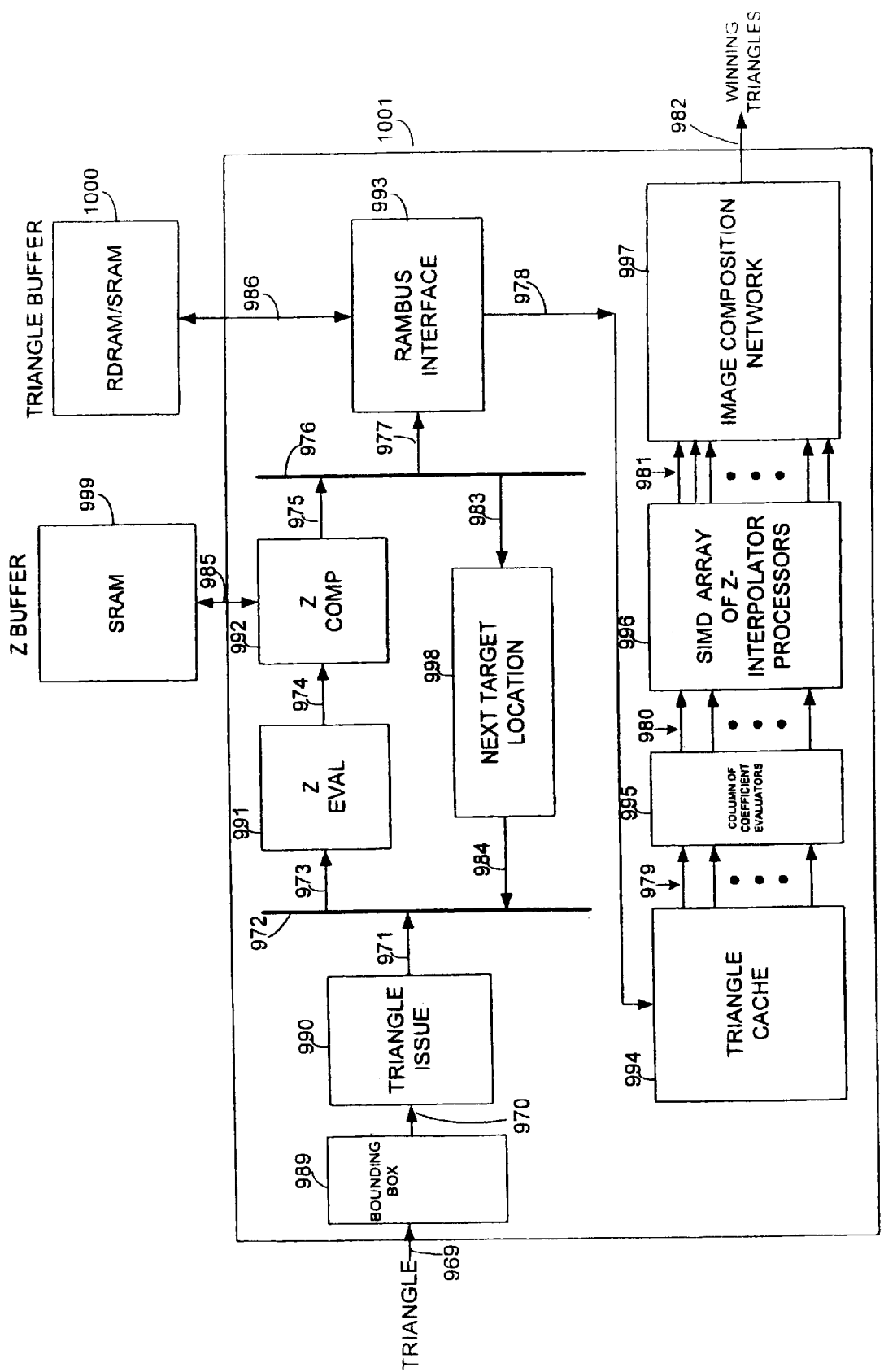
FIG. 29 shows a chip-level view of the deferred scanline converter architecture in accordance with one embodiment of the present invention.
Figure 30:
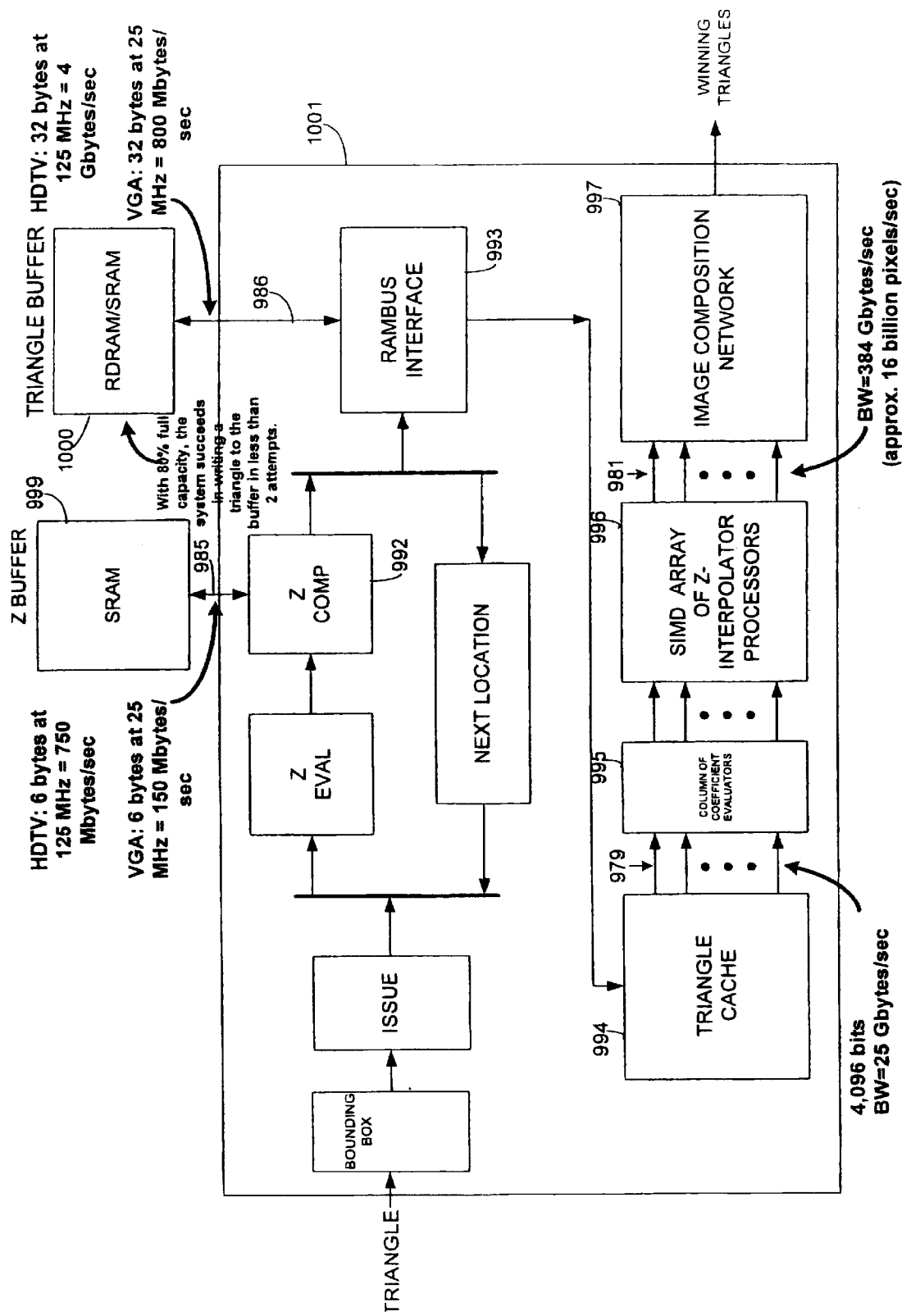
FIG. 30 shows performance improvement specifications at various key points in the chip-level diagram of FIG. 29.
Figure 31:
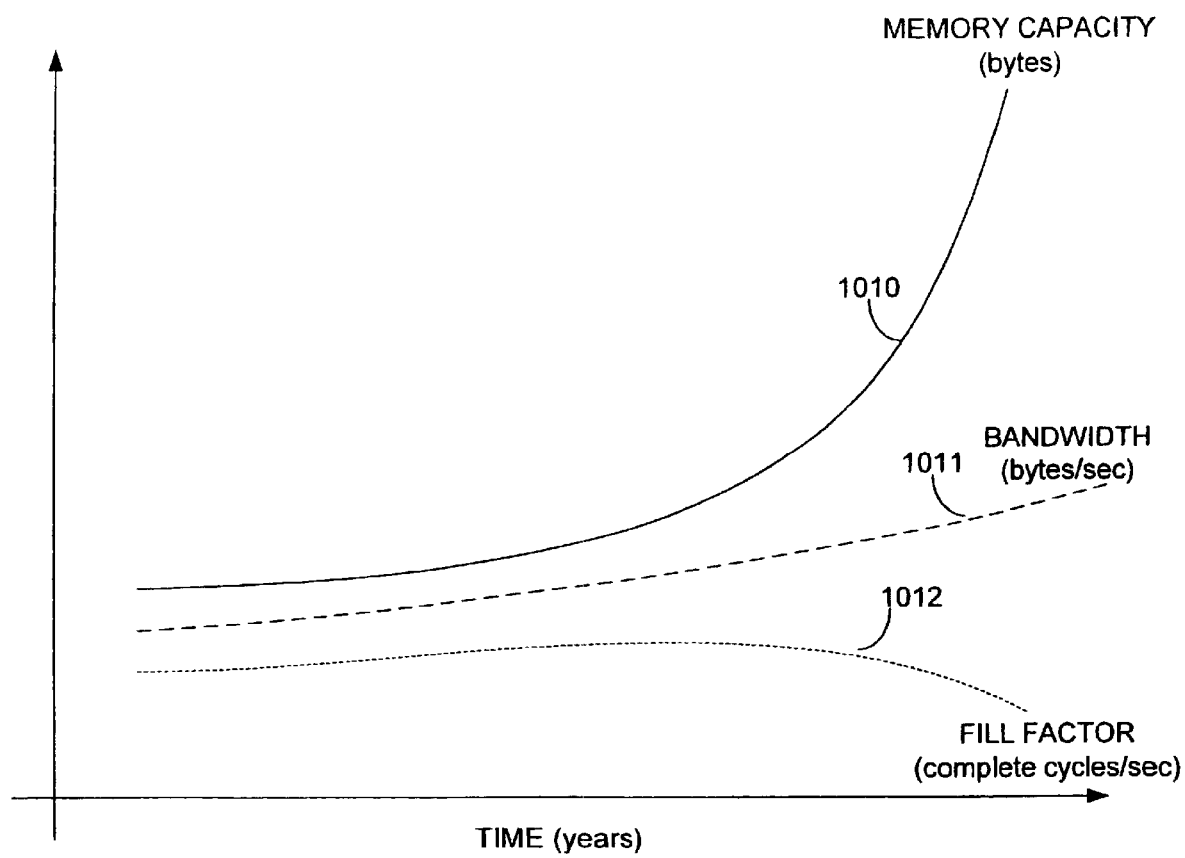
FIG. 31 illustrates the fill factor concept in graphical form.

FIG. 29 shows one embodiment of the present invention. Chip 1001 includes the structure and functions disclosed in this patent specification from the bounding box unit to the image composition network. Bus 969 receives triangles from the front end processor (not shown in FIG. 29) and provides them to the bounding box unit 989. Bounding box unit 989 is also coupled the triangle issue unit 990 via bus 970. The triangle issue unit 990 is also coupled to the z evaluation unit 991 (or z value unit) via buses 971, 972, and 973. The z evaluation unit 991 is also coupled to the z comparator unit 992 via bus 974. The z comparator unit 992 is also coupled to the next target location unit 998 via buses 975, 976, and 983 along with buses 984 and 972. The z comparator unit is also coupled to the SRAM z buffer 999 via bus 985. Finally, the z comparator unit 992 is also coupled to the Rambus interface 993 via buses 975, 976, and 977. The Rambus interface 993 provides access to the triangle buffer 1000 for storage of triangle data via bus 986.

The triangle buffer 1000 in the form of embedded DRAM, RDRAM, or SRAM and the z buffer 999 are not implemented on-chip. However, these two buffers are fast enough and the frequency of required memory accesses is much less than that required for frame buffer access in frame buffer technology so that performance will not substantially improve by implementing these two buffers on-chip. In another embodiment, the embedded DRAM is on-chip.

Up to this point, the various components and functions have been previously discussed, especially the discussion associated with FIG. 20. The remaining structural and functional units are the scan-out portion of the graphics system.

In FIG. 29, a triangle cache 994 is coupled to the Rambus interface 993 via bus 978. The triangle cache 994 is also coupled to the column of coefficient evaluators 995 via bus 979. The column of coefficient evaluators 995 is also coupled to the SIMD array of z-interpolator processors 996 via bus 980. The SIMD array of z-interpolator processors 996 is also coupled to the image composition network 997 via bus 981. The image composition network 997 provides the winning triangles to the shader/texture mapping unit (not shown in FIG. 29) via bus 982.

Performance Specifications

The many benefits of the embodiments of the present invention are generally gained by the triangle buffer writing scheme, the on-the-fly pixel generation technique, elimination of the frame buffer, and the bounded triangle processing design. Although conventional frame buffer-based computer graphics processors scan-convert triangle descriptions before the frame buffer and then stores the pixel data (typically scan converted RGB values) in the frame buffer, the embodiments of the present invention store triangle descriptions in a buffer and then scan-convert the triangle data to RGB values for display when needed. In other words, the scan converter creates a display list out of the frame buffer by deferring the scan conversion process until triangle descriptions are scanned out of the triangle buffer rather than when writing to the conventional frame buffer. Rather than storing pixel data (typically RGB values) in the frame buffer location for each pixel location, the embodiments of the present invention store a complete triangle description in a triangle buffer at selected pixel locations.

Some factors that influence the performance of the many embodiments of the present invention include triangle buffer collisions, triangle cache burst characteristics (e.g., interleaving), and the coverage mask size. Triangle buffer collisions will be discussed first. A collision, as used herein, refers to the incidence of a write attempt at a buffer location that is already occupied with data. The number of collisions depends on the capacity of the triangle buffer at the time of the write attempt. At one extreme, if a triangle buffer is completely empty, a write attempt to any location in the buffer will be successful on the first attempt and will not encounter any location that is already occupied with data. At the other extreme, if a triangle buffer is completely filled with data, a write attempt at any location in the buffer will encounter a location that is already occupied with data and thus, the collision would have to be resolved before proceeding further. If such a collision occurs at a target buffer location, the system has to spend additional time and resources to resolve the collision by: (1) comparing the z value of the new data to be written with the z value of the data that is already stored therein at the target location; (2) finding a new buffer location for the new data if the new data loses the z comparison; (3) finding a new buffer location for the old data that was displaced by the new data if the new data wins the z comparison; (4) writing the new data into the target location if the new data wins the z comparison; and/or (5) discarding any data, new or old, if a buffer location cannot be found within the coverage mask defined for the relevant data. For performance purposes, a lower number of collisions is better so that these additional time and resources will not further delay the processing of a large number of triangle data to generate pixels.

Generally, as stated above, the number of triangle buffer collisions depends on how full the triangle buffer is at the time of the write attempt. Thus, $$E(p) = 1*(1-p) + 2*(1-p)*p + 3*(1-p)*p2 + \ldots, \text{ or}$$

$$E(p) = \sum_{n=1}^{\infty} n(1-p)p^{(n-1)} = 1/(1-p)$$

where, E refers to the number of attempts per triangle needed in an image for a given p, and p refers to the ratio of the number of triangles stored over the number of triangle storage locations available for the image. Here, $p$=triangles/image size=$t/I$.

Assume that a triangle buffer has enough storage capacity for 100 triangles. So, I=100. Examining E(p), if the triangle buffer is empty, t=0 and I=100 and thus, $p=t/I=0/100=0$, because zero triangles are stored in the triangle buffer. Thus, $E(p)=1/(1-p)=1/(1-0)=1$.

Only one attempt is needed to successfully write to this triangle buffer if the triangle buffer is empty.

At the opposite extreme, assume that the same triangle buffer is full at t=100. Thus, $p=t/I32\ 100/100=1$, and $E(p)=1/(1-p)=1/(1-1)$=undefined (i.e., $\infty$)

For a full triangle buffer, the number of write attempts needed per triangle is undefined and the triangle buffer write scheme will ultimately determine whether this triangle can be written to a triangle buffer location by displacing an already stored triangle.

At the middle, when the triangle buffer is half full, $p=t/I=50/100=0.5$, and $E(p)=1/(1-p)=1/(1-0.5)=1/0.5=2$ For a half full triangle buffer, roughly two attempts are needed to write a triangle to this triangle buffer at any triangle buffer location.

This E(p) relation describes the single triangle write attempt situation. For multiple triangles, the E(p) relation must be integrated over an interval from 0 to the maximum number of triangles. The cost of writing an image of triangles containing T triangles into the triangle buffer can be determined by integrating the number of attempts per triangle E(p) from 0 triangles to the total T triangles, as follows:

$$TBA = \int_0^T E(p)dt = \int_0^T 1/(1-t/I)dt = [-I*\ln(1-t/I)]_0^T = -I*\ln(1-t/I)$$

where, TBA refers to the triangle buffer write attempts for the entire image. Divide TBA by T to obtain:

$TBA/T=-I/T*\ln(1-T/I)$ $TBA/T=-1/P*\ln(1-P)$, where $P=T/I$

Figure 32:
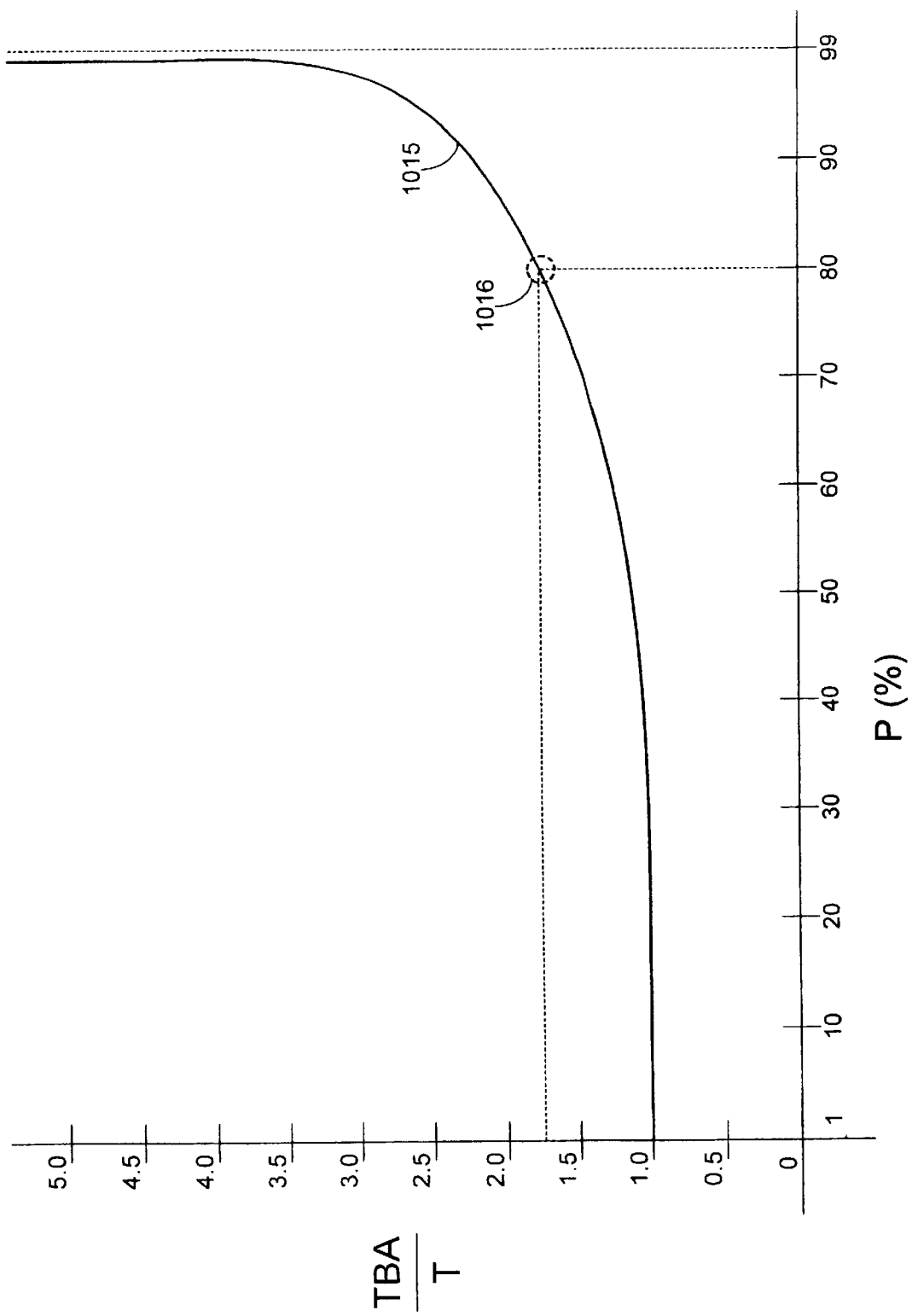
FIG. 32 shows a graph of triangle buffer write attempts need for a successful triangle write given various capacity specifications of the triangle buffer.

FIG. 32 plots TBA/T versus P (in percentage %). As shown in FIG. 32, for the triangle buffer write portion, the embodiments of the present invention can successfully write to the triangle buffer at an average of less than 2 attempts per triangle given that the triangle buffer is 80% full. With lower capacity, a triangle data can be written successfully into the triangle buffer in fewer attempts on average. Refer to FIG. 32. The y-axis represents the number of write attempts necessary to successfully write a triangle data into the triangle buffer. The x-axis represents the capacity of the triangle buffer before the particular write attempt occurred. Curve 1015 represents the plotted data of the number of triangle buffer write attempts per triangle necessary to successfully write the triangle data into the triangle buffer at various capacity of the triangle buffer. Thus, at point 1016, the triangle buffer was 80% full capacity and accordingly, the embodiments of the present invention needed slightly less than 2 attempts to successfully write the triangle data into the triangle buffer.

Thus, for the most part, the system need not check every location of the coverage mask before a successful write operation is performed. As the capacity increases, more attempts are needed to successfully write the triangle data into the triangle buffer, although even at 90% full capacity, the system requires less than 3 attempts to successfully write a triangle data into the triangle buffer. For real-time systems, the typical range of P (%) in FIG. 32 is 0% to 50%.

Another factor that influences performance is cache burst characteristics. As known to those ordinarily skilled in the art, a cache line can be filled with less than the normal number of cycles. So long as the first cycle is normal (e.g., 2 cycles), the remaining cycles for other memory locations are less (e.g., 1 cycle). Thus, a burst cycle starts with a normal memory access which lasts for 2 clock cycles, for example, and then all remaining accesses need 1 clock cycle. Typically, burst cycles are restricted in that the amount of data to be transferred within one burst cycle must fall into a single N-byte area which starts at a N-byte boundary. If the requested data goes beyond this address area, the cache burst cycle must be split into two clock cycles.

A third factor that influences system performance is coverage mask size. In one embodiment, the mask size is 16×16; that is, the coverage mask is 16 triangle buffer locations wide and 16 triangle buffer locations tall. In other embodiments, the coverage mask size is 8×8. In one embodiment of the present invention, this selection of the coverage mask dimensions is constant for a given graphics session. Thus, regardless of the sizes and shapes of the triangles that are delivered by the front end processor, the coverage mask size remains constant.

The selection of the coverage mask size is not arbitrary. If the coverage mask had smaller dimensions, the system may operate faster with some loss in accuracy as the system tries to find a storage location within the confines of a smaller coverage mask and more triangles that should be in competition are potentially eliminated from competition at the outset due to the lack of triangle buffer locations within the coverage mask. The smaller coverage mask also further simplifies (although not by much) some of the scan-out logic hardware. If the coverage mask had larger dimensions, the system may operate less fast with increased accuracy (albeit with diminishing returns) as the system tries to find a storage location within the confines of a larger coverage mask and less triangles are eliminated from competition at the outset. So, with larger masks, the system may expend more time and resources to find a triangle buffer location for a "failed" or "displaced" triangle. With the larger coverage mask, the system needs more scan-out hardware (although not much more). Because of the particular architectural design resulting in a simpler hardware implementation, the advantages gained from the many embodiments of the present invention are not significantly diminished because of an arbitrary selection of the coverage mask. Furthermore, the hardware implications of arbitrary selections of the coverage mask dimensions are de minimis. Nevertheless, for optimal performance, the coverage mask dimensions should be selected with some care.

Moreover, as shown in 30, further benefits are obtained for the triangle buffer write process. During the z comparison portion of the triangle buffer write process, the system can process 6 bytes of HDTV data at 125 MHz (which translates to 750 Mbytes/second) across bus 985 between the z-buffer SRAM 999 and the z-comparison logic 992. For VGA data, the system can process 6 bytes at 25 MHz (which translates to 150 Mbytes/second) across the same bus 985.

For writes to the triangle buffer 1000 in 30, the system can process 32 bytes of HDTV data at 125 MHz (which translates to 4 Gbytes/second) across bus 986 between the triangle buffer 1000 and the Rambus interface 993. For VGA data, the system can process 32 bytes at 25 MHz (which translates to 800 Mbytes/second) across the same bus 986.

For scan-out, the embodiments of the present invention can generate pixels at a rate of approximately 16 billion pixels/second or 384 Gbytes/second across bus 981 between the array of z interpolators 996 and the image composition network 997. This is the point in the scan-out logic where z values are computed and compared. This rasterization bandwidth can be accomplished without accessing memory at all, unlike frame buffer technology.

The system can also provide triangle data across bus 979 from the triangle cache 994 to the column of coefficient evaluators 995 at 25 Gbytes/second. This bus 979 can be at least 4,096 bits wide. If each triangle is represented by 256 bits, the 4,096-bit width of the bus 979 allows 16 triangles to be transported from the triangle cache 994 to the column of coefficient evaluators 995 in one cycle, whereas prior art chip implementations needed multiple cycles and a multiplexed scheme to access all 4,096 bits by going off-chip. This wide bus 979 allows an entire column of data (i.e., 16 triangles) to be accessed from the triangle cache.

Implementation With Micro-polygons

Another embodiment of the present invention processes micro-polygons instead of polygons (i.e., conventional triangles); that is, the front end processing system delivers micro-polygons to the back-end graphics system. The back-end graphics system still uses the triangle buffer logic and the scan-out logic in accordance with one embodiment of the present invention to identify the visible micro-polygon at each sub-pixel or sample location. What are micro-polygons? Essentially, micro-polygons are analogous to the polygons (i.e., triangles) that were processed by the triangle buffer logic and the scan-out logic described above.

Figure 62:
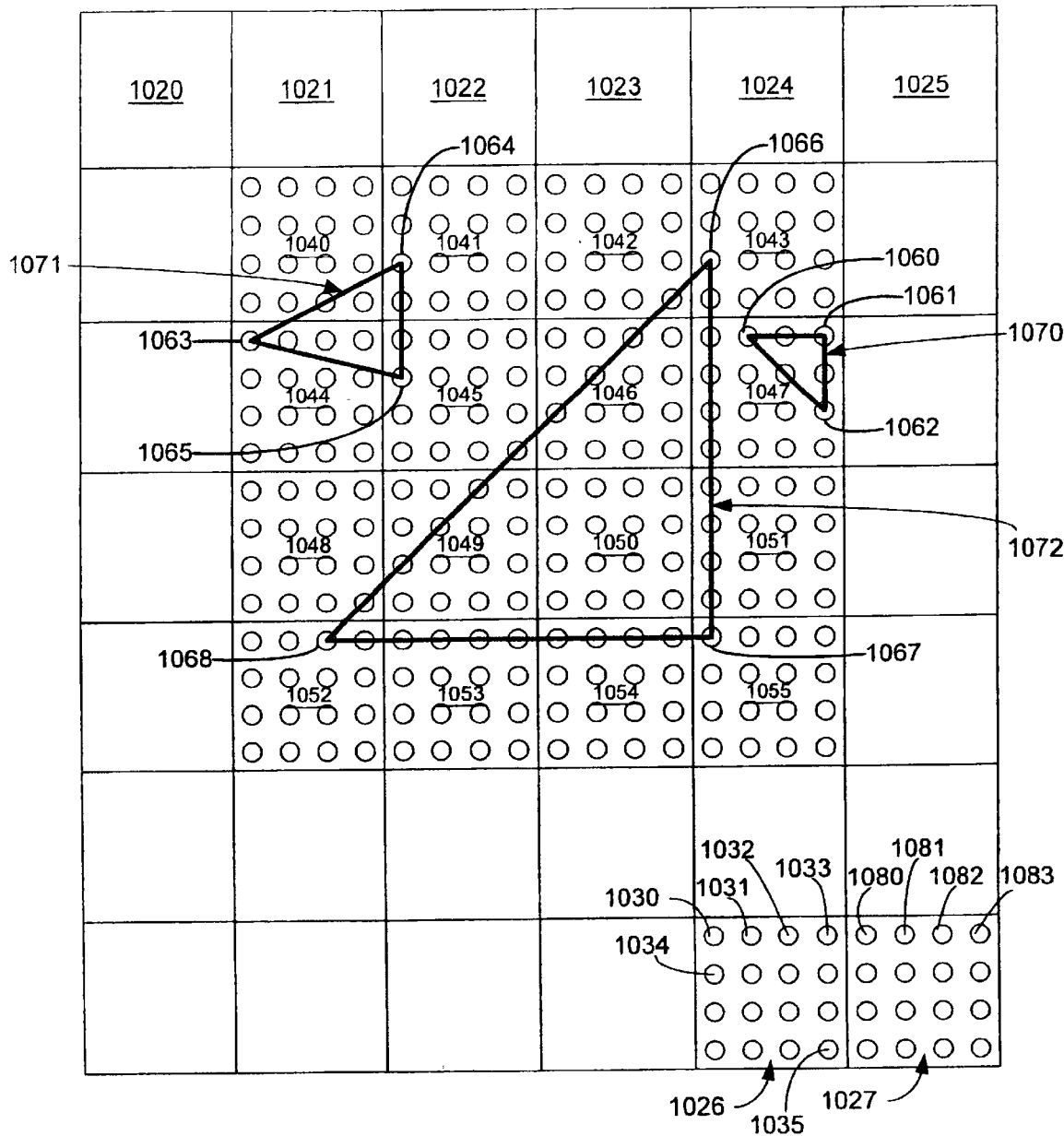
FIG. 62 illustrates micro-polygons and sub-pixels (samples).

Referring to FIG. 62, a portion of an output device, such as a graphics display screen, is shown. This portion of the screen shows several pixel locations such as pixels 1020–1025 at the top row, and pixel 1026 at the bottom row. Of course, the other similarly sized squares are also pixels. When an image is finally rendered to the screen, each pixel will display one value representing the color and intensity of the image at that pixel location. For example, a value of 255 may represent all white and value of 0 may represent all black. Texture of that pixel is also added later.

Each pixel location comprises a number of sub-pixels or samples. For example, pixel 1026 comprises sixteen sub-pixels arranged in a 4×4 matrix, where each sub-pixel is represented by a circle in FIG. 62. Pixel 1026 comprises such sub-pixels as sub-pixels 1030–1034. Each sub-pixel can be represented by a single color/intensity value (e.g., 255 for all white and 0 for all black).

Still referring to FIG. 62, a micro-polygon is any grouping of sub-pixels. Three exemplary micro-polygons include micro-polygons 1070–1072. Micro-polygon 1070 is relatively small in size and located in such a way that it fits within a single pixel 1047. Micro-polygon 1071, while small in size, is located across the boundaries of four different pixels 1040, 1041, 1044, and 1045. However, it is not located in such a way that all of its surface area is encapsulated within a single pixel. Micro-polygon 1072 is relatively larger in size than the other two exemplary micro-polygons 1070–1071 and is located in such a way that it crosses the boundaries of thirteen different pixels 1042–1043 and 1045–1055. Micro-polygon 1072 also covers all of pixel 1050.

The vertices of the micro-polygons are associated with the sub-pixels. To illustrate, micro-polygon 1070 has three vertices that correspond to sub-pixels 1060–1062. Micro-polygon 1071 has three vertices that correspond to sub-pixels 1063–1065. Micro-polygon 1072 has three vertices that correspond to sub-pixels 1066–1068. To the extent that the vertices are associated with sub-pixels, these micro-polygons can be of any size, shape, orientation, and located anywhere on the screen.

These micro-polygons will be processed by the triangle buffer logic and the scan-out logic of the back-end graphics system in accordance with one embodiment of the present invention. Earlier in the patent specification, the triangle buffer logic used a triangle buffer having exemplary dimensions of 1280×1024 memory locations, where each memory location corresponded to a pixel screen location. When micro-polygons are used, the triangle buffer dimensions change. Because each pixel comprises sixteen sub-pixels (4×4 sub-pixels per pixel) in one embodiment, the triangle buffer's dimensions become 5120×4096 memory locations, which is 1280*4 (=5120) and 1024*4 (=4096).

Thus, instead of storing triangle information associated with some pixel location, each memory location now stores micro-polygon information associated with some sub-pixel location. For each pixel location, data associated with sixteen different micro-polygons may be stored in the sixteen memory locations that are collectively associated with a pixel location. Of course, the coverage mask is sized accordingly to bound the number of possible memory locations that micro-polygon data can be stored in the triangle buffer.

Similarly, the dimensions of the scan-out logic's sliding mask are derived from the coverage mask to scan-out micro-polygon data out of the triangle buffer one sub-pixel location at a time. The scan-out logic identifies all micro-polygons that may be competing for a given sub-pixel location and identifies the unobscured visible micro-polygon for each sub-pixel location. Once the visible micro-polygon has been identified, the scan-out logic then converts the micro-polygon at that sub-pixel location into a sub-pixel. As stated above, each sub-pixel is associated with a color and intensity value (e.g., 255 for all white and 0 for all black).

The scan-out logic further converts the sub-pixels into pixels. Why does the scan-out logic generate pixels from sub-pixels? The output device, such as a computer graphics display monitor, can only display pixels; it cannot display sixteen different sub-pixels per pixel because sub-pixels are not recognized by the display driver. Thus, the back-end graphics system in accordance with one embodiment of the present invention generates pixels from sub-pixel information.

This sub-pixel-to-pixel conversion is not performed across arbitrary pixel boundaries. Sub-pixels are naturally associated with some pixel location. For example, in FIG. 62, sub-pixel 1065 is associated with pixel location 1045. Similarly, sub-pixel 1034 is associated with pixel location 1026. Thus, when the scan-out logic performs the sub-pixel to pixel conversion, the value of sub-pixel 1034 will contribute to the generation of pixel location 1026. The scan-out logic collects the plurality of sub-pixel values associated with each pixel location and then generates a pixel.

To designate a value for the pixel for display screen presentation, the back-end graphics system can sum the individual sub-pixel values together and average them (i.e., divide the sum by 16 sub-pixels) so that the pixel location uses the average of the sub-pixel values associated with that pixel location. Alternatively, the back-end graphics system can interpolate sub-pixel values based on the sub-pixel values at the vertices of the corresponding micro-polygon.

Figure 63:
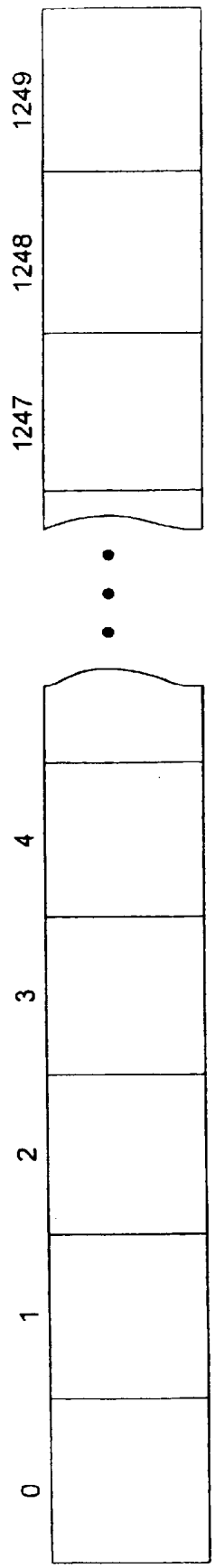
FIG. 63 shows the single line buffer used to temporarily accumulate and store the sub-pixel values for each pixel location so that they can be processed for presentation to the display screen.

To sum the sub-pixel values for each pixel location, a single buffer having one row and 1280 columns is utilized, assuming that the screen dimension requires 1280 columns of pixel locations. FIG. 63 shows the single line buffer having 1280 memory locations. Each memory location is associated with values associated with a pixel location. This single buffer is used for temporarily storing sub-pixel values for all 1280×1024 pixel locations, one row at a time.

To illustrate the use of this single line buffer, refer to FIG. 62. Assume that pixel location 1026 is the first pixel location on the screen; that is, pixel location 1026 corresponds to pixel location (row 0, col 0) at the upper left corner of the screen. Pixel location 1026 comprises sixteen sub-pixel locations including 1030–1034. Pixel location 1027 is the next pixel location (row 0, col 1). Pixel location 1027 comprises sixteen sub-pixel locations including 1080–1083. In FIG. 63, the At a first cycle, the value from sub-pixel 1030 is stored in memory location 0 in the single line buffer of FIG. 63. In a subsequent cycle, the value from sub-pixel 1031 is added to the already existing value of sub-pixel 1030 in memory location 0 and the result is stored in memory location 0. In a subsequent cycle, the value from sub-pixel 1032 is added to the already existing value in memory location 0 (sub-pixel 1030+sub-pixel 1031) and the result is stored in memory location 0. In a subsequent cycle, the value from sub-pixel 1033 is added to the already existing value in memory location 0 (sub-pixel 1030+sub-pixel 1031+sub-pixel 1032) and the result is stored in memory location 0. At this point, the value in memory location 0 stores the sum of the sub-pixel values from the first row of sub-pixels of pixel location 1026.

Moving across the row in a subsequent cycle, the accumulation of sub-pixel is performed for the next pixel location 1027 where the values are temporarily accumulated and stored in memory location 1. The value from sub-pixel 1080 is added to the already existing value in memory location 1 (none) and the result is stored in memory location 1. In a subsequent cycle, the value from sub-pixel 1081 is added to the already existing value in memory location 1 (sub-pixel 1080) and the result is stored in memory location 1. In a subsequent cycle, the value from sub-pixel 1082 is added to the already existing value in memory location 1 (sub-pixel 1080+sub-pixel 1081) and the result is stored in memory location 1. In a subsequent cycle, the value from sub-pixel 1083 is added to the already existing value in memory location 1 (sub-pixel 1080+sub-pixel 1081+sub-pixel 1082) and the result is stored in memory location 1. Like memory location 0, the first row of sub-pixel values has now been accumulated and stored in memory location 1.

This cycle of accumulating and storing sub-pixel values in each memory location of the buffer in FIG. 63 continues to the end of the row at memory location 1279. After this first row, processing for the next row begins. So far, memory location 0 contains the sum of sub-pixels 1030–1033. The next sub-pixel 1034 is then added to this sum and the new sum (sum of sub-pixel values 1030 to 1034) is stored in memory location 0. Again, the accumulation and storage steps continue to the end of the row until the last pixel location for that row has been processed. Row after row, this process continues so that during the scan of the fourth row, memory location 0 has accumulated the sixteenth and last sub-pixel 1035 for pixel location 1026. The sum of the sixteen sub-pixels (some of which are sub-pixels 1030–1035) in pixel location 1026 is stored in memory location. By the time the last column of this fourth row has been reached, every memory location 0–1279 in the single line buffer, which is associated with a pixel location, contain the sum of the sub-pixel values from their respective sub-pixels. These sums are then each divided by sixteen to obtain an average sub-pixel value for each pixel location. Thus, the final output for pixel location 1026 is an average of its sub-pixels. Similarly, the final output for pixel location 1027 is an average of its sub-pixels.

At a subsequent cycle, the fifth row is scanned. This fifth row is associated with a different set of pixels from the first four rows. Prior to scanning the fifth row, one embodiment of the present invention clears the contents of memory location 0 so that the value stored therein is zero. In another embodiment, the system clears the contents of memory locations 0–1279 in the single line buffer prior to scanning the row that corresponds to the start of a different pixel location from prior rows. Now, memory location 0 will accumulate the sub-pixel values from the pixel location that is immediately below pixel location 1026 in FIG. 62.

By recycling the use of this single line buffer to accumulate and store the sum of sub-pixel values, memory resource is saved. So long as the system knows how many sub-pixels as well as the number of rows and columns of sub-pixels, hardware implementation is fairly straightforward.

Example of Overall System Operation

Figure 34A:
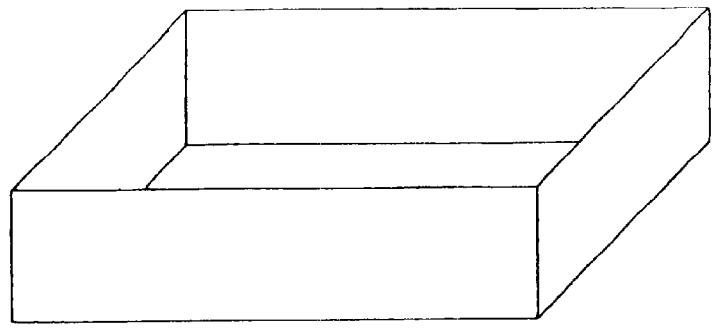
FIG. 34(A) shows a graphical depiction of a top-open box that will be rendered by the graphics system in accordance with one embodiment of the present invention.

The operation of the entire system in accordance with one embodiment of the present invention will now be discussed using a specific example. In FIG. 34(A), an open-ended box having four sides, a bottom, and no top side is shown. This open-ended box will be computer generated against a background.

The number associated with each triangle not only identifies the triangle but also indicates the order in which the front end processor delivered it to the back end processor. Thus, triangle 1 was delivered first and triangle 13 was delivered last. The coordinates associated with each triangle are used to position and orient each triangle in the scene and their respective plane equations will dictate their color and z depth. No delivery ordering is assumed so that the triangle for the bottom right corner of the screen may be sent by the front end processor before the triangle for the upper left corner of the screen, and triangles for the background may be received before triangles for actively moving objects.

Figure 33B:
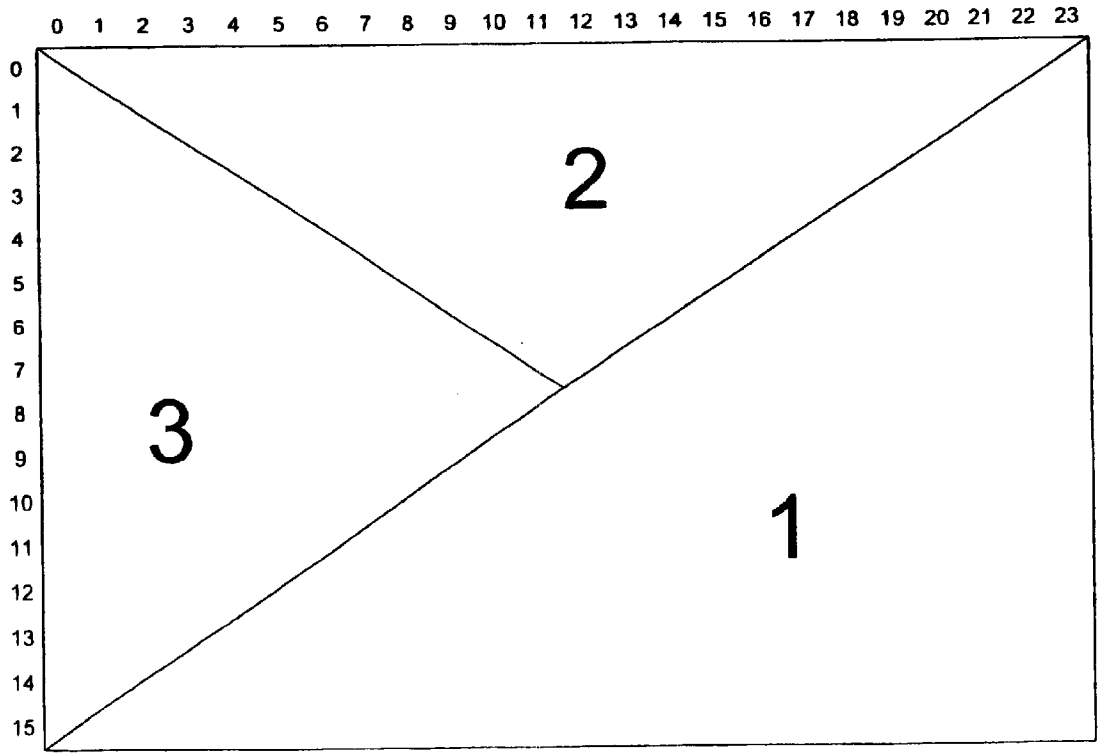
FIG. 33(B) shows three triangles representing the background of a scene covering the output monitor of FIG. 33(A).
Figure 34B:
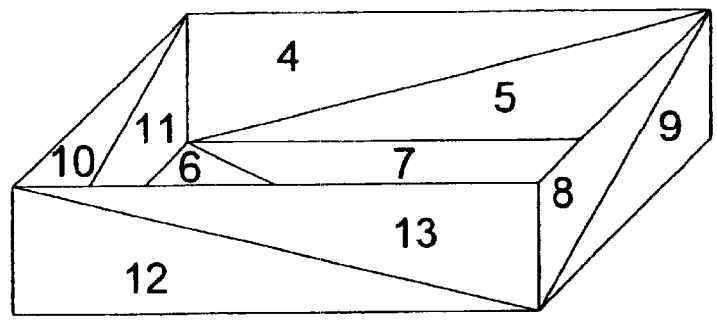
FIG. 34(B) shows a simplified triangle representation of the same box of FIG. 34(A).
Figure 34C:
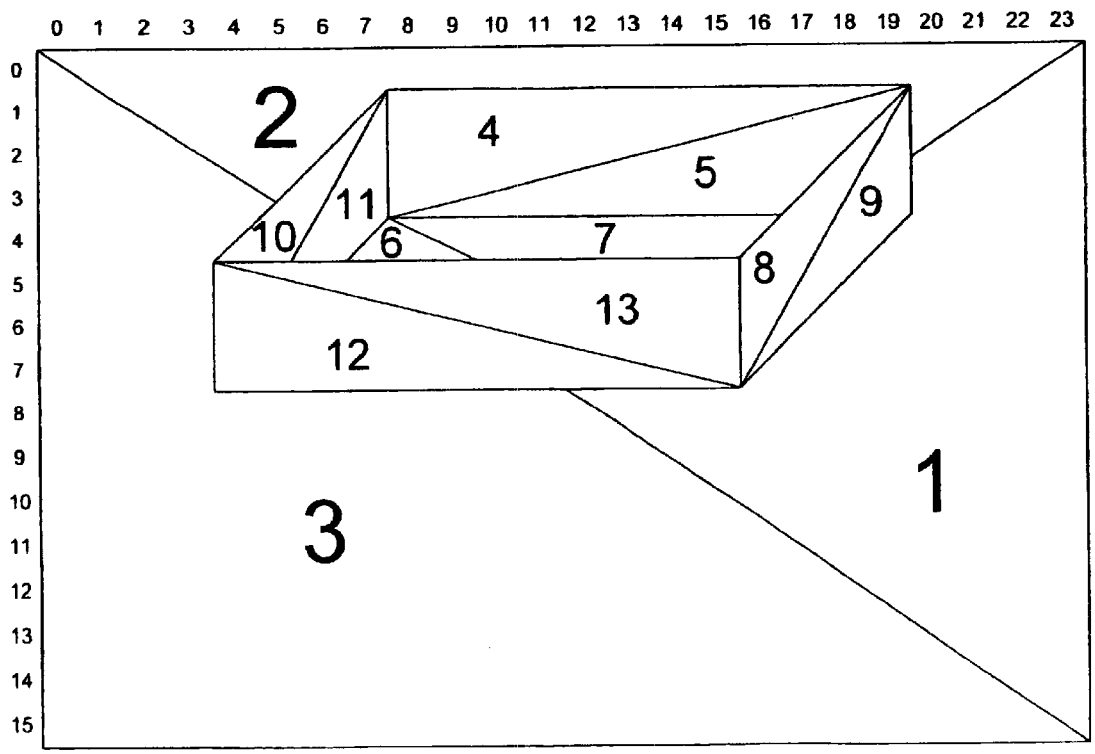
FIG. 34(C) shows the same box depicted against the background by the output monitor of FIGS. 33(A) and 33(B).

To generate this open-ended box, several triangles will be needed. In this example, thirteen triangles (numbered 1 to 13) will be provided by the front end processor to the back end processor. Triangles 1 to 3 are associated with the background. As shown in FIG. 33(B), the first three triangles (i.e., triangles 1 to 3) provide the background of the scene. These three triangles are shaped as shown and are all at the same z depth. Triangles 4 to 13 are associated with the open-ended box as shown in FIG. 34(B) for the open-ended box. The bottom of the box is represented by triangles 6 and 7. The side of the box closest to the user is represented by triangles 12 and 13. The right side of the box is represented by triangles 8 and 9. The left side of the box is represented by triangles 10 and 11. The back side of the box is represented by triangles 4 and 5. Although the box can be rotated about any axes, this example is made simple for teaching purposes by keeping the scene static and rendering only one frame period of the image. Together, the background and the open-ended box should be generated as shown in FIG. 34(C).

In the view shown in FIG. 34(B), z depths of the various triangles vary. The z depths are also evaluated pixel position by pixel position instead of triangle by triangle. Thus, some points on a triangle may be closer to the user than some other points. Also, some points on a first triangle may be closer to the user than some points on a second triangle while some other points on the first triangle may be farther away than some points on the second triangle. For this static view example from a single frame period, though, triangles 12 and 13 are at equivalent depths and are generally closest to the user. Triangles 8 and 9 are also at equivalent depths and are generally the next closest to the user. Only triangles 12 and 13 are generally closer to the user than triangles 8 and 9. Triangles 10 and 11 are at equivalent depths and are generally the next closest to the user. Only triangles 12, 13, 8, and 9 are closer to the user than triangles 10 and 11. Triangles 6 and 7 are at equivalent depths and are generally the next closest to the user. Then, triangles 4 and 5 are the next closest. Last, the triangles 1, 2, and 3 are the farthest away and also represent the background for this open-ended box.

Figure 33A:
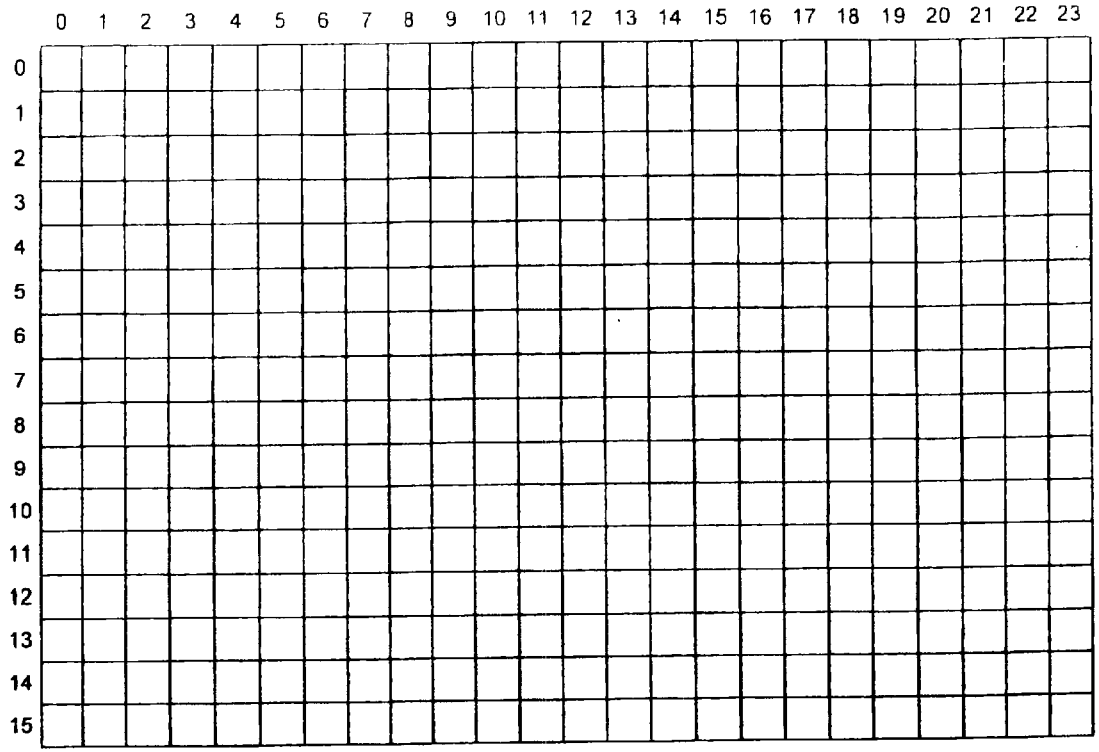
FIG. 33(A) shows a teaching example of a grid for the output monitor and its pixel locations. The grid can also represent the triangle buffer locations.

Referring to FIG. 33(A), a triangle buffer is shown having 24 columns (columns 0 to 23) and 16 rows (rows 0 to 15) as shown by the numerical markings at the top and left side of the buffer. A triangle buffer location is the intersection location of any row and any column. In each location, the system can store one triangle data at the most.

This is not a typical size for the triangle buffer. A typical buffer would be larger to support a larger screen, such as dimensions 1024 rows and 1024 columns. The dimensions of the exemplary triangle buffer in FIG. 33(A) has been scaled down for teaching purposes so that the various concepts of the present invention will be more accessible with more manageable numbers. The triangle buffer locations also coincide with a computer graphics monitor. In this example, the monitor also has dimensions 24 columns by 16 rows.

Figure 35:
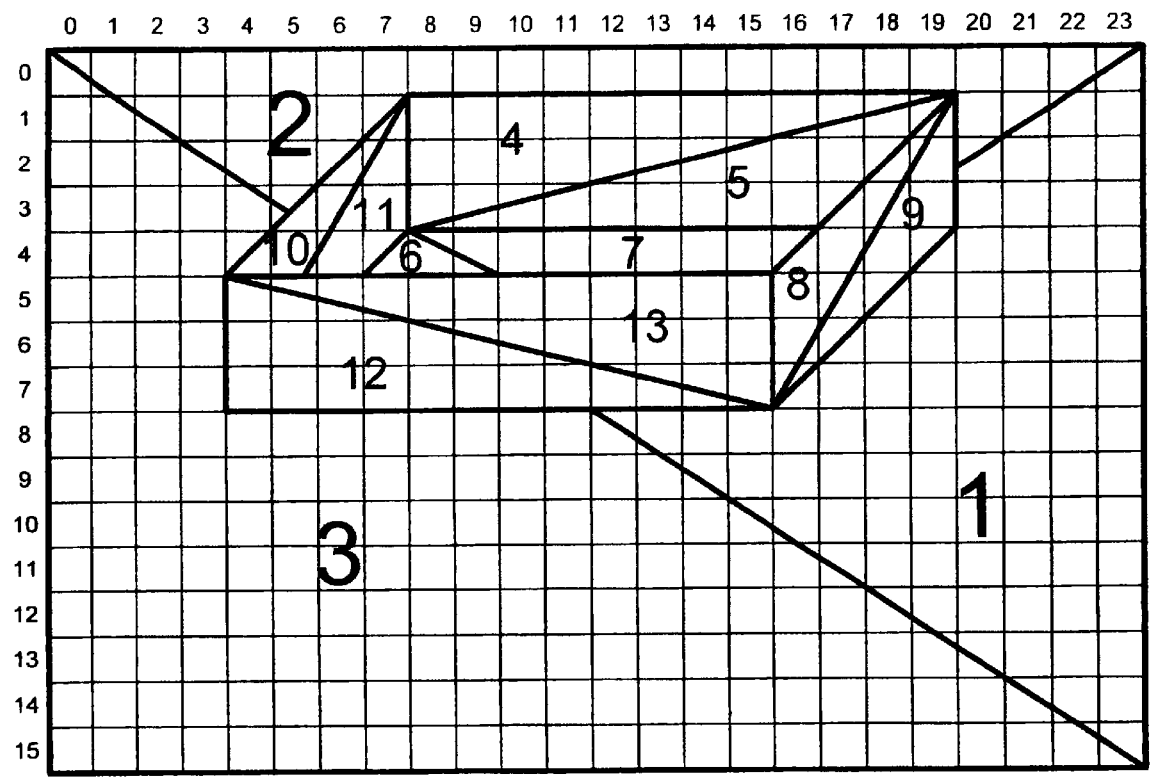
FIG. 35 expressly shows the pixel locations superimposed on the box and background of FIG. 34(C).

When fully rendered, the scene should look like the illustration of FIG. 35. For the sake of clarity, the corresponding triangle buffer row and column markings on the top and left side of the scene are displayed along with the pixel locations.

The operation of the graphics system in accordance with one embodiment of the present invention will now be described. In this example, the coverage mask has dimensions 4 columns by 4 rows, and the sliding mask has dimensions 8 columns by 4 rows. Thus, the triangle cache has dimensions 24 columns by 4 rows. The column of coefficient evaluators has 1 column and 4 rows. The array of z-interpolator processors has 8 columns and 4 rows. The image composition network has 32 inputs, 16 comparators in the first stage, 8 comparators in the second stage, 4 comparators in the third stage, 2 comparators in the fourth stage, and 1 comparator in the fifth stage all structured in the form of a tree. The monitor which will display this computer generated scene has dimensions that are at least 24 columns by 16 rows. If the monitor has larger dimensions than the triangle buffer, some blank pixels will be displayed at pixel locations not corresponding to any triangles. Because the coverage mask is 4×4 and the array of z-interpolator processors is 8×4, the triangle data will be loaded 4 cycles out of phase so that the actual pixel location for which a pixel is being generated is located 4 pixel locations to the left of the pixel location for which triangle data is being loaded.

To effectively follow this example of the system operation, refer to the following figures concurrently: (1) FIG. 36(B) for the contents of the triangle buffer; (2) FIG. 35 to get a sense of the span of a triangle and the scene to be rendered; (3) FIG. 55 for the coefficient evaluator; and (4) FIG. 26 for the z-interpolator processor in the array. Additionally, this example will direct the reader to other figures from FIGS. 37 to 52, which show the contents of the triangle cache and the array of z-interpolator processors.

Figures 36A, 36B:
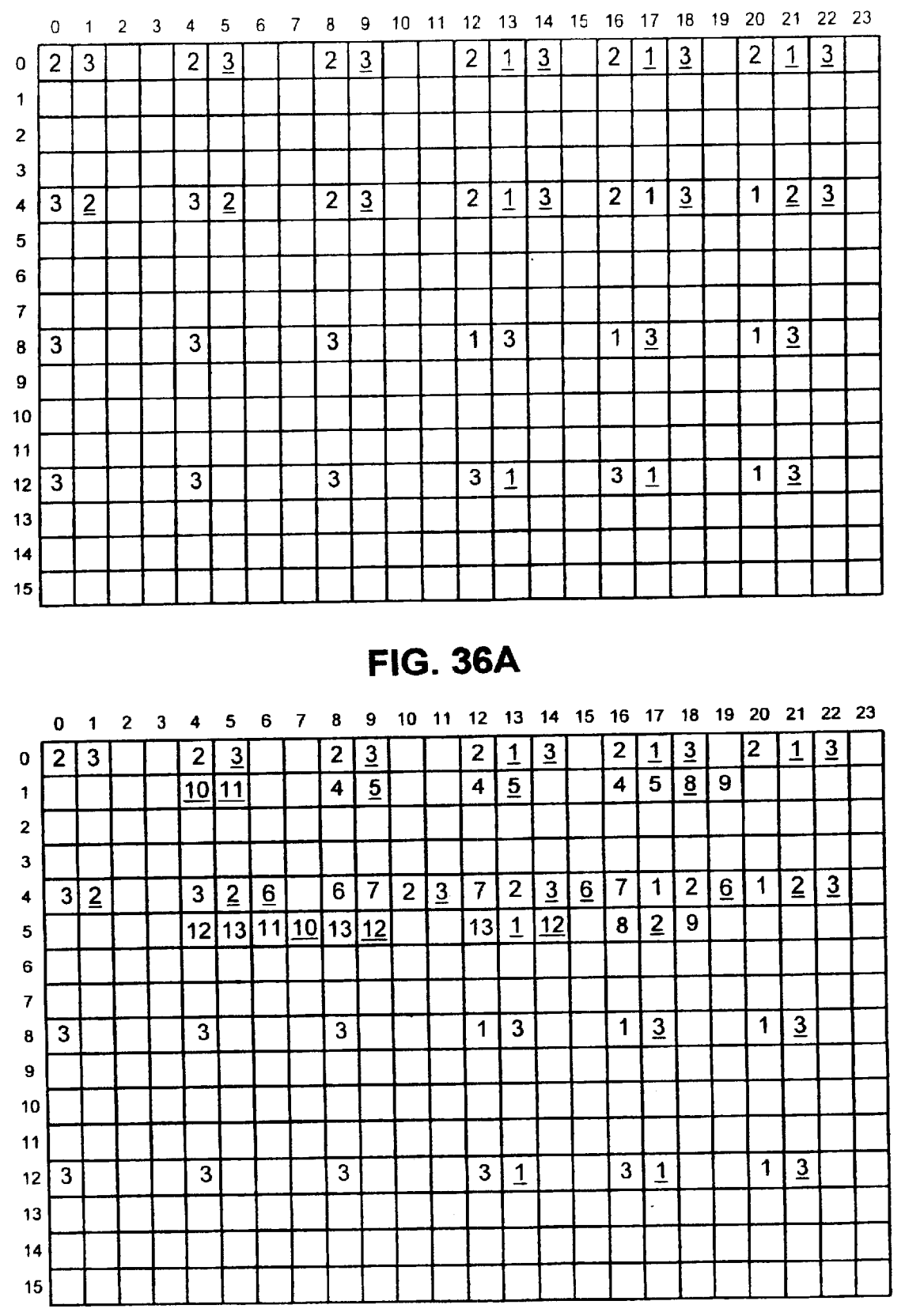

Initially, triangles 1, 2, and 3 representing the background are delivered by the front end processor. FIG. 36(A) shows the contents of the triangle buffer after these all the triangles associated triangles 1, 2, and 3 have been issued and written.

In accordance with the triangle buffer writing scheme, the system writes the relevant data associated with triangle 1 to the buffer first. Because this is the first triangle, the first attempt success rate is high. A z buffer would also store corresponding z values for the triangles stored in the triangle buffer at corresponding locations. An underlined number indicates that the z value stored in the corresponding z buffer for that triangle is $z_{max}$, or the artificial z value assigned to non-visible regions of the bounding box. However, whether or not the triangle is underlined, the coefficient evaluators always evaluate initial z values (usually the z value at the left edge of the triangle or the actual z value of the triangle at that current pixel location) which will be used by the array of z-interpolator processors to interpolate the z value at select locations on the triangle. Of course, a non-underlined number indicates that the z value stored in the corresponding z buffer location for that triangle is the actual z value of the triangle at that location because this location is associated with a visible region of its bounding box. Because the bounding box for triangle 1 is larger than the 4×4 coverage mask, multiple coverage masks are used and hence multiple triangle data are issued for triangle 1. In one embodiment, multiple triangles are issued for the different locations associated with each coverage mask necessary to cover the bounding box. At each upper left corner of each coverage mask, the system writes the relevant triangle data for triangle 1.

Next, triangle 2 is processed. Because triangle 2 is at the same depth as triangle 1, the system will attempt to store triangle 2 to the triangle buffer location adjacent where triangle 1 is currently stored unless the non-visible 1 is stored there. If 1 is stored at a location, such as locations (12, 0), (16, 0), (20, 0), (12, 4), (12, 12), and (16, 12), a visible triangle 2 displaces triangles 1. The system seeks a new target location for these displaced triangles 1 at the next adjacent locations (13, 0), (17, 0), (21, 0), (13, 4), (13, 12), and (17, 12). The z value evaluated at these new target locations is still associated with a non-visible region of the bounding box of triangle 1 and therefore triangle 1 will be stored therein.

Next, triangle 3 is processed. Because these first three triangles are at equivalent z depths, triangle 3 does not displace triangle 1 and triangle 2, unless non-visible triangles 1 or 2 are stored at the target locations for triangle 3.

Next, the triangles representing the open-ended box are processed. Triangles 4 to 13 are at lower z depths (i.e., closer to the user) than triangles 1, 2, and 3 and accordingly, whenever a comparison operation is performed for a triangle buffer location, the triangles 4 to 13 would displace triangles 1, 2, and 3. Of course, triangles 12 and 13 are at the lowest z depths than the other triangles 4 to 11 and thus, triangles 12 and 13 will generally displace these other triangles when competition for a triangle buffer location occurs (barring non-visible region cases).

After bounding box determination, multiple triangle issues (for large bounding boxes that require multiple coverage masks), z evaluations, z compares, and writing to the triangle buffer and the corresponding locations in the z buffer, the contents of the triangle buffer (and z buffer) would appear as shown in FIG. 36(B). Of course, the z buffer stores z values associated with specific spatial locations on the triangle while the triangle buffer stores various other data associated with the triangle. The contents of the triangle buffer and the specific locations where the triangles are stored are important during scan-out if the user wants to render the correct image. Notice that the triangle buffer is not full although a complete image can be rendered with just these data in the buffer. Thus, unlike frame buffer technology, less memory accesses are required because a pixel need not be stored at every pixel location.

At the end of the frame period, the system loads triangle data from the triangle buffer to the triangle cache. During this loading, the system also loads data from the triangle cache to the column of coefficient evaluators and then to the array of z-interpolator processors column by column. As one column of the array of z-interpolator processors is filled, the system loads data to the next column of the array of z-interpolator processors. After the last column in the array z-interpolator processors is filled, the system loads the next column of data into the first column in the array of z-interpolator processors. This round robin column loading of the array of z-interpolator processors continues indefinitely.

Figures 48A, 48B, 48C, 48D, 48E, 48F:
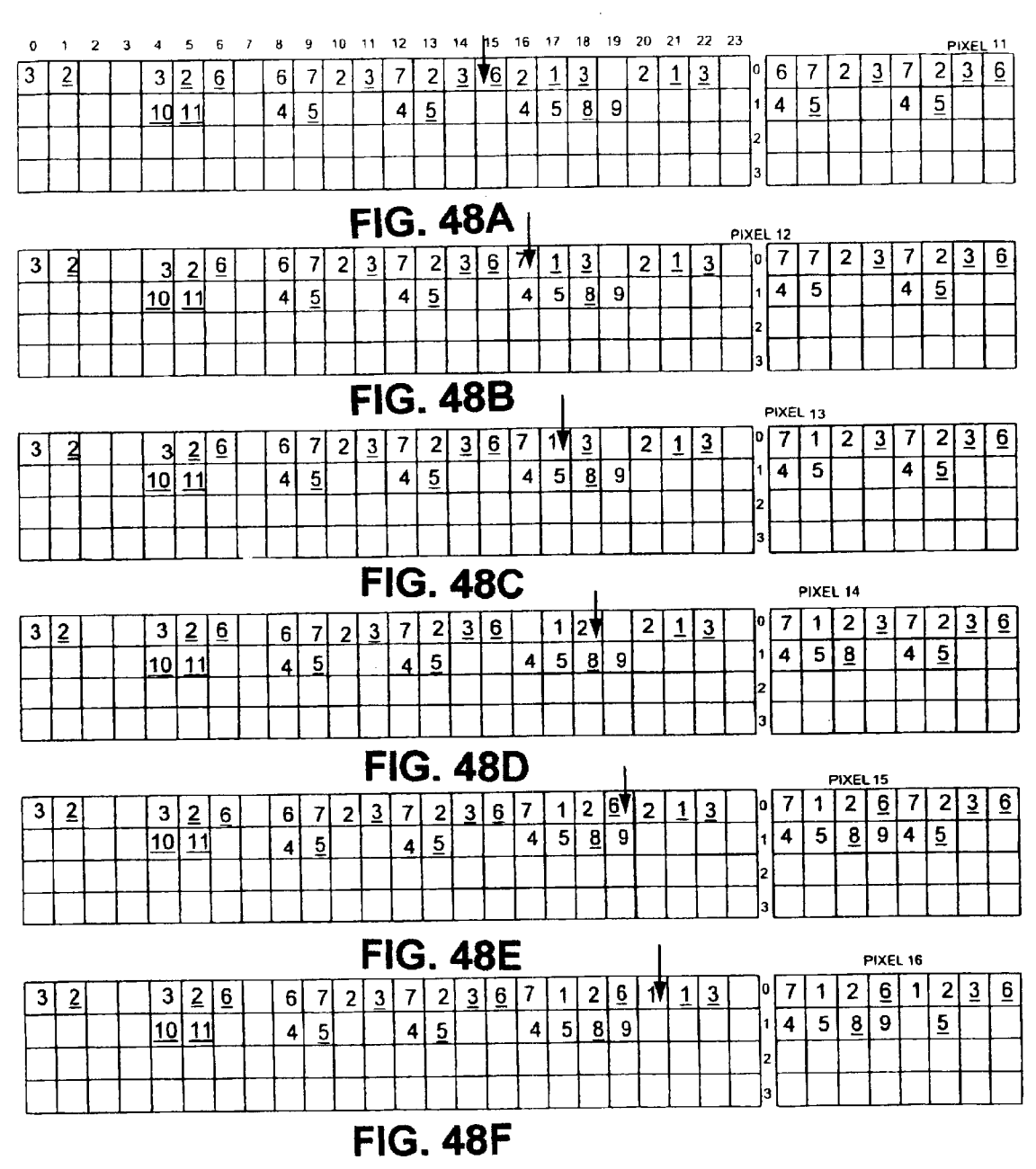

FIGS. 37(A) to 37(F) illustrate the contents of the triangle cache and the corresponding contents of the array of z-interpolator processors based on the contents of the triangle buffer of FIG. 36(B) so that the scan-out operation in accordance with one embodiment of the present invention can be understood. The following Table A provides the figure numbers corresponding to the current pixel location for which a pixel is being generated, the current triangle buffer location from which data is being loaded into the triangle cache, and the current triangle cache location where data from the triangle buffer is being loaded. For example, FIG. 48(D) shows that the current pixel location for which the system is generating a pixel is location (14, 4). However, the system is loading data from triangle buffer location (18, 4) into triangle cache location (18, 0), and thus, the triangle cache data loading location is four locations ahead of the pixel location, in accordance with one embodiment of the present invention.

TABLE A

Memory Location v. FIGS.

| Current Pixel Location | Current Triangle Buffer Location | Current Triangle Cache Location | FIG. |
|---|---|---|---|
| (0, 0) | (4, 0) | (4, 0) | 37(A) |
| (1, 0) | (5, 0) | (5, 0) | 37(B) |
| (2, 0) | (6, 0) | (6, 0) | 37(C) |
| (3, 0) | (7, 0) | (7, 0) | 37(D) |
| (4, 0) | (8, 0) | (8, 0) | 37(E) |
| (5, 0) | (9, 0) | (9, 0) | 37(F) |
| (6, 0) | (10, 0) | (10, 0) | 38(A) |
| (7, 0) | (11, 0) | (11, 0) | 38(B) |
| (8, 0) | (12, 0) | (12, 0) | 38(C) |
| (9, 0) | (13, 0) | (13, 0) | 38(D) |
| (10, 0) | (14, 0) | (14, 0) | 38(E) |
| (11, 0) | (15, 0) | (15, 0) | 38(F) |
| (12, 0) | (16, 0) | (16, 0) | 39(A) |
| (13, 0) | (17, 0) | (17, 0) | 39(B) |
| (14, 0) | (18, 0) | (18, 0) | 39(C) |
| (15, 0) | (19, 0) | (19, 0) | 39(D) |
| (16, 0) | (20, 0) | (20, 0) | 39(E) |
| (17, 0) | (21, 0) | (21, 0) | 39(F) |
| (18, 0) | (22, 0) | (22, 0) | 40(A) |
| (19, 0) | (23, 0) | (23, 0) | 40(B) |
| (20, 0) | (0, 1) | (0, 1) | 40(C) |
| (21, 0) | (1, 1) | (1, 1) | 40(D) |
| (22, 0) | (2, 1) | (2, 1) | 40(E) |
| (23, 0) | (3, 1) | (3, 1) | 40(F) |
| (0, 1) | (4, 1) | (4, 1) | 41(A) |
| (1, 1) | (5, 1) | (5, 1) | 41(B) |
| (2, 1) | (6, 1) | (6, 1) | 41(C) |
| (3, 1) | (7, 1) | (7, 1) | 41(D) |
| (4, 1) | (8, 1) | (8, 1) | 41(E) |
| (5, 1) | (9, 1) | (9, 1) | 41(F) |
| (6, 1) | (10, 1) | (10, 1) | 42(A) |
| (7, 1) | (11, 1) | (11, 1) | 42(B) |
| (8, 1) | (12, 1) | (12, 1) | 42(C) |
| (9, 1) | (13, 1) | (13, 1) | 42(D) |
| (10, 1) | (14, 1) | (14, 1) | 42(E) |
| (11, 1) | (15, 1) | (15, 1) | 42(F) |
| (12, 1) | (16, 1) | (16, 1) | 43(A) |
| (13, 1) | (17, 1) | (17, 1) | 43(B) |
| (14, 1) | (18, 1) | (18, 1) | 43(C) |
| (15, 1) | (19, 1) | (19, 1) | 43(D) |
| (16, 1) | (20, 1) | (20, 1) | 43(E) |
| (17, 1) | (21, 1) | (21, 1) | 43(F) |
| (18, 1) | (22, 1) | (22, 1) | 44(A) |
| (19, 1) | (23, 1) | (23, 1) | 44(B) |
| ... | ... | ... | N/A |
| (20, 3) | (0, 4) | (0, 0) | 45(A) |
| (21, 3) | (1, 4) | (1, 0) | 45(B) |
| (22, 3) | (2, 4) | (2, 0) | 45(C) |
| (23, 3) | (3, 4) | (3, 0) | 46(A) |
| (0, 4) | (4, 4) | (4, 0) | 46(B) |
| (1, 4) | (5, 4) | (5, 0) | 46(C) |
| (2, 4) | (6, 4) | (6, 0) | 46(D) |
| (3, 4) | (7, 4) | (7, 0) | 46(E) |
| (4, 4) | (8, 4) | (8, 0) | 46(F) |
| (5, 4) | (9, 4) | (9, 0) | 47(A) |
| (6, 4) | (10, 4) | (10, 0) | 47(B) |
| (7, 4) | (11, 4) | (11, 0) | 47(C) |
| (8, 4) | (12, 4) | (12, 0) | 47(D) |
| (9, 4) | (13, 4) | (13, 0) | 47(E) |
| (10, 4) | (14, 4) | (14, 0) | 47(F) |
| (11, 4) | (15, 4) | (15, 0) | 48(A) |
| (12, 4) | (16, 4) | (16, 0) | 48(B) |
| (13, 4) | (17, 4) | (17, 0) | 48(C) |
| (14, 4) | (18, 4) | (18, 0) | 48(D) |
| (15, 4) | (19, 4) | (19, 0) | 48(E) |
| (16, 4) | (20, 4) | (20, 0) | 48(F) |
| (17, 4) | (21, 4) | (21, 0) | 49(A) |
| (18, 4) | (22, 4) | (22, 0) | 49(B) |
| (19, 4) | (23, 4) | (23, 0) | 49(C) |
| (20, 4) | (0, 5) | (0, 1) | 49(D) |
| (21, 4) | (1, 5) | (1, 1) | 49(E) |
| (22, 4) | (2, 5) | (2, 1) | 49(F) |
| (23, 4) | (3, 5) | (3, 1) | 50(A) |
| (0, 5) | (4, 5) | (4, 1) | 50(B) |
| (1, 5) | (5, 5) | (5, 1) | 50(C) |
| (2, 5) | (6, 5) | (6, 1) | 50(D) |
| (3, 5) | (7, 5) | (7, 1) | 50(E) |
| (4, 5) | (8, 5) | (8, 1) | 50(F) |
| (5, 5) | (9, 5) | (9, 1) | 51(A) |
| (6, 5) | (10, 5) | (10, 1) | 51(B) |
| (7, 5) | (11, 5) | (11, 1) | 51(C) |
| (8, 5) | (12, 5) | (12, 1) | 51(D) |
| (9, 5) | (13, 5) | (13, 1) | 51(E) |
| (10, 5) | (14, 5) | (14, 1) | 51(F) |
| (11, 5) | (15, 5) | (15, 1) | 52(A) |
| (12, 5) | (16, 5) | (16, 1) | 52(B) |
| (13, 5) | (17, 5) | (17, 1) | 52(C) |
| (14, 5) | (18, 5) | (18, 1) | 52(D) |
| (15, 5) | (19, 5) | (19, 1) | 52(E) |
| (16, 5) | (20, 5) | (20, 1) | 52(F) |

Because the system is pipelined, at any given moment in time, the contents of the triangle cache do not correspond to the contents of the array of z-interpolator processors. The array processors are located several stages further down the pipeline than the triangle cache and thus, some time must pass before the contents of the array processors reflect the data that corresponds to the contents of the triangle cache. Thus, at different time periods that correspond to the number of stages separating the triangle cache from the array processors, the contents of the array processors correspond to the data that had been processed from the triangle cache. For each pair of triangle cache and array processors, FIGS. 37 to 52 attempt to show the contents of the triangle cache at one time period on the left side of the figure and the corresponding contents of the array processors several cycles later on the right side of the figure so that the contents of the array processors reflect the original contents of the triangle cache after some processing.

Figures 37A, 37B, 37C, 37D, 37E, 37F:
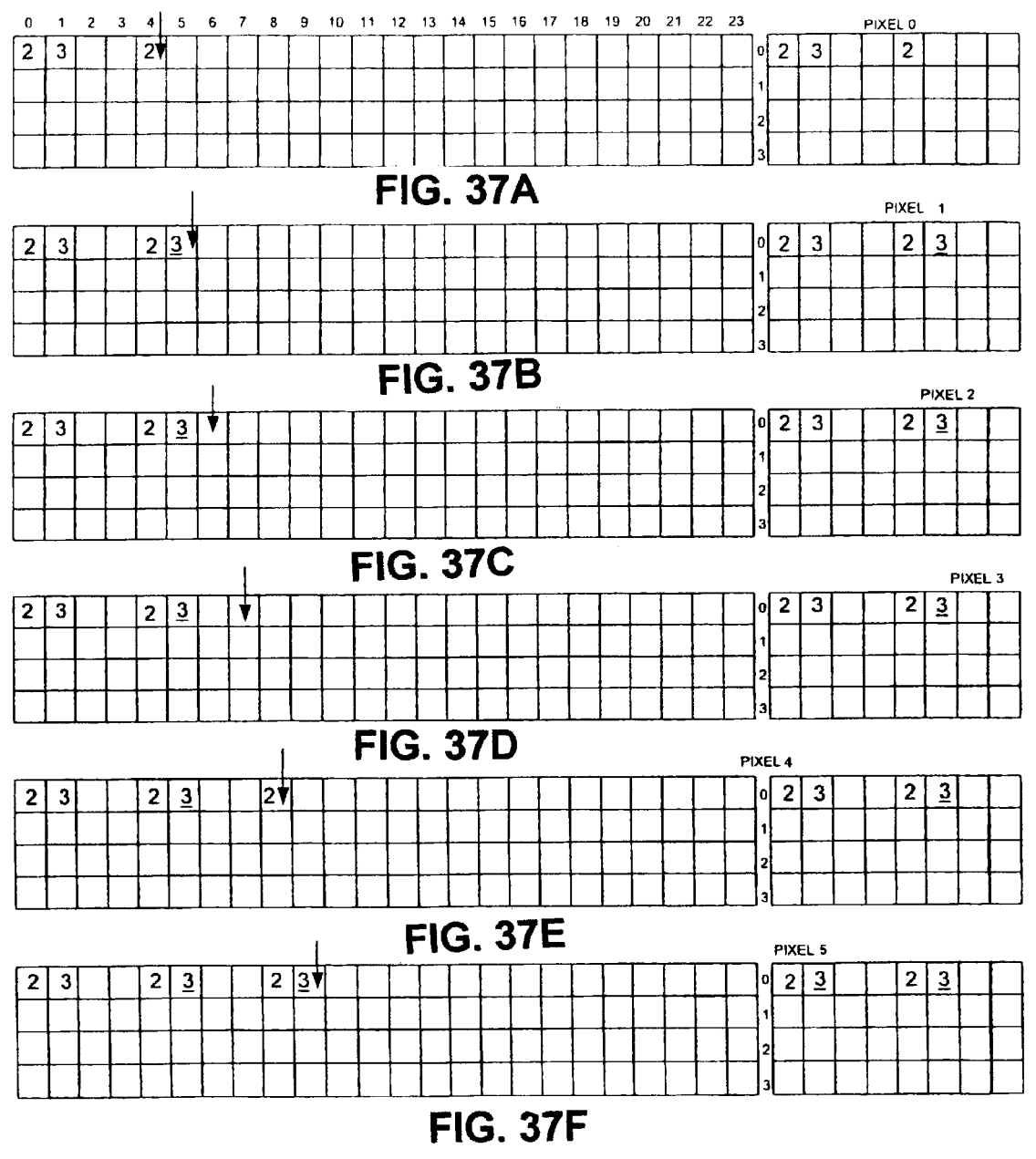

Turning to FIG. 37(A), prior to any data being loaded into the triangle cache, some blank signals have been provided to the various components in the scan-out logic pipeline so that no pixel is generated for any pixel location. At the start of the scan-out cycle for this frame period, column 0 of the first row of the triangle cache receives triangle 2 from triangle buffer location (0, 0). The column of coefficient evaluators receives the data along the entire column 0 in the triangle cache to generate left, right, z, and dz information for every triangle in the column to the array of z-interpolator processors. At this point, only triangle 2 exists in the entire column 0. The pixel location that is being processed is located 4 locations to the left of location (0, 0), which is outside the screen space. The triangle cache next receives triangle 3 data from triangle buffer location (1, 0) for storage at triangle cache column 1 of the first row. The next two data are empty.

The cycle that corresponds to the next data that is received by the triangle cache also corresponds to the first pixel position for which a pixel can be generated—location (0, 0). The fifth data that enters the triangle cache is triangle 2 from triangle buffer location (4, 0) for storage at triangle cache column 4 in the first row. The contents of the array of z-interpolator processors 10 corresponding to these data are as shown in FIG. 37(A). As mentioned earlier, because the array of z-interpolator processors is located deeper down in the pipeline than the triangle cache, the contents of the array of z-interpolator processors that correspond to these data are obtained several cycles later when the contents of the triangle make their way down the pipeline to the array of z-interpolator processors.

At pixel location (0, 0), the array of z-interpolator processors are processing data associated with triangles 2 and 3. Prior to this cycle, the array of z-interpolator processors provided zmax to the image composition network because all locations prior to pixel position (0, 0) were outside the span of all triangles in the array of z-interpolator processors. Location (0, 0), however, is inside the span of all triangles in the array of z-interpolator processors. The current column is column 0. The left and right edges for triangle 3 is (0, 0). The left edge of triangle 2 is (0, 0) and the right edge is (23, 0). This current location is within the span for both triangles 2 and 3. Both triangles 2 and 3 are at the same depth. Depending on which input lines to the image composition network are associated with the array of z-interpolator processor outputs, either triangle 2 or 3 could win the competition. Assume triangle 2 wins the competition. The pixel generated for location (0, 0) is based on triangle 2.

For the next location (1, 0) for which a pixel is to be generated, FIG. 37(B) shows that data from triangle buffer location (5, 0) has been stored in triangle cache location (5, 0). This is consistent with the four-cycle out of phase loading and computation of the system. This data is triangle 3, the non-visible region of triangle 3. The corresponding contents of the array of z-interpolator processors are also shown. The competing triangles are triangles 2, 3 and 3. Since the pixel location has moved from (0, 0) to (1, 0), the z values are also updated from the z values at location (0, 0) to (1, 0). For triangle 2, the current location is still within its span so the new z value at location (1, 0) is the z value from location (0, 0) plus the dz value (per FIG. 26). This new z value is an interpolated z value for location (1, 0). For triangle 3 (and 3), the current location (1, 0) is outside its span so the z value for triangle 3 is associated with $z_{max}$. The image composition network evaluates these triangles and declares that triangle 2 has the lowest z value and hence, triangle 2 is the winning triangle that is used to generate the pixel for location (1, 0).

For the next two locations (2, 0) and (3, 0), the results are the same as for location (1, 0) because no new data are received for the next two triangle cache locations (6, 0) and (7, 0). The pixel locations (2, 0) and (3, 0) are still outside the span for triangle 3. These pixel locations are however inside the span for triangle 2 and hence, after interpolating the z values for locations (2, 0) and (3, 0), the image composition would determine that these z values for triangle 2 would be the lowest for locations (2, 0) and (3, 0). The contents of the triangle cache and the array of z-interpolator processors for processing the data for pixel locations (2, 0) and (3, 0) are shown in FIGS. 37(C) and 37(D), respectively.

For pixel location (4, 0), triangle 2 is stored at triangle cache location (8, 0), as shown in FIG. 37(E). The system has already loaded a column of data into the last column in the array of z-interpolator processors, so the system loads the new data into the first column in the array of z-interpolator processors by writing over the existing data. As shown in FIG. 37(E), the competing triangles are triangles 2, 3 and 3. Since the pixel location has moved from (3, 0) to (4, 0), the z values are also updated from the z values at location (3, 0) to (4, 0). For triangle 2, the current location is still within its span so the new z value at location (4, 0) is the z value from location (3, 0) plus the dz value (per FIG. 26). This new z value is an interpolated z value for location (4, 0). For triangle 3 (and 3), the current location (4, 0) is still outside its span so the z value for triangle 3 is associated with $z_{max}$. The image composition network evaluates these triangles and declares that triangle 2 has the lowest z value and hence, triangle 2 is the winning triangle that is used to generate the pixel for location (4, 0).

In FIG. 37(F), the system is in the process of generating a pixel for pixel location (5, 0). New triangle 3 is stored at triangle cache location (9, 0). The system loads the new data into the second column in the array of z-interpolator processors by writing over the existing data. As shown in FIG. 37(F), the competing triangles are triangles 2 and 3. Since the pixel location has moved from (4, 0) to (5, 0), the z values are also updated from the z values at location (4, 0) to (5, 0). For triangle 2, the current location is still within its span so the new z value at location (4, 0) is the z value from location (4, 0) plus the dz value (per FIG. 26). This new z value is an interpolated z value for location (5, 0). For triangle 3, the z value is of course, $z_{max}$. The image composition network evaluates these triangles and declares that triangle 2 has the lowest z value and hence, triangle 2 is the winning triangle that is used to generate the pixel for location (5, 0).

Figure 40A:
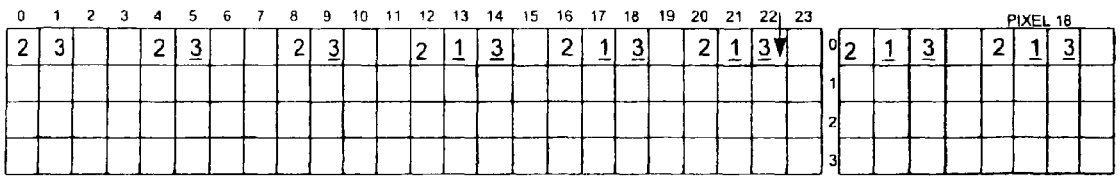
FIGS. 40(A)–40(F) show the contents of the triangle cache and the array of z-interpolator processors when the pipelined graphics system of the present invention is generating pixels for pixel locations $(18, 0)$ to $(23, 0)$, respectively.
Figure 40B:
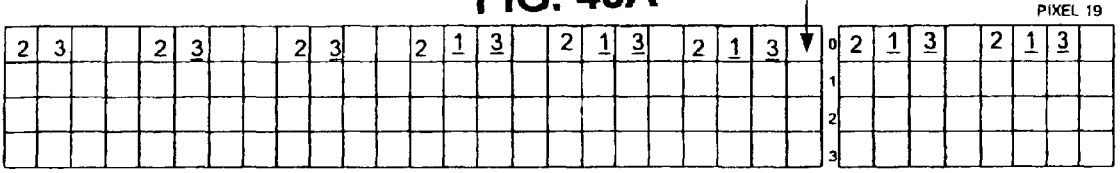
Figure 40C:
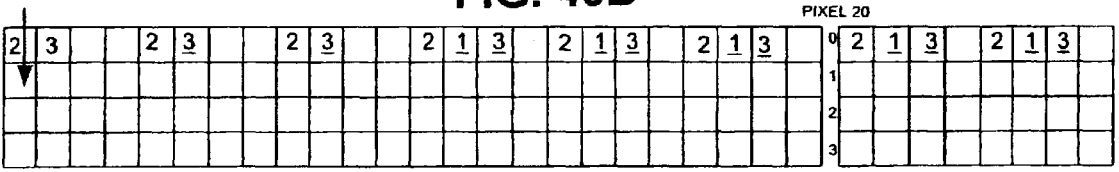
Figure 40D:
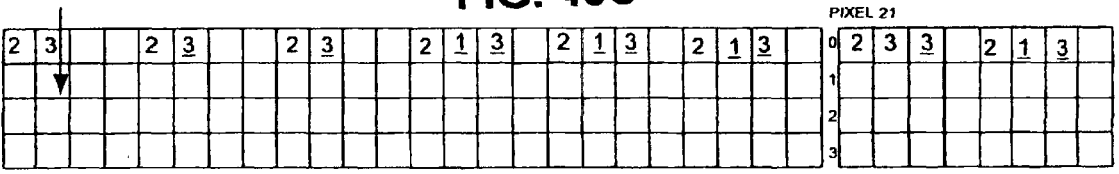
Figure 40E:
Figure 40F:
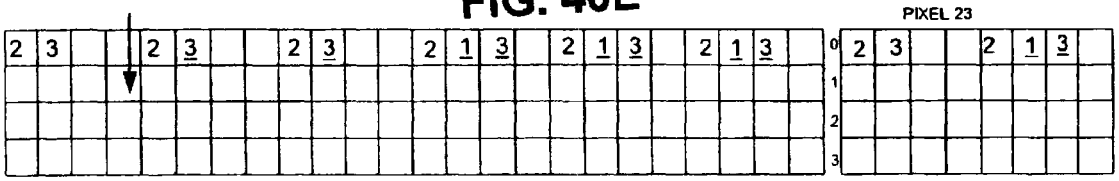
Figure 50A:
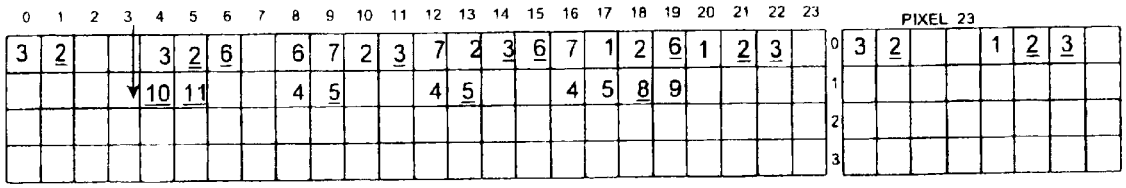
FIGS. 50(A)–50(F) show the contents of the triangle cache and the array of z-interpolator processors when the pipelined graphics system of the present invention is generating pixels for pixel locations (23, 4) to (4, 5), respectively.
Figure 50B:
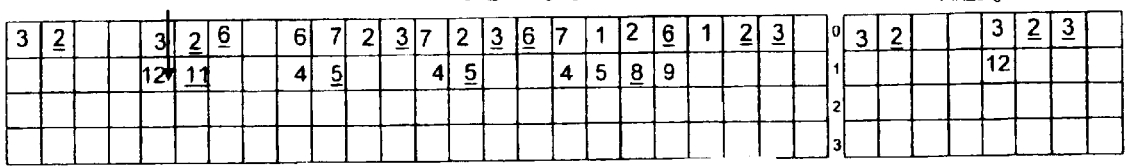
Figure 50C:
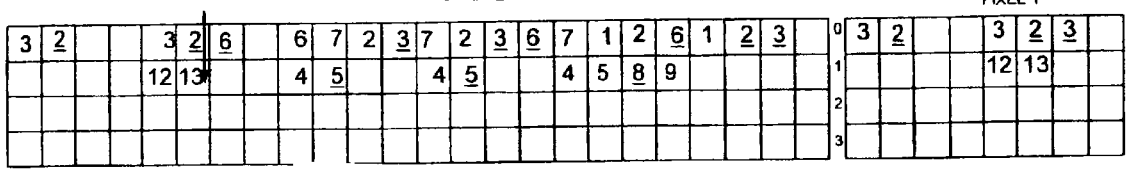
Figure 50D:
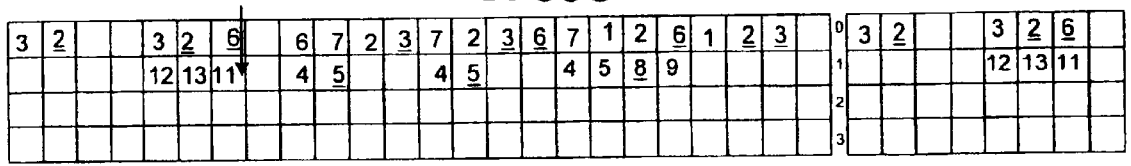
Figure 50E:
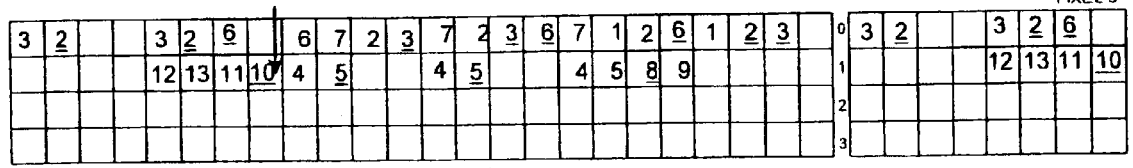
Figure 50F:
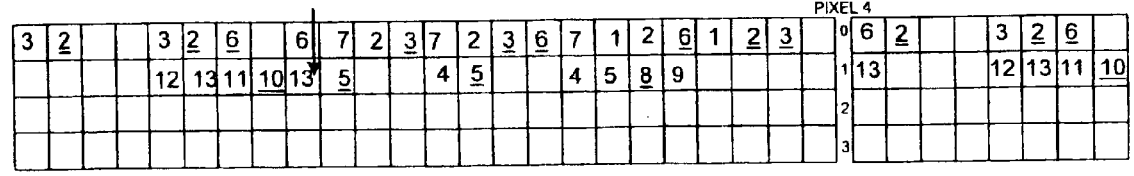

This process continues to the end of the row and triangle 2 continues to win for every pixel position. FIGS. 38(A) to 38(F) show the contents of the triangle cache and the array of z-interpolator processors as the system writes data into triangle cache locations (10, 0) to (15, 0) corresponding to pixel generation for pixel locations (6, 0) to (11, 0). Continuing, FIGS. 39(A) to 39(F) show the contents of the triangle cache and the array of z-interpolator processors as the system writes data into triangle cache locations (16, 0) to (21, 0) corresponding to pixel generation for pixel locations (12, 0) to (17, 0). Continuing further to the end of the row, FIGS. 40(A) and 40(B) show the contents of the triangle cache and the array of z-interpolator processors as the system writes data into triangle cache locations (22, 0) and (23, 0) corresponding to pixel generation for pixel locations (18, 0) and (19, 0).

Figures 41A, 41B, 41C, 41D, 41E, 41F:
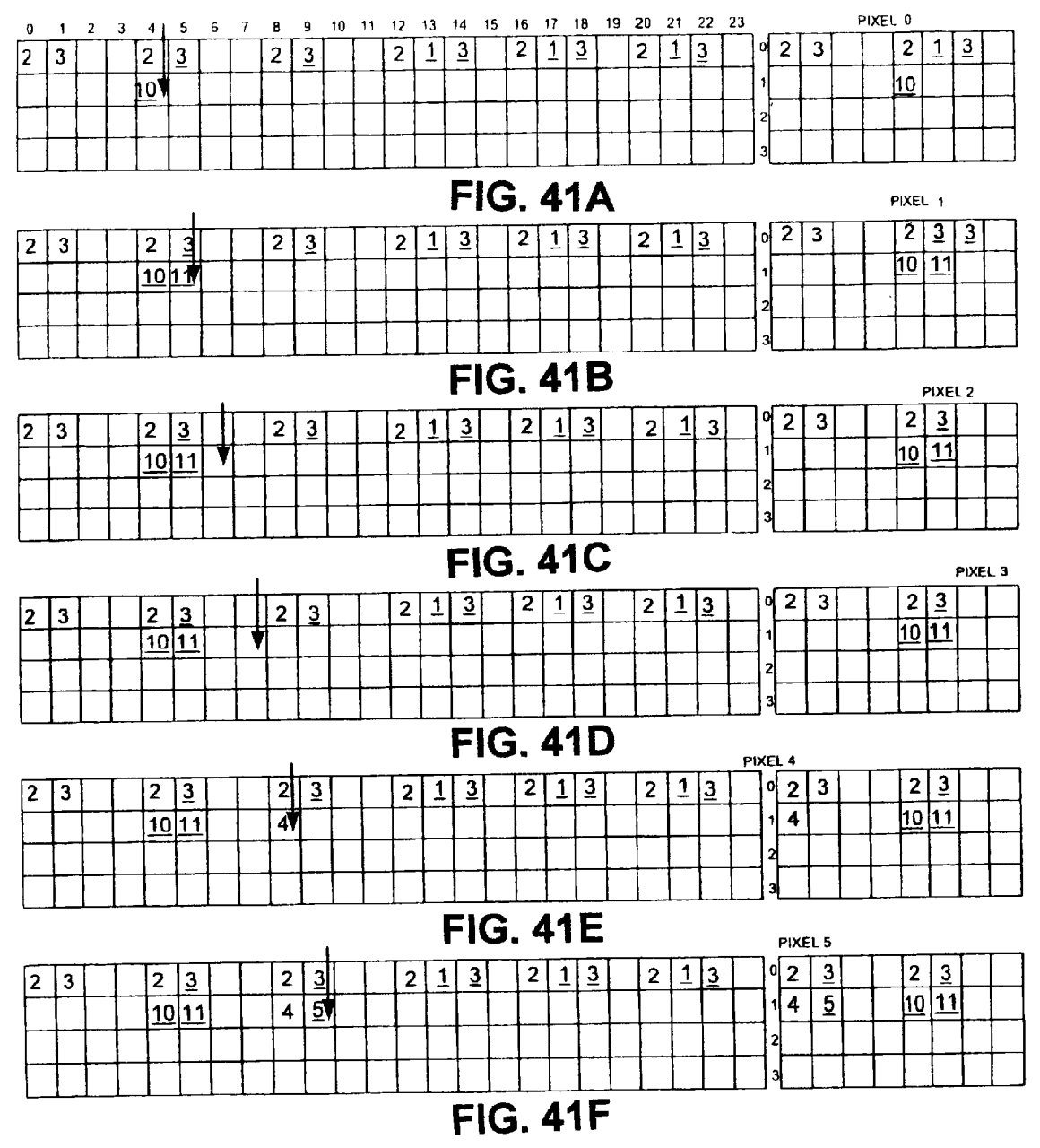

Having reached the end of the first row, the system is now ready to fill a new row of the triangle cache even though the out of phase scan-out logic is still processing pixels for the first row. FIGS. 40(C) to 40(F) show the contents of the triangle cache and the array of z-interpolator processors as the system writes data into triangle cache locations (0, 1) to (3,1) corresponding to pixel generation for pixel locations (20, 0) to (23, 0). These four locations happen to be empty. Regardless, the system loads a column of data from the triangle cache to the coefficient evaluators and then to the array of z-interpolator processors. So, in FIG. 40(C), if the empty data in triangle buffer location (0, 1) is the newest data that is written into triangle cache location (0, 1), the column associated with this empty data (i.e., column 0) is loaded into the column of coefficient evaluators which then provides their results corresponding to this associated column of data to the array of z-interpolator processors. Triangle 2 in triangle cache location (0, 1) is the only data in this column at this point. Because a new row is being processed in the triangle cache, the span information (i.e., left and right edges) determined by the coefficient evaluators is associated with this new row (i.e., refer to "row" data being evaluated in the coefficient evaluator of FIGS. 55 and 56). However, because the current column is associated with the pixel location at the end of the row in the previous row, the z value that is generated by the coefficient evaluators is the left edge of the triangles in the second row. This z value is output to the array of z-interpolator processors which will hold this left edge z value until the current pixel location is within the span of their respective triangles where it will then begin the interpolation calculation (i.e., new z=old z+dz), After the system fills the first four triangle cache locations in the second row with data from the triangle buffer, the system has just commenced processing the data for generating a pixel for the last pixel location of the first row, due to the out of phase logic. When the system writes the data into the fifth triangle cache location of the second row (4, 1), the system is then ready to generate a pixel for the first pixel location of the second row (0, 1). For the pixel generation at this pixel location (0, 1), the corresponding contents of the triangle cache and the array of z-interpolator processors are shown in FIG. 41(A). The competing triangles are triangles 2, 3 1, 3 and 10. Since the pixel location has moved from (23, 0) to (0, 1), the z values are also updated as necessary. For triangle 2, the current location is outside its span so the new z value at location (1, 0) is $z_{max}$. For triangle 3, the current location (0, 1) is inside its span so the z value for triangle 3 is the left edge z value. For triangles 1, 10 and 3, the z values are, of course, $z_{max}$. The image composition network evaluates these triangles and declares that triangle 3 has the lowest z value and hence, triangle 3 is the winning triangle that is used to generate the pixel for location (0, 1).

The same process continues for pixel locations (1, 1) and (2, 1), as evident by the contents of the triangle cache and the array of z-interpolator processors in FIGS. 41(B) and 41(C). At location (2, 1), this location is within the span for both triangles 2 and 3. Both triangles 2 and 3 are at the same depth. Depending on which input lines to the image composition network are associated with the array of z-interpolator processor outputs, either triangle 2 or 3 could win the competition. Assume triangle 2 wins the competition. The pixel generated for location (2, 1) is based on triangle 2.

For pixel locations (3, 1) to (6, 1), as shown in FIGS. 41(D) to 41(F) and 42(A), the pixel locations are outside the span of triangle 3 so triangle 3 will be associated with $z_{max}$. These pixel locations are also outside the span of triangle 4, which appears in FIG. 41 (E) in triangle cache location (8, 1) for the first time. However, this location is inside the span for triangle 2. Triangle 2 wins the z competitions and is the winning triangle for which a pixel is generated for locations (3, 1) to (6, 1).

For pixel location (7, 1), the competing triangles are 2, 3, 4, 5, 10, and 11. For triangle 2, the current pixel location is inside the span of the triangle so the z value is updated by the array of z-interpolator processors (i.e., new z=old z+dz). For triangle 3, the current location is outside the span and hence the z value is $z_{max}$. For triangle 4, the current location is outside the span and hence the z value is $z_{max}$. For triangle 5, the current location is outside the span and hence the z value is $z_{max}$. For triangle 10, the current location is inside the span and hence, the actual z value at that location on the triangle is used. The system first loaded triangle 10 into the triangle cache location (4, 1) (see FIG. 41(A)) whereas the current triangle cache location is (11, 1). As the pixel location proceeded from (0, 1) in FIG. 41(A) to (7, 1) in FIG. 42(B), the z value in the array of z-interpolator processors for triangle 10 has been fixed at one particular value associated with the left edge of triangle 10. Note that the underlining is merely to indicate that $z_{max}$ is stored in the corresponding z buffer location and not that $z_{max}$ will be used for all z comparison purposes. Whether or not a triangle is underlined, the coefficient evaluator always evaluates initial z values (usually the z value at the left edge of the triangle or the actual z value of the triangle at that current pixel location) which will be used by the array of z-interpolator processors to interpolate the z value at select locations on the triangle. For triangle 11, the current location is inside the span and hence, the actual z value at that location on the triangle is used. Thus, for pixel location (7, 1), the competition is primarily between triangles 2, 10 and 11. Triangle 2, representing the background, is at the highest z depth. Both triangles 10 and 11 are at the same depth. Depending on which input lines to the image composition network are associated with the array of z-interpolator processor outputs, either triangle 10 or 11 could win the competition. Assume triangle 10 wins the competition. The pixel generated for location (7, 1) is based on triangle 10.

For pixel locations (8, 1) to (17, 1) along the row, triangle 4 is the winning triangle. The contents of the array of z-interpolator processors are shown in FIG. 42(C) to FIG. 42(F) and FIG. 43(A) to FIG. 43(F). These pixel locations correspond to the loading of triangle cache locations (12, 1) to (21, 1). These pixel locations are inside the respective spans of triangles 2 and 4, while they are outside the respective spans for all other triangles. Hence, these other triangles are at $z_{max}$ as output from the array of z-interpolator processors. Between triangles 2 and 4, triangle 4 is at a lower z depth at every location where the two triangles overlap.

Figures 44A, 44B:
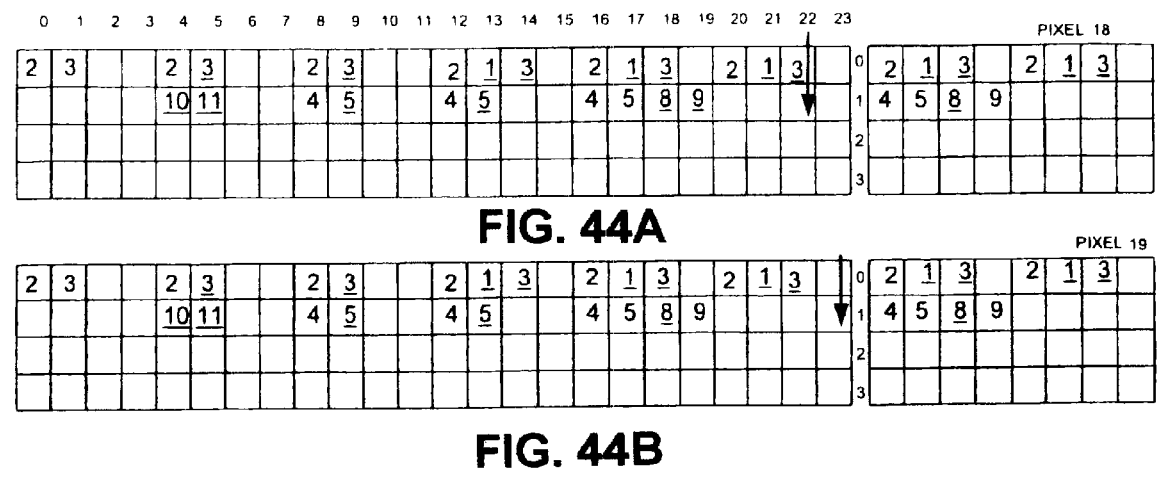

For pixel location (18, 1), the competition is primarily between triangles 2, 4 and 5, as shown in FIG. 44(A). This location is outside the respective spans of all other triangles in the array of z-interpolator processors. Hence, these other triangles are at $z_{max}$ as output from the array of z-interpolator processors. Triangle 2, representing the background, is at the highest z depth. Both triangles 4 and 5 are at the same depth. Depending on which input lines to the image composition network are associated with the array of z-interpolator processor outputs, either triangle 4 or 5 could win the competition. Assume triangle 5 wins the competition. The pixel generated for location (18, 1) is based on triangle 5.

For pixel location (19, 1), the competition is primarily between triangles 2, 4, 5, 8, and 9, as shown in FIG. 44(B). This location is outside the respective spans of all other triangles in the array of z-interpolator processors. Hence, these other triangles are at $z_{max}$ as output from the array of z-interpolator processors. Triangle 2, representing the background, is at the highest z depth. Both triangles 4 and 5 are at the same depth, and triangles 8 and 9 are at the same depth. However, triangles 8 and 9 are at lower z depths than triangles 4 and 5. Depending on which input lines to the image composition network are associated with the array of z-interpolator processor outputs, either triangle 8 or 9 could win the competition. Assume triangle 8 wins the competition. The pixel generated for location (19, 1) is based on triangle 8.

Up to this point, the system has loaded data from the triangle buffer to the triangle cache each location at time for the first two rows. During these loads, the system loaded a column of data from the triangle cache (regardless of whether the column was empty or full) to the column of coefficient evaluators. The system also loads the data from the column of coefficient evaluators to the array of z-interpolator processors. The pixel generation is always behind in time the triangle cache data loading by a coverage mask length of locations; that is, while the system is loading the triangle cache at location (x+C, y), the system is generating a pixel for location (x, y), where C is the length of the coverage mask. The next two rows in the triangle buffer is empty, not necessarily because no pixel is associated with these pixel locations but because the triangle buffer writing scheme did not require that these next two rows had to be filled with data to render this scene as depicted in FIG. 34(C). Even though no new data is loaded from rows 2 and 3 of the triangle buffer into the triangle cache, the scan-out logic still processes the data from rows 0 and 1 (with rows 2 and 3 empty) in the triangle cache (and triangle buffer) to properly render the scene. The span information would be different for each triangle because rows 2 and 3 are now implicated instead of rows 0 and 1. Although the same set of triangles may be competing at each pixel location, a different triangle may win because, as the span information has changed, each pixel location is inside or outside a different set of triangles. For example, in FIG. 42(A), pixel location (6, 1) had triangle 2 as the winning triangle. Triangle 10 was one of the triangles competing for that location but because that location was outside the span of triangle 10, triangle 10 was associated with $z_{max}$ in the array of z-interpolator processors for the z competition. In pixel location (6, 2) however, that location was within the spans for both triangles 2 and 10 but triangle 10 has a lower z depth and so triangle 10 wins the competition.

Figures 45A, 45B, 45C:
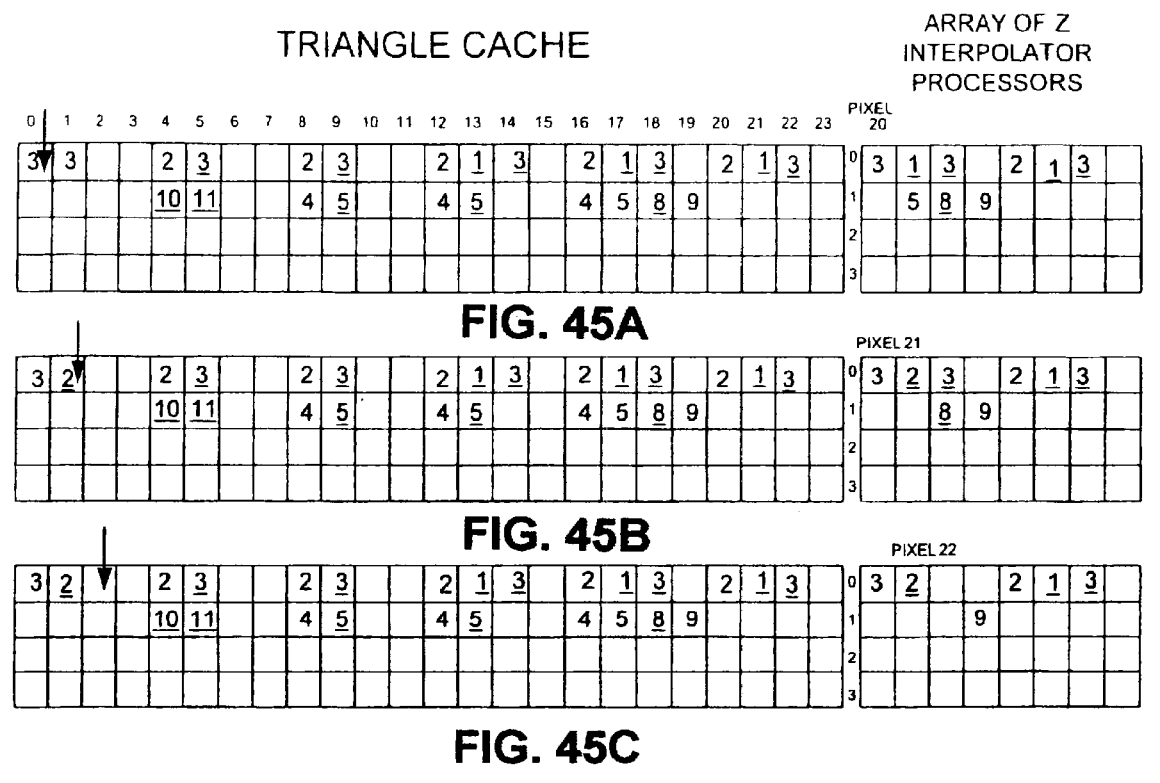

In FIG. 45(A), the system has already loaded the first four rows of data from the triangle buffer to the triangle cache as described above. Up to this point, the system had enough available triangle cache locations to store these first four rows of data. However, the next data will be from the fifth row of the triangle buffer (i.e., triangle buffer location (0, 4)) and although the triangle cache has the same number of columns as the triangle buffer, the triangle cache is also limited (by design) with only four rows.

One aspect of the design of the scan-out logic is the reuse of storage space in the triangle cache which is consistent with the sliding mask concept. Because the sliding mask is 8 columns by 4 rows, only four rows of data are needed at any given pixel location to generate the correct pixel. If the current pixel location is in the fifth row, most of the data from the first row are not needed because the current pixel location needs select data from the last four rows. Thus, the system can write over the existing data in the first row of the triangle cache, which was storing data from the first row of the triangle buffer, starting from the beginning of the first row with data from the fifth row of the triangle buffer, without any dire consequences. By starting at the beginning of the row, the data from the end of the first row of the triangle cache (which coincides with data from the first row of the triangle buffer) is preserved until the system no longer needs them. Remember, because the pixel generation is several memory locations out of phase with the data loading into the triangle cache, data from the end of the last four rows must be preserved even though the system is loading data from the fifth row of the triangle buffer into the first row of the triangle cache. The overwriting of data in the triangle cache starts from the beginning of the first row and thus, data stored near the end of the first four rows in the triangle cache are retained until they are no longer needed. By the time the overwriting occurs near the end of these rows, these data are no longer needed since the pixel location has moved to the next row.

In FIG. 45(A), data in the current triangle buffer location (0, 4) will now be loaded into triangle cache location (0, 0). Although triangle 2 was stored in triangle cache location (0, 0) prior to this cycle, the system will write over this data so that it can store triangle 3 at this location (0, 0). The data loading at triangle cache location (0, 0) from triangle buffer location (0, 4) also coincides with pixel generation at pixel location (20, 3), which is near the end of the fourth row. To generate the correct pixel at this pixel location (20, 3) at the end of the fourth row, the system needs triangle information from a range of locations defined by the sliding mask. This range of locations is from 3 columns to the left of the current column to three columns to the right of the current column, which are all stored in the triangle cache even though the system has started to load data from the next row (fifth row) and write over existing data in the first row of the triangle cache. In FIG. 45(A), this range includes columns 17 to 23 in the first four rows of the triangle buffer, which are all stored in the triangle cache and will make their way into the array of z-interpolator processors.

For this pixel location (20, 3), the competing triangles are 1, 2, 3 (and 3), 5, 8, and 9 as shown in the array of z-interpolator processors in FIG. 45(A). This location is outside the respective spans of all of these competing triangles except for triangle 1. Hence, these other triangles are at $z_{max}$ as output from the array of z-interpolator processors. The z value for triangle 1 is updated from the previous z value (i.e., new z=old z+dz). Triangle 1 wins the competition with a z value that is the lowest among the competing triangles. Triangle 1 will also win for the remaining pixel locations in this row. The contents of the triangle cache and the array of z-interpolator processors are shown in FIGS. 45(B) for pixel location (21, 3), 45(C) for pixel location (22, 3), and 46(A) for pixel location (23, 3).

For pixel location (0, 4), the system has already written over existing data in triangle cache locations (0, 0), (1, 0), (2, 0), and (3, 0), which correspond to triangle buffer locations (0, 4), (1, 4), (2, 4), and (3, 4), respectively. The system is now in the process of writing triangle 3 into triangle cache location (4, 0). The competing triangles are triangles 1, 2, 3 (and 0), and 10 as shown in the array of z-interpolator processors in FIG. 46(B). This location is outside the respective spans of all of these competing triangles except for triangle 3. Hence, these other triangles are at $z_{max}$ as output from the array of z-interpolator processors. The z value for triangle 3 is from the left edge of the triangle. Triangle 3 wins the competition with a z value that is the lowest among the competing triangles.

This process as described above will continue for every pixel location indefinitely or until the user decides to stop the rendering process. Refer to Table A for the remaining figures and remaining pixel locations. The teaching discussed above will enable the reader to understand the remaining figures in this example.

In the discussion of this example, cache burst access was not used to fill the triangle cache with data from the triangle buffer to simplify the discussion for teaching purposes. The reader should realize that in some embodiments, the triangle cache is filled by cache burst; that is, a triangle cache line can be filled with data from the triangle buffer via cache burst access. As known to those ordinarily skilled in the art, a cache line can be filled with less than the normal number of cycles. Thus, with cache burst access, an entire cache line can be filled ahead of the data being loaded into the column of coefficient evaluators. In these embodiments, a particular triangle cache location may have been filled several cycles ago even though the system is just now loading data from that triangle cache location into the column of coefficient evaluators. This concludes the discussion of the system operation example.

Summary

In sum, the graphics system in accordance with one embodiment of the present invention processes incoming triangle data and generates pixels via a triangle buffer logic and a scan-out logic. The triangle buffer logic identifies the triangles that may be in competition for a pixel location by writing triangle data to a triangle buffer in accordance with a triangle buffer writing scheme via z compares and the use of coverage masks to bound the system design. The scan-out logic takes these competing triangles, determines whether they are visible or not for a given pixel location, interpolates z values for visible triangles, and performs a z competition to determine the closest triangle for the given pixel location so that a pixel can be generated based on that winning triangle.

The graphics system receives triangle data from a front end processor. The triangle buffer stores triangle data that may or may not ultimately win for a pixel location, but so long as storage space is available within the defined coverage mask and the triangle data satisfies the requirements of the triangle buffer writing scheme, the triangle data are stored in the triangle buffer for later retrieval during scan-out processing.

The triangle buffer write scheme is as follows. The triangle buffer write operation essentially seeks a triangle buffer location for a newly received and formatted triangle within the confines of its coverage mask and then compares the new triangle with the triangle already stored therein (if a triangle is already stored therein) for z depth. Depending on the result of the comparison, the system assigns the winning triangle to that designated location and seeks a new location for the losing triangle within the confines of the coverage mask. The winning triangle can either be the existing triangle already stored there or the new triangle which the triangle buffer logic is attempting to write. Similarly, the losing triangle can be either the existing triangle or the new triangle. If a location cannot be found for the triangle within the confines of the coverage mask, the triangle is discarded. When a location has been found (or the triangle discarded), the system can process the next new triangle.

If any write is successful at any location, the system will perform two writes: (1) the corresponding triangle data will be stored in the triangle buffer; and (2) the actual z value for visible regions or the artificial $z_{max}$ for non-visible regions at the corresponding location in the z buffer. If the current triangle loses a z comparison against a triangle that was already stored therein in the target location, the system seeks a new location for the current "failed" triangle within the coverage mask. Conversely, if a triangle that was previously stored at a target location has been displaced by the current triangle, the system must find a new location for the displaced triangle within the confines of the coverage mask the system had used to store the displaced triangle in that memory location in a prior cycle. Note that the position of the coverage mask does not change with respect to a particular triangle data, whether new or displaced triangle data.

If a triangle is successfully written into a target location because that location was empty, the system need not perform a new location seek routine within this comparison cycle again because no outstanding triangles exist. At another comparison cycle, the new location seek routine may be invoked because a new location may be necessary for a current triangle that has lost a z comparison (i.e., the "failed" triangle) or a triangle that was stored in a target location lost a z comparison against a current triangle (i.e., the "displaced" triangle).

The scan-out logic performs the following functions using the triangles stored in the triangle buffer: (1) identifies those stored triangles that are in competition for a given pixel location; (2) determines visibility of triangles for a particular pixel location; (3) determines z depth values for all these identified triangles; (4) compares depth values of all these competing triangles for a given pixel location; (5) determines the winning triangle among the competing triangles in which the winning triangle represents the triangle (and hence object or portion of an object) that is at the front of all other triangles (and all other objects or portions of objects), assuming no transparencies are involved; and (5) generates a pixel from the winning triangle for delivery to the output device.

The scan-out logic subsystem includes a triangle cache, a column of coefficient evaluators, an array of z-interpolator processors, and an image composition network which all function to ultimately convert triangles to pixels. To improve processing throughput, the scan-out logic is pipelined so that several multiple different data can be processed concurrently in different stages in the pipeline. The triangle cache receives 3D triangle data and z-plane equations (for both z depth and color) from the triangle buffer. The coefficient evaluator receives a column of these 3D information from the triangle cache and converts them to 2D spans, z, and dz. The array of z-interpolator processors and the image composition network receive the 2D spans, z, and dz information from the coefficient evaluator and determine the winning triangle for each pixel location. A shader/texture mapper finally converts the winning triangles to 1D pixels. In other embodiments, a triangle cache is not used; rather, appropriate memory address logic is used to select data from the triangle buffer and feed them directly to the coefficient evaluator.

In one embodiment, two triangle buffers are provided so that one buffer can be written with new incoming triangle data from the front end processor while the other buffer can be used for scan-out and during the next frame period, the roles of the triangle buffers are reversed. For scan-out, the triangle data located within the sliding mask in the triangle buffer are processed. For each sliding mask, or pixel location, the triangles that are competing for the given pixel location are evaluated and compared to each other so that a single triangle wins the competition for representation as the pixel for that given pixel location. These pixels are generated straight out of the triangle buffer and no other buffering mechanism, such as the traditional frame buffer, are utilized. Pixels are generated and provided to the output device without additional buffering.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. One skilled in the art will readily appreciate that other applications may be substituted for those set forth herein without departing from the spirit and scope of the present invention. Accordingly, the invention should only be limited by the Claims included below.

I claim:

1. A back end graphics processing system for receiving primitive object data from a front end graphics processing system for processing primitive object data to generate pixels for delivery to an output system, comprising:

a primitive object buffer logic for receiving primitive object data from the front end graphics system, processing the primitive object data and storing for each pixel to be generated a bounded amount of primitive object data; and a scan-out logic coupled to the primitive object buffer logic for receiving primitive object data stored in the primitive object buffer logic and for generating pixels during scan-out of the corresponding pixels to an output system.

2. The back end graphics processing system of claim 1, wherein the primitive object data is micro-polygon data, wherein the micro-polygon data is a grouping of a plurality of samples.

3. The back end graphics processing system of claim 1, wherein the primitive object data is triangle data.

4. The back end graphics processing system of claim 1, wherein the primitive object buffer logic further comprises:
   a primitive object buffer for storing primitive object data in a plurality of memory locations; and
   a write logic for receiving the primitive object data from the front end graphics processing system and determining a targeted memory location in the primitive object buffer for writing the primitive object data into the targeted memory location.

5. The back end graphics processing system of claim 4, wherein the plurality of memory locations correspond to screen locations at the output system.

6. The back end graphics processing system of claim 4, wherein the write logic further comprises:
   a bounding box logic for receiving the primitive object data from the front end graphics processing system and generating a bounding box that is sized to fit the primitive object data, wherein the bounding box is associated with the smallest rectangle that can fit the primitive object data; and
   a primitive object issue logic for using a coverage mask with predetermined dimensions and issuing N primitive object data if N coverage masks are needed to cover the bounding box of the primitive object data.

7. The back end graphics processing system of claim 6, wherein the N coverage masks needed to cover the bounding box for the primitive object data are placed adjacent each other without overlap.

8. The back end graphics processing system of claim 7, wherein each primitive object data issued for each coverage mask is associated with an initial targeted memory location, wherein the initial targeted memory location is the upper left corner of each coverage mask.

9. The back end graphics processing system of claim 4 wherein the primitive object data received by the write logic is designated as new primitive object data and the primitive object data that may already be stored in the targeted memory location in the primitive object buffer is designated as old primitive object data, wherein the write logic further comprises:
   a z buffer for storing z depth values of a plurality of primitive object data, wherein each primitive object data is associated with a particular z value at each targeted memory location; and
   a comparison logic for comparing the z value of the old primitive object data at the targeted memory location to the z value of the new primitive object at the targeted memory location, and designating the targeted memory location for the primitive object data that wins the comparison.

10. The back end graphics processing system of claim 9, wherein the comparison logic writes the new primitive object data into the targeted memory location if its z value is lesser than the z value of the old primitive object data at the targeted memory location.

11. The back end graphics processing system of claim 4 wherein the primitive object data received by the write logic is designated as new primitive object data and the primitive object data that may already be stored in the targeted memory location in the primitive object buffer is designated as old primitive object data, wherein the write logic further comprises:
   a z buffer for storing z depth values of a plurality of primitive object data, wherein each primitive object data is associated with a particular z value at each targeted memory location; and
   a comparison logic for comparing the z value of the old primitive object data at the targeted memory location to the z value of the new primitive object at the targeted memory location, and designating the targeted memory location for the primitive object data that wins the comparison.

12. The back end graphics processing system of claim 11, wherein the comparison logic writes the new primitive object data into the targeted memory location if its z value is lesser than the z value of the old primitive object data at the targeted memory location.

13. The back end graphics processing system of claim 1, wherein the scan-out logic further comprises:
   a first processor for receiving primitive object data, slope information, and z-plane information for generating a final z depth information associated with all primitive objects competing for coverage at a given screen location, the final z-depth information including a z-depth value associated with the screen location; and
   a second processor coupled to the first processor for receiving the final z depth information associated with all primitive objects that are competing for the given specific screen location and resolving the competition by selecting a primitive object among the competing primitive objects with the lowest z depth value for the given screen location.

14. The back end graphics processing system of claim 13, further comprising a shader/texture logic for receiving an index to the winning primitive object from the second processor and for generating a pixel associated with the winning primitive object for delivery to the output system.

15. A method of writing a plurality of primitive object data to a primitive object buffer in a graphics processing system, each primitive object data associated with a primitive object that is used to render an image to an output device, comprising steps:
   defining a coverage mask, the coverage mask serving to limit the number of primitive objects competing to be displayed at any given pixel location of the output device;
   receiving a plurality of primitive object data associated with a plurality of primitive objects from a front end graphics system;
   defining a bounding box for each primitive object;
   determining the number of non-overlapping coverage masks that are needed to cover each bounding box;
   issuing as many primitive object data as there are coverage masks that are needed to cover each bounding box; and
   writing each primitive object data into at least one memory location in the primitive object buffer, wherein a primitive object data associated with a primitive object is written to at most one memory location within the confines of its coverage mask upon satisfaction of a set of primitive object buffer write conditions.

16. The method of claim 15, wherein the step of writing further comprises steps:

selecting a plurality of target memory locations in the primitive object buffer within the confines of the coverage masks for writing the primitive object data, where each coverage mask is associated with a target memory location for a primitive object; and writing the plurality of primitive object data into the plurality of target memory locations in the primitive object buffer upon satisfaction of a set of primitive object buffer write conditions.

17. A method of generating pixels from primitive object data in a graphics processing system, the primitive object data associated with a primitive object for rendering an image on an output device, comprising steps:

defining a coverage mask having particular dimensions, the coverage mask serving to limit the number of primitive objects competing to be displayed at any given pixel location of the output device;

receiving a new primitive object data associated with a primitive object from a front end graphics system, the primitive object associated with any location on the output device;

writing the new primitive object data into a memory location in the primitive object buffer within the confines of the coverage mask upon satisfaction of a set of primitive object buffer write conditions, the coverage mask providing a bounded set of possible memory locations for storage of the new primitive object data in the primitive object buffer; and generating a pixel based on the stored primitive object data in the primitive object buffer using a limited set of processors that are based on the particular dimensions of the coverage mask.

18. The method of claim 17, further comprising steps:

defining a bounding box for the primitive object;

determining the number of non-overlapping coverage masks that are needed to cover the bounding box;

issuing as many new primitive object data as there are coverage masks that are needed to cover the bounding box; and writing the new primitive object data into a memory location in the primitive object buffer within the confines of the coverage masks upon satisfaction of a set of primitive object buffer write conditions.

19. The method of claim 18, wherein the step of writing further comprises steps:

selecting a plurality of target memory locations in the primitive object buffer within the confines of the coverage mask for writing the new primitive object data, where each coverage mask is associated with a target memory location; and writing the new primitive object data into the plurality of target memory locations in the primitive object buffer upon satisfaction of a set of primitive object buffer write conditions.

20. The method of claim 19, wherein the step of writing further comprises steps:

selecting a target memory location among the plurality of target memory locations;

writing the new primitive object data into a target memory location among the plurality of target memory locations in the primitive object buffer if no other primitive object data had been previously stored in the selected target memory location; and writing the new primitive object data into the selected target memory location in the primitive object buffer if its z value is less than the z value of an old primitive object data, if the old primitive object data had been previously stored at the selected target memory location.

21. The method of claim 20, wherein the step of writing the new primitive object data into the plurality of target memory locations further comprises steps:

determining another target memory location within the confines of the coverage mask if the new primitive object data is unsuccessful in writing to a previously selected target memory location; and discarding the new primitive object data if it is unsuccessful in writing to any selected target memory location within the confines of its coverage mask.

22. The method of claim 20, wherein the step of writing the new primitive object data into the plurality of target memory locations further comprises steps:

displacing the old primitive object data, now designated as displaced primitive object data, from the selected target memory location if the new primitive object data is associated with a z depth value that is less than the z depth value of the old primitive object data;

re-positioning the coverage mask so that the upper left corner of the coverage mask is associated with the memory location where the displaced primitive object data was previously stored but displaced from;

determining another target memory location within the confines of the re-positioned coverage mask for the displaced primitive object data;

writing the displaced primitive object data into the another target memory location in the primitive object buffer if no other primitive object data had been previously stored in the another target memory location; and writing the displaced primitive object data into the another target memory location in the primitive object buffer if its z value is less than the z value of an old primitive object data, if the old primitive object data had been previously stored at the another target memory location.

23. The method of claim 17, wherein the step of generating pixels further comprises steps:

receiving primitive object data, slope information, and z-plane information for generating a final z depth information associated with all primitive objects competing for coverage at each output device location; and generating the final z depth information associated with all primitive objects that are competing for the given output device location and resolving the competition by selecting the primitive object with the lowest z depth value among the competing primitive objects for the given output device location.

* * * * *